(12) United States Patent
Brown et al.

(10) Patent No.: US 8,271,105 B2
(45) Date of Patent: *Sep. 18, 2012

(54) MOTION CONTROL SYSTEMS

(75) Inventors: David W. Brown, Bingen, WA (US); Jay S. Clark, Bingen, WA (US)

(73) Assignee: Roy-G-Biv Corporation, Bingen, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/454,053

(22) Filed: Jun. 14, 2006

(65) Prior Publication Data

US 2006/0282180 A1  Dec. 14, 2006

Related U.S. Application Data

(63) Continuation of application No. 10/761,537, filed on Jan. 21, 2004, now abandoned, which is a continuation of application No. 10/316,451, filed on Dec. 10, 2002, now abandoned, which is a continuation of application No. 10/021,669, filed on Dec. 10, 2001, now Pat. No. 6,516,236, which is a continuation of application No. 09/191,981, filed on Nov. 13, 1998, now abandoned, which is a continuation of application No. 08/656,421, filed on May 30, 1996, now Pat. No. 5,867,385, which is a continuation-in-part of application No. 08/454,736, filed on May 30, 1995, now Pat. No. 5,691,897, application No. 11/454,053, which is a continuation of application No. 09/795,777, filed on
(Continued)

(51) Int. Cl.
*G06F 19/00* (2011.01)

(52) U.S. Cl. .......................... 700/45; 700/188

(58) Field of Classification Search .................... 700/45, 700/64, 98, 173, 188, 182, 112, 247, 164; 717/130, 109, 124, 169; 715/763, 762, 500, 715/138

See application file for complete search history.

(56) References Cited

U.S. PATENT DOCUMENTS 4,078,195 A   3/1978 Mathias et al.
(Continued)

FOREIGN PATENT DOCUMENTS

CA   2222235   12/1996
(Continued)

OTHER PUBLICATIONS

U.S. Appl. No. 10/405,883, filed Apr. 1, 2003, Brown et al.
(Continued)

*Primary Examiner* — Kidest Bahta
(74) *Attorney, Agent, or Firm* — Michael R. Schacht; Schacht Law Office Inc.

(57) ABSTRACT

A method of debugging software used to communicate with a motion control system comprising the following steps. Debug information containing diagnostic information associated with a hardware motion control attribute is generated. At least one selected software driver is capable of sending the debug information to a debug target. A software application is caused to call a motion component function to exchange a common motion control attribute with a selected software driver. The called motion component function is used to cause a motion component to exchange a common motion control attribute with the selected driver by calling a driver function. A called driver function is used to cause the selected software driver to convert a common motion control attribute to a hardware motion control attribute, exchange a hardware motion control attribute with the motion control device, and send debug information to the debug target.

25 Claims, 55 Drawing Sheets

Related U.S. Application Data

Feb. 27, 2001, now Pat. No. 6,513,058, which is a continuation of application No. 09/205,627, filed on Dec. 3, 1998, now Pat. No. 6,209,037, said application No. 09/205,627 is a continuation of application No. 09/191,981, filed on Nov. 13, 1998, now abandoned, which is a continuation of application No. 08/656,421, filed on May 30, 1996, now Pat. No. 5,867,385, which is a continuation-in-part of application No. 08/454,736, filed on May 30, 1995, now Pat. No. 5,691,897, application No. 11/454,053, which is a continuation of application No. 09/633,633, filed on Aug. 7, 2000, now Pat. No. 6,941,543, which is a continuation of application No. 09/191,981, filed on Nov. 13, 1998, now abandoned, which is a continuation of application No. 08/656,421, filed on May 30, 1996, now Pat. No. 5,867,385, which is a continuation-in-part of application No. 08/454,736, filed on May 30, 1995, now Pat. No. 5,691,897.

(60) Provisional application No. 60/067,466, filed on Dec. 4, 1997.

(56) References Cited

U.S. PATENT DOCUMENTS

| | | |
|---|---|---|
| 4,159,417 A | 6/1979 | Rubincam |
| 4,199,814 A | 4/1980 | Rapp et al. |
| 4,418,381 A | 11/1983 | Molusis et al. |
| 4,422,150 A | 12/1983 | Keller et al. |
| 4,444,061 A | 4/1984 | Mathias |
| 4,494,060 A | 1/1985 | Chitayat et al. |
| 4,531,182 A | 7/1985 | Hyatt |
| 4,563,906 A | 1/1986 | Mathias |
| 4,688,195 A | 8/1987 | Thompson et al. |
| 4,713,808 A | 12/1987 | Gaskill et al. |
| 4,716,458 A | 12/1987 | Heitzman et al. |
| 4,750,888 A | 6/1988 | Allard et al. |
| 4,767,334 A | 8/1988 | Thorne et al. |
| 4,769,771 A | 9/1988 | Lippmann et al. |
| 4,782,444 A | 11/1988 | Munshi et al. |
| 4,800,521 A | 1/1989 | Carter et al. |
| 4,809,335 A | 2/1989 | Rumsey |
| 4,815,011 A | 3/1989 | Mizuno et al. |
| 4,829,219 A | 5/1989 | Penkar |
| 4,829,419 A | 5/1989 | Hyatt |
| 4,840,602 A | 6/1989 | Rose |
| 4,843,566 A | 6/1989 | Gordon et al. |
| 4,846,693 A | 7/1989 | Baer |
| 4,852,047 A | 7/1989 | Lavallee et al. |
| 4,853,877 A | 8/1989 | Parkhurst et al. |
| 4,855,725 A | 8/1989 | Fernandez |
| 4,857,030 A | 8/1989 | Rose |
| 4,868,474 A | 9/1989 | Lancraft et al. |
| 4,887,966 A | 12/1989 | Gellerman |
| 4,897,835 A | 1/1990 | Gaskill et al. |
| 4,901,218 A | 2/1990 | Cornwell |
| 4,912,650 A | 3/1990 | Tanaka et al. |
| 4,923,428 A | 5/1990 | Curran |
| 4,937,737 A | 6/1990 | Schwane et al. |
| 4,937,759 A | 6/1990 | Vold |
| 4,987,537 A | 1/1991 | Kawata |
| 5,005,134 A | 4/1991 | Nakashima et al. |
| 5,005,135 A | 4/1991 | Morser et al. |
| 5,014,208 A | 5/1991 | Wolfson |
| 5,020,021 A | 5/1991 | Kaji et al. |
| 5,025,385 A * | 6/1991 | Froyd .......................... 700/169 |
| 5,095,445 A | 3/1992 | Sekiguchi |
| 5,119,318 A | 6/1992 | Paradies |
| 5,120,065 A | 6/1992 | Driscoll et al. |
| 5,126,932 A | 6/1992 | Wolfson et al. |
| 5,162,986 A | 11/1992 | Graber et al. |
| 5,168,441 A | 12/1992 | Onarheim et al. |
| 5,175,684 A | 12/1992 | Chong |
| 5,175,817 A | 12/1992 | Adams et al. |
| 5,175,856 A | 12/1992 | Van Dyke et al. |
| 5,204,599 A | 4/1993 | Hohn |
| 5,230,049 A | 7/1993 | Chang et al. |
| 5,231,693 A | 7/1993 | Backes et al. |
| 5,245,703 A | 9/1993 | Hubert |
| 5,247,650 A | 9/1993 | Judd et al. |
| 5,287,199 A | 2/1994 | Zoccolillo |
| 5,291,416 A | 3/1994 | Hutchins |
| 5,309,351 A | 5/1994 | McCain et al. |
| 5,329,381 A | 7/1994 | Payne |
| 5,341,451 A | 8/1994 | Latte et al. |
| 5,368,484 A | 11/1994 | Copperman et al. |
| 5,377,258 A | 12/1994 | Bro |
| 5,382,026 A | 1/1995 | Harvard et al. |
| 5,390,304 A | 2/1995 | Leach et al. |
| 5,390,330 A | 2/1995 | Talati |
| 5,392,207 A * | 2/1995 | Wilson et al. .................. 700/64 |
| 5,392,382 A | 2/1995 | Schoppers |
| 5,400,345 A | 3/1995 | Ryan, Jr. |
| 5,402,518 A | 3/1995 | Lowery |
| 5,405,152 A | 4/1995 | Katanics et al. |
| 5,412,757 A | 5/1995 | Endo |
| 5,413,355 A | 5/1995 | Gonzalez |
| 5,417,210 A | 5/1995 | Funda et al. |
| 5,418,964 A | 5/1995 | Conner et al. |
| 5,438,529 A | 8/1995 | Rosenberg et al. |
| 5,450,079 A | 9/1995 | Dunaway |
| 5,453,933 A | 9/1995 | Wright et al. |
| 5,459,382 A | 10/1995 | Jacobus et al. |
| 5,465,215 A | 11/1995 | Strickland et al. |
| 5,483,440 A | 1/1996 | Aono et al. |
| 5,485,545 A | 1/1996 | Kojima et al. |
| 5,485,620 A * | 1/1996 | Sadre et al. .................. 717/162 |
| 5,491,813 A | 2/1996 | Bondy et al. |
| 5,493,281 A | 2/1996 | Owens |
| 5,511,147 A | 4/1996 | Abdel-Malek |
| 5,541,838 A | 7/1996 | Koyama et al. |
| 5,566,278 A | 10/1996 | Patel et al. |
| 5,566,346 A | 10/1996 | Andert et al. |
| 5,576,727 A | 11/1996 | Rosenberg et al. |
| 5,577,253 A | 11/1996 | Blickstein |
| 5,596,994 A | 1/1997 | Bro |
| 5,604,843 A | 2/1997 | Shaw et al. |
| 5,607,336 A | 3/1997 | Lebensfeld et al. |
| 5,608,894 A | 3/1997 | Kawakami et al. |
| 5,613,117 A | 3/1997 | Davidson et al. |
| 5,617,528 A | 4/1997 | Stechmann et al. |
| 5,618,179 A | 4/1997 | Copperman et al. |
| 5,623,582 A | 4/1997 | Rosenberg |
| 5,625,821 A | 4/1997 | Record et al. |
| 5,636,994 A | 6/1997 | Tong |
| 5,652,866 A | 7/1997 | Aldred et al. |
| 5,655,945 A | 8/1997 | Jani |
| 5,659,753 A | 8/1997 | Murphy et al. |
| 5,666,161 A | 9/1997 | Kohiyama et al. |
| 5,666,264 A | 9/1997 | Chandler et al. |
| 5,670,992 A | 9/1997 | Yasuhara et al. |
| 5,691,897 A | 11/1997 | Brown et al. |
| 5,691,898 A | 11/1997 | Rosenberg et al. |
| 5,692,195 A | 11/1997 | Conner et al. |
| 5,697,829 A | 12/1997 | Chainani et al. |
| 5,701,140 A | 12/1997 | Rosenberg et al. |
| 5,704,837 A | 1/1998 | Iwasaki et al. |
| 5,707,289 A | 1/1998 | Watanabe et al. |
| 5,724,074 A | 3/1998 | Chainani et al. |
| 5,733,131 A | 3/1998 | Park |
| 5,734,373 A | 3/1998 | Rosenberg et al. |
| 5,737,523 A | 4/1998 | Callaghan et al. |
| 5,739,811 A | 4/1998 | Rosenberg et al. |
| 5,746,602 A | 5/1998 | Kikinis |
| 5,752,880 A | 5/1998 | Gabai et al. |
| 5,752,976 A | 5/1998 | Duffin et al. |
| 5,754,855 A | 5/1998 | Miller et al. |
| 5,761,669 A | 6/1998 | Montague et al. |
| 5,764,155 A | 6/1998 | Kertesz et al. |
| 5,766,077 A | 6/1998 | Hongo |
| 5,790,178 A | 8/1998 | Shibata et al. |
| 5,800,268 A | 9/1998 | Molnick |

| | | | | | | |
|---|---|---|---|---|---|---|
| 5,801,946 A | 9/1998 | Nissen et al. | 6,425,118 B1 | 7/2002 | Molloy et al. | |
| 5,802,365 A | 9/1998 | Kathail et al. | 6,442,451 B1 | 8/2002 | Lapham | |
| 5,805,442 A | 9/1998 | Crater et al. | 6,463,404 B1 | 10/2002 | Appleby | |
| 5,805,785 A | 9/1998 | Dias et al. | 6,470,377 B1 | 10/2002 | Sevcik et al. | |
| 5,821,920 A | 10/1998 | Rosenberg et al. | 6,480,896 B1 | 11/2002 | Brown et al. | |
| 5,825,308 A | 10/1998 | Rosenberg | 6,497,606 B2 | 12/2002 | Fong et al. | |
| 5,825,361 A | 10/1998 | Rubin et al. | 6,513,058 B2 | 1/2003 | Brown et al. | |
| 5,836,014 A | 11/1998 | Faiman, Jr. | 6,516,236 B1 | 2/2003 | Brown et al. | |
| 5,846,132 A | 12/1998 | Junkin | 6,519,594 B1 | 2/2003 | Li | |
| 5,848,415 A | 12/1998 | Guck | 6,542,925 B2 | 4/2003 | Brown et al. | |
| 5,867,385 A | 2/1999 | Brown et al. | 6,571,141 B1 | 5/2003 | Brown | |
| 5,889,670 A | 3/1999 | Schuler et al. | 6,652,378 B2 | 11/2003 | Cannon et al. | |
| 5,889,672 A | 3/1999 | Schuler et al. | 6,678,713 B1 | 1/2004 | Mason et al. | |
| 5,917,840 A | 6/1999 | Cheney et al. | 6,859,671 B1 | 2/2005 | Brown | |
| 5,926,389 A | 7/1999 | Trounson | 6,879,862 B2 | 4/2005 | Brown et al. | |
| 5,956,484 A | 9/1999 | Rosenberg et al. | 6,885,898 B1 | 4/2005 | Brown et al. | |
| 5,959,613 A | 9/1999 | Rosenberg et al. | 6,922,826 B2 * | 7/2005 | Bates et al. | 717/129 |
| 6,012,961 A | 1/2000 | Sharpe, III et al. | 6,941,543 B1 | 9/2005 | Brown et al. | |
| 6,020,876 A | 2/2000 | Rosenberg et al. | 7,024,255 B1 | 4/2006 | Brown et al. | |
| 6,028,593 A | 2/2000 | Rosenberg et al. | 7,024,666 B1 * | 4/2006 | Brown | 717/137 |
| 6,031,973 A | 2/2000 | Gomi et al. | 7,031,798 B2 | 4/2006 | Brown et al. | |
| 6,038,603 A | 3/2000 | Joseph | 7,035,697 B1 | 4/2006 | Brown | |
| 6,046,727 A | 4/2000 | Rosenberg et al. | 7,113,833 B1 | 9/2006 | Brown et al. | |
| 6,057,828 A | 5/2000 | Rosenberg et al. | 7,137,107 B1 | 11/2006 | Brown | |
| 6,061,004 A | 5/2000 | Rosenberg | 7,139,843 B1 | 11/2006 | Brown et al. | |
| 6,070,010 A | 5/2000 | Keenleyside et al. | 7,302,676 B2 * | 11/2007 | Schmitt et al. | 717/132 |
| 6,078,308 A | 6/2000 | Rosenberg et al. | 8,073,557 B2 | 12/2011 | Brown et al. | |
| 6,083,104 A | 7/2000 | Choi | 2001/0020944 A1 | 9/2001 | Brown et al. | |
| 6,090,156 A | 7/2000 | MacLeod | 2001/0029443 A1 | 10/2001 | Miyahira | |
| 6,100,874 A | 8/2000 | Schena et al. | 2001/0032268 A1 | 10/2001 | Brown et al. | |
| 6,101,530 A | 8/2000 | Rosenberg et al. | 2001/0032278 A1 | 10/2001 | Brown et al. | |
| 6,104,158 A | 8/2000 | Jacobus et al. | 2001/0037492 A1 | 11/2001 | Holzmann | |
| 6,125,385 A | 9/2000 | Wies et al. | 2002/0044297 A1 | 4/2002 | Tanaka | |
| 6,128,006 A | 10/2000 | Rosenberg et al. | 2002/0052939 A1 | 5/2002 | Lee | |
| 6,131,097 A | 10/2000 | Peurach et al. | 2002/0156872 A1 | 10/2002 | Brown | |
| 6,147,647 A | 11/2000 | Tassoudji et al. | 2002/0165627 A1 | 11/2002 | Brown | |
| 6,161,126 A | 12/2000 | Wies et al. | 2002/0165708 A1 | 11/2002 | Kumhyr | |
| 6,166,723 A | 12/2000 | Schena et al. | 2002/0177453 A1 | 11/2002 | Chen et al. | |
| 6,169,540 B1 | 1/2001 | Rosenberg et al. | 2003/0069998 A1 | 4/2003 | Brown et al. | |
| 6,173,316 B1 | 1/2001 | De Boor et al. | 2005/0114444 A1 | 5/2005 | Brown et al. | |
| 6,191,774 B1 | 2/2001 | Schena et al. | 2005/0132104 A1 | 6/2005 | Brown | |
| 6,195,592 B1 | 2/2001 | Schuler et al. | 2006/0064503 A1 | 3/2006 | Brown et al. | |
| 6,209,037 B1 | 3/2001 | Brown et al. | 2006/0206219 A1 | 9/2006 | Brown et al. | |
| 6,219,032 B1 | 4/2001 | Rosenberg et al. | 2006/0241811 A1 | 10/2006 | Brown et al. | |
| 6,219,033 B1 | 4/2001 | Rosenberg et al. | 2006/0247801 A1 | 11/2006 | Brown et al. | |
| 6,232,891 B1 | 5/2001 | Rosenberg | 2006/0282180 A1 | 12/2006 | Brown et al. | |
| 6,233,545 B1 | 5/2001 | Datig | 2007/0022194 A1 | 1/2007 | Brown et al. | |
| 6,243,078 B1 | 6/2001 | Rosenberg | 2008/0275576 A1 | 11/2008 | Brown et al. | |
| 6,246,390 B1 | 6/2001 | Rosenberg | 2008/0275577 A1 | 11/2008 | Brown et al. | |
| 6,252,579 B1 | 6/2001 | Rosenberg et al. | 2009/0030977 A1 | 1/2009 | Brown et al. | |
| 6,252,853 B1 | 6/2001 | Ohno | 2009/0063628 A1 | 3/2009 | Brown et al. | |
| 6,259,382 B1 | 7/2001 | Rosenberg | 2009/0082686 A1 | 3/2009 | Brown et al. | |
| 6,271,833 B1 | 8/2001 | Rosenberg et al. | 2009/0157199 A1 | 6/2009 | Brown et al. | |
| 6,278,439 B1 | 8/2001 | Rosenberg et al. | 2009/0157807 A1 | 6/2009 | Brown et al. | |
| 6,285,351 B1 | 9/2001 | Chang et al. | 2009/0271007 A1 | 10/2009 | Brown et al. | |
| 6,288,705 B1 | 9/2001 | Rosenberg et al. | 2010/0005192 A1 | 1/2010 | Brown et al. | |
| 6,288,716 B1 | 9/2001 | Humpleman et al. | 2010/0064026 A1 | 3/2010 | Brown et al. | |
| 6,290,565 B1 | 9/2001 | Galyean, III et al. | 2012/0005268 A1 | 1/2012 | Brown et al. | |
| 6,292,170 B1 | 9/2001 | Chang et al. | | | | |
| 6,292,174 B1 | 9/2001 | Mallett et al. | | FOREIGN PATENT DOCUMENTS | | |
| 6,292,712 B1 | 9/2001 | Bullen | CA | 2586401 | 12/1996 | |
| 6,292,714 B1 | 9/2001 | Okabayashi | CA | 2389183 | 5/2001 | |
| 6,295,530 B1 | 9/2001 | Ritchie et al. | CA | 2625283 | 5/2001 | |
| 6,300,936 B1 | 10/2001 | Braun et al. | CA | 2586401 | 10/2009 | |
| 6,300,937 B1 | 10/2001 | Rosenberg | EP | 0 275 826 A1 | 7/1988 | |
| 6,301,634 B1 | 10/2001 | Gomi et al. | EP | 0 281 427 A2 | 9/1988 | |
| 6,304,091 B1 | 10/2001 | Shahoian et al. | EP | 0 442 676 A2 | 8/1991 | |
| 6,305,011 B1 | 10/2001 | Safonov | EP | 0 508 912 A1 | 10/1992 | |
| 6,309,275 B1 | 10/2001 | Fong et al. | EP | 0 583 908 A2 | 2/1994 | |
| 6,310,605 B1 | 10/2001 | Rosenberg et al. | EP | 1260891 | 5/1995 | |
| 6,317,116 B1 | 11/2001 | Rosenberg et al. | EP | 821522 A2 | 1/1998 | |
| 6,317,871 B1 | 11/2001 | Andrews et al. | EP | 0829039 | 3/1998 | |
| 6,343,349 B1 | 1/2002 | Braun et al. | EP | 1560093 | 8/2005 | |
| 6,353,850 B1 | 3/2002 | Wies et al. | EP | 1678589 | 7/2006 | |
| 6,366,272 B1 | 4/2002 | Rosenberg et al. | EP | 1690173 | 8/2006 | |
| 6,366,273 B1 | 4/2002 | Rosenberg et al. | EP | 2081094 | 7/2009 | |
| 6,374,255 B1 | 4/2002 | Peurach et al. | GB | 2 244 896 A | 12/1991 | |
| 6,400,996 B1 | 6/2002 | Hoffberg et al. | JP | 59-228473 | 12/1984 | |
| 6,401,005 B1 | 6/2002 | Schwarz et al. | JP | 06-168157 | 6/1994 | |

| | | |
|---|---|---|
| JP | 8 161335 A | 6/1996 |
| JP | 11506234 | 6/1999 |
| JP | 2000 020114 A | 1/2000 |
| JP | 2003513348 | 4/2003 |
| JP | 2004078904 | 3/2004 |
| JP | 2007102796 | 4/2007 |
| JP | 2008159046 | 7/2008 |
| WO | WO 92/11731 | 7/1992 |
| WO | WO 93/08654 | 4/1993 |
| WO | WO 95/05704 | 3/1995 |
| WO | 96/38769 | 12/1996 |
| WO | 0067081 | 11/2000 |
| WO | 0131408 | 5/2001 |
| WO | 0163431 | 8/2001 |
| WO | 02054184 | 7/2002 |
| WO | 02071241 | 9/2002 |
| WO | 03019397 | 3/2003 |
| WO | 2005031542 | 4/2005 |
| WO | 2005048086 | 5/2005 |

OTHER PUBLICATIONS

U.S. Appl. No. 10/316,451, filed Dec. 10, 2002, Brown et al.
U.S. Appl. No. 10/761,537, filed Jan. 21, 2004, Brown et al.
U.S. Appl. No. 10/844,025, filed May 12, 2004, Brown et al.
U.S. Appl. No. 10/966,848, filed Oct. 14, 2004, Brown et al.
U.S. Appl. No. 11/067,327, filed Feb. 25, 2005, Brown et al.
U.S. Appl. No. 11/084,673, filed Mar. 18, 2005, Brown et al.
U.S. Appl. No. 11/416,660, filed May 3, 2006, Brown et al.
U.S. Appl. No. 11/375,502, filed Mar. 13, 2006, Brown et al.
U.S. Appl. No. 11/370,082, filed Mar. 6, 2006, Brown et al.
U.S. Appl. No. 11/418,075, filed May 4, 2006, Brown et al.
U.S. Appl. No. 11/505,056, filed Aug. 15, 2004, Brown et al.
U.S. Appl. No. 11/583,233, filed Oct. 19, 2006, Brown et al.
U.S. Appl. No. 11/728,801, filed Mar. 22, 2007, Brown et al.
Pacific Scientific; "Advanced Motion Language", Date Unknown, pp. C-2 thru C-11.
Moore; "Advanced Process Automation and Control System (APACS Product Literature)", Date Unknown, pp. 1-13.
Katila, P.; "Applying Total Productive Maintenance—TPM Principles in the Flexible Manufacturing Systems", Lulea Tekniska Universitet, Date Unknown, pp. 1-41.
Silma; "CimStation Product Literature", Date Unknown, pp. 1-12.
Fanuc Robotics North America; "Manufacturing solutions for value-minded companies (Product Brochure)", Date Unknown, pp. 1-5.
Highland Technology, Inc.; "Perfect Parts Product Literature", Date Unknown, pp. 1-4.
Mitutoyo; "Quick Vision Product Literature", Date Unknown, pp. 1-8.
Fanuc Robotics North America; "Robotic Palletizing Provides Flexibility at High Speeds", Date Unknown, pp. 1-2.
Fanuc Robotics North America; "The Growing Demand for Advanced Robotic Packaging Systems", Date Unknown, pp. 1-2.
Mack, B., Bayoumi, M.; "Design and Integration of New Software for the Robot Controller Test Station", IEEE, 1988, pp. 866-873.
Pritchard, K., Anonymous; "Applying Simulation to The Control Industry", Cahners Publishing Company, May 1, 1989, pp. 1-3 (reprinted from Control Engineering, May 1989).
Vaataja, H., Hakala, H., Mattila, P., Suoranta, R.; "3-D Simulation of Ultrasonic Sensor System in Mobile Robots", IEEE, 1992, pp. 333-336.
USDATA; "FactoryLink IV for Microsoft Windows and NT", 1992, pp. 1-4.
National Instruments; "IEEE 488 and VXIbus Control, Data Acquisition, and Analysis (Catalog)", 1993, pp. Main Table of Contents, Introduction pp. ii-xi, and Section 1 Instrumentation Software Products.
Software Horizons, Inc.; "Operator Interface Software for Supervisory Control, Monitoring and Reporting for Windows Operating System (Product Literature)", 1993, pp. 1-12.
Pro-Log Corporation; "Pro-Log Motion Control for Allen-Bradley PLCs (Product Literature)", 1993, pp. 1-5.
Tele-Denken Resources, Inc.; "VIEWpoint (Product Data Sheet)", 1993, pp. 1-11.
Pritchard, K.; "PC-based Simulation in Control System Design", Cahners Publishing Company, Feb. 1, 1993, pp. 1-2 (reprinted from Control Engineering, Feb. 1993).
Laduzinsky, A.; "An Open Look for PLC Programs", Cahners Publishing Company, May 1, 1993, p. 1 (reprint from Control Engineering—May 1993).
Christensen, J.; "Programmable controller users and makers to go global with IEC 1131-3", Instrument and Control Systems, Oct. 1, 1993, pp. 1-4 (reprint from Instrument and Control Systems—Oct. 1993).
National Instruments; "LabWindows/CVI Product Literature", 1994, pp. 1-8.
Honeywell Inc.; "SDS Physical Layer Specification", 1994, pp. 1-34.
Steeplechase Software, Inc.; "Visual Logic Controller (Product Literature)", 1994, pp. 1-3.
Tele-Denken Resources, Inc.; "The History of Programmable Controllers", Apr. 1, 1994, pp. 1-26.
Wonderware; "InTouch 5 Lite (Product Data Sheet)", Apr. 14, 1994, pp. 1-4.
Wonderware; "InTouch 5 (Product Data Sheet)", Apr. 19, 1994, pp. 1-4.
Wonderware; "InTouch 5 PDK/NT (Product Data Sheet)", Apr. 19, 1994, pp. 1-4.
Control; "Simulation Software Helps Troubleshoot PLC Code", Jun. 1, 1994, p. 1 (reprinted from Control, Jun. 1994).
Tele-Denken Resources, Inc.; "SoftPLC (Product Data Sheet)", Jun. 1, 1994, pp. 1-5.
Tele-Denken Resources, Inc.; "TopDoc (Product Data Sheet)", Oct. 1, 1994, pp. 1-7.
National Instruments; "LabVIEW Graphical Programming for Instrumentation", 1995, pp. 1-16.
Wizdom Controls, Inc.; "Paradym-31 Software Brochure", 1995, pp. 1-4.
Fanuc Robotics North America; "SpotTool Application Software", 1995, pp. 1-2.
Iconics, Inc.; "Configuring Input/Output (I/O) Devices (Genisis Product Guide)", Feb. 15, 1995, pp. 1-31.
Quinn, T., George, G.; "Windows 95 Marks a New Era in PC-Based Automation", Cahners Publishing Company, Mar. 1, 1995, pp. 19-20, 22 (Control Engineering, Mar. 1995).
Automation and Control; "PLC Programming Standard Expands", Apr. 1, 1995, pp. 3-4 (Reprinted from Automation and Control, Apr. 1995).
Cahners Publishing Company; "PC Control Software Combines Ladder Logic, HMI and I/O", May 1, 1995, pp. 1-3 (reprint from Control Engineering—May 1995).
OASYS Group, Inc.; "OASYS Open Architecture System", Jul. 11, 1995, pp. 1-23.
Cahners Publishing Company; "PC Software Adds 'Joy-of-Use' To Power and Flexibility", Sep. 1, 1995, pp. 2-3 (reprinted from Control Engineering, Sep. 1995).
Wonderware; "InTouch 5.6 (Product Data Sheet)", Sep. 15, 1995, pp. 1-4.
ARC Advisory Group; "PC-Based Control Strategies", Oct. 1, 1995.
Wonderware; "InTrack Manufacturing Execution System (Product Data Sheet)", Nov. 15, 1995, pp. 1-5.
Kagami, S., Tamiya, Y., Inaba, M., Inoue, H.; "Design of Real-Time Large Scale Robot Software Platform and its Implementation in the Remote-Brained Robot Project", IEEE, 1996, pp. 1394-1399.
Factorysoft, Inc.; "FactorySoft Report Product Literature", 1996, pp. 1-2.
Galil Motion Control; "Motion Control Product Catalog", 1996, pp. 1-10, 82-91, 106-125.
Ge Fanuc Automation; "PowerMotion Servo and Machine Control (Product Brochure)", 1996, pp. 1-8.
Compumotor Division, Parker Hannifin; "Step Motor and Servo Motor Systems and Controls", 1996, pp. 1, 28-29.
Sperber, B.; "Try These Two Little Disks for a Bit Step in Streamlined, Object-Oriented Scada", Control, Apr. 1, 1996, pp. 1-2 (reprinted from Control—Apr. 1996).
Ge Fanuc Automation; "GE Fanuc Automation Product Guide", May 1, 1996, pp. 1-8.

National Instruments; "Lookout Product Literature", May 15, 1996, pp. 1-12.

Compumotor Division, Parker Hannifin; "Motion Toolbox User Guide (a Library of LabVIEW Virtual Instruments for Motion Control)", Jun. 1, 1997, pp. i-v, 7-10, 85-93.

ROY-G-BIV Corporation; "Pleadings: Plaintiff ROY-G-BIV Corporation's Response to GE Fanuc Automation orporation's Motion to Dismiss", Dec. 13, 2007, pp. 1-54.

GE Fanuc; "Pleadings: GE Fanuc Automation Corporation's Reply in Support of Its Motion to Dismiss for Lack of Personal Jurisdiction", Dec. 28, 2007, pp. 1-25.

ROY-G-BIV Corporation; "Pleadings: Joint Conference Report", Jan. 4, 2008, pp. 1-6.

ROY-G-BIV Corporation; "Pleadings: Roy-G-Biv Corporation's First Set of Interrogatories (Nos. 1-15) for Each Defendant", Jan. 18, 2008, pp. 1-16.

ROY-G-BIV Corporation; "Pleadings: Roy-G-BIV Corporation's First Set of Requests to Defendants for Document, Electronically Stored Information, and Things", Jan. 18, 2008, pp. 1-19.

GE Fanuc; "Pleadings: Defendants Fanuc Ltd.'s, Fanuc Robotics America, Inc.'s, GE Fanuc Automation Americas, Inc.'s, and GE Fanuc Intelligent Platforms, Inc.'s First Set of Interrogatories to Plaintiff Roy-G-Biv Corporation", Jan. 25, 2008, pp. 1-10.

GE Fanuc; "Pleadings: Defendants Fanuc Ltd.'s, Fanuc Robotics America, Inc.'s, GE Fanuc Automation Americas, Inc.'s, and GE Fanuc Intelligent Platforms, Inc.'s First Set of Requests for Production to Plaintiff ROY-G-BIV Corporation", Jan. 31, 2008, pp. 1-25.

GE Fanuc; "Pleadings: Defendant's Initial Disclosures Pursuant to Federal Rule of Civil Procedure 26(a)(1)", Feb. 1, 2008, pp. 1-6.

ROY-G-BIV Corporation; "Pleadings: Plaintiff ROY-G-BIV Corporation's Initial Disclosures", Feb. 1, 2008, pp. 1-5.

Aerotech, Inc.; "Aerotech Motion Control Product Guide", Date Unknown, pp. 233-234.

Intec Controls Corp; "Paragon TNT Product Brochure", Date Unknown, 6 pages.

Precision Microcontrol; "Precision MicroControl Product Guide", Date Unknown, pp. 11, 27-28.

Seven Technologies A/S; "The complete, computer-based automation tool—Control at your fingertips (IGSS)", Date Unknown, 6 pages.

SEMI; "SEMI E4-0699 Semi Equipment Communications Standard 1 Message Transfer (SECS-I)", Jan. 2, 1980.

SEMI; "SEMI E5-1104 SEMI Equipment Communications Standard 2 Message Content (SECS-II)", 1982, Sections 1-9 (pp. 1-9).

Fitzgerald, M. , Barbera, A.; "A Low-Level Control Interface for Robot Manipulators", Robotics and Computer-Integrated Manufacturing, 1985, vol. 2, No. 3/4, pp. 201-213.

Rembold, J. , Blume, C. , Frommherz, B.; "The Proposed Robot Software Interfaces SRL and IRDATA", Robotics and Computer-Integrated Manufacturing, 1985, vol. 2, No. 3/4, pp. 219-225.

Taylor, R.; "A General Purpose Control Architecture for Programmable Automation Research", IBM T.J. Watson Research Center, 1986, pp. 165-173.

Hayward, V. , Paul, R.; "Robot Manipulator Control under Unix RCCL: A Robot Control "C" Library", The International Journal of Robotics Research, 1986, vol. 5, No. 4, pp. 94-111.

Lloyd, J. , Parker, M. , McClain, R.; "Extending the RCCL Programming Environment to Multiple Robots and Processors", IEEE, 1988, pp. 465-469.

Mangaser, A. , Wang, Y. , Butner, S.; "Concurrent Programming Support for a Multi-Manipulator Experiment on RIPS", IEEE, 1989, pp. 853-859.

Tesar, D. , Butler, M.; "A Generalized Modular Architecture for Robot Structures", American Society of Mechanical Engineers, Jun. 1, 1989, pp. 91-118.

Stewart, Schmitz, Khosla; "Implementing Real-Time Robotic Systems Using Chimera II", IEEE, 1990, pp. 254-255, Sections 3.1 and 3.2.

Wright, P. , Greenfeld, I.; "Open Architecture Manufacturing: The Impact of Open-System Computers on Self-sustaining Machinery and the Machine Tool Industry", 1990, Proc. Manuf. Int. 90, Part2: Advances in Manufacturing, pp. 41-47.

Bloom, H.; "Software and Computer Integrated Manufacturing", 1990, pp. 1-14.

Kasahara, T.; "Map 2.0 Entering the Practical Use Period in the CIM Era: MAP 3.0 MMS Architecture and Mounting Method", Ohmsha Ltd., Mar. 1, 1990, pp. 57-62, Computer and Network LAN vol. 8, No. 3.

Altintas, Y. , Peng, J.; "Design and Analysis of a Modular CNC System", Elsevier Science Publishers B.V, Mar. 4, 1990, pp. 305-316, vol. 13, Computers in Industry.

Paidy, Reeve; "Software Architecture for a Cell Controller", IEEE, 1991, pp. 344-349.

Miller, D. , Lennox, C.; "An Object-Oriented Environment for Robot System Architectures", IEEE Control Systems, Feb. 1, 1991, pp. 14-23.

Yared, W. , Sheridan, T.; "Plan Recognition and Generalization in Command Languages with Application to Telerobotics", IEEE, Mar. 1, 1991, vol. 21, No. 2, pp. 327-338.

Senehi, M. , Wallace, S. , Barkmeyer, E. , Ray, S. , Wallace, E.; "Control Entity Interface Document", Jun. 1, 1991, pp. 1-38.

Payton, D. , Bihari, T.; "Intelligent Real-Time Control of Robotic Vehicles", ACM, Aug. 1, 1991, pp. 49-63, vol. 34, No. B.

Robert Bosch GMBH; "CAN Specification", Sep. 1, 1991, 72 pages, Version 2.0.

Motion Engineering, Inc.; "PC/DSP-Series Motion Controller C Programming Guide", 1992, pp. 1-54.

Delta TAU Data Systems, Inc.; "PMAC Product Catalog", 1992, p. 43.

SEMI; "SEMI E30-1103 General Model for Communications and Control of Manufacturing Equipment (GEM)", 1992.

Microsoft Corporation; "Win32 SDK Programming Reference vol. 2", 1992, Dynamic Data Exchange Management Library, Chapter 77, 26 pages.

Microsoft Corporation; "Windows 3.1 SDK Guide to Programming", 1992, Dynamic Data Exchange, Chapter 22, 21 pages.

Microsoft Corporation; "Windows for Workgroups 3.1 Resource Kit", 1992, Network Dynamic Data Exchange, Chapter 11, 19 pages.

Smith, M.; "An Environment for More Easily Programming a Robot", International Conference on Robotics and Automation, May 1, 1992, pp. 10-16.

Nielsen, L. , Trostmann, S. , Trostmann, E.; "Robot Off-line Programming and Simulation As a True CIME-Subsystem", International Conference on Robotics and Automation, May 1, 1992, pp. 1089-1094.

Allen-Bradley Company, Inc.; "CNCnet Software Library", Oct. 1, 1992, Publication 8000-6.1.1.

Albus, J.; "A Reference Model Architecture for Intelligent Systems Design", NIST, 1993, pp. 1-38.

TA Engineering Co., Inc; "Aimax-Win MMI Software for the New DCS Era", 1993, 8 pages.

Compumotor; "Compumotor Digiplan Positioning Control Systems and Drives", 1993, 1993-1994 Catalog, pp. 10-11.

Gerry Engineering Software, Inc.; "ExperTune PID Tuning Software Product Brochure", 1993, 6 pages.

Farsi, M.; "Flexible and Reliable Robotics Cells in Factory Automation", 1993, pp. 520-525.

Oregon Micro Systems, Inc.; "Precision Motion Controls At Affordable Prices Product Guide", 1993, pp. 1-20.

Anderson, R.; "Smart: A Modular Architecture for Robotics and Teleoperation", IEEE, 1993, pp. 416-421.

Iconics, Inc.; "Software Products for Industrial Automation", 1993, 6 pages.

Pritschow, G. , Daniel, C. , Junghans, G. , Sperling, W.; "Open System Controllers: A Challenge for the Future of the Machine Tool Industry", Jan. 15, 1993, Annals of the CIRP, pp. 449-452, vol. 42.

Katayama, Y. , Nanjo, Y. , Shimokura, K.; "A Motion Control System with Event-driven Motion-module Switching Mechanism for Robotic Manipulators", IEEE, Jul. 1, 1993, International Workshop on Robot and Human Communication pp. 320-325., U.S.

Microsoft Corporation; "WOSA Backgrounder: Delivering Enterprise Services to the Windows-based Desktop", Jul. 1, 1993, Backgrounders and Whitepapers: Operating Systems Extensions—MSDN Archive Edition, pp. 1-19.

Wallace, S., Senehi, M., Barkmeyer, E., Ray, S., Wallace, E.; "Control Entity Interface Specification", Sep. 1, 1993, pp. 10-20.
Microsoft Corporation; "Object Linking and Embedding 2.0 Backgrounder", Sep. 1, 1993, pp. 1-15.
Microsoft Corporation; "Microsoft OLE Today and Tomorrow: Technology Overview", Dec. 1, 1993, pp. 1-9.
Chen, S., Lin, J.; "Computer Numerical Control: Essentials in Programming and Networking", Delmar Publishers, Inc, 1994, pp. 824-848, Part V, Chapter 27.
Farsi, M.; "Device Communication for Flexible Manufacturing:—A New Concept", 1994, pp. 328-334.
Intellution, Inc.; "FIX Product Brochure", 1994, 6 pages.
King, A.; "Inside Windows 95", Microsoft Press, 1994, pp. 348-351, WOSA Section.
Xanalog; "Model NL-SIM Product Brochure", 1994, 4 pages.
Proctor, F., Damazo, B., Yang, C., Frechette, S.; "Open Architectures for Machine Control", NIST, 1994, pp. 1-17.
PID, Inc; "OpenBatch Product Brief", 1994, 6 pages.
SISCO, Inc.; "Overview and Introduction to the Manufacturing Message Specification (MMS)", 1994, pp. 1-47, Revision 2.
Trihedral Engineering Ltd; "Web 3.0 Product Brochure", 1994, 6 pages.
US Department of Energy; "Robotic Technology Development Program", Feb. 1, 1994, pp. 1-114.
Microsoft Corporation; "Open Systems: Technology, Leadership, and Collaboration", Mar. 1, 1994, Backgrounders and Whitepapers: Operating System Extensions—MSDN Archive Edition, pp. 1-15.
Microsoft Corporation; "The Microsoft Object Technology Strategy", Mar. 1, 1994, Backgrounders and Whitepapers: Operating System Extensions—MSDN Archive Edition, pp. 1-33.
Miller, D.; "Using Generic Tool Kits to Build Intelligent Systems (AIAA 94-1214)", Sandia National Laboratories, Mar. 9, 1994, pp. 1-9.
Chu, Wang; "Development of a Practical SFC System for CNC Machine Shop: International Conference on Data and Knowledge Systems for Manufacturing and Engineering", May 1, 1994, pp. 362-367, vol. 1; pp. xx+745, vol. 2.
Sakai, K.; "Object Orientation and C++ Language: Facts of Object-Oriented Programming", CQ Publishing Co., Ltd., Jun. 1, 1994, vol. 20, No. 6, pp. 83-93.
Blasvaer, Pirjanian; "An Autonomous Mobile Robot System", Jun. 8, 1994, pp. 52-61 and 122-124, Chapters 4 and 6.7.
Ford, W.; "What Is an Open Architecture Robot Controller", IEEE, Aug. 16, 1994, pp. 27-32.
Hori, K.; "Protocol Conversion Software That Makes Possible Communication between Different Types of Field Devices", Cosmo Technica, Sep. 1, 1994, pp. 1-12.
Brockschmidt, K.; "Notes on Implementing an OLE Control Container", Microsoft Development Library, Sep. 21, 1994, pp. 1-47.
Daiyo, M.; "The Full Color Era Has Arrived with Scanner and Printer Development", Nikkei Byte, Oct. 1, 1994, No. 130, pp. 160-172.
Senehi, M., Kramer, T., Michaloski, J., Quintero, R., Ray, S., Rippey, W., Wallace, S.; "Reference Architecture for Machine Control Systems Integration: Interim Report", Oct. 20, 1994, pp. 1-52.
ISO/IEC; "ISO/IEC 7498-1 Information Technology; Open Systems Interconnection-Basic Reference Model: The Basic Model", Nov. 1, 1994.
Putnam, F.; "The WinSEM OLE Messaging Architecture Working Paper", Labtech, Dec. 1, 1994.
OMAC Users Group; "Requirements of Open Modular Architecture Controllers for Applications in the Automotive Industry", Dec. 13, 1994, pp. 1-13, Version 1.1.
Farsi, M.; "A Production Cell Communication Model in Factory Automation Using the Controller Area Network", 1995, pp. 90-95.
FANUC Ltd.; "FANUC Robot i series Product Manual", 1995, pp. 1-8.
Koizumi, A.; "Pursuing Design Development with a Focus on Compatibility and Permeability with Incorporation of Worldwide Standard Specifications", Instrumentation: Instrumentation and Control Engineering, May 1, 1995, vol. 38, No. 5, pp. 58-62.
Electronic Industries Association; "ANSI/EIA-484-A: Electrical and Mechanical Interface Characteristics and Line Control Protocol Using Communication Control Characters for Serial Data Link Between a Direct Numerical Control System and Numerical Control Equipment Employing Asynchronous Full Duplex Transmission", Jun. 1, 1995, ANSI/EIA Specification 484-A.
Schuett, T.; "The Benefits and Data Bottlenecks of High Speed Milling: Conference paper presented at Southeastern Michigan Chapter American Mold Builders Association", Creative Technology Corporation, Aug. 1, 1995.
Leitao, Lopes, Machado; "A Manufacturing Cell Integration Solution: paper developed at CCP as a part of the ESPRIT 5629 Project", Oct. 1, 1995.
Fedrowitz; "IRL-Based Expansion of the Commonly Used High-Level Language C for Robot Programming", Oct. 1, 1995, 5 pages.
Pirjanian, Christensen; "Hierarchical Control for Navigation Using Heterogeneous Models", Nov. 1, 1995, 19 pages, Denmark.
McGraw; "A Friendly Command, Control, and Information System for Astronomy", 1996, ASP Conference Series, pp. 356-367.
Farsi, M.; "CANopen: the Open Communications Solution", 1996, pp. 112-116.
SISCO, Inc.; "MMS-EASE", 1996, pp. 1-4.
Jackman; "Robotic Control Using Sequential Function Charts", SPIE, 1996, pp. 120-128, vol. 2911.
GE Fanuc; "TCP/IP Ethernet Communications for the Series 90 -70 PLC", 1996.
Schuett, T.; "The Ultimate DNC; Direct CNC Networking (DCN)", Modern Machine Shop, 1996, Creative Technology Corporation.
Proctor, F.; "Validation of Standard Interfaces from a Machine Control", NIST, 1996, NIST Internal Report, pp. 659-664.
Team ICLP API Working Group; "Technologies Enabling Agile Manufacturing (TEAM) Intelligent Closed Loop Processing", Jan. 11, 1996, pp. 1-30.
Baruch, J., Cox, M.; "Remote control and robots: an Internet solution", Computing and Control Engineering Journal, Feb. 1, 1996.
Burchard, R., Feddema, J.; "Generic Robotic and Motion Control API Based on GISC-Kit Technology and CORBA Communications", Sandia National Laboratories, Apr. 1, 1996, pp. 712-717.
Sperling, W., Lutz, P.; "Enabling Open Control Systems: An Introduction to the OSACA System Platform", ASME Press, May 1, 1996, Robotics and Manufacturing, pp. 1-8, vol. 6.
Schuett, T.; "Advanced Controls for High Speed Milting"; conference paper presented at the SME "High Speed Machining", Creative Technology Corporation, May 7, 1996.
General Motors; "Open, Modular Architecture Controls at GM Powertrain", May 14, 1996, 39 pages, Version 1.
Brockschmidt, K.; "What OLE Is Really About; OLE (General) Technical Articles", Microsoft Corporation, Jul. 1, 1996, 33 pages.
Mitsubishi Electric Corporation; "Mitsubishi Electric Advance: Programmable Logic Controllers Edition", Sep. 1, 1996, vol. 76.
Matsui; "An Event-Driven Architecture for Controlling Behaviors of the Office Conversant Mobile Robot, Jijo-2: Proceedings of the 1997 IEEE International Conference on Robotics and Automation", IEEE, 1997, pp. 3367-3372, vol. 4.
Lawrenz, W.; "CAN System Engineering—From Theory to Practical Applications", Springer-Verlag, Inc., 1997, Chps. 1, 2.1, 2.2, 3.2 and 4.1.
ISO/IEC; "ISO/IEC 7498-3 Information Technology—Open Systems Interconnection-Basic Reference Model: Naming and Addressing", Apr. 1, 1997, ISO/IEC 7498-3.
Bargen, B., Donnely, P.; "Inside Direct X—In Depth Techniques for Developing High-Performance Multimedia Applications", Microsoft Press, 1998, Chps. 1, 18-20, 22-27.
Farsi, M., Barbosa, M.; "CANopen Implementation—Applications to Industrial Networks", Research Studies Press Ltd, 2000, Chps. 1, 2 and 3.
Kovach, P.; "Inside Direct3D—The Definitive Guide for Real-Time 3D Power and Performance for Microsoft Windows", Microsoft Press, 2000, Chps. 1, 7 and 15.
Microsoft Corporation; "How to Write and Use Activex Controls for Microsoft Windows CE 3.0", Jun. 1, 2000, Windows CE 3.0 Technical Articles, 5 pages.
ISO/IEC; "ISO-9506-1 Industrial Automation Systems;Manufacturing Message Specification;Part 1: Service definition", Aug. 1, 2000, pp. i-22, 38 pages.

ISO/IEC; "ISO-9506-2 Industrial Automation Systems;Manufacturing Message Specification;Part 2: Protocol specification", Aug. 1, 2000, pp. i-6, 18 pages.
Microsoft Corporation; "Categorizing by Component Capabilities", Nov. 1, 2001, Platform SDK: COM.
ROY-G-BIV Corporation; "Pleadings: Plaintiff ROY-G-BIV Corporation's Complaint for Patent Infringement and Demand for Jury Trial", Sep. 19, 2007, pp. 1-9.
GE Fanuc; "Pleadings: Defendants Fanuc Ltd., Fanuc Robotics America, Inc., GE Fanuc Automation Americas, Inc., and GE Fanuc Intelligent Platforms, Inc.'s Answer to Plaintiff's Complaint for Patent Infringement and Counterclaims for Invalidity and Noninfringement", Nov. 15, 2007, pp. 1-12.
GE Fanuc; "Pleadings: Motion to Dismiss", Nov. 21, 2007, 9 pages.
ROY-G-BIV Corporation; "Pleadings: Plaintiff ROY-G-BIV Corporation's Reply to Defendants' Counterclaims for Invalidity and Noninfringement", Dec. 10, 2007, pp. 1-5.
GE Fanuc; "Pleadings: Defendant GE Fanuc Automation Americas, Inc.'s Notice of Change of Corporate Name", Dec. 14, 2007, pp. 1-3.
Thomas, R.; "The Languages of Tape", American Machinist, Jan. 6, 1964, DEFS 00011360-00011367, Special Report No. 545.
Aerotech, Inc.; "Aerotech UNIDEX 31 Series Machine Controller Brochure", Date Unknown, Aerotech 613-623.
Mishra, B., Antoniotti, M.; "ED I: NYU Educational Robot", Date Unknown, DEFS 00007791-00007873.
Wright, P., Hong, J., Tan, X., Pavlakos, L., Hansen, F.; "MOSAIC: Machine-tool, Open-System, Advanced Intelligent Controller", Date Unknown, DEFS 00030957-00030962.
Wizdom Controls, Inc.; "Paradym-31 User's Guide and Reference", Date Unknown, DEFS 00047946-00048274.
Precision Microcontrol; "Precision MicroControl Product Guide (with DEFS)", Date Unknown, RGB00076292-RGB00076323.
Wright, P., Hansen, F., Pavlakos, L.; "Tool Wear and Failure Monitoring on an Open-Architecture Machine Tool", New York University, Date Unknown, DEFS 00031419-00031436.
Allen-Bradley Company, Inc.; "Servo Positioning Assembly User Manual", Oct. 1, 1985, DEFS 00034317-00034563.
GMFANUC Robotics Corporation; "GMFCOMM Communications Program Reference Manual—Version 2.11", 1986, DEFS 00058429-00058553.
GMFANUC Robotics Corporation; "KCS-PC Karel Communications Software Reference Manual—Version 1.0", 1986, DEFS 00058611-00058786.
GMFANUC Robotics Corporation; "Karel OLPC Off-line Programming Software Operations Guide—Version OLPC-V1.50P", 1987, DEFS 00058098-00058305.
GMFANUC Robotics Corporation; "Karel-Vax Communication Software Reference Manual—Version 1.1", 1987, DEFS 00057536-00057757.
Greenfeld, I., Hansen, F., Wright, P.; "Self-Sustaining, Open-System Machine Tools", NAMR/SME, 1989, DEFS 00030204-00030210, 1989 Transactions of NAMR/SME.
Greenfeld, I., Hansen, F., Fehlinger, J., Pavlakos, L.; "Robotics Research Technical Report", New York University, Jun. 15, 1989, DEFS 00040323-00040398.
FANUC Ltd.; "FANUC MMMC-II Product Literature", Aug. 1, 1989, DEFS 00055223-00055228.
Reeker, L., Wright, P., Greenfeld, I., Hansen, F., Fehlinger, J., Pavlakos, L.; "Investigation and Design of Open System Controllers for Machine Tools", Defense Advanced Research Projects Agency, Nov. 1, 1989, DEFS 00030700-00030946.
FANUC Ltd.; "FANUC MMC-II Programming Manual", 1990, DEFS 00055273-00055555.
FANUC Ltd.; "FANUC MM-II Programming Manual", 1990, DEFS 00055273-00055555.
Microsoft Corporation; "Microsoft Windows Software Development Kit Reference—vol. 2", 1990, DEFS 00050303-00050674.
Denardo, P., Lapage, S., Staniulis, E.; "Network Communications with DAE 1.0", IBM Corporation, Mar. 6, 1990, DEFS 00002923-00002935.
Aerotech, Inc.; "Unidex 31 Integrated Machine Controller Software Manual", Jun. 29, 1990, Aerotech 001-357.
Compumotor Division, Parker Hannifin; "Compumotor 6000 Series Software Reference Guide", 1991, RGBINSP00001703-RGBINSP00001970.
Intellution, Inc.; "I/Q Driver Manual Allen-Bradley KT/KT2", 1991, DEFS 00020252-00020340.
IEC/TC; "Electrical Equipment of Industrial Machines—Serial Data Link for Real-time Communications Between Controls and Drives", Nov. 22, 1991, DEFS 00039926-00040070.
Intellution, Inc.; "FIXDMACS Product Documentation", 1992, DEFS 00018984-00019624.
Intellution, Inc.; "I/O Driver Manual I/O Driver Toolkit", 1992, DEFS 00020348-00020516.
Intellution, Inc.; "I/O Driver Manual I/O Driver Toolkit (Duplicate with different DEFS)", 1992, DEFS 00035971-00036139.
GE FANUC Automation; "MMC-II Application Reference Manual", 1992, DEFS 00054848-00055222.
GE Fanuc Automation; "MMC-II Programming Manual", 1992, DEFS 00054538-00054847.
Tele-Denken Resources, Inc.; "VIEWpoint Product Documentation", May 18, 1992, DEFS 00014912-00015830.
Sercos Interface; "Digital Interface for Communication between Controls and Drives in Numerically Controlled Machines", Jul. 1, 1992, DEFS 00041190-00041207.
Hewlett Packard Company; "PCL 5 Printer Language Technical Reference Manual—Part 1", Oct. 1, 1992, HP 0001-0369.
Shaw, L., Bidstrup, E., Wu, Z.; "United States Pat. 5,604,843 (with DEFS)", USPTO, Dec. 23, 1992, RGB00061667-RGB00061713.
Smith, M.; "CNC Machining Technology—vol. III Part Programming Techniques", Springer-Verlag, Inc., 1993, DEFS 00010649-00010723.
Intellution, Inc.; "FIX DMACS Recipe Manual", 1993, DEFS 00035624-00035793.
Ability Systems; "HPGL Controller Design Reference", 1993, DEFS 00043010-00043052.
Intellution, Inc.; "I/O Driver Manual Eurotherm 800 Series", 1993, DEFS 00036515-00036600.
Fanuc Robotics America, Inc; "KFLOPPY-DOS PS-100/200 Floppy Disk Drive Emulator—Version 3.07P", 1993, DEFS 00058306-00058404.
Fanuc Robotics North America, Inc., "Robot Controller Terminal Emulator Manual (Version 3.0)", 1993, DEFS 00058405-00058428.
Cahners Publishing Company; "The First Open Architecture, Multitasking Machine Controller Plus Computer", 1993, DEFS 00045272-00045237, Article in Jan., 1993 issue of Control Engineering.
Hewlett Packard Company; "The HP-GL/2 and HP RTL Reference Guide", 1993, DEFS 00031028-00031418.
Pritschow, G., Daniel, C., Junghans, G., Sperling, W.; "Open System Controllers: A Challenge for the Future of the Machine Tool Industry (with DEFS)", Jan. 15, 1993, RGB00076341-RGB00076344, Annals of the CIRP, pp. 449-452, vol. 42.
Microsoft Corporation; "WOSA Backgrounder: Delivering Enterprise Services to the Windows-based Desktop (with DEFS)", Jul. 1, 1993, RGB00078542-RGB00078560, Backgrounders and Whitepapers: Operating Systems Extensions—MSDN Archive Edition, pp. 1-19.
National Instruments; "LabVIEW for Windows User Manual", Aug. 1, 1993, DEFS 00031588-00032047.
National Instruments; "LabVIEW Networking Reference Manual", Aug. 1, 1993, DEFS 00032048-00032154.
Wonderware; "Wonderware NetDDE for Windows Users Guide", Nov. 1, 1993, DEFS 00017524-00017663.
ACE Technical Sales; "Third Party I/O Driver List", Dec. 7, 1993, DEFS 00055557-00055565.
Wonderware; "InTouch Getting Started Reference", 1994, DEFS 00016956-00017007.
Wonderware; "InTouch User's Guide", 1994, DEFS 00017008-00017523.
Proctor, F., Damazo, B., Yang, C., Frechette, S.; "Open Architectures for Machine Control (with DEFS)", NIST, 1994, DEFS 00010471-00010487.
Fanuc Robotics North America, Inc.; "Pontiac Truck and Bus PAINTworks II Manual", 1994, DEFS 00055734-00055920.

Fanuc Ltd.; "Fanuc MMC-IV Operator's Manual", Mar. 1, 1994, DEFS 00053795-00054125.

GE Fanuc Automation; "MMC-IV Descriptions Manual", Mar. 1, 1994, DEFS 00054457-00054479.

GE Fanuc Automation; "MMC-IV Operator's Manual", Mar. 1, 1994, DEFS 00054126-00054456.

GE Fanuc Automation; "MMV-IV Operator's Manual", Mar. 1, 1994, DEFS 00054126-00054456.

Wonderware; "Extensibility Toolkit for InTouch", Jul. 1, 1994, DEFS 00016606-00016955.

GE Fanuc Automation; "MMC-IV Connection and Maintenance Manual", Dec. 1, 1994, DEFS 00054480-00054537.

Hibbard, S.; "Open Drive Interfaces for Advanced Machining Concepts", Indramat Division, Rexroth Corporation, 1995, DEFS 00051134-00051151.

Mitchell, D.; "OLE Based Real-Time Device Interface", USDATA, Mar. 24, 1995, DEFS 00007882-00007908.

Schofield, S.; "Open Architecture Controllers for Advanced Machine Tools", Dec. 12, 1995, DEFS 00030394-00030590.

"OSACA Open System Architecture for Controls within Automation Systems Final Report", Feb. 21, 1996, DEFS 00009106-00009173.

Compumotor Division, Parker Hannifin; "Compumotor Motion Builder Start-Up Guide and Tutorial", Oct. 1, 1996, DEFS 00009960-00010053.

Schneeman, R.; "Device Driver Development for Microsoft Windows NT: Accessing Motion Control Hardware Using a Multimedia Framework (with DEFS)", NIST, Oct. 1, 1996, DEFS 00010531-00010580.

Compumotor Division, Parker Hannifin; "Motion Toolbox User Guide", Jul. 1 1997, DEFS 00010095-00010214.

ROY-G-BIV Corporation; "Pleadings: Plaintiff ROY-G-BIV Corp.'s Answers and Objections to Defendants First Set of Interrogatories", Feb. 28, 2008.

GE Fanuc; "Pleadings: Objections and Responses of Defendants to Plaintiff First Set of Requests for Documents (Nos. 1-25)", Mar. 7, 2008, pp. 1-31.

ROY-G-BIV Corporation; "Pleadings: Plaintiff ROY-G-BIV Corp.'s First Supplementary Answers and Objections to Defendants' First Set of Interrogatories", Mar. 20, 2008, pp. 1-6.

GE Fanuc; "Pleadings: Defendant'S Objections and Responses to Plaintiff's Second Set of Requests for Documents (Nos. 26-94)", Mar. 24, 2008, pp. 1-60.

ROY-G-BIV Corporation; "Pleadings: Plaintiff's First Supplemental Objections and Responses of Defendant'S First Set of Interrogatories (Nos. 1, 2, 8, 11, and 12)", Apr. 14, 2008, pp. 1-15.

Ge Fanuc; "Pleadings: Defendant'S Second Set of Document Requests (Nos. 88-123) to Plaintiff", Apr. 18, 2008, pp. 1-16.

"Pleadings: Plaintiff's Second Supplemental Answers and Objections to Defendant's First Set of Interrogatories", Apr. 25, 2008, pp. 1-11.

GE Fanuc; "Pleadings: Invalidity Contentions of Defendants (Redacted)", Jul. 11, 2008, pp. 1-87.

GE Fanuc; "Pleadings: Invalidity Contentions of Defendants—Exhibit A-058", Jul. 11, 2008, pp. 1-37.

GE Fanuc; "Pleadings: Invalidity Contentions of Defendants—Exhibit A-236", Jul. 11, 2008, pp. 1-50.

GE Fanuc; "Pleadings: Invalidity Contentions of Defendants—Exhibit A-543", Jul. 11, 2008, pp. 1-47.

GE Fanuc; "Pleadings: Invalidity Contentions of Defendants—Exhibit A-897", Jul. 11, 2008, pp. 1-129.

GE Fanuc; "Pleadings: Invalidity Contentions of Defendants—Exhibit AA-058", Jul. 11, 2008, pp. 1-85.

GE Fanuc; "Pleadings: Invalidity Contentions of Defendants—Exhibit AA-236", Jul. 11, 2008, pp. 1-74.

GE Fanuc; "Pleadings: Invalidity Contentions of Defendants—Exhibit AA-543", Jul. 11, 2008, pp. 1-74.

GE Fanuc; "Pleadings: Invalidity Contentions of Defendants—Exhibit AA-897", Jul. 11, 2008, pp. 1-148.

GE Fanuc; "Pleadings: Invalidity Contentions of Defendants—Exhibit B-058", Jul. 11, 2008, pp. 1-19.

GE Fanuc; "Pleadings: Invalidity Contentions of Defendants—Exhibit B-236", Jul. 11, 2008, pp. 1-22.

GE Fanuc; "Pleadings: Invalidity Contentions of Defendants—Exhibit B-543", Jul. 11, 2008, pp. 1-16.

GE Fanuc; "Pleadings: Invalidity Contentions of Defendants—Exhibit B-897", Jul. 11, 2008, pp. 1-42.

GE Fanuc; "Pleadings: Invalidity Contentions of Defendants—Exhibit BB-543", Jul. 11, 2008, pp. 1-18.

GE Fanuc; "Pleadings: Invalidity Contentions of Defendants—Exhibit C-543", Jul. 11, 2008, pp. 1-11.

GE Fanuc; "Pleadings: Invalidity Contentions of Defendants—Exhibit CC-058", Jul. 11, 2008, pp. 1-25.

GE Fanuc; "Pleadings: Invalidity Contentions of Defendants—Exhibit CC-236", Jul. 11, 2008, pp. 1-25.

GE Fanuc; "Pleadings: Invalidity Contentions of Defendants—Exhibit CC-543", Jul. 11, 2008, pp. 1-20.

GE Fanuc; "Pleadings: Invalidity Contentions of Defendants—Exhibit CC-897", Jul. 11, 2008, pp. 1-57.

GE Fanuc; "Pleadings: Invalidity Contentions of Defendants—Exhibit D-058", Jul. 11, 2008, pp. 1-24.

GE Fanuc; "Pleadings: Invalidity Contentions of Defendants—Exhibit D-236", Jul. 11, 2008, pp. 1-22.

GE Fanuc; "Pleadings: Invalidity Contentions of Defendants—Exhibit D-543", Jul. 11, 2008, pp. 1-26.

GE Fanuc; "Pleadings: Invalidity Contentions of Defendants—Exhibit D-897", Jul. 11, 2008, pp. 1-49.

GE Fanuc; "Pleadings: Invalidity Contentions of Defendants—Exhibit DD-543", Jul. 11, 2008, pp. 1-6.

GE Fanuc; "Pleadings: Invalidity Contentions of Defendants—Exhibit E-543", Jul. 11, 2008, pp. 1-5.

GE Fanuc; "Pleadings: Invalidity Contentions of Defendants—Exhibit EE-058", Jul. 11, 2008, pp. 1-15.

GE Fanuc; "Pleadings: Invalidity Contentions of Defendants—Exhibit EE-236", Jul. 11, 2008, pp. 1-13.

GE Fanuc; "Pleadings: Invalidity Contentions of Defendants—Exhibit EE-543", Jul. 11, 2008, pp. 1-17.

GE Fanuc; "Pleadings: Invalidity Contentions of Defendants—Exhibit EE-897", Jul. 11, 2008, pp. 1-30.

GE Fanuc; "Pleadings: Invalidity Contentions of Defendants—Exhibit F-058", Jul. 11, 2008, pp. 1-24.

GE Fanuc; "Pleadings: Invalidity Contentions of Defendants—Exhibit FF-058", Jul. 11, 2008, pp. 1-24.

GE Fanuc; "Pleadings: Invalidity Contentions of Defendants—Exhibit FF-236", Jul. 11, 2008, pp. 1-18.

GE Fanuc; "Pleadings: Invalidity Contentions of Defendants—Exhibit FF-543", Jul. 11, 2008, pp. 1-18.

GE Fanuc; "Pleadings: Invalidity Contentions of Defendants—Exhibit FF-897", Jul. 11, 2008, pp. 1-37.

GE Fanuc; "Pleadings: Invalidity Contentions of Defendants—Exhibit G-058", Jul. 11, 2008, pp. 1-24.

GE Fanuc; "Pleadings: Invalidity Contentions of Defendants—Exhibit G-236", Jul. 11, 2008, pp. 1-16.

GE Fanuc; "Pleadings: Invalidity Contentions of Defendants—Exhibit G-543", Jul. 11, 2008, pp. 1-18.

GE Fanuc; "Pleadings: Invalidity Contentions of Defendants—Exhibit G-897", Jul. 11, 2008, pp. 1-32.

GE Fanuc; "Pleadings: Invalidity Contentions of Defendants—Exhibit Gg-543", Jul. 11, 2008, pp. 1-14.

GE Fanuc; "Pleadings: Invalidity Contentions of Defendants—Exhibit H-543", Jul. 11, 2008, pp. 1-5.

GE Fanuc; "Pleadings: Invalidity Contentions of Defendants—Exhibit HH-058", Jul. 11, 2008, pp. 1-68.

GE Fanuc; "Pleadings: Invalidity Contentions of Defendants—Exhibit HH-236", Jul. 22, 2008, pp. 1-41.

GE Fanuc; "Pleadings: Invalidity Contentions of Defendants—Exhibit HH-543", Jul. 11, 2008, pp. 1-63.

GE Fanuc; "Pleadings: Invalidity Contentions of Defendants—Exhibit HH-897", Jul. 11, 2008, pp. 1-92.

GE Fanuc; "Pleadings: Invalidity Contentions of Defendants—Exhibit II-058", Jul. 11, 2008, pp. 1-143.

GE Fanuc; "Pleadings: Invalidity Contentions of Defendants—Exhibit II-236", Jul. 11, 2008, pp. 1-84.

GE Fanuc; "Pleadings: Invalidity Contentions of Defendants—Exhibit II-543", Jul. 11, 2008, pp. 1-144.

GE Fanuc; "Pleadings: Invalidity Contentions of Defendants—Exhibit II-897", Jul. 11, 2008, pp. 1-179.
GE Fanuc; "Pleadings: Invalidity Contentions of Defendants—Exhibit J-058", Jul. 11, 2008, pp. 1-104.
GE Fanuc; "Pleadings: Invalidity Contentions of Defendants—Exhibit J-236", Jul. 11, 2008, pp. 1-76.
GE Fanuc; "Pleadings: Invalidity Contentions of Defendants—Exhibit J-543", Jul. 11, 2008, pp. 1-73.
GE Fanuc; "Pleadings: Invalidity Contentions of Defendants—Exhibit J-897", Jul. 11, 2008, pp. 1-169.
GE Fanuc; "Pleadings: Invalidity Contentions of Defendants—Exhibit JJ-058", Jul. 11, 2008, pp. 1-80.
GE Fanuc; "Pleadings: Invalidity Contentions of Defendants—Exhibit JJ-236", Jul. 11, 2008, pp. 1-56.
GE Fanuc; "Pleadings: Invalidity Contentions of Defendants—Exhibit JJ-543", Jul. 11, 2008, pp. 1-65.
GE Fanuc; "Pleadings: Invalidity Contentions of Defendants—Exhibit JJ-897", Jul. 11, 2008, pp. 1-129.
GE Fanuc; "Pleadings: Invalidity Contentions of Defendants—Exhibit K-543", Jul. 11, 2008, pp. 1-4.
GE Fanuc; "Pleadings: Invalidity Contentions of Defendants—Exhibit L-058", Jul. 11, 2008, pp. 1-47.
GE Fanuc; "Pleadings: Invalidity Contentions of Defendants—Exhibit L-236", Jul. 11, 2008, pp. 1-34.
GE Fanuc; "Pleadings: Invalidity Contentions of Defendants—Exhibit L-543", Jul. 11, 2008, pp. 1-39.
GE Fanuc; "Pleadings: Invalidity Contentions of Defendants—Exhibit L-897", Jul. 11, 2008, pp. 1-66.
GE Fanuc; "Pleadings: Invalidity Contentions of Defendants—Exhibit LL-058", Jul. 11, 2008, pp. 1-55.
GE Fanuc; "Pleadings: Invalidity Contentions of Defendants—Exhibit LL-236", Jul. 11, 2008, pp. 1-41.
GE Fanuc; "Pleadings: Invalidity Contentions of Defendants—Exhibit LL-543", Jul. 11, 2008, pp. 1-59.
GE Fanuc; "Pleadings: Invalidity Contentions of Defendants—Exhibit LL-897", Jul. 11, 2008, pp. 1-98.
GE Fanuc; "Pleadings: Invalidity Contentions of Defendants—Exhibit MM-543", Jul. 11, 2008, pp. 1-3.
GE Fanuc; "Pleadings: Invalidity Contentions of Defendants—Exhibit NN-058", Jul. 11, 2008, pp. 1-37.
GE Fanuc; "Pleadings: Invalidity Contentions of Defendants—Exhibit NN-236", Jul. 11, 2008, pp. 1-35.
GE Fanuc; "Pleadings: Invalidity Contentions of Defendants—Exhibit NN-543", Jul. 11, 2008, pp. 1-33.
GE Fanuc; "Pleadings: Invalidity Contentions of Defendants—Exhibit NN-897", Jul. 11, 2008, pp. 1-63.
GE Fanuc; "Pleadings: Invalidity Contentions of Defendants—Exhibit O-058", Jul. 11, 2008, pp. 1-44.
GE Fanuc; "Pleadings: Invalidity Contentions of Defendants—Exhibit O-236", Jul. 11, 2008, pp. 1-24.
GE Fanuc; "Pleadings: Invalidity Contentions of Defendants - Exhibit O-543", Jul. 11, 2008, pp. 1-35.
GE Fanuc; "Pleadings: Invalidity Contentions of Defendants—Exhibit O-897", Jul. 11, 2008, pp. 1-58.
GE Fanuc; "Pleadings: Invalidity Contentions of Defendants—Exhibit OO-058", Jul. 11, 2008, pp. 1-24.
GE Fanuc; "Pleadings: Invalidity Contentions of Defendants—Exhibit OO-543", Jul. 11, 2008, pp. 1-8.
GE Fanuc; "Pleadings: Invalidity Contentions of Defendants—Exhibit P-058", Jul. 11, 2008, pp. 1-24.
GE Fanuc; "Pleadings: Invalidity Contentions of Defendants—Exhibit P-236", Jul. 11, 2008, pp. 1-24.
GE Fanuc; "Pleadings: Invalidity Contentions of Defendants—Exhibit P-543", Jul. 11, 2008, pp. 1-28.
GE Fanuc; "Pleadings: Invalidity Contentions of Defendants—Exhibit P-897", Jul. 11, 2008, pp. 1-55.
GE Fanuc; "Pleadings: Invalidity Contentions of Defendants—Exhibit Q-058", Jul. 11, 2008, pp. 1-83.
GE Fanuc; "Pleadings: Invalidity Contentions of Defendants—Exhibit Q-236", Jul. 11, 2008, pp. 1-53.
GE Fanuc; "Pleadings: Invalidity Contentions of Defendants—Exhibit Q-543", Jul. 11, 2008, pp. 1-90.
GE Fanuc; "Pleadings: Invalidity Contentions of Defendants—Exhibit Q-897", Jul. 11, 2008, pp. 1-110.
GE Fanuc; "Pleadings: Invalidity Contentions of Defendants—Exhibit S-058", Jul. 11, 2008, pp. 1-26.
GE Fanuc; "Pleadings: Invalidity Contentions of Defendants—Exhibit S-236", Jul. 11, 2008, pp. 1-17.
GE Fanuc; "Pleadings: Invalidity Contentions of Defendants—Exhibit S-543", Jul. 11, 2008, pp. 1-29.
GE Fanuc; "Pleadings: Invalidity Contentions of Defendants—Exhibit S-897", Jul. 11, 2008, pp. 1-38.
GE Fanuc; "Pleadings: Invalidity Contentions of Defendants—Exhibit T-058", Jul. 11, 2008, pp. 1-43.
GE Fanuc; "Pleadings: Invalidity Contentions of Defendants—Exhibit T-236", Jul. 11, 2008, pp. 1-31.
GE Fanuc; "Pleadings: Invalidity Contentions of Defendants—Exhibit T-543", Jul. 11, 2008, pp. 1-48.
GE Fanuc; "Pleadings: Invalidity Contentions of Defendants—Exhibit T-897", Jul. 11, 2008, pp. 1-80.
GE Fanuc; "Pleadings: Invalidity Contentions of Defendants—Exhibit V-058", Jul. 11, 2008, pp. 1-43.
GE Fanuc; "Pleadings: Invalidity Contentions of Defendants—Exhibit V-236", Jul. 11, 2008, pp. 1-37.
GE Fanuc; "Pleadings: Invalidity Contentions of Defendants—Exhibit V-543", Jul. 11, 2008, pp. 1-47.
GE Fanuc; "Pleadings: Invalidity Contentions of Defendants—Exhibit V-897", Jul. 11, 2008, pp. 1-91.
GE Fanuc; "Pleadings: Invalidity Contentions of Defendants—Exhibit W-058", Jul. 11, 2008, pp. 1-93.
GE Fanuc; "Pleadings: Invalidity Contentions of Defendants—Exhibit W-236", Jul. 11, 2008, pp. 1-68.
GE Fanuc; "Pleadings: Invalidity Contentions of Defendants—Exhibit W-543", Jul. 11, 2008, pp. 1-67.
GE Fanuc; "Pleadings: Invalidity Contentions of Defendants—Exhibit W-897", Jul. 11, 2008, pp. 1-161.
GE Fanuc; "Pleadings: Invalidity Contentions of Defendants—Exhibit X-236", Jul. 11, 2008, pp. 1-37.
GE Fanuc; "Pleadings: Invalidity Contentions of Defendants—Exhibit X-543", Jul. 11, 2008, pp. 1-51.
GE Fanuc; "Pleadings: Invalidity Contentions of Defendants—Exhibit X-897", Jul. 11, 2008, pp. 1-73.
GE Fanuc; "Pleadings: Invalidity Contentions of Defendants—Exhibit Y-058", Jul. 11, 2008, pp. 1-28.
GE Fanuc; "Pleadings: Invalidity Contentions of Defendants—Exhibit Y-236", Jul. 11, 2008, pp. 1-15.
GE Fanuc; "Pleadings: Invalidity Contentions of Defendants—Exhibit Y-543", Jul. 11, 2008, pp. 1-19.
GE Fanuc; "Pleadings: Invalidity Contentions of Defendants—Exhibit Y-897", Jul. 11, 2008, pp. 1-34.
GE Fanuc; "Pleadings: Invalidity Contentions of Defendants—Exhibit Z-058", Jul. 11, 2008, pp. 1-117.
GE Fanuc; "Pleadings: Invalidity Contentions of Defendants—Exhibit Z-236", Jul. 11, 2008, pp. 1-103.
GE Fanuc; "Pleadings: Invalidity Contentions of Defendants—Exhibit Z-543", Jul. 11, 2008, pp. 1-97.
GE Fanuc; "Pleadings: Invalidity Contentions of Defendants—Exhibit Z-897", Jul. 11, 2008, pp. 1-227.
ROY-G-BIV Corporation; "Pleadings: Plaintiff Indentification of Ten Asserted Claims", Aug. 8, 2008, p. 1.
GE Fanuc; "Pleadings: Fourth Supplemental Objections and Responses of Defendants to Plantiff First Set of Interrogatories (No. 1 and 2)", Aug. 14, 2008, pp. 1-26.
GE Fanuc; "Pleadings: Fifth Supplemental Objections and Responses of Defendants to Plantiff First Set of Interrogatories (Nos. 1)", Aug. 26, 2008, pp. 1-23.
ROY-G-BIV Corporation; "Pleadings: RGB Internal Document #8", Nov. 6, 2008, p. 4 (RGB00055568).
ROY-G-BIV Corporation; "Pleadings: RGB Internal Documents #9", Nov. 6, 2008, p. 14 (RGB00056075).
ROY-G-BIV Corporation; "Pleadings: RGB Related Document #1", Nov. 6, 2008, PDF pp. 1-23 (RGB00051652-RGB00051674).
ROY-G-BIV Corporation; "Pleadings: RGB Related Document #2", Nov. 6, 2008, PDF pp. 1-5 (RGB00052822-RGB00052826).

ROY-G-BIV Corporation; "Pleadings: RGB Related Document #3", Nov. 6, 2008, PDF p. 1 (RGB00004196).
ROY-G-BIV Corporation; "Pleadings: RGB Related Document #4", Nov. 6, 2008, PDF p. 1 (RGB00004200).
ROY-G-BIV Corporation; "Pleadings: RGB Related Document #5", Nov. 6, 2008, PDF p. 1 (RGB00004201).
ROY-G-BIV Corporation; "Pleadings: RGB Related Document #6", Nov. 6, 2008, PDF p. 1 (RGB00004202).
ROY-G-BIV Corporation; "Pleadings: RGB Related Document #7", Nov. 6, 2008, PDF pp. 1-3 (RGB00052984-RGB00052986).
Daniel A. Norton, "Writing Windows Device Drivers", 1992, pp. 1-202, Addison-Wesley Publishing Company, Inc.
Daniel A. Norton, "Writing Windows Device Drivers", 1992, pp. 202-436, Addison-Wesley Publishing Company, Inc.
Microsoft Corporation, "Win32 Programmer's Reference: vol. I—Windows Management and Graphics Device Interface", 1993, pp. 1-428, Microsoft Press.
Microsoft Corporation, "Win32 Programmer's Reference: vol. I—Windows Management and Graphics Device Interface", 1993, pp. 429-876, Microsoft Press.
Microsoft Corporation, "Windows NT Device Driver Kit: Win32 Subsystem Driver Design Guide", 1993, pp. 1-80, Microsoft Corporation.
Microsoft Corporation, "Windows NT Device Driver Kit: Network Drivers", 1993, pp. 1-12, Microsoft Corporation.
Microsoft Corporation, "Windows NT Device Driver Kit: Win32 Subsystem Driver Reference", 1993, pp. 1-11, Microsoft Corporation.
Microsoft Corporation, "Windows NT Device Driver Kit: Programming Guide", 1993, pp. 1-11, Microsoft Corporation.
Microsoft Corporation, "Windows NT Device Driver Kit: Kernel-Mode Driver Design Guide", 1993, pp. 1-7. Microsoft Corporation.
Microsoft Corporation, "Windows NT Device Driver Kit: Kernel-Mode Driver Reference", 1993, pp. 1-5. Microsoft Corporation.
Martin Marietta, "Next Generation Workstation/Machine Controller (NGC): vol. VI—Sensor/Effector Standardized Application (SESA)", 1992, pp. 1-38.
Martin Marietta, "Next Generation Workstation/Machine Controller (NGC): vol. V—Controls Standardized Application (CSA)", 1992, pp. 1-95.
Martin Marietta, "Next Generation Workstation/Machine Controller (NGC): vol. IV—Workstation Planning Standardized Application (WPSA)", 1992, pp. 1-120.
Martin Marietta, "Next Generation Workstation/Machine Controller (NGC): vol. III—Workstation Management Standardized Application (WMSA)", 1992, pp. 1-85.
Martin Marietta, "Next Generation Workstation/Machine Controller (NGC): vol. II—NGC Data", 1992, pp. 1-309.
Martin Marietta, "Next Generation Workstation/Machine Controller (NGC): vol. I—Specification for an Open System Architecture Standard (SOSAS)", 1992, pp. 1-259.
Steven K. Sorensen, "An Off-line Approach to Task Level State Driven Robot Programming", 1989, pp. 1-229.
Sercos Interface, Inc., "SERCOS Interface: Digital Interface for Communications Between Controls and Drives for Numerically Controlled Machines", 1991, pp. 1-366.
Charles Petzoid, "Programming Windows: The Microsoft Guide to Writing Applications for Windows 3—Second Edition", 1990, pp. 1-95 (Chapters 1 and 2), Microsoft Press.
Charles Petzoid, "Programming Windows: The Microsoft Guide to Writing Applications for Windows 3—Second Edition", 1990, pp. 96-180 (Chapters 3 and 4), Microsoft Press.
Charles Petzoid, "Programming Windows: The Microsoft Guide to Writing Applications for Windows 3—Second Edition", 1990, pp. 181-268 (Chapters 5 and 6), Microsoft Press.
Charles Petzoid, "Programming Windows: The Microsoft Guide to Writing Applications for Windows 3—Second Edition", 1990, pp. 269-341 (Chapters 7 and 8), Microsoft Press.
Charles Petzoid, "Programming Windows: The Microsoft Guide to Writing Applications for Windows 3—Second Edition", 1990, pp. 342-408 (Chapter 9), Microsoft Press.
Charles Petzoid, "Programming Windows: The Microsoft Guide to Writing Applications for Windows 3—Second Edition", 1990, pp. 409-496 (Chapter 10), Microsoft Press.
Charles Petzoid, "Programming Windows: The Microsoft Guide to Writing Applications for Windows 3—Second Edition", 1990, pp. 497-609 (Chapters 11 and 12), Microsoft Press.
Charles Petzoid, "Programming Windows: The Microsoft Guide to Writing Applications for Windows 3—Second Edition", 1990, pp. 610-718 (Chapters 13 and 14), Microsoft Press.
Charles Petzoid, "Programming Windows: The Microsoft Guide to Writing Applications for Windows 3—Second Edition", 1990, pp. 719-777 (Chapters 15), Microsoft Press.
Charles Petzoid, "Programming Windows: The Microsoft Guide to Writing Applications for Windows 3—Second Edition", 1990, pp. 778-877 (Chapters, 16, 17, and 18), Microsoft Press.
Charles Petzoid, "Programming Windows: The Microsoft Guide to Writing Applications for Windows 3—Second Edition", 1990, pp. 878-952 (Chapter 19 and Index), Microsoft Press.
Paul Wright et al., "Mosaic: An Open-Architecture Machine Tool for Precision Manufacturing", 1993, pp. 1-10.
Steven Ashley, "A Mosaic for Machine Tools", Mechanical Engineering CIME, 1990, pp. 1-6.
Adrian King, "Inside Windows 95", 1994, pp. 1-129 (Chapters 1, 2, and 3), Microsoft Press.
Adrian King, "Inside Windows 95", 1994, pp. 129-247 (Chapters 4 and 5), Microsoft Press.
Adrian King, "Inside Windows 95", 1994, pp. 248-505 (Chapters 6-10), Microsoft Press.
Bruel & Kjaer, "Bruel & Kjaer Product Brochure: A System to Build Systems", 1991, pp. 1-64.
Bruel & Kjaer, "Major Challenges in Test Systems for the 1990's", 1991, pp. 1-22.
Bruel & Kjaer, "Modular Test System: A Second Generation VXI Architecture", date unknown, pp. 1-23.
VME Bus Extensions for Instrumentation, "System Specification VXI-1, Draft 1.4", 1991, pp. 1-24.
Bruel & Kjaer, "Short Form Catalog 1991", 1991, pp. 1-68.
Bruel & Kjaer, "Modular Test System Software Presentation", date unknown, pp. 1-36.
Ability Systems Corporation, "Development in Motion", 1990, p. 1.
Ability Systems Corporation, "Indexer LPT Version 5", 1989, pp. 1-214.
Furness, Harry, "New Family of 'NT' Process Software Set to Move In", Control Engineering, Apr. 1993, 2 pages.
Agrusa, Russell L., "Is Windows NT the PCT Platform for the Future?", Control Engineering, Apr. 1993, 3 pages.
Faber, Tom, "From Distributed Control to Integrated Information", Control Engineering, Mid-Mar. 1992, 3 pages, published by Cahners Publishing Company.
GE Fanuc; "Pleadings: Defendants Proposed Terms and Claim Elements for Construction Pursuant to Patent Rule 4-1", Jul. 25,2008, pp. 1-16 (pdf pages).
ROY-G-BIV Corporation; "Pleadings: Plaintiff Proposed Terms and Claim Elements for Construction", Jul. 25, 2008, pp. 1-4 (pdf pages).
ROY-G-BIV Corporation; "Pleadings: Plaintiff Identification of Ten Asserted Claims", Aug. 8, 2008, pp. 1-3.
GE Fanuc; "Pleadings: Defendants Claim Constructions and Preliminary Identification of Extrinsic Evidence Pursuant to Patent Rule 4-2", Oct. 3, 2008, pp. 1-13 (pdf pages).
Roy-G-Biv Corporation; "Pleadings: Plaintiff Proposed Claim Constructions and Extrinsic Evidence", Oct. 3, 2008, pp. 1-22 (pdf pages).
GE Fanuc; "Pleadings: Defendant's Preliminary Constructions for Three Terms Identified by Plaintiff", Oct. 16, 2008, pp. 1-2.
GE Fanuc; "Pleadings: Defendant's Second Set of Interrogatories to Plaintiff", Oct. 17, 2008, pp. 1-9 (pdf pages).
GE Fanuc; "Pleadings: Defendants Preliminary Claim Constructions and Preliminary Identification of Extrinsic Evidence Pursuant to Patent Rule 4-2", Oct. 17, 2008, pp. 1-29 (pdf pages).
ROY-G-BIV Corporation; "Pleadings: Plaintiff's Proposed Constructions and Extrinsic Evidence for Terms Identified in Defendant's Letter Dated Oct. 7, 2008", Oct. 17, 2008, pp. 1-9.

ROY-G-BIV Corporation and GE Fanuc; "Pleadings: Joint Claim Construction and Prehearing Statement of Plaintiff and Defendant", Oct. 24, 2008, pp. 1-5 (pdf pages).
ROY-G-BIV Corporation and GE Fanuc; "Pleadings: Joint Claim Construction and Prehearing Statement of Plaintiff and Defendant—Exhibit A", Oct. 24, 2008, pp. 1-2 (pdf pages).
ROY-G-BIV Corporation and GE Fanuc; "Pleadings: Joint Claim Construction and Prehearing Statement of Plaintiff and Defendant—Exhibit B", Oct. 24, 2008, pp. 1-19.
ROY-G-BIV Corporation and GE Fanuc; "Pleadings: Joint Claim Construction and Prehearing Statement of Plaintiff and Defendant—Exhibit C", Oct. 24, 2008, pp. 1-64.
ROY-G-BIV Corporation and GE Fanuc; "Pleadings: Joint Claim Construction and Prehearing Statement of Plaintiff and Defendant—Exhibit C", Oct. 24, 2008, pp. 65-133.
ROY-G-BIV Corporation and GE Fanuc; "Pleadings: Joint Claim Construction and Prehearing Statement of Plaintiff and Defendant—Exhibit D", Oct. 24, 2008, pp. 1-22.
GE Fanuc; "Pleadings: Sixth Supplemental Objections and Responses of Defendants to Plaintiff's First Set of Interrogatories (Nos. 3-5)", Nov. 12, 2008, pp. 1-11 (pdf pages).
ROY-G-BIV Corporation; "Pleadings: Plaintiff's Answers and Objections to Defendant's Second Set of Interrogatories", Nov. 20, 2008, pp. 1-9 (pdf pages).
ROY-G-BIV Corporation; "Pleadings: Plaintiff Opening Markman Brief", Nov. 21, 2008, pp. 1-43 (pdf pages).
ROY-G-BIV Corporation; "Pleadings: Plaintiff Opening Markman Brief—Exhibit 1", Nov. 21, 2008, pp. 1-12 (pdf pages).
ROY-G-BIV Corporation; "Pleadings: Plaintiff Opening Markman Brief—Exhibit 10", Nov. 21, 2008, pp. 1-21 (pdf pages).
ROY-G-BIV Corporation; "Pleadings: Plaintiff Opening Markman Brief—Exhibit 11", Nov. 21, 2008, pp. 1-20 (pdf pages).
ROY-G-BIV Corporation; "Pleadings: Plaintiff Opening Markman Brief—Exhibit 12", Nov. 21, 2008, pp. 1-11 (pdf pages).
ROY-G-BIV Corporation; "Pleadings: Plaintiff Opening Markman Brief—Exhibit 13", Nov. 21, 2008, pp. 1-11 (pdf pages).
ROY-G-BIV Corporation; "Pleadings: Plaintiff Opening Markman Brief—Exhibit 14", Nov. 21, 2008, pp. 1-6 (pdf pages).
ROY-G-BIV Corporation; "Pleadings: Plaintiff Opening Markman Brief—Exhibit 15", Nov. 21, 2008, pp. 1-4 (pdf pages).
ROY-G-BIV Corporation; "Pleadings: Plaintiff Opening Markman Brief—Exhibit 16", Nov. 21, 2008, pp. 1-19 (pdf pages).
ROY-G-BIV Corporation; "Pleadings: Plaintiff Opening Markman Brief—Exhibit 17", Nov. 21, 2008, pp. 1-3 (pdf pages).
ROY-G-BIV Corporation; "Pleadings: Plaintiff Opening Markman Brief—Exhibit 18", Nov. 21, 2008, pp. 1-11 (pdf pages).
ROY-G-BIV Corporation; "Pleadings: Plaintiff Opening Markman Brief—Exhibit 19", Nov. 21, 2008, pp. 1-8 (pdf pages).
ROY-G-BIV Corporation; "Pleadings: Plaintiff Opening Markman Brief—Exhibit 20", Nov. 21, 2008, pp. 1-3 (pdf pages).
ROY-G-BIV Corporation; "Pleadings: Plaintiff Opening Markman Brief—Exhibit 21", Nov. 21, 2008, pp. 1-2 (pdf pages).
ROY-G-BIV Corporation; "Pleadings: Plaintiff Opening Markman Brief—Exhibit 2", Nov. 21, 2008, pp. 1-64 (pdf pages).
ROY-G-BIV Corporation; "Pleadings: Plaintiff Opening Markman Brief—Exhibit 2", Nov. 21, 2008, pp. 65-130 (pdf pages).
ROY-G-BIV Corporation; "Pleadings: Plaintiff Opening Markman Brief—Exhibit 3", Nov. 21, 2008, pp. 1-40 (pdf pages).
ROY-G-BIV Corporation; "Pleadings: Plaintiff Opening Markman Brief—Exhibit 3", Nov. 21, 2008, pp. 41-81 (pdf pages).
ROY-G-BIV Corporation; "Pleadings: Plaintiff Opening Markman Brief—Exhibit 4", Nov. 21, 2008, pp. 1-50 (pdf pages).
ROY-G-BIV Corporation; "Pleadings: Plaintiff Opening Markman Brief—Exhibit 4", Nov. 21, 2008, pp. 51-99 (pdf pages).
ROY-G-BIV Corporation; "Pleadings: Plaintiff Opening Markman Brief—Exhibit 6", Nov. 21, 2008, pp. 1-50.
ROY-G-BIV Corporation; "Pleadings: Plaintiff Opening Markman Brief—Exhibit 6", Nov. 21, 2008, pp. 51-94.
ROY-G-BIV Corporation and GE Fanuc; "Pleadings: Supplemental Joint Claim Construction and Prehearing Statement of Plaintiff and Defendant—Exhibit C", Nov. 21, 2008, pp. 1-64 (pdf pages).
ROY-G-BIV Corporation and GE Fanuc; "Pleadings: Supplemental Joint Claim Construction and Prehearing Statement of Plaintiff and Defendant—Exhibit C", Nov. 21, 2008, pp. 65-131 (pdf pages).
ROY-G-BIV Corporation and GE Fanuc; "Pleadings: Supplemental Joint Claim Construction and Prehearing Statement of Plaintiff and Defendant—Exhibit D", Nov. 21, 2008, pp. 1-50 (pdf pages).
Roy-G-Biv Corporation and GE Fanuc; "Pleadings: Supplemental Joint Claim Construction and Prehearing Statement of Plaintiff and Defendant—Exhibit D", Nov. 21, 2008, pp. 51-98 (pdf pages).
ROY-G-BIV Corporation; "Pleadings: Plaintiff Opening Markman Brief—Exhibit 7"Nov. 21, 2008. p. 1.
ROY-G-BIV Corporation; "Pleadings: Plaintiff Opening Markman Brief—Exhibit 8", Nov. 21, 2008, pp. 1-10 (pdf pages).
ROY-G-BIV Corporation; "Pleadings: Plaintiff Opening Markman Brief—Exhibit 9", Nov. 21, 2008, pp. 1-3 (pdf pages).
ROY-G-BIV Corporation and GE Fanuc; "Pleadings: Supplemental Joint Claim Construction and Prehearing Statement of Plaintiff and Defendant", Nov. 21, 2008, pp. 1-4.
ROY-G-BIV Corporation and GE Fanuc; "Pleadings: Supplemental Joint Claim Construction and Prehearing Statement of Plaintiff and Defendant—Exhibit B", Nov. 21, 2008, pp. 1-13 (pdf pages).
ROY-G-BIV Corporation and GE Fanuc; "Pleadings: Supplemental Joint Claim Construction and Prehearing Statement of Plaintiff and Defendant—Exhibit A", Nov. 21, 2008, pp. 1-2 (pdf pages).
ROY-G-BIV Corporation; "Pleadings: Plaintiff's Answer to Defendant's Second Amended Answer and Counterclaims", Dec. 5, 2008, pp. 1-15 (pdf pages).
ROY-G-BIV Corporation; "Pleadings: Plaintiff's Motion to Dismiss GE Fanuc Intelligent Platforms, Inc. and General Electric Company's Infringement Claims or, Alternatively, Motion to Sever—and Proposed Order", Dec. 5, 2008, pp. 1-11 (pdf pages).
GE Fanuc; "Pleadings: Claim Construction Brief of Defendants", Dec. 6, 2008, pp. 1-46 (pdf pages).
GE Fanuc; "Pleadings: Claim Construction Brief of Defendants—Exhibit A", Dec. 6, 2008, pp. 1-2 (pdf pages).
GE Fanuc; "Pleadings: Claim Construction Brief of Defendants—Exhibit B", Dec. 6, 2008, pp. 1-2 (pdf pages).
GE Fanuc; "Pleadings: Claim Construction Brief of Defendants—Exhibit C", Dec. 6, 2008, pp. 1-2 (pdf pages).
GE Fanuc; "Pleadings: Claim Construction Brief of Defendants—Exhibit D", Dec. 6, 2008, pp. 1-2 (pdf pages).
GE Fanuc; "Pleadings: Declaration of Christina M. Finn", Dec. 6, 2008, pp. 1-6 (pdf pages).
GE Fanuc; "Pleadings: Declaration of Christina M. Finn—Exhibit A", Dec. 6, 2008, pp. 1-13 (pdf pages).
GE Fanuc; "Pleadings: Declaration of Christina M. Finn—Exhibit B", Dec. 6, 2008, pp. 1-2 (pdf pages).
GE Fanuc; "Pleadings: Declaration of Christina M. Finn—Exhibit C", Dec. 6, 2008, pp. 1-2 (pdf pages).
GE Fanuc; "Pleadings: Declaration of Christina M. Finn—Exhibit D", Dec. 6, 2008, pp. 1-2 (pdf pages).
GE Fanuc; "Pleadings: Declaration of Christina M. Finn—Exhibit E", Dec. 6, 2008, pp. 1-17 (pdf pages).
GE Fanuc; "Pleadings: Declaration of Christina M. Finn—Exhibit F", Dec. 6, 2008, pp. 1-2 (pdf pages).
GE Fanuc; "Pleadings: Declaration of Christina M. Finn—Exhibit G", Dec. 6, 2008, pp. 1-2 (pdf pages).
GE Fanuc; "Pleadings: Declaration of Christina M. Finn—Exhibit H", Dec. 6, 2008, pp. 1-2 (pdf pages).
GE Fanuc; "Pleadings: Declaration of Christina M. Finn—Exhibit I", Dec. 6, 2008, pp. 1-8 (pdf pages).
GE Fanuc; "Pleadings: Declaration of Christina M. Finn—Exhibit J", Dec. 6, 2008, pp. 1-9 (pdf pages).
GE Fanuc; "Pleadings: Declaration of Christina M. Finn—Exhibit K", Dec. 6, 2008, pp. 1-8 (pdf pages).
GE Fanuc; "Pleadings: Declaration of Christina M. Finn—Exhibit L", Dec. 6, 2008, pp. 1-5 (pdf pages).
GE Fanuc; "Pleadings: Declaration of Melvin Ray Mercer", Dec. 6, 2008, pp. 1-34 (pdf pages).
GE Fanuc; "Pleadings: Declaration of Melvin Ray Mercer—Exhibit A", Dec. 6, 2008, pp. 1-22 (pdf pages).
GE Fanuc; "Pleadings: Declaration of Melvin Ray Mercer—Exhibit B", Dec. 6, 2008, pp. 1-2 (pdf pages).

GE Fanuc; "Pleadings: Declaration of Melvin Ray Mercer—Exhibit C", Dec. 6, 2008, pp. 1-2 (pdf pages).
GE Fanuc; "Pleadings: Declaration of Melvin Ray Mercer—Exhibit D", Dec. 6, 2008, pp. 1-2 (pdf pages).
GE Fanuc; "Pleadings: Declaration of Melvin Ray Mercer—Exhibit E", Dec. 6, 2008, pp. 1-2 (pdf pages).
GE Fanuc; "Pleadings: Declaration of Melvin Ray Mercer—Exhibit F", Dec. 6, 2008, pp. 1-5 (pdf pages).
GE Fanuc; "Pleadings: Declaration of Melvin Ray Mercer—Exhibit G", 1216/2008, pp. 1-8 (pdf pages).
ROY-G-BIV Corporation; "Pleadings: Plaintiff's Motion to Dismiss GE Fanuc Intelligenc Platforms, Inc. and General Electric Company's Infringement Claims or, Alternatively Motion to Sever", Jan. 8, 2009, pp. 1-7 (pdf pages).
GE Fanuc; "Pleadings: Defendant's Reply in Support of Their Motion to Stay the Litigation Plending the Outcome of the Reexamination Proceedings", Jan. 12, 2009, pp. 1-8 (pdf pages).
GE Fanuc; "Pleadings: Defendant's Reply in Support of Their Motion to Stay the Litigation Plending the Outcome of the Reexamination Proceedings—Exhibit 1", Jan. 12, 2009, pp. 1-2 (pdf pages).
GE Fanuc; "Pleadings: Defendant's Reply in Support of Their Motion to Stay the Litigation Plending the Outcome of the Reexamination Proceedings—Exhibit 2", Jan. 12, 2009, pp. 1-2 (pdf pages).
GE Fanuc; "Pleadings: Defendant's Reply in Support of Their Motion to Stay the Litigation Plending the Outcome of the Reexamination Proceedings—Exhibit 3", Jan. 12, 2009, pp. 1-2 (pdf pages).
US Dist Court EDTX, Marshal Div; "Order: Order Resetting Markman Date", Jan. 14, 2009, p. 1.
ROY-G-BIV Corporation; "Pleadings: Plaintiff's Opposition to Defendant's Motion to Stay the Litigation Pending the Outcome of the Reexamination Proceedings (Corrected)", Jan. 27, 2009, pp. 1-8 (pdf pages).
ROY-G-BIV Corporation; "Pleadings: Plaintiff's Second Set of Interrogatories (Nos. 17-18) for Each Defendant", Feb. 6, 2009, pp. 1-4.
ROY-G-BIV Corporation; Pleadings: Plaintiff Opening Markman Brief—Exhibit 5, Nov. 21, 2008, pp. 1-50.
ROY-G-BIV Corporation; Pleadings: Plaintiff Opening Markman Brief—Exhibit 5, Nov. 21, 2008, pp. 51-92.
Agrusa, Russell L., "Is Windows NT the PC Platform for the Future?", Control Engineering, Apr. 1993, 3 pages.
Numerical Control Society; "Who's Who in Numerical Control—1972", 1972, all pages.
Numerical Control Society; "Who's Who in Numerical Control—1973", 1973, all pages.
Greenfeld, I.; Wright, P.; "A Generic User-Level Specification for Open-System Machine Controllers", Date Unknown, New York University, pp. 1-17.
Galil Motion Control; "Galil Dynamic Data Exchange Server for DMC-1000", Date Unknown, pp. 1-2.
Galil Motion Control; "Galil OPINT600 Product Features", Date Unknown, pp. 1-3.
Penton Media, Inc.; "Technology Trends section of American Machinist", Date Unknown, all pages. (publish date unknown, from American Machinist).
ISO—International Standards Organization; "ISO 6983/1: Numerical control of machines—Program format and definition of adress words: Part 1: Data format for positioning, line motion and contouring control systems: First Edition", Sep. 15, 1982, pp. 1-16.
Tal, J.; "Motion Control by Microprocessors", 1984, Galil Motion Control.
ISO—International Standards Organization; "ISO 4342: Numerical control of machines—NC processor input—Basic part program reference language, First Edition", Dec. 15, 1985, all pages.
Petzold, C.; "The GDI Philosophy", 1988, Microsoft Development Library, Jul. 1994 MSDN, Programming Windows 3.1, pdf pages 1-2.
Tal, J.; "Motion Control Applications", 1989, Galil Motion Control.
Electronic Industries Association; "EIA-511 Manufacturing Message Specification—Service Definition and Protocol", Mar. 1, 1989, pp. 1-177.
GE Fanuc; "Pleadings: Defendant's Markman Claim Construction Hearing Tutorial", Apr. 15, 2009, all pages.
ROY-G-BIV Corporation; "Pleadings: Plaintiff Markman Claim Construction Tutorial", Apr. 15, 2009, all pages.
GE Fanuc; "Pleadings: Defendant's Markman Presentation for Claim Construction Hearing", Apr. 16, 2009, all pages.
ROY-G-BIV Corporation; "Pleadings: Plaintiff Markman Claim Construction Argument", Apr. 16, 2009, all pages.
ISO—International Standards Organization; "ISO/CD 10303-214—Application protocol: Core Data for Automative Mechanical Design Process—Draft", Aug. 8, 1995, pp. 1-1967.
Kramer, T.; Proctor, F.; "The NIST RS274/NGC Interpreter—Version 2", Oct. 26, 1995, NIST, pp. 1-58.
Selamoglu, H.; "Component Categories", Dec. 1, 1995, Microsoft Development Library, pp. 1-19.
OPC Foundation; "OLE for Process Control Standard—Version 1.0 Draft", Dec. 22, 1995, pp. 1-70.
ESPRIT 5629 Project; "Open System Architecture for Controls within Automation Systems EP 6379 and EP 9115, OSACA I and II Final Report", Apr. 30, 1996, pp. 1-79.
ROY-G-BIV Corporation and GE Fanuc; "Pleadings: Notice of Compliance With P.R. 4-5(d)", Jan. 9, 2009, pp. 1-3.
ROY-G-BIV Corporation and GE Fanuc; "Pleadings: Supplemental Joint Claim Construction and Prehearing Statement—Exhibit A", Jan. 9, 2009, pp. 1-2.
ROY-G-BIV Corporation and GE Fanuc; "Pleadings: Supplemental Joint Claim Construction and Prehearing Statement—Exhibit B", Jan. 9, 2009, pp. 1-9.
ROY-G-BIV Corporation and GE Fanuc; "Pleadings: Supplemental Joint Claim Construction and Prehearing Statement—Exhibit C", Jan. 9, 2009, pp. 1-110.
ROY-G-BIV Corporation and GE Fanuc; "Pleadings: Supplemental Joint Claim Construction and Prehearing Statement—Exhibit D", Jan. 9, 2009, pp. 1-80.
ROY-G-BIV Corporation and GE Fanuc; "Pleadings: Supplemental Joint Claim Construction and Prehearing Statement", Jan. 9, 2009, pp. 1-4.
GE Fanuc; "Pleadings: Defendants and Counterclaim Plaintiffs Fourth Set of Requests for Production to Plaintiff and Counterclaim Defendant (Nos. 144 to 183)", Feb. 19, 2009, pp. 1.
Salkind, L.; "Robotics Research Technical Report—SAGE A Real-Time Operating System for Robotic Supervisory Control", May 1, 1990, New York University, pp. 1-132. (DEFS 00040941-00041085).
ISO/IEC; "ISO/IEC 8824: Information Technology—Open Systems Interconnection—Specification of Abstract Syntax Notation One", Dec. 15, 1990, all pages.
Compumotor Division, Parker Hannifin; "6000 Series Programmer's Guide", 1991, all pages.
Microsoft Development Library; "1.1 Printer Driver Operation", 1992, Jul. 1994 MSDN, Windows NT DDK: Win32 Subsystem Driver Design Guide, pdf pp. 1-6.
Microsoft Development Library; "3.1.1 Using Unitool", 1992, Jul. 1994 MSDN, Windows NT DDK: Win32 Subsystem Driver Design Guide, pdf pp. 1-101.
Microsoft Development Library; "3.4 Specifying Cursor-Movement Commands", 1992, Jul. 1994 MSDN, Windows NT DDK: Win32 Subsystem Driver Design Guide, pdf pp. 1-7.
Microsoft Development Library; "4.1.22 Banding Drivers", 1992, Jul. 1994 MSDN, Windows 3.1 DDK: Device Driver Adaptation Guide, pdf pp. 1-3.
Microsoft Development Library; "Chapter 11—Graphics-Driver Escapes", 1992, Jul. 1994 MSDN, Windows 3.1 DDK: Device Driver Adaptation Guuide, pdf pp. 1-50.
Microsoft Development Library; "Chapter 2 Supporting DDI Printing and User Interface Functions", 1992, Jul. 1994 MSDN, Windows NT DDK: Win32 Subsystem Driver Design Guide, pdf pp. 1-5.
Microsoft Development Library; "Chapter 4—Specifying Control Information", 1992, Jul. 1994 MSDN, Windows 3.1 DDK: Minidriver Development Guide, pdf pp. 1-16.
Microsoft Development Library; "Chapter 5 Printer Escapes", 1992, Jul. 1994 MSDN, Windows 3.1 SDK: Programmers Reference, vol. 3: Messages, Structures, Macros, pdf pp. 1-54.
Microsoft Development Library; "Chpater 7 Minidriver", 1992, Jul. 1994 MSDN, International SDKS: Hanguel Windows DDK, pdf pp. 1-8.

Microsoft Development Library; "Win32 SDK Programmers API Reference, Escape Function", 1992, Jul. 1994 MSDN, Win32 SSK Programmers API Reference, vol. 3, pdf pp. 1-2.
Microsoft Development Library; "Windows 3.1 SDK: Programmers Reference vol. 2: Functions—SpoolFile", 1992, Jul. 1994 MSDN, Windows 3.1 Programmers Reference vol. 2: Functions, pdf p. 1.
Ambrose, C.; "The Development of an Interactive Synthesis Tool for Intelligent Controllers of Modular Reconfigurable Robots", Dec. 1, 1992, pp. 1-304.
Individual; "www.dictionary.com definition of 'persistent'", 1993.
Galil Motion Control; "Galil ServoTRENDS vol. IX. No. 2", Sep. 1, 1993, pp. 1-4.
Galil Motion Control; "Galil G-Code Translator News Release", Apr. 14, 1989, pp. 1-2.
Electronic Industries Association; "EIA-511 Errata", Apr. 18, 1989, pp. 1-7.
Galil Motion Control; "Galil OPINT600 Product Literature", Jun. 1, 1989, pp. 1-2.
Galil Motion Control; "Galil ServoTRENDS vol. V. No. 3", Jul. 1, 1989, pp. 1-3.
Galil Motion Control; "Galil OPINT600 Press Release", Jul. 10, 1989, pp. 1-2.
Cahners Publishing Company; "Control Engineering Software", Oct. 1, 1993, p. 184 of Oct. 1993 issue of Control Engineering.
Tuggle, E.; "Introduction to Device Driver Design", Oct. 5, 1993, Proceedings of the Fifth Annual Embedded Systems Conference, pp. 455-468, vol. 2.
Microsoft Development Library; "How to Send Printer Escape Codes from a WinWord Document", Oct. 25, 1993, Jul. 1994 MSDN, Knowledge Base Article, PSS ID No. Q93658, pdf page 1.
Tal, J.; "Step-By-Step Design of Motion Control Systems", 1994, Galil Motion Control.
Microsoft Development Library; "Using Passthrough Escape to Send Data Directly to Printer", Feb. 2, 1994, Jul. 1994 MSDN, Knowlege Base Article, PSS ID No. Q96795, pdf pp. 1-2.
CAN in Automation (CIA); "CAN Physical Layer for Industrial Applications", Apr. 20, 1994, pp. 1-4, CiA Draft Standard 102, Version 2.0.
Kramer, T.; Proctor, F.; Michaloski, J.; "The NIST RS274/NGC Interpreter—Version 1", Apr. 28, 1994, NIST, pp. 1-26.
ISO—International Standards Organization; "ISO/CC 10303-204: Application protocol: Mechanical design using boundary representation—Draft", Apr. 29, 1994, pp. 1-214.
Microsoft Development Library; "INF: An Alternative to SpoolFile( )", May 6, 1994, Jul. 1994 MSDN, Knowledge Base Article, PSS ID No. Q111010, pdf pp. 1-5.
Microsoft Development Library; "INF: Banding, Printing, and the Number of Bands", May 6, 1994, Jul. 1994 MSDN, Knowledge Base Article, PSS ID No. Q72691.
Microsoft Development Library; "INF: Basics of Banding Printing in Windows", May 6, 1994, Jul. 1994 MSDN, Knowledge Base, PSS ID No. Q75471, pdf pp. 1-2.
ISO/IEC; "ISO/IEC 9506-6: Industrial automation systems—Manufacturing message specification—Part 6: Companion Standard for Process Control", Jun. 1, 1994, pp. 1-267.
Galil Motion Control; "Galil ServoTRENDS vol. X. No. 2", Jul. 1, 1994, pp. 1-4.
ISO/IEC; "ISO/IEC 9545: Information technology—Open Systems Interconnection—Application Layer structure", Aug. 15, 1994, pp. 1-20.
ISO—International Standards Organization; "ISO 10303-1: Industrial automation systems and integration—Product data representation and exchange—Part 1: Overview and fundamental principles: First Edition", Dec. 15, 1994, pp. 1-28.
ISO—International Standards Organization; "ISO 1033-11: Part 11: Description methods: the Express language reference manual", Dec. 15, 1994, all pages.
Fredriksson, L.; "A Can Kingdom", 1995, Kvaser AB, pp. 1-109, Rev 3.01.
Takase, K; "Project of a robot performing in an extreme situation", Oct. 15, 1991, vol. 9, No. 5, pp. 79-82, p. 59.
Lynch, M.; "Computer Numerical Control for Machining", 1992, McGraw-Hill Inc., All pages. (Copyright 1992).
Lin, S.; "Computer Numerical Control—From Programming to Networking", 1994, Delmar Publishers, Inc, All pages. (Copyright 1994).
Webb, J.; Reis, R.; "Programmable Logic Controllers—Principles and Applications (Third Edition)", 1995, Prentice-Hall, Inc., All pages. (Copyright 1995).
Iyengar, S.; Elfes, A.; "Autonomous Mobile Robots: Control, Planning, and Architecture", 1991, IEEE Computer Society Press, All pages.
Iyengar, S.; Elfes, A.; "Autonomous Mobile Robots: Perception, Mapping, and Navigation", 1991, IEEE Computer Society Press, All pages
Folsom, D.; "Order: (Granting) Motion for Continuance", Aug. 25, 2009, US Dist Court EDTX, Marshal Div, p. 1.
Folsom, D.; "Order: Claim Construction ('897, '058, '236 and '543 Patents)", Aug. 25, 2009, US Dist Court. EDTX, Marshal Div, pp. 1-64.
Fanuc Ltd, Fanuc Robotics, and GE Fanuc; "Pleadings: Objections and Responses of Defendants to Plaintiff's Second Set of Interrogatories (Nos. 17-18)—Redacted", Mar. 16, 2009, All pages.
Everingham IV, C.; "Order: (Granted in Part) Plaintiff Motion for Proctective Order re Experts", Jun. 4, 2009, US Dist Court EDTX, Marshal Div, All pages.
Everingham IV, C.; "Order: (Granted) Plaintiff Motion to Compel re FANUC Witnesses", Jun. 4, 2009, US Dist Court EDTX, Marshal Div, All pages.
Fanuc Ltd, Fanuc Robotics, and GE Fanuc; "Pleadings: Defendant's Request for Leave to File a Motion for Summary Adjudication of Non-Infringement", Jun. 15, 2009, All pages.
Fanuc Ltd, Fanuc Robotics, and GE Fanuc; "Pleadings: Defendants Motion for ReconsiderationOrder Granting Plantiff's (Amended) Motion for Protective Order (D.E. 170)", Jun. 15, 2009, All pages.
Fanuc Ltd, Fanuc Robotics, and GE Fanuc; "Pleadings: Defendants Third Set of Interrogatories to Plaintiff (Nos. 19-28)", Jun. 17, 2009, All pages.
ROY-G-BIV Corporation; "Pleadings: Plaintiffs Fourth Set of Interrogatories (Nos. 25-27) for Each Defendant", Jun. 19, 2009, All pages.
Fanuc Ltd, Fanuc Robotics, and GE Fanuc; "Pleadings: Objections and Responses of Defendants to Plaintiffs Fourth Set of Interrogatories (Nos. 25-27)", Jul. 2, 2009, All pages.
Individual; "Order: (Denying) Defendants Motion for Reconsideration re Protective Order", Jul. 9, 2009, All pages.
Folsom, D.; "Order: Judgment Dismissing Action by Reason of Settlement", Oct. 19, 2009, US Dist Court EDTX, Marshal Div, pp. 1-2.
Folsom, D.; "Order: Reopen and Dismissal of Case", Nov. 20, 2009, US Dist Court EDTX, Marshal Div, p. 1.
ROY-G-BIV Corporation; "(U.S. Appl. No. 11/368,231) File History", Mar. 3, 2006, Now Abandoned (113 pages).
ROY-G-BIV Corporation; "(U.S. Appl. No. 11/370,082) File History", Mar. 6, 2006, Pending (1226 pages).
ROY-G-BIV Corporation; "(U.S. Appl. No. 11/375,502) File History", Mar. 13, 2006, Pending (1306 pages).
ROY-G-BIV Corporation; "(U.S. Appl. No. 11/583,233) File History", Oct. 18, 2006, Now Abandoned (664 pages).
ROY-G-BIV Corporation; "(U.S. Appl. No.11/728,801) File History", Mar. 26, 2007, Pending (1338 pages).
ROY-G-BIV Corporation; "(U.S. Appl. No. 12/271,724) File History", Nov. 14, 2008, Pending (361 pages).
ROY-G-BIV Corporation; "(U.S. Appl. No. 12/546,566) File History", Aug. 24, 2009, Pending (646 pages).
USPTO; "(U.S. Appl. No. 11/370,082) File History—Office Action", Mar. 16, 2010, pp. 1-88.
Health Hero Network, Inc.; "(U.S. Appl. No. 08/944,529) File History", Oct. 7, 1997, Now Abandoned (123 pages).
ROY-G-BIV Corporation; "(U.S. Appl. No. 09/191,981) File History", Nov. 13, 1998, Now Abandoned (290 pages).
ROY-G-BIV Corporation; "(U.S. Appl. No. 09/882,800) File History", Jun. 14, 2001, Now Abandoned (132 pages).
ROY-G-BIV Corporation; "(U.S. Appl. No. 10/074,552) File History", Feb. 11, 2002, Now Abandoned (115 pages).

ROY-G-BIV Corporation; "(U.S. Appl. No. 10/150,237) File History", May 17, 2002, Now Abandoned (39 pages).
ROY-G-BI Corporation; "(U.S. Appl. No. 10/405,883) File History", Apr. 1, 2003, Pending (1144 pages).
ROY-G-BIV Corporation; "(U.S. Appl. No. 10/409,393) File History", Apr. 7, 2003, Now Abandoned (140 pages).
ROY-G-BIV Corporation; "(U.S. Appl. No. 10/412,166) File History", Apr. 10, 2003, Now Abandoned (282 pages).
ROY-G-BIV Corporation; "(U.S. Appl. No. 10/643,533) File History", Aug. 18, 2003, Now Abandoned (311 pages).
ROY-G-BIV Corporation; "(U.S. Appl. No. 11/067,327) File History", Feb. 25, 2005, Now Abandoned (311 pages).
National Electrical Manufacturers Association; "ReEx: Malina Exhibit B—Excerpts from NEMA Motion Cointrol Handbook", Nov. 1, 1992, all pages.
Armstrong Teasdale LLP; "ReEx: U.S. Patent No. 5,691,897 Reexamination (Control No. 90/009,282)—Third Party Request", Sep. 23, 2008, all pages.
Armstrong Teasdale LLP; "ReEx: U.S. Patent No. 6,513,058 Reexamination (Control No. 95/000,398)—Third Party Request", Sep. 23, 2008, all pages.
Armstrong Teasdale LLP; "ReEx: U.S. Patent No. 6,516,236 Reexamination (Control No. 95/000,396)—Third Party Request", Sep. 23, 2008, all pages.
USPTO; "ReEx: U.S. Patent No. 5,691,897 Reexamination (Control No. 90/009,282)—Notice of Assignment of Request", Sep. 26, 2008, pp. 1-2.
USPTO; "ReEx: U.S. Patent No. 6,516,236 Reexamination (Control No. 95/000,396)—Notice of Assignment of Request", Oct. 2, 2008, all pages.
USPTO; "ReEx: U.S. Patent No. 6,513,058 Reexamination (Control No. 95/000,398)—Notice of Assignment of Request", Oct. 6, 2008, all pages.
USPTO; "ReEx: U.S. Patent No. 5,691,897 Ex-Partes Reexamination (Control No. 90/009,282)—Granted", Nov. 10, 2008, all pages.
USPTO; "ReEx: U.S. Patent No. 6,516,236 Inter-Partes Reexamination (Control No. 95/000,396)—Granted", Nov. 20, 2008, all pages.
USPTO; "ReEx: U.S. Patent No. 6,513,058 Inter-Partes Reexamination (Control No. 95/000,398)—Granted", Nov. 25, 2008, all pages.
USPTO; "ReEx: U.S. Patent No. 6,941,543 Inter-Partes Reexamination (Control No. 95/000,397)—Granted", Nov. 25, 2008, all pages.
USPTO; "ReEx: U.S. Patent No. 6,516,236 Reexamination (Control No. 95/000,396)—Non-Final Office Action", Jan. 23, 2008, all pages.
USPTO; "ReEx: U.S. Patent No. 6,513,058 Reexamination (Control No. 95/000,398)—Non-Final Office Action", Jan. 29, 2009, all pages.
USPTO; "ReEx: U.S. Patent No. 6,941,543 Reexamination (Control No. 95/000,397)—Non-Final Office Action", Jan. 29, 2009, all pages.
USPTO; "ReEx: U.S. Patent No. 5,691,897 Reexamination (Control No. 90/009,282)—Non-Final Office Action", Feb. 4, 2009, all pages.
USPTO; "ReEx: U.S. Patent No. 5,691,897 Reexamination (Control No. 90/009,282)—Decision for Petition for Extension of Time", Feb. 12, 2009, all pages.
Black, Lowe and Graham; "ReEx: U.S. Patent No. 6,941,543 Reexamination (Control No. 95/000,397)—Decision on Petition Extensin for Time", Feb. 12, 2009, all pages.
Black, Lowe and Graham; "ReEx: U.S. Patent No. 6,516,236 Reexamination (Control No. 95/000,396)—Decision for Petition for Extension of Time", Feb. 13, 2008, all pages.
USPTO; "ReEx: U.S. Patent No. 6,513,058 Reexamination (Control No. 95/000,398)—Decision for Petition for Petition for Extension of Time", Feb. 17, 2009, all pages.
Ard, J.; "ReEx: U.S. Patent No. 5,691,897 Reexamination (Control No. 90/009,282)—Response Declaration: Ard", Apr. 23, 2009, Black Lowe and Graham, (declaration—8 pages) and (supporting Exhibits A-BB—237 pages). See Supporting Exhibit CC listed in "RGRX_06 Exhibit Index".
Chouinard, D.; "ReEx: U.S. Patent No. 5,691,897 Reexamination (Control No. 90/009,282)—Response Declaration: Chouinard", Apr. 23, 2009 (declaration—8 pages) and (supporting Exhibit A—4 pages).
Levy, A.; "ReEx: U.S. Patent No. 5,691,897 Reexamination (Control No. 90/009,282)—Response Declaration: Levy", Apr. 23, 2009 (declaration—9 pages) and (supporting Exhibits A-C—7 pages).
Malina, R.; "ReEx: U.S. Patent No. 5,691,897 Reexamination (Control No. 90/009,282)—Response Declaration: Malina", Apr. 23, 2009, (declaration—34 pages) and (supporting Exhibits A-F—19 pages).
Mathias, R.; "ReEx: U.S. Patent No. 5,691,897 Reexamination (Control No. 90/009,282)—Response Declaration: Mathias", Apr. 23, 2009, (declaration—73 pages). See supporting Exhibita AA1-AA3, Y1-Y25, and Z1-Z10—listed in "RGRX_06 Exhibit Index".
McConnel, S.; "ReEx: U.S. Patent No. 5,691,897 Reexamination (Control No. 90/009,282)—Response Declaration: McConnell", Apr. 23, 2009, (12 pages).
Omoigui, N.; "ReEx: U.S. Patent No. 5,691,897 Reexamination (Control No. 90/009,282)—Response Declaration: Omoigui", Apr. 23, 2009, (declaration—22 pages) and (supporting Exhibit C—8 pages). See supporting Exhibits A-B—listed in "RGRX_06 Exhibit Index".
Petzold, C.; "ReEx: U.S. Patent No. 5,691,897 Reexamination (Control No. 90/009,282)—Response Declaration: Petzold", Apr. 23, 2009 (declaration—12 pages) and (supporting Exhibit A-B, where Exhibit B includes sub-exhbits A-G—78 pages).
Richter, J.; "ReEx: U.S. Patent No. 5,691,897 Reexamination (Control No. 90/009,282)—Response Declaration: Richter", Apr. 23, 2008, (declaratin—27 pages) and (supporting Exhibits A-B where Exhibit B includes sub-exhibits A-G—80 pages).
Stone, M.; "ReEx: U.S. Patent No. 5,691,897 Reexamination (Control No. 90/009,282)—Response Declaration: Stone", Apr. 23, 2009, (declaration—pages) and (supporting Exhibit A—4 pages).
Black, Lowe and Graham; "ReEx: U.S. Patent No. 6,516,236 Reexamination (Control No. 95/000,396)—Certificate of Service", Apr. 23, 2009, all pages.
Brown, D.; Clark, J.; "Foreign FileHist: Canadian Patent Application No. CA 2,705,404—File History", Jun. 1, 2010, CIPO, (190 pages).
EPO; "Foreign FileHist: European Patent Application No. EP04809804—Search Report", Sep. 2, 2010, (3 pages).
ROY-G-BIV Corporation; "USPTO Patent File Hist: (U.S .Appl. No. 11/728,801) Amendment after Notice of Allowance", Sep. 17, 2010, (2 pages).
USPTO; "ReEx: U.S. Patent No. 6,513,058 Reexamination (Control No. 95/000,398)—Action Closing Prosecution", Sep. 22, 2010, (144 pages).
USPTO; "ReEx: U.S. Patent No. 6,516,236 Reexamination (Control No. 95/000,396)—Action Closing Prosecution", Sep. 22, 2010, (147 pages).
USPTO; "ReEx: U.S. Patent No. 6,941,543 Reexamination (Control No. 95/000,397)—Action Closing Prosecution", Sep. 22, 2010, (141 pages).
ROY-G-BIV Corporation; "ReEx: U.S. Patent No. 6,513,058 Reexamination (Control No. 95/000,398)—Petition Requesting Termination of Reexammination Proceedings", Sep. 28, 2010, (34 pages).
ROY-G-BIV Corporation; "ReEx: U.S. Patent No. 6,516,236 Reexamination (Control No. 95/000,396)—Petition Requesting Termination of Reexamination Proceedings", Sep. 28, 2010, (34 pages).
ROY-G-BIV Corporation; "ReEx: U.S. Patent No. 6,941,543 Reexamination (Control No. 95/000,397)—Petition Requesting Termination of Reexamination Proceedings", Sep. 28, 2010, (34 pages).
USPTO; "USPTO Patent FileHist: 7110.00001 (U.S. Appl. No. 12/400,098) File History", Feb. 11, 2010, (1075 pages).
USPTO; "USPTO Patent FileHist: 7110.00002 (U.S. Appl. No. 12/263,953) File History", Feb. 11, 2010, (1054 pages).
USPTO; "USPTO Patent FileHist: 7110.00003 (U.S. Appl. No. 12/326,565) File History", Feb. 11, 2010, (1063 pages).
USPTO; "USPTO Patent FileHist: 7110.00004 (U.S. Appl. No. 12/390,779) File History", Feb. 11, 2010, (968 pages).
USPTO; "(U.S. Appl. No. 12/244,673) File History", Feb. 11, 2010, (1005 pages).
USPTO; "(U.S. Appl. No. 12/406,921) File History", Feb. 11, 2010, (539 pages).
USPTO; "(U.S. Appl. No. 12/494,163) File History", Feb. 11, 2010, (384 pages).

USPTO; "(U.S. Appl. No. 12/244,673) File History: Terminal Disclaimer", Feb. 16, 2010, (13 pages).
JPO; "JPO FileHist: Japanese Patent Application No. JP2003513348: Office Action", Jun. 10, 2010, (7 pages).
ROY-G-BIV Corporation; "USPTO Patent FileHist: (U.S. Appl. No. 12/271,724)—Response to Non-Final Office Action", Aug. 27, 2010, (10 pages).
ROY-G-BIV Corporation; "USPTO Patent FileHist: 7110.00002 (U.S. Appl. No. 12/263,953) File History: Response to Non-Final Office Action", Aug. 31, 2010, (7 pages).
USPTO; "(U.S. Appl. No. 12/271,724)—Office Action", Apr. 27, 2010, (153 pages).
Roy-G-Biv Corporation; "(U.S. Appl. No. 11/370,082) File History—Response to Office Action", Jul. 16, 2010, (10 pages).
USPTO; "(U.S. Appl. No. 11/375,502) File History; Final Office Action", Jul. 21, 2010, (195 pages).
Roy-G-Biv Corporation; "(U.S. Appl. No. 10/966,848)—Amend After Notice of Allowance, Formal Drawings", Jul. 29, 2010, (19 pages).
Roy-G-Biv Corporation; "(U.S. Appl. No. 12/406,921) File History—Preliminary Amendment", Jul. 29, 2010, (21 pages).
USPTO; "(U.S. Appl. No. 10/405,883) File History; Non-Final Office Action", Aug. 5, 2010, (30 pages).
USPTO; "ReEx: U.S. Patent No. 5,691,897 Reexamination (Control No. 90/009,282)—Examiner Advisory Action", May 24,2010, (5 pages).
Roy-G-Biv Corporation; "ReEx: U.S. Patent No. 5,691,897 Ex-Partes Reexamination (Control No. 90/009,282)—Appeal Brief", Jul. 12, 2010, (75 pages).
JPO; "Japanese Patent Application No. JP2003513348—FileHist: Office Action", Jun. 10, 2010, (13 pages).
USPTO; "(U.S. Appl. No. 11/728,801) Notice of Allowance", Jun. 16, 2010, (72 pages).
USPTO; "(U.S. Appl. No. 10/966,848)—Notice of Allowance", Jun. 22, 2010, (50 pages).
USPTO; "(U.S. Appl. No. 10/966,848)—Notice of Allowance", Jul. 12, 2010, (17 pages).
USPTO; "ReEx: U.S. Patent No. 5,691,897 Reexamination (Control No. 90/009,282)—All Rejections Withdrawn", Oct. 4, 2010, (6 pages).
Black, Lowe and Graham; "ReEx: U.S. Patent No. 6,516,236 Reexamination (Control No. 95/000,396)—Fee Transmittal", Apr. 23, 2009, all pages.
Black, Lowe and Graham; "ReEx: U.S. Patent No. 6,516,236 Reexamination (Control No. 95/000,396)—Information Disclosure Statement", Apr. 23, 2009, all pages.
"Ard. J.; ReEx: U.S. Patent No. 6,516,236 Reexamination (Control No. 95/000,396)—Response Declaration: Ard", Apr. 23, 2009, (declaration—8 pages) and (supporting Exhibits A-BB—237 pages). See supporting Exhibit CC listed in "RGRX_06 Exhibit Index".
Chouina ReEx: "U.S. Patent No. 6,516,236 Reexamination (Control No. 95/000,396)—- Response Declaration: Chouinard", Apr. 23, 2009, (declaration—8 pages) and (supporting Exhibit A—4 pages).
Levy, .; "ReEx: U.S. Patent No. 6,516,236 Reexamination (Control No. 95/000,396)—Response Declaration: Levy"Apr. 23, 2009, (declaration—9 pages) and (supporting Exhibits A-C—7 pages).
Malina, R.; "ReEx: U.S. Patent No. 6,516,236 Reexamination (Control No. 95/000,396)—Response Declaration: Malina", Apr. 23, 2009, (declaration—34 pages) and (supporting Exhibits A-F—19 pages).
Mathias, R.; "ReEx: U.S. Patent No. 6,516,236 Reexamination (Control No. 95/000,396)—Response Declaration:Mathias", Apr. 23, 2009, (declaration—74 pages). See supporting Exhibits AA1-AA3, Y1-Y25, and Z1-Z10—listed in "RGRX_06 Exhibit Index".
McConnel, S.; "ReEx: U.S. Patent No. 6,516,236 Reexamination (Control No. 95/000,396)—Response Declaration: McConnell", Apr. 23, 2009, (12 pages).
Omoigui, N.; "ReEx: U.S. Appl. No. 6,516,236 Reexamination (Control No. 95/000,396)—Response Declaration: Omoigui", Apr. 23, 2008, (declaration—22 pages) and (supporing Exhibit C—8 pages). See supporting Exhibits A-B—listed in "RGRX_06 Exhibit INdex".

Petzold,. C.; "ReEx: U.S. Appl. No. 6,516,236 Reexamination(Control No. 95/000,396)—Response Declaration: Petzold", Apr. 23, 2009, (declaration—12 pages) and (supporting Exhibit A-B, where Ehxibit B includes sub-exhbits A-G—78 pages).
Richter, J.; "ReEx: U.S. Patent No. 6,516,236 Reexamination (Control No. 95/000,396)—Response Declaration: Richer", Apr. 23, 2008, (declaration —27 pages) and (supporting Exhibits A-B where Exibit B includes sub-exhibits A-G—80 pages).
Stone, M.; "ReEx: U.S. Patent No. 6,415,235 Reexamination (Control No. 95/000,396)—Response Declaration: Stone", Apr. 23, 2009, (declaration—13 pages) and (supporting Exhibit A—4 pages).
Black, Lowe and Graham; "ReEx: U.S. Patent No. 6,516,236 Reexamination (Control No. 95/000,396)—Transmittal Letter ", Apr. 23, 200 all pages.
Black, Lowe and Graham; "ReEx: U.S. Patent No. 6,513,058 Reexamination (Control No. 95/000,398)—Certificate of Service", Apr. 28, 2009, all pages
Black, Lowe and Graham; "ReEx: U.S. Patent No. 6,513,058 Reexamination (Control No. 95/000,398)—Fee Transmittal", Apr. 28, 2009, all pages.
Black, Lowe and Graham; "ReEx: U.S. Patent No. 6,513,058 Reexamination (Control No. 95/000,398)—Information Disclosure Statement", Apr. 28, 2009, all pages.
Ard, J.; "ReEx: U.S. Patent No. 6,513,058 Reexamination (Control No. 95/000,398)—Response Declaration: Ard", Apr. 28, 2008, (declaration—8 pages) and (supporting Exhibits A-BB—237 pages). See supporting Exhibit CC listed in "RGRX_06 Exhibit INdex".
Chouinard, D.; "ReEx: U.S. Patent No. 6,513,058 Reexaminatin (Control No. 95/000,398)—Response Declaration: Chouinard", Apr. 28, 2009, declaration—8 pages) and (supporting Exhibit A—4 pages).
Levy, A.; "ReEx: U.S. Patent No. 6,513,058 Reexamination (Control No. 95/000,398—Response Declaration: Levy", Apr. 28, 2009, (declaration—9 pages) and (supporting Exhibits A-C—7 pages).
Malina, R.; "ReEx: U.S. Patent No. 6,513,058 Eeexamination (Control No. 95/000,398)—Response Declaration: Malina", Apr. 28. 2009, (declaratin—34 pages) and (supporting Exhibits A-F—19 pages).
Mathias, R.; "ReEx: U.S. Patent No. 6,513,058 Reexamination (Control No. 95/000,398)—Response Declaration: Mathias", Apr. 28. 2009. See supporting Exhibits AA1-AA3, Y1-Y25, and Z1-Z10—listed in "RGRX_06 Exhibit INdex".
McConnel, S.; "ReEx: U.S. Patent No. 6,513,058 Reexamination (Control No. 95/000,398)—Response Declaration: McConnell", Apr. 28, 2009 (12 pages).
Omoigui, N.; "ReEx: U.S. Patent No. 6,513,058 Reexamination (Control No. 95/000,398)—Response Declaration: Omoigui", Apr. 28, 2009, (declaration—22 pages). See supporting Exhibits A-B—listed in "RGRX_06 Exhibit Index".
Petzold, C. "ReEx: U.S. Patent No. 6,513,058 Reexamination (Control No. 95/000,398)—Response Declaration: Petzold", Apr. 28, 2009, (declaration—11 pages) and (supporting Exhibit A-B, where Ehxibit B includes sub-exhbits A-G—78 pages).
Richter, J.; "ReEx: U.S. Patent No. 6,513,058 Reexamination (Control No. 95/000,398)—Response Declaration: Richter", Apr. 28, 2009, (declaration13 27 pages) and (supporting Exhibits A-B where Exibit B includes sub-exhibits A-G—80 pages).
Stone, M.; "ReEx: U.S. Patent No. 6,513,058 Reexamination (Control No. 95/000,398)—Response Declaration: Stone", Apr. 28, 2009, (declaration—13 pagew) and (supporting Exhibit A—4 pages).
USPTO; "ReEx: U.S. Patent No. 6,513,058 Reexamination (Control No. 95/000,398)—Returned Postcards", Apr. 28, 2009, all pages.
Black, Lowe and Graham; "ReEx: U.S. Patent No. 6,513,058 Reexamination (Control No. 95/000,398)—Transmittal Letter", Apr. 28, 2008, all pages.
Black, Lowe and Graham; "ReEx: U.S. Patent No. 6,941,543 Reexamination (Control No. 95/000,397)—Information Disclosure Statement", Apr.28, 2009, all pages.
Black, Lowe and Graham; "ReEx: U.S. Patent No. 6,513.058 Reexamination (Control No. 95/000,398—Response after Non-Final Office Action", Apr. 29, 2009, all pages.

Black, Lowe and Graham; "ReEx: U.S. Patent No. 6,941,543 Reexamination (Control No. 95/000,397)—Certificat of Service", Apr. 29, 2009, all pages.
Black, Lowe and Graham; "ReEx: U.S. Patent No. 6,941,543 Reexamination (Control No. 95/000,397)—Fee Transmittal", Apr. 29, 2009, all pages.
Black, Lowe and Graham; "ReEx: U.S. Patent No. 6,941,543 Reexamination (Control No. 95/000,397)—Response after Non-Final Office Action". Apr. 29. 2009, all pages.
Ard, J.; "ReEx: U.S. Patent No. 6,941,543 Reexamination (Control No. 95/000,397)—Response Declaration: Ard≤, Apr.29. 2009, (declaration—8 pages) and (supporting Exhibits A-BB—237 pages). See supporting Exhibit CC listed in 'RGRX_06 Exhibit Index".
Chouinard, D.; "ReEx: U.S. Patent No. 6,941,543 Reexamination (Control No. 95/000,397)—Response Declaration: Chouinard", Apr. 29, 2009, (declaration—8 pages) and (supporting Exhibit A—4 pages).
Levy, A.; "ReEx: U.S. Patent No. 6,941,543 Reexamination (Control No. 95/000,397)—Response Declaration: Levy", Apr. 29, 2009, (declaration—9 pages) and (supporting Exhibits A-C—7 pages).
Malina, R.; "ReEx: U.S. Patent No. 6,941,543 Reexamination (Control No. 95/000,397)—Response Declaration: Malina", Apr. 29. 2009, (declaration—34 pages) ;and (supporting Exhibits A-F—19 pages).
Mathias, R.; "ReEx: U.S. Patent No. 6,941,543 Reexamination (Control No. 95/000,397)—Response Declaration: Mathias", Apr. 29. 2009, (declaration—73 pages). See supporting Exhibits AA1-AA3, Y1-Y25, and Z1-Z10—listed in "RGRX_06 Exhibit Index".
McConnel, S.; "ReEx: U.S. Patent No. 6,941,543 Reexamination (Control No. 95/000,397)—Response Declaration: McConnell", Apr. 29, 2009, (12 pages).
Omoigui, N.; "ReEx: U.S. Patent No. 6,941,543 Reexamination (Control No. 95/000,397)—Response Declaration: Omoigui", Apr. 29, 2009, (22 pages) and (supporting Exhibit C—8 pages). See supporting Exhibits A-B—listed in "RGRX_06 Exhibit Index".
Petzold, C.; "ReEx: U.S. Patent No. 6,941,543 Reexamination (Control No. 95/000,397) - Response Declaration: Petzold", Apr. 29, 2009, (declaration—12 pages) and (supporting Exhibit A-B, where Ehxibit B includes sub-exhbits A-G—78 pages).
Richter, J.; "ReEx: U.S. Patent No. 6,941,543 Reexamination (Control No. 95/000,397)—Response Declaration: Richter", Apr. 29, 2009, (declaration—27 pages) and (supporting Exhibits A-B where Exibit B includes sub-exhibits A-G—80 pages).
Stone, M.; "ReEx: U.S. Patent No. 6,941,543 Reexamination (Control No. 951000,397)—Response Declaration: Stone", Apr. 29, 2009, (declaration—13 pages) and (supporting Exhibit A—pages).
USPTO; "ReEx: U.S. Patent No. 6,941,543 Reexamination (Control No. 95/000,397)—Returned Postcards", Apr. 29, 2009, all pages.
Black, Lowe and Graham; "ReEx: U.S. Patent No. 6,941,543 Reexamination (Control No. 95/000,397)—Transmittal Letter", Apr. 29, 2009, all pages.
Black, Lowe and Graham; "ReEx: U.S. Patent No. 5,691,897 Reexamination (Control No. 90/009,282)—Certificate of Service", May 1, 2009, all pages.
Black, Lowe and Graham; "ReEx: U.S. Patent No. 5,691,897 Reexamination (Control No. 90/009,282)—Fee Transmittal", May 1, 2009, all pages.
Black, Lowe and Graham; "ReEx: U.S. Patent No. 5,691,897 Reexamination (Control No. 90/009,282)—Information Disclosure Statement", May 1, 2009, all pages.
Black, Lowe and Graham; "ReEx: U.S. Patent No. 5,691,897 Reexamination (Control No. 90/009,282)—Response after Non-Final Office Action", May 1, 2009, all pages.
Black, Lowe and Graham; "ReEx: U.S. Patent No. 5,691,897 Reexamination (Conrol No. 90/009,282)—Transmittal Letter", May 1, 2009, all pages.
USPTO "ReEx: U.S. Patent No. 5,691,897 Reexamination (Control No. 90/009,282)—Returned Postcards", May 6, 2009, all pages.
Armstrong Teasdale Llp; "ReEx: U.S. Patent No. 6,516,236 Reexamination (Control No. 95/000,396)—Third Party Requester Comments after Non-Final Office Action", May 22, 2009, all pages.

Individual; "ReEx: U.S. Patent No. 6,516,236 Reexamination (Control No. 95/000,396)—Third Party Requester Comments after Non-Final Office Action: Exhibits A-1 thru A-47", May 22, 2009, all pages.
Individual; "ReEx: U.S. Patent No. 6,516,236 Reexamination (Control No. 95/000,396)—Third Party Requester Comments after Non-Final Office Action: Exhibits B thru Q", May 22, 2009, all pages. See transcript—Contains multiple refs. with varying pub. dates. Exh Q not provided by requestor.
Individual; "ReEx: U.S. Patent No. 6,513,058 Reexamination (Control No. 95/000,398)—Third Party Certificate of Mailing", May 28, 2009, all pages.
Armstrong Teasdale LLP; "ReEx: U.S. Patent No. 6,513,058 Reexamination (Control No. 95/000,398)—Third Party Requester Comments after Non-Final Office Action", May 28, 2009, all pages.
Individual; "ReEx: U.S. Patent No. 6,513,058 Reexamination (Control No. 95/000,398)—Third Party Requester Comments after Non-Final Office Action: Exhibits A-1 thru A-55", May 28, 2009, all pages.
Individual; "ReEx: U.S. Patent No. 6,513,058 Reexamination (Control No. 95/000,398)—Third Party Requester Comments after Non-Final Office Action: Exhibits B thru S", May 28, 2009, all pages.
Armstrong Teasdale LLP "ReEx: U.S. Patent No. 6,941,543 Reexamination (Control No. 95/000,397)—Third Party Requester Comments after Non-Final Office Action", May 29, 2009, all pages.
Individual; "ReEx: U.S. Patent No. 6,941,543 Reexamination (Control No. 95/000,397)—Third Party Requester Comments after Non-Final Office Action: Exhibits T Thru V", May 29, 2009, all pages.
Individual; "ReEx: U.S. Patent No. 6,513,058 Reexamination (Control No. 95/000,398)—Third Party Certificate of Service", Jun. 11, 2009, all pages.
Individual; "ReEx: U.S. Patent No. 6,516,236 Reexamination (Control No. 95/000,396)—Third Party Certificate of Service", Jun. 11, 2009, all pages.
Individual; "ReEx: U.S. Patent No. 6,513,058 Reexamination (Control No. 95/000,398)—Petition and Request for Return of 3rd Party Req. Comments Without Consideration", Jun. 12, 2009, all pages.
Black, Lowe and Graham; "ReEx: U.S. Patent No. 6,516,236 Reexamination (Control No. 95/000,396)—Petition and Request of 3rd Party Req. Comments Without Consideration", Jun. 12, 2009. All pages.
Armstrong Teasdale LLP; "ReEx: U.S. Patent No. 6,941,543 Reexamination (Control No. 95/000,397)—Third Party Request", Sep. 23, 2009, all pages.
USPTO; "ReEx: U.S. Patent No. 5,691,897 Reexamination (Control No. 90/009,282)—Final Office Action", Jan. 13, 2010, all pages.
USPTO; "ReEx: U.S. Patent No. 6,516,236 Reexamination (Control No. 95/000,396)—Non-Final Office Action #2", Feb. 4, 2010, all pages.
USPTO; "ReEx: U.S. Patent No. 6,941,543 Reexamination (Control No. 95/000,397)—Non-Final Office Action #2", Feb. 4, 2010, all pages.
USPTO; "ReEx: U.S. Patent No. 6,513,058 Reexamination (Control No. 95/000,398)—Non-Final Office Action #2", Feb. 8, 2010, all pages.
Black, Lowe and Graham; "ReEx: U.S. Patent No. 6,516,236 Reexamination (Control No. 95/000,396)—Response after Non-Final Office Action", Feb. 16, 2010, all pages.
Black, Lowe and Graham; "ReEx: U.S. Patent No. 6,513,058 Reexamination (Control No. 95/000,398)—Response after PTO's Notice Dated Feb 4, 2010", Feb. 19, 2010, (52 pages).
Black, Lowe and Graham; "ReEx: U.S. Patent No. 6,941,543 Reexamination (Control No. 95/000,397)—Response after PTO's Notice Dated Feb 4, 2010", Feb. 19, 2010, (59 pages).
Roy-G-Biv Corporation; "ReEx: RGRX_06 Exhibit Index", Feb. 24, 2010, (7 pages).
Black, Lowe and Graham; "ReEx: U.S. Patent No. 5,691,897 Ex-Partes Reexamination (Control No. 90/009,282)—Response after Final Office Action", Mar. 12, 2010, 43 pages.
Black, Lowe and Graham; "ReEx: U.S. Patent No. 6,516,236 Reexamination (Control No. 95/000,396)—Response after PTO's Notice Dated Feb 4, 2010", Mar. 19, 2010, (56 pages).

Stegbauer, W.; "Intertask-Communication Inside a Real-Time Database", 1989, IFAC Distributed Databases in Real-time, pp. 63-69.
Roy-G-Biv Corporation; "(U.S. Appl. No. 10/405,883) File History; Amend after Final Rejection Office Action", Mar. 29, 2010, (6 pages).
Uspto; "(U.S. Appl.; No. 12/263,953) File History; Non-Final Office Action", Mar. 31, 2010, (476 pages).
Roy-G-Biv Corporation; "(U.S. Appl. No. 11/375,502) File History; Response After Oct. 1, 2009 Non-Final Office Action", Mar. 31, 2010, (13 pages).
Richter, J.; "Advanced Windows NT—The Developer's Guide to the Win32 Application Programming Interface", 1994, Microsoft Press, (732 pages) Copyright 1994.
Kruglinski, D.; "Inside Visual C++—Version 1.5; Second Edition", 1994, Microsoft Press, (754 pages) Copyright 1994.
Microsoft Press; "Microsoft Windows NT(TM) 3.5 Guidelines for Security, Audit, and Control", 1994, (296 pages) Copyright 1994.
EPO; "FileHist: European Patent Application No. EP04816957—Search Report", Mar. 24, 2010, (4 pages).
Brockschmidt, K.; "Inside OLE—Second Edition", 1995, Microsoft Press, (1236 pages) Copyright 1995.
Kruglinski, D.; "Inside Visual C++—The Standard Reference for Programming with Microsoft Visual C++ version 4", 1996, Microsoft Press, (946 pages) Copyright 1996.
Chappell, D.; "Understanding ActiveX and Ole - a Guide for Developers and Managers", 1996, Microsoft Press, (347 pp.) Copyright 1996.
Roy-G-Biv Corporation; "ReEx: U.S. Patent No. 6,516,236 Reexamination (Control No. 95/000,396)—Patent Owner's Comments in Response to the Action Closing Prosecution", Oct. 8, 2010, (40 pages).
Roy-G-Biv Corporation; "ReEx: U.S. Patent No. 6,513,058 Reexamination (Control No. 95/000,398)—Patent Owner's Comments in Response to the Action Closing Prosecution", Oct. 12, 2010, (38 pages).
Roy-G-Biv Corporation; "ReEx: U.S. Patent No. 6,941,543 Reexamination (Control No. 95/000,397)—Patent Owner's Comments in Response to the Action Closing Prosecution", Oct. 13, 2010, (43 pages).
USPTO; "(U.S. Appl. No. 12/557,722) File History—Non Final Office Action", Oct. 20, 2010, (441 pages).
Roy-G-Biv Corporation; "(U.S. Appl. No. 11/728,801)—Response After Notice of Allowance", Nov. 1, 2010, (2 pages).
Roy-G-Biv Corporation; "Foreign FileHist: European Patent Application No. EP04816957—Response to Examination Report", Nov. 9, 2010, (7 pages).
USPTO; "(U.S. Appl. No. 12/271,724)—Final Office Action", Nov. 10, 2010, (269 pages).
USPTO; "(U.S. Appl. No. 10/966,848)—Issue Notification", Nov. 23, 2010, (1 page).
Roy-G-Biv Corporation; "USPTO Patent FileHist: 7110.00002 (U.S. Appl. No. 12/263,953)—Letter to Examiner", Oct. 24,2010, (4 pages).
USPTO; "(U.S. Appl. No. 12/244,673) File History—Final Office Action", Nov. 29, 2010, (228 pages).
USPTO; "(U.S. Appl. No. 12/406,921) File History—Non-Final Office Action", Dec. 3, 2010, (278 pages).
Roy-G-Biv Corporation; "(U.S. Appl. No. 10/405,883) Amendment and Response to Non-Final Office Action", Dec. 6, 2010, (8 pages).
USPTO; "(U.S. Appl. No. 11/728,801)—Notice of Allowance", Dec. 14, 2010, (8 pages).
EPO; "Foreign FileHist: European Patent Application No. EP04809804—Examination Report", Dec. 15, 2010, (5 pages).
USPTO; "(U.S. Appl. No. 12/244,673) File History—Advisory Action after Final Office Action", Jan. 13, 2011, (2 pages).
Roy-G-Biv Corporation; "USPTO Patent FileHist: 7110.00001 (U.S. Appl. No. 12/400,098) File History—Response after Non-Final Office Action", Dec. 28, 2010, (8 pages).
Roy-G-Biv Corporation; "USPTO Patent FileHist: 7110.00004 (U.S. Appl. No. 12/390,779) File History—Response after Non-Final Office Action", Dec. 30, 2010, (9 pages).
Roy-G-Biv Corporation; "(U.S. Appl. No. 12/244,673) File History—Response after Final Office Action", Jan. 5, 2011, (4 pages).

USPTO; "ReEx: U.S. Patent No. 5,691,897 Ex-Partes Reexamination (Control No. 90/009,282)—Ex Parte Reexamination Certificate (7971st)", Jan. 11, 2011, 9 pages.
USPTO; "ReEx: U.S. Patent No. 6,513,058 Reexamination (Control No. 95/000,398)—Right of Appeal Notice", Jan. 26, 2011, (10 pages).
USPTO; "ReEx: U.S. Patent No. 6,516,236 Reexamination (Control No. 95/000,396)—Right of Appeal Notice", Jan. 26, 2011, (10 pages).
USPTO; "ReEx: U.S. Patent No. 6,941,543 Reexamination (Control No. 95/000,397)—Right of Appeal Notice", Jan. 26, 2011, (13 pages).
Roy-G-Biv Corporation; "Pleadings: Plaintiff Complaint (*Roy-G-Biv Corp.* v. *ABB*) for Patent Infringement and Demand for Jury Trial", Nov. 15, 2011, (8 pages).
Roy-G-Biv Corporation; "Pleadings: Plaintiff Complaint (*Roy-G-Biv Corp.* v. *Honeywell*) for Patent Infringement and Demand for Jury Trial", Nov. 15, 2011, (10 pages).
Roy-G-Biv Corporation; "Pleadings: Plaintiff Complaint (*Roy-G-Biv Corp.* v. *Siemens*) for Patent Infringement and Demand for Jury Trial", Nov. 15, 2011, (8 pages).
Roy-G-Biv Corporation; "ReEx: U.S. Patent No. 5,691,897 Reexamination (Control No. 90/009,282)—Certificate of Correction Filing", Feb. 24, 2011, (9 pages).
Roy-G-Biv Corporation; "ReEx: U.S. Patent No. 6,941,543 Reexamination (Control No. 95/000,397)—Notice of Appeal", Feb. 24, 2011, (4 pages).
USPTO; "ReEx: U.S. Patent No. 5,691,897 Ex-Partes Reexamination (Control No. 90/009,282)—Certificate of Correction", May 24, 2011, (4 pages).
CIPO; "Foreign FileHist: Canadian Patent Application No. CA 2,705,404—Office Action Cancelled", Aug. 3, 2011, (1 page).
Roy-G-Biv Corporation; "(U.S. Appl. No. 12/494,163)—Amendment and Response to Non-Final Office Action", Aug. 11, 2011, (7 pages).
USPTO; "(U.S. Appl. No. 12/557,722) File History—Notice of Allowability", Aug. 12, 2011, (8 pages).
CIPO; "Foreign FileHist: Canadian Patent Application No. CA 2,705,404—Office Action", Aug. 3, 2011, (4 pages).
Roy-G-Biv Corporation; "(U.S. Appl. No. 12/546,566) File History—Preliminary Amendment", Sep. 20, 2011, (8 pages).
USPTO; "(U.S. Appl. No. 12/406,921) File History—Supplemental Notice of Allowance", Oct. 3, 2011, (195 pages).
USPTO; "(U.S. Appl. No. 12/494,163)—Supplemental Notice of Allowance", Oct. 3, 2011, (20 pages).
Roy-G-Biv Corporation; "(U.S. Appl. No. 12/244,673) File History—Appeal Brief", Oct. 24, 2011, (29 pages).
USPTO; "(U.S. Appl. No. 12/406,921) File History—Issue Notification", Nov. 16, 2011, (1 page).
USPTO; "(U.S. Appl. No. 12/494,163)—Supplemental Notice of Allowance", Nov. 22, 2011, (8 pages).
USPTO; "(U.S. Appl. No. 11/370,082) File History—Final Office Action", Dec. 2, 2011, (34 pages).
USPTO; "USPTO Patent FileHist: 7110.00002 (U.S. Appl. No. 12/263,953)—Non-Final Office Action", Dec. 6, 2011, (36 pages).
USPTO; "(U.S. Appl. No. 13/004,789) File History Published Application US 2011/0169832", Jul. 14, 2011, (18 pages).
USPTO; "(U.S. Appl. No. 13/011,753) File History—Published Application US 2011/0185371", Jul. 28, 2011, (94 pages).
Roy-G-Biv Corporation; "(U.S. Appl. No. 12/244,673) File History—Notice of Appeal", Aug. 25, 2011, (1 page).
USPTO; "(U.S. Appl. No. 12/557,722) File History—Issue Notification", Sep. 7, 2011, (1 page).
Roy-G-Biv Corporation; "(U.S. Appl. No. 11/370,082) File History—Response to Non-Final Office Action", Sep. 12, 2011, (9 pages).
USPTO; "(U.S. Appl. No. 10/405,883) File History—Issue Notification", Sep. 14, 2011, (1 page).
CIPO; "Foreign FileHist: Canadian Patent Application No. CA 2,625,283—Notice of Reinstatement", Mar. 8, 2011, 1 page.
Brown, D.; Stein, S.; "(U.S. Appl. No. 12/896,750) File History—Published Application US 2011/0071652", Mar. 24, 2011, USPTO, (33 pages).

Brown, D.; Clark, J.; "Foreign FileHist: European Patent Publication No. EP2302475", Mar. 30, 2011, EPO, (149 pages).
Roy-G-Biv Corporation; "(U.S. Appl. No. 12/406,921) File History—Response to Non-Final Office Action", Apr. 4, 2011, (3 pages).
EPO; "Foreign FileHist: European Patent Application No. EP08013237—Examination Report", Apr. 5, 2011, (5 pages).
USPTO; "(U.S. Appl. No. 11/370,082) File History—Non-Final Office Action", Apr. 11, 2011, (34 pages).
USPTO; "ReEx: U.S. Patent No. 6,513,058 Reexamination (Control No. 95/000,398)—Notice of Intent to Issue Inter Partes ReExamination Certificate", Mar. 28, 2011, (5 pages).
USPTO "ReEx: U.S. Patent No. 6,516,236 Reexamination (Control No. 95/000,396)—Notice of Intent to Issue Inter Partes ReExamination Certificate", Mar. 28, 2011, (5 pages).
Various Entities; "ReEx: U.S. Patent No. 6,941,543 Reexamination (Control No. 95/000,397)—Patent Owner's Appeal Brief Evidence Appendix", Apr. 22, 2011, (161 pages).
Roy-G-Biv Corporation; "ReEx: U.S. Patent No. 6,941,543 Reexamination (Control No. 95/000,397)—Patent Owner's Appeal Brief", Apr. 22, 2011, (23 pages).
USPTO; "ReEx: U.S. Patent No. 6,513,058 Reexamination (Control No. 95/000,398)—Inter Partes Reexamination Certificate (0276th)", Jun. 28, 2011, (10 pages).
USPTO; "ReEx: U.S. Patent No. 6,516,236 Reexamination (Control No. 95/000,396)—Inter Partes Reexamination Certificate (0277th)", Jun. 28, 2011, (10 pages).
Roy-G-Biv Corporation; "(U.S. Appl. No. 12/244,673) File History—Second Request for Reconsisderation after Final Office Action", Feb. 4, 2011, (3 pages).
USPTO; "(U.S. Appl. No. 10/405,883) File History—Final Office Action", Feb. 10, 2011, (28 pages).
Roy-G-Biv Corporation; "Canadian Patent FileHist: Canadian Patent Application No. 2,625,283 Petition for Reinstatement", Feb. 16, 2011, (7 pages).
USPTO; "(U.S. Appl. No. 12/244,673) File History—Final Office Action", Feb. 25, 2011, (17 pages).
Roy-G-Biv Corporation; "(U.S. Appl. No. 11/370,082) File History—Request for Continued Examination", Mar. 7, 2011, (9 pages).
USPTO; "(U.S. Appl. No. 11/728,801) Issue Notification", Mar. 8, 2011, (1 page).
USPTO; "USPTO Patent FileHist: 7110.00001 (U.S. Appl. No. 12/400,098) File History—Final Office Action", Mar. 17, 2011, (37 pages).
Roy-G-Biv Corporation; "(U.S. Appl. No. 12/557,722) File History—Response to Non Final Office Action", Mar. 21, 2011, (8 pages).
USPTO; "USPTO Patent FileHist: 7110.00004 (U.S. Appl. No. 12/390,779) File History—Final Office Action", Mar. 22, 2011, (41 pages).
Roy-G-Biv Corporation; "(U.S. Appl. No. 10/405,883) File History—Amendment After Final Rejection", May 10, 2011, (9 pages).
USPTO; "(U.S. Appl. No. 12/494,163)—Non Final Office Action", May 12, 2011, (7 pages).
USPTO; "(U.S. Appl. No. 10/405,883) File History—Notice of Allowance", May 26, 2011, (8 pages).
Roy-G-Biv Corporation; "USPTO Patent FileHist: 7110.00002 (U.S. Appl. No. 12/263,953)—Request for Continued Examination", Jun. 9, 2011, (7 pages).
Roy-G-Biv Corporation; "Foreign FileHist: European Patent Application No. EP04809804—Response to Examination Report", Jun. 16, 2011, (16 pages).
USPTO; "(U.S. Appl. No. 12/557,722) File History—Notice of Allowance", Jun. 16, 2011, (48 pages).
USPTO; "(U.S. Appl. No. 12/406,921) File History—Notice of Allowance", Jun. 23, 2011, (32 pages).
CIPO; "Foreign FileHist: Canadian Patent Application No. CA 2,705,404—Office Action", Jul. 4, 2011, (4 pages).
CIPO; "Foreign FileHist: Canadian Patent Application No. CA 2,625,283—Office Action", Jul. 11, 2011, (2 pages).
USPTO; "(U.S. Appl. No. 12/557,722) File History—Notice of Allowability", Jul. 18, 2011, (22 pages).
Roy-G-Biv Corporation; "Pleadings: Plaintiff Amended Complaint (*Roy-G-Biv Corp.v. Abb*) for Patent Infringement and Demand for Jury Trial", Dec. 13, 2011, (10 pages).
Roy-G-Biv Corporation; "Pleadings: Plaintiff Amended Complaint (*Roy-G-Biv Corp.v. Honeywell*) for Patent Infringement and Demand for Jury Trial", Dec. 13, 2011, (12 pages).
Roy-G-Biv Corporation; "Pleadings: Plaintiff Amended Complaint (*Roy-G-Biv Corp.v. Siemens*) for Patent Infringement and Demand for Jury Trial", Dec. 13, 2011, (10 pages).
Meadwestvaco Corporation; "Pleadings: ABB Answer, Affirmative Defenses, and Counterclaims of Defendant Meadwestvaco Corp.", Jan. 11, 2012, (8 pages).
Meadwestvaco Texas, LP; "Pleadings: ABB Answer, Affirmative Defenses, and Counterclaims of Defendant Meadwestvaco Texas, LP", Jan. 11, 2012, (9 pages).
ABB; "Pleadings: ABB Answer, Affirmative Defenses, and Counterclaims of Defendant", Jan. 11, 2012, (11 pages).
Roy-G-Biv Corporation; "Pleadings: Plaintiff Amended Complaint (*Roy-G-Biv Corp.v. Siemens*) for Patent Infringement and Demand for Jury Trial", Feb. 1, 2012, (11 pages).
USPTO; "USPTO Patent FileHist: (U.S. Appl. No. 12/494,163)—Issue Notification", Jan. 4, 2012, 1 page.
Roy-G-Biv Corporation; "USPTO Patent FileHist: 7110.00003 (U.S. Appl. No. 12/326,565)—Response to Non-Final Office Action", Feb. 23, 2012, (8 pages).
Roy-G-Biv Corporation; "USPTO Patent FileHist: (U.S. Appl. No. 12/244,673) File History—Response to Non-Final Office Action", Mar. 1, 2012, (8 pages).
Brown, D.; Clark, J.; "Foreign FileHist: Canadian Patent Application No. CA 2,705,404—File History", Jun. 11, 2010, CIPO, (190 pages).
EPO; "Foreign FileHist: European Patent Application No. EP04809804—Search Report", Sep. 21, 2010, (3 pages).
USPTO; "USPTO Patent FileHist: (U.S. Appl. No. 11/728,801) Notice of Allowance (second received)", Sep. 13, 2010, (31 pages).
Roy-G-Biv Corporation; "USPTO Patent FileHist: P215429 (U.S. Appl. No. 11/728,801) Amendment after Notice of Allowance", Sep. 17, 2010, (2 pages).
USPTO; "USPTO Patent FileHist: 7110.00001 (U.S. Appl. No. 12/400,098) File History—Non-Final Office Action", Sep. 28, 2010, (479 pages).
USPTO; "Uspto Patent FileHist: 7110.00004 (U.S. Appl. No. 12/390,779) File History—Non-Final Office Action", Sep. 30, 2010, (352 pages).
USPTO; "Uspto Patent FileHist: (U.S. Appl. No. 11/370,082) File History—Final Office Action", Oct. 5, 2010, (122 pages).
Brown, D.; Clark, J.; "Foreign FileHist: European Patent Application No. EP08013237—File History", Oct. 8, 2010, EPO, (198 pages).
USPTO; "ReEx: U.S. Patent No. 6,513,058 Reexamination (U.S. Appl. No. 95/000,398)—Action Closing Prosecution", Sep. 22, 2010, (144 pages).
USPTO; "ReEx: U.S. Patent No. 6,516,236 Reexamination (U.S. Appl. No. 95/000,396)—Action Closing Prosecution", Sep. 22, 2010, (147 pages).
USPTO; "ReEx: U.S. Patent No. 6,941,543 Reexamination (U.S. Appl. No. 95/000,397)—Action Closing Prosecution", Sep. 22, 2010, (141 pages).
Roy-G-Biv Corporation; "ReEx: U.S. Patent No. 6,513,058 Reexamination (U.S. Appl. No. 95/000,398)—Petition Requesting Termination of Reexammination Proceedings", Sep. 28, 2010, (34 pages).
Roy-G-Biv Corporation; "ReEx: U.S. Patent No. 6,516,236 Reexamination (U.S. Appl. No. 95/000,396)—Petition Requesting Termination of Reexamination Proceedings", Sep. 28, 2010, (34 pages).
Roy-G-Biv Corporation; "ReEx: U.S. Patent No. 6,941,543 Reexamination (U.S. Appl. No. 95/000,397)—Petition Requesting Termination of Reexamination Proceedings", Sep. 28, 2010, (34 pages).

* cited by examiner

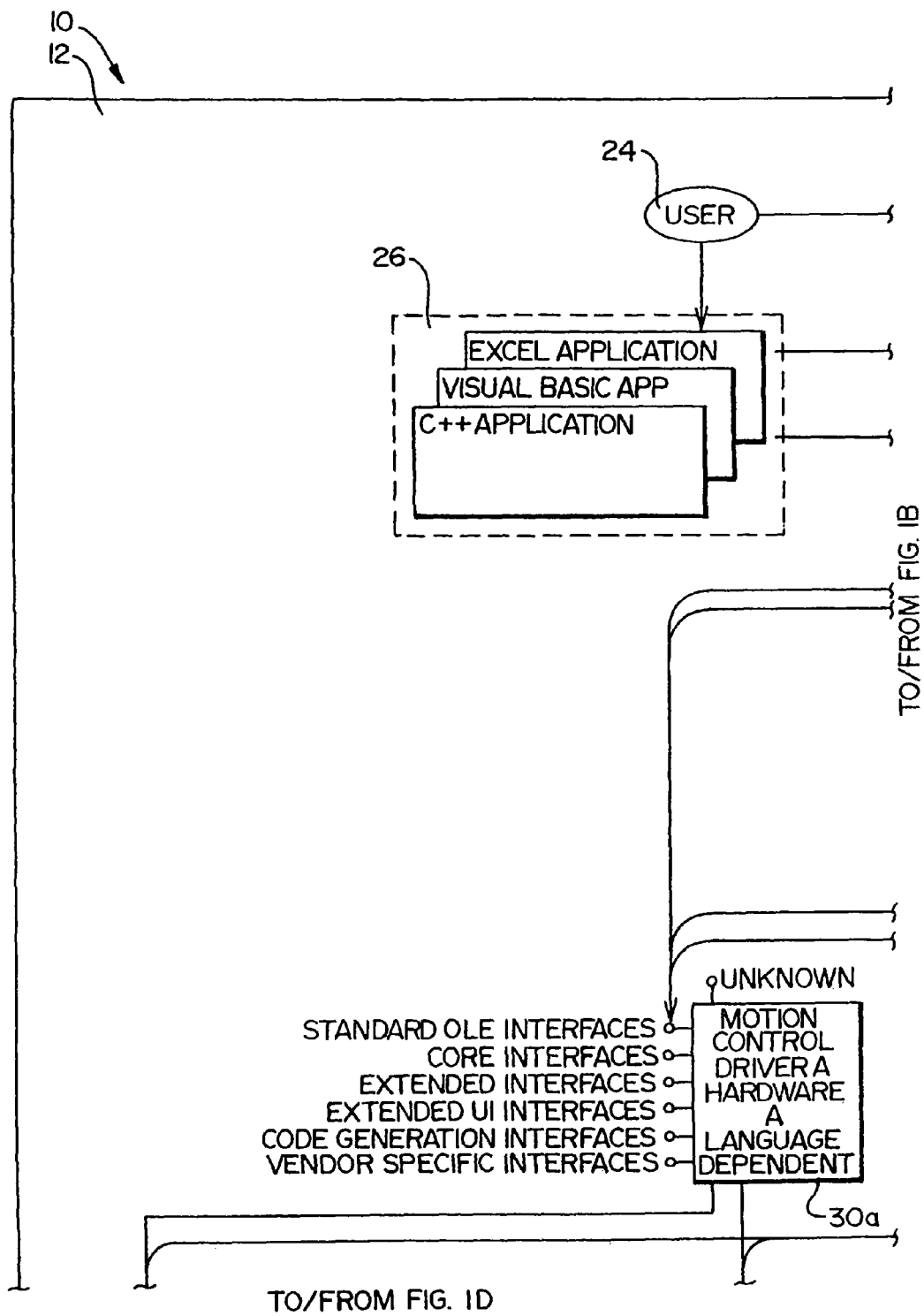

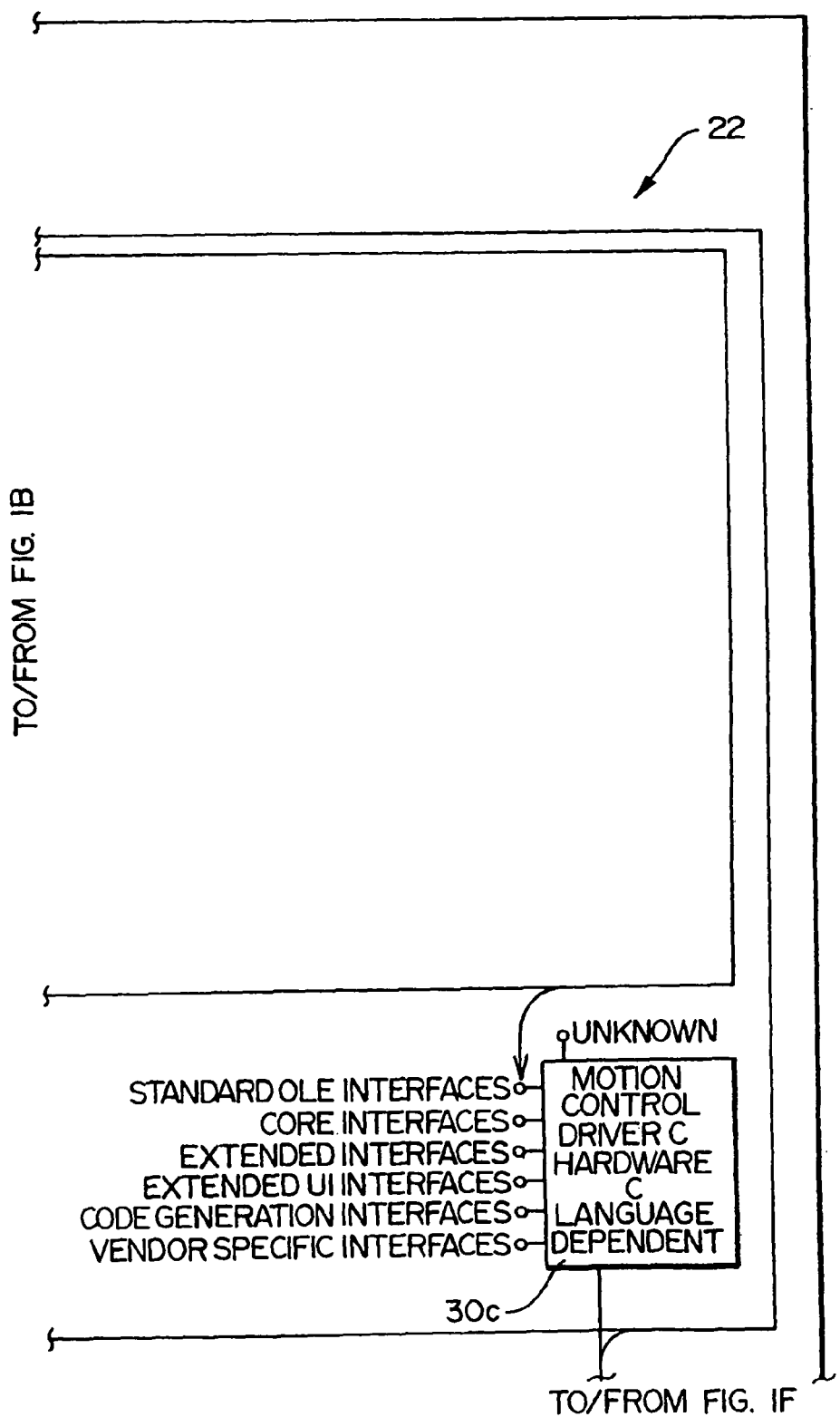

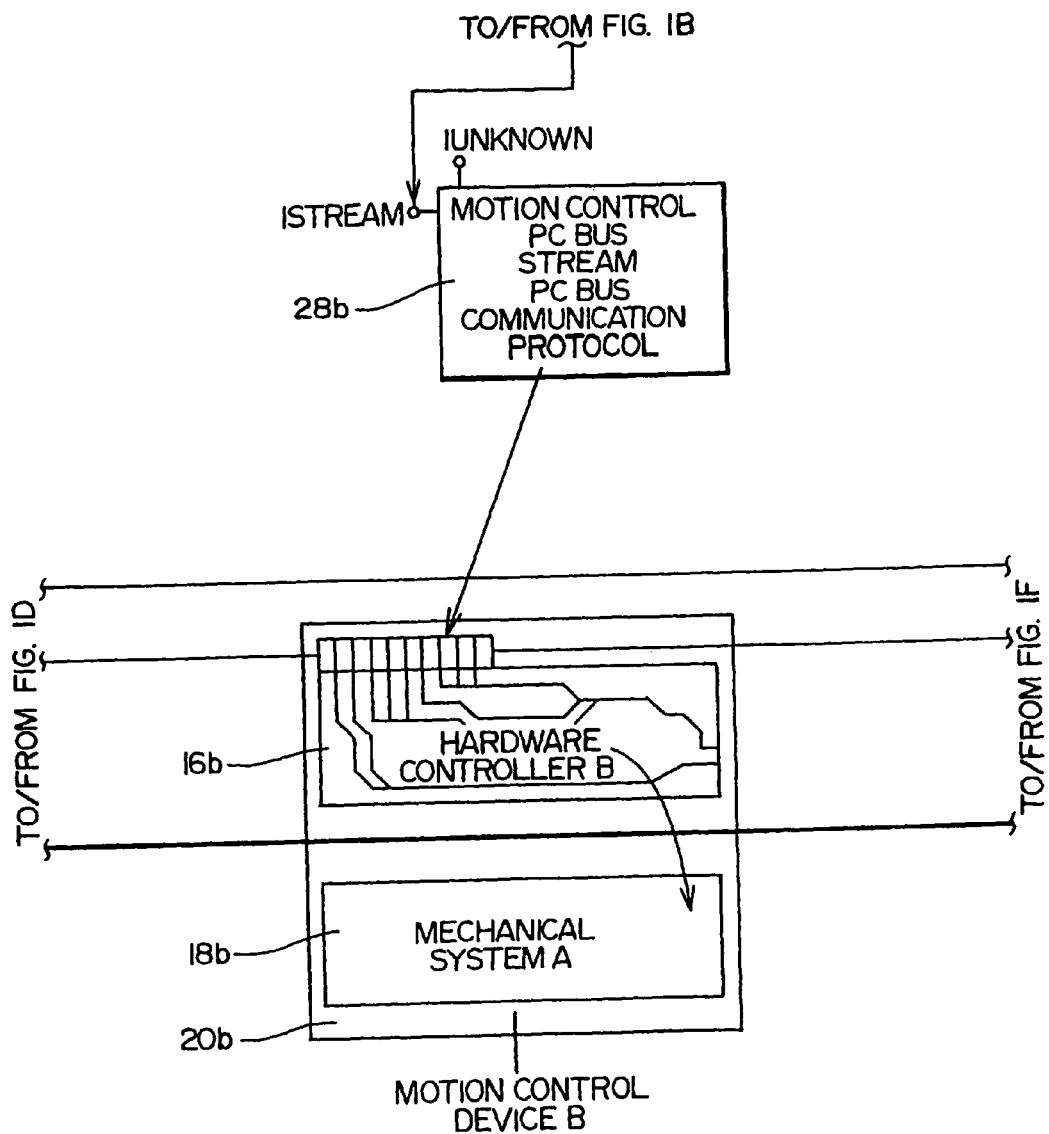

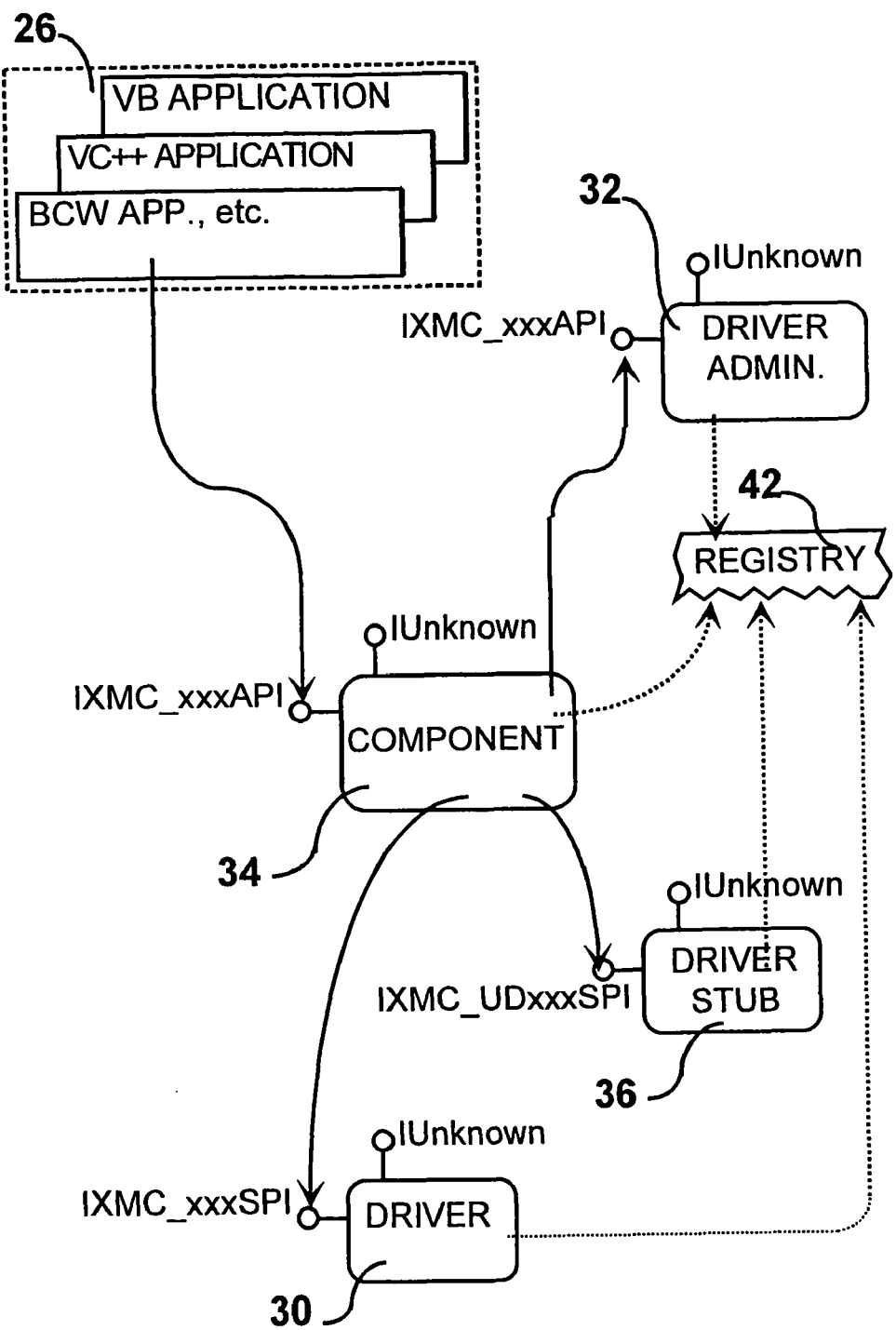
FIG. 2 Module Interaction-Map

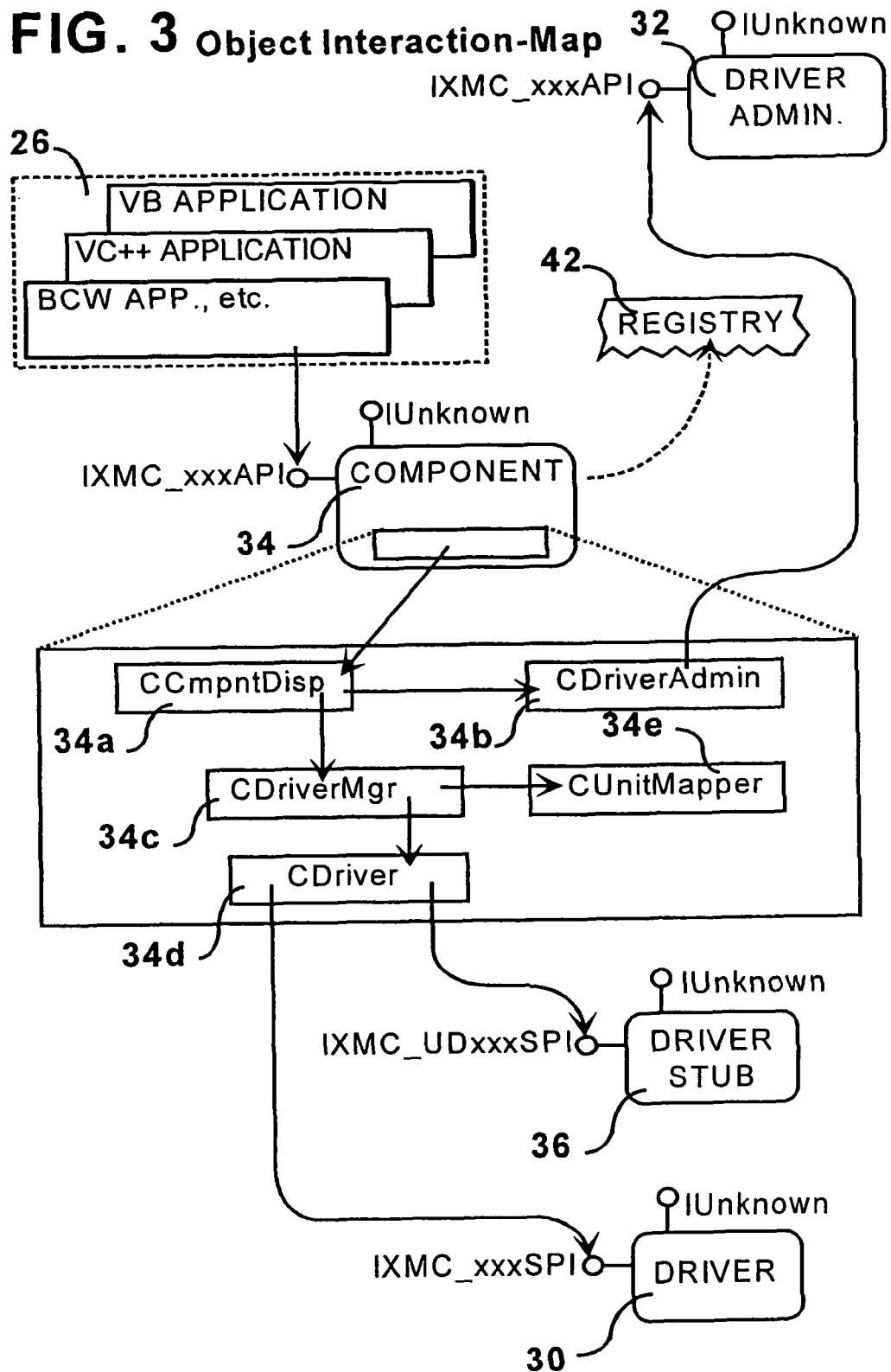
FIG. 3 Object Interaction-Map

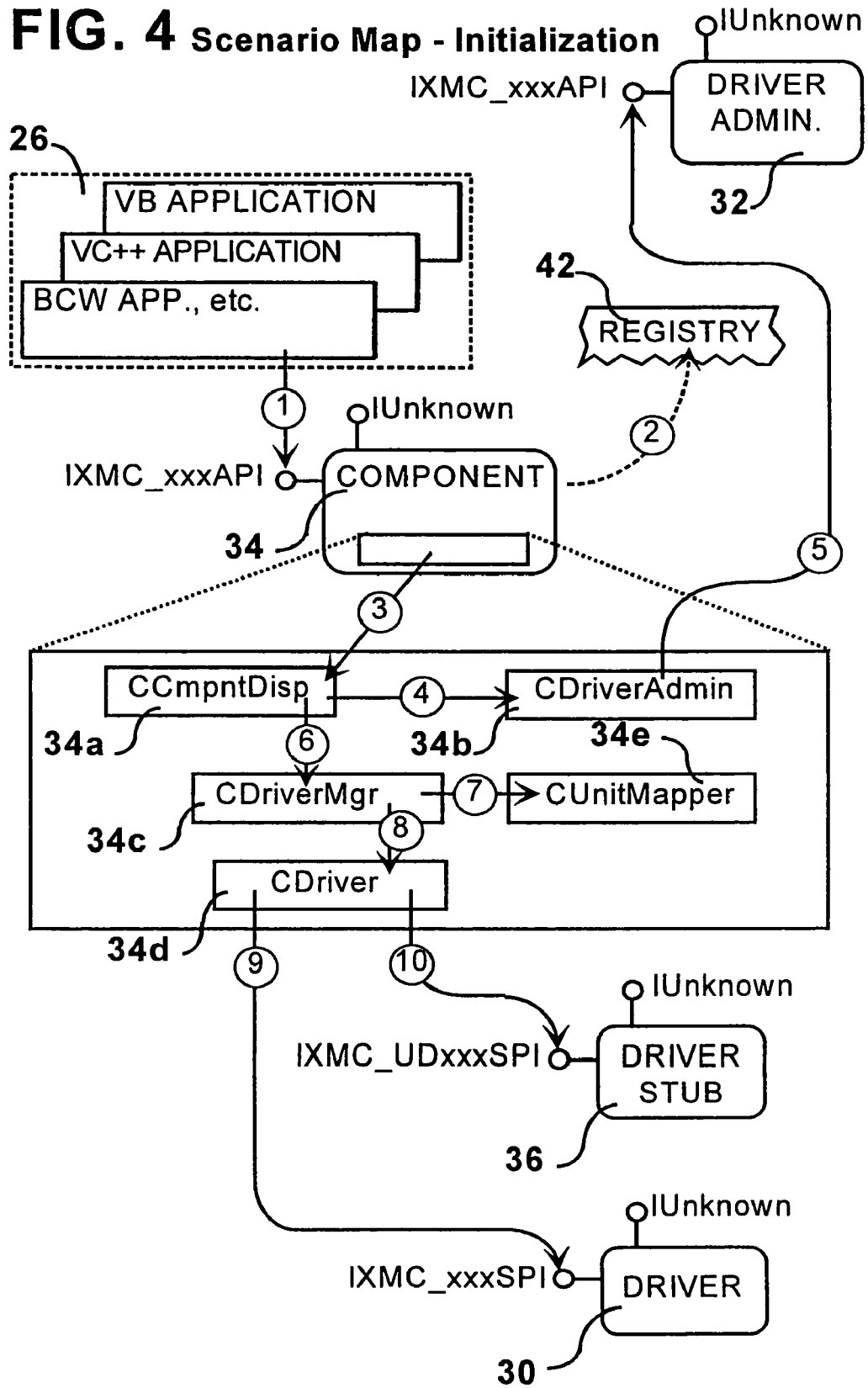
FIG. 4 Scenario Map - Initialization

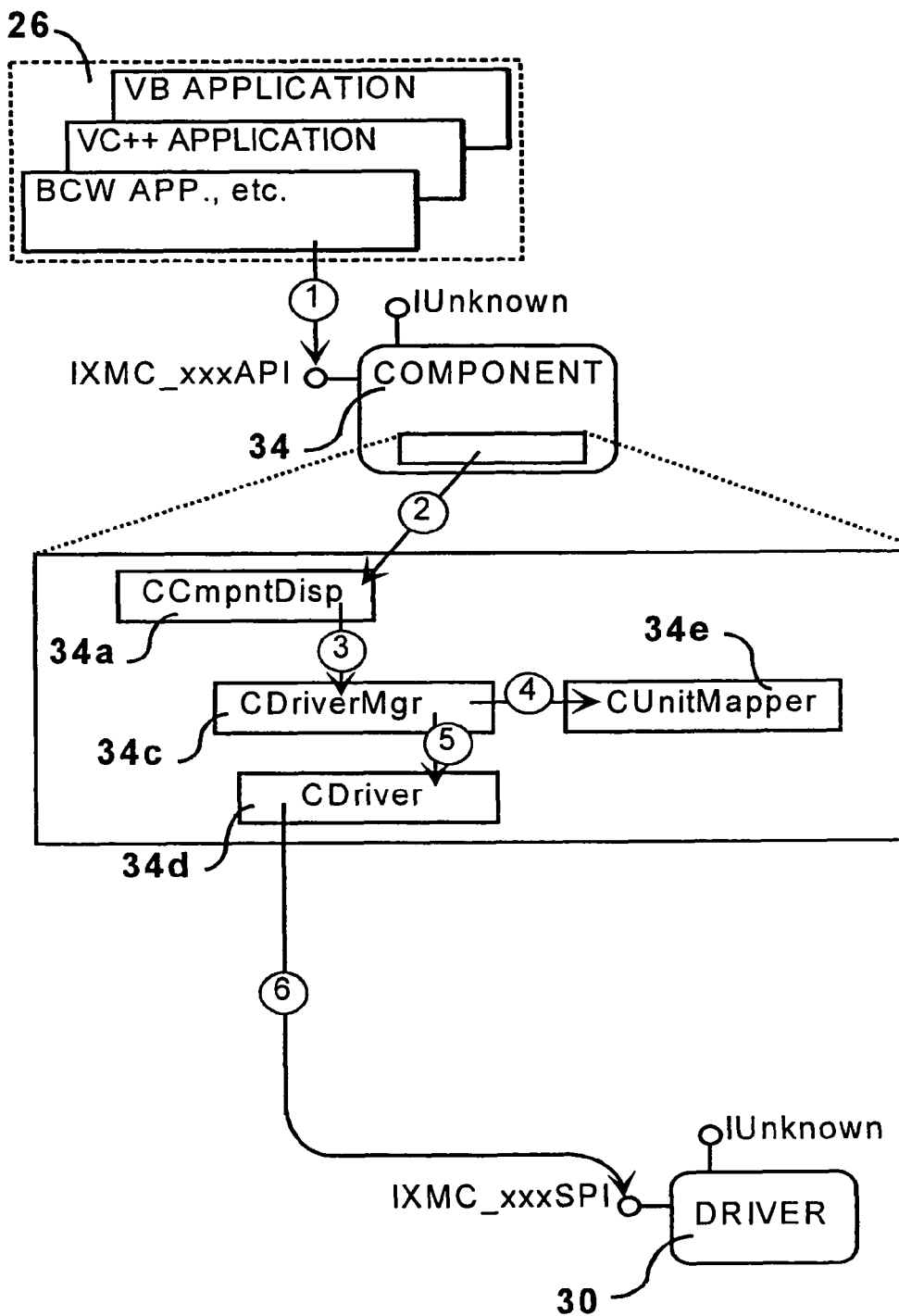
FIG. 5 Scenario Map - Core SPI Operation

FIG. 6 Scenario-Map - Unit Mapping
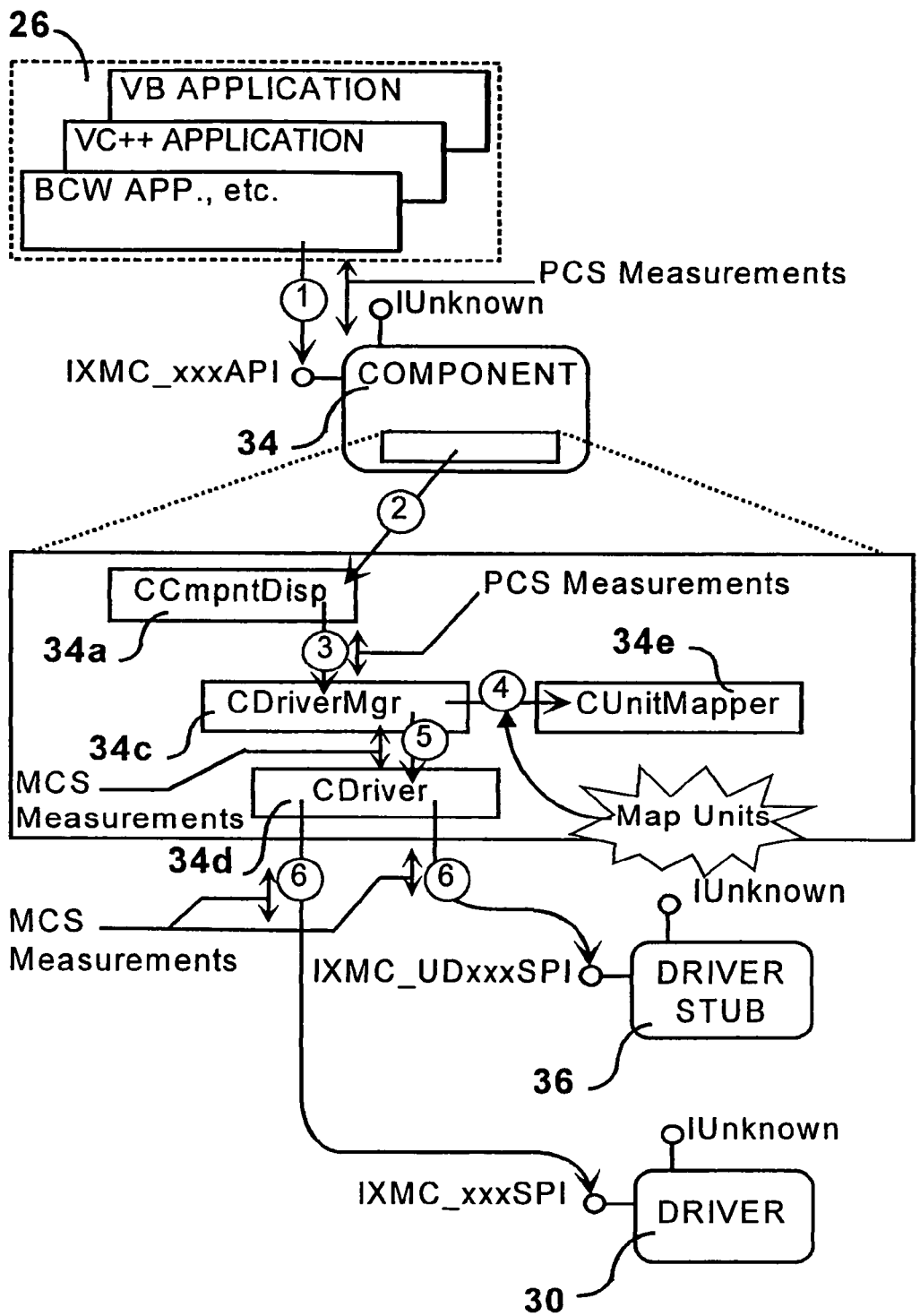

FIG. 7 Scenario-Map - Extended SPI Operation
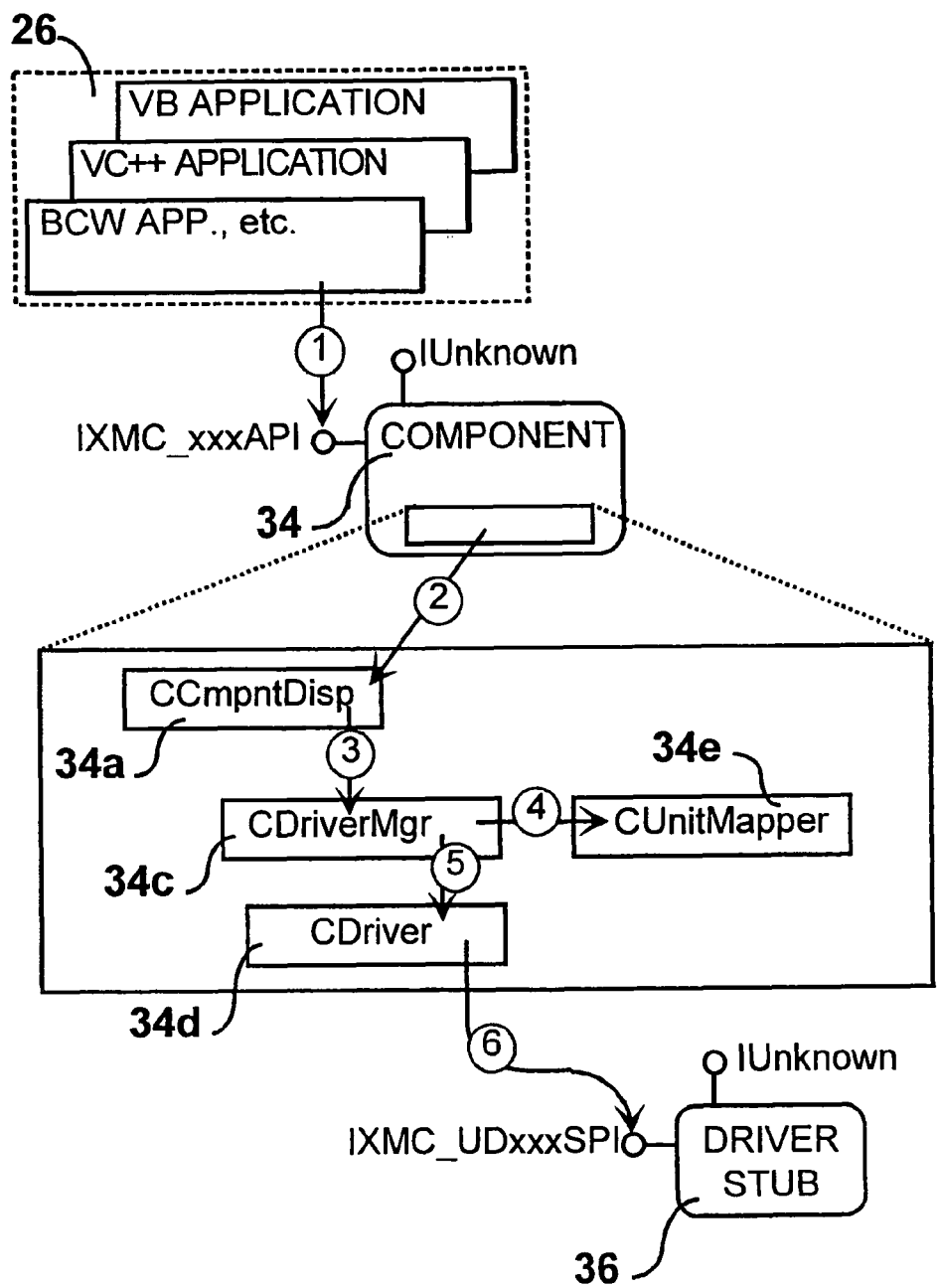

FIG. 8 Scenario-Map - Clean-up.
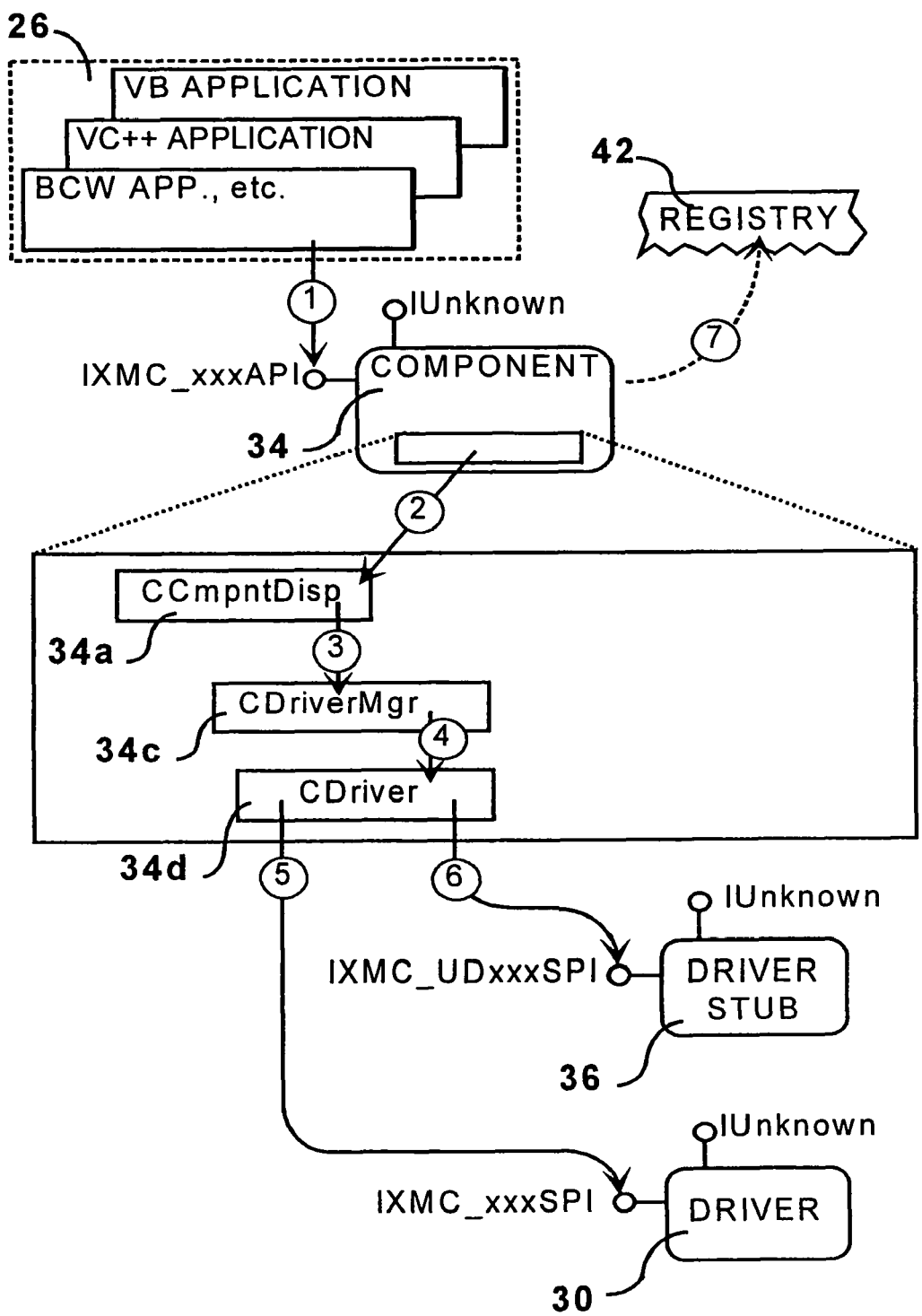

FIG. 9 Interface-Map
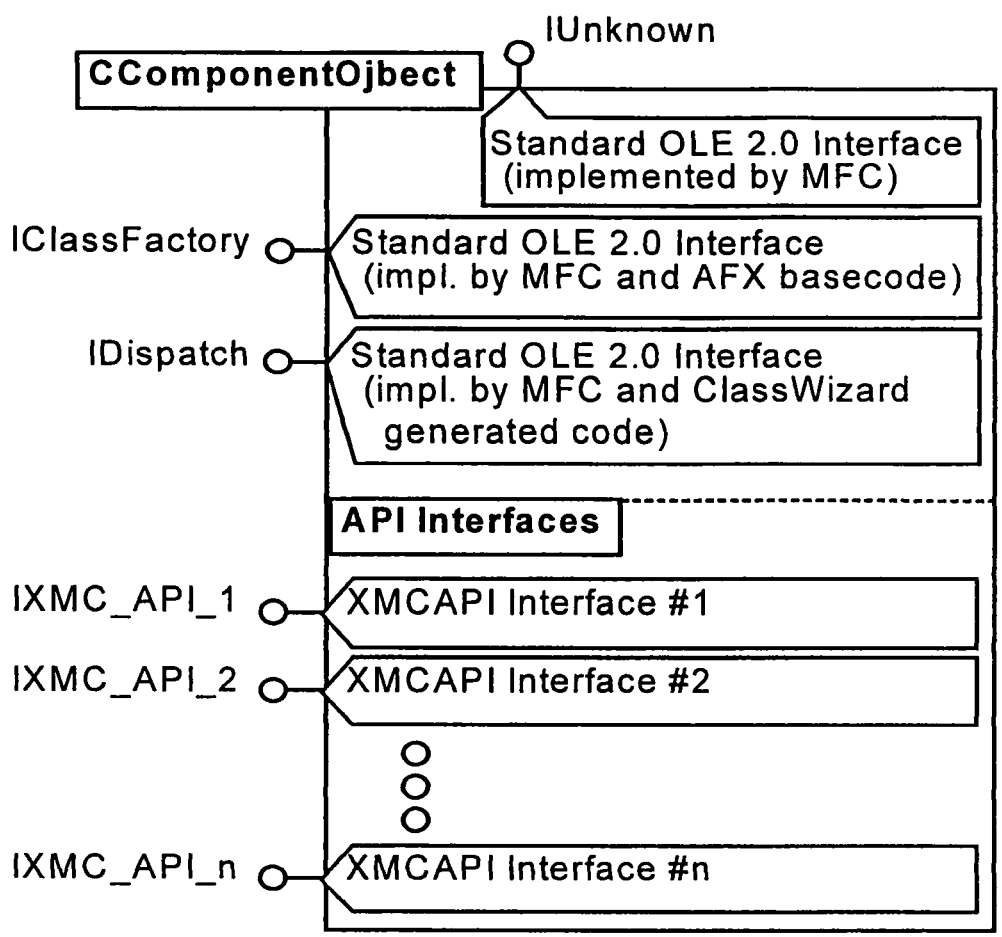

FIG. 10 CDriver class with XMCSPI table
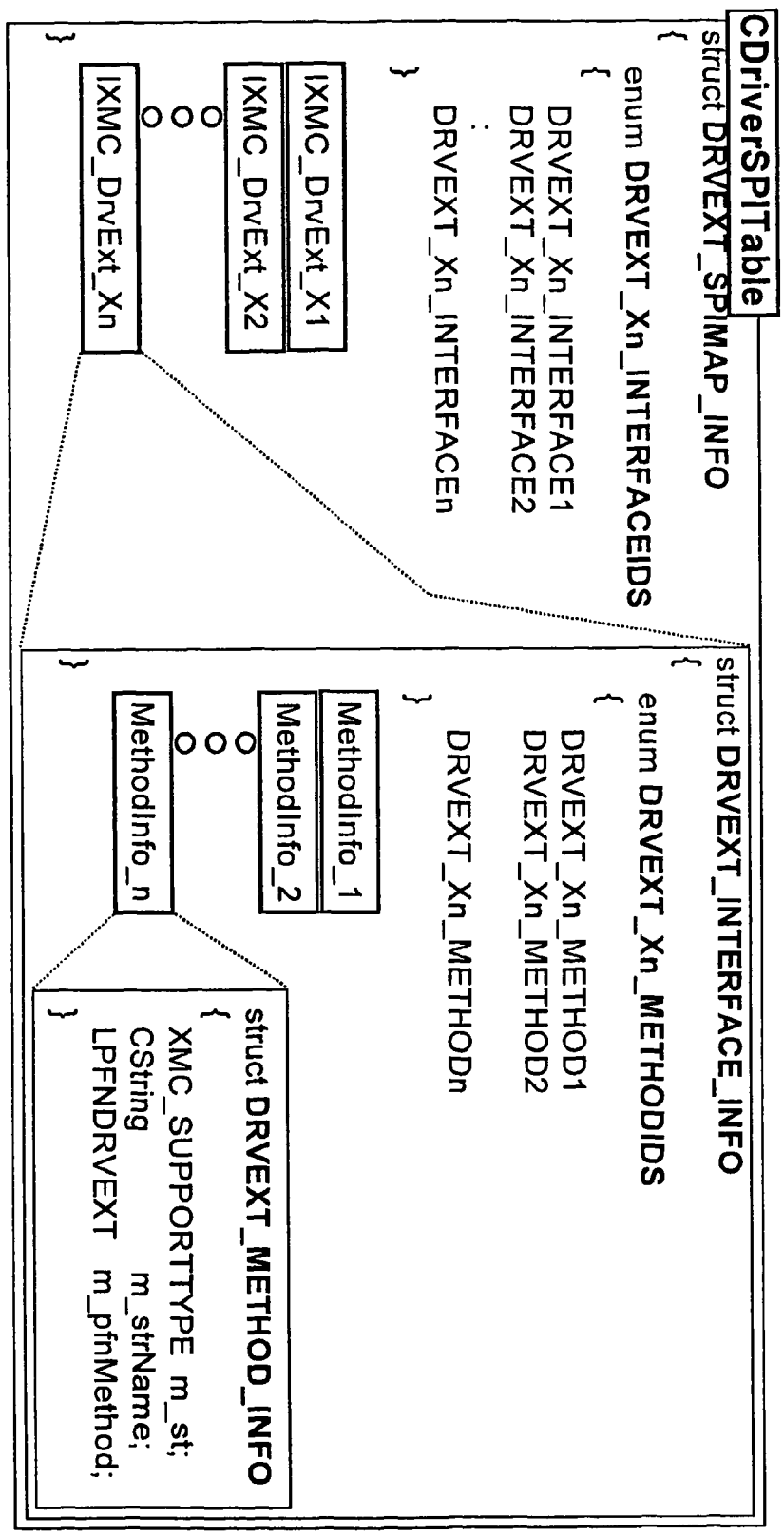

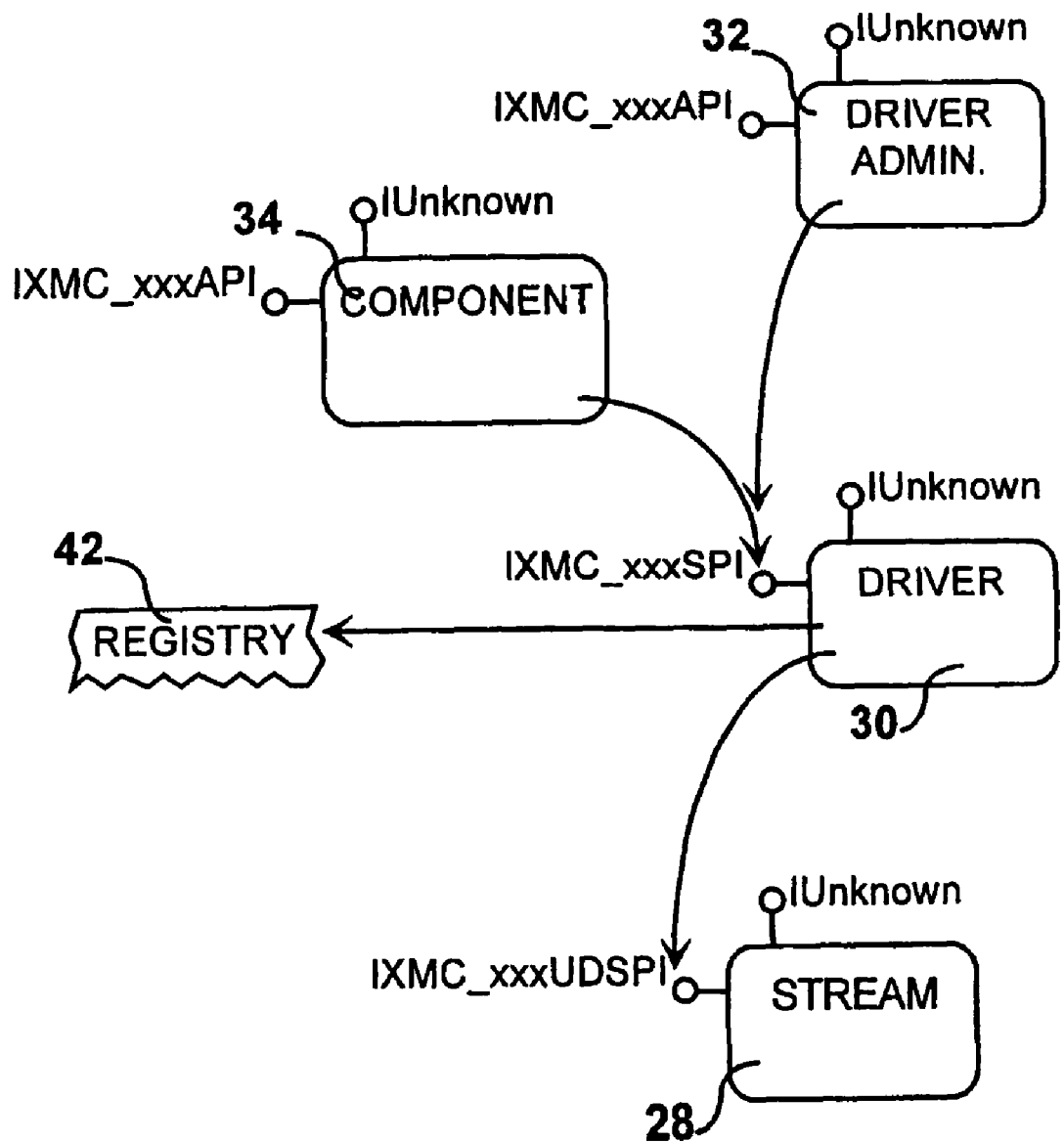
FIG. 11 Module Interaction-Map

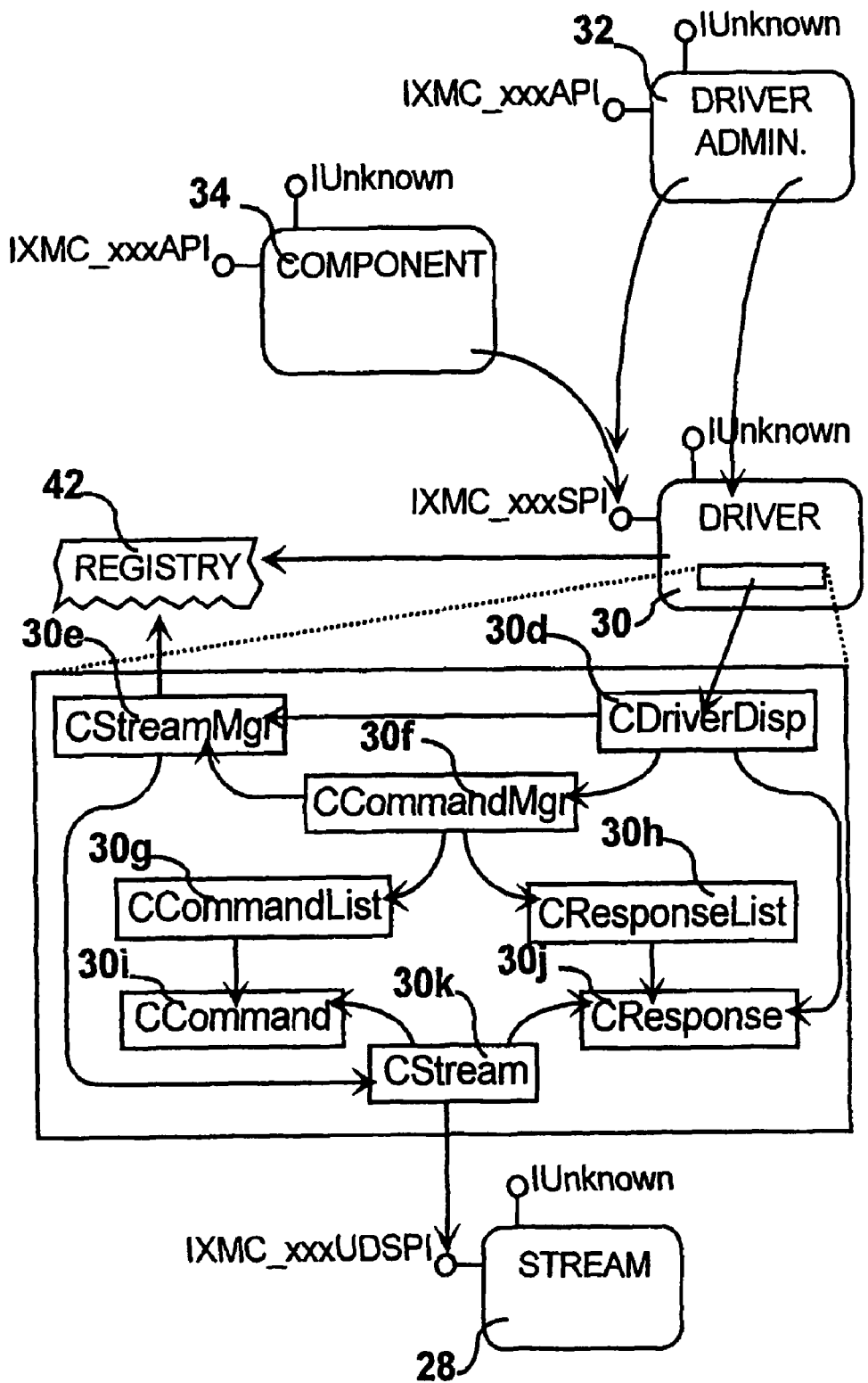
FIG. 12 Object Interaction-Map

FIG. 13 Scenario-Map - Registration
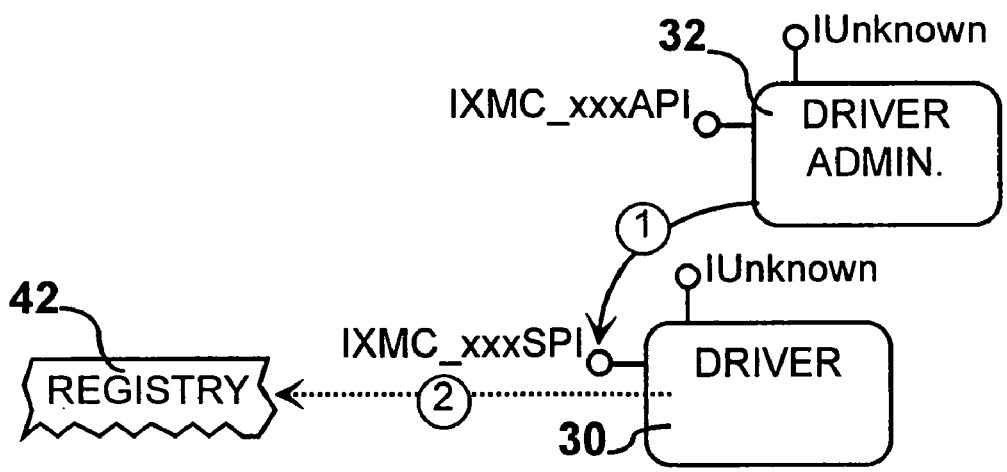
FIG. 14 Scenario-Map - Init. by Driver Admin.
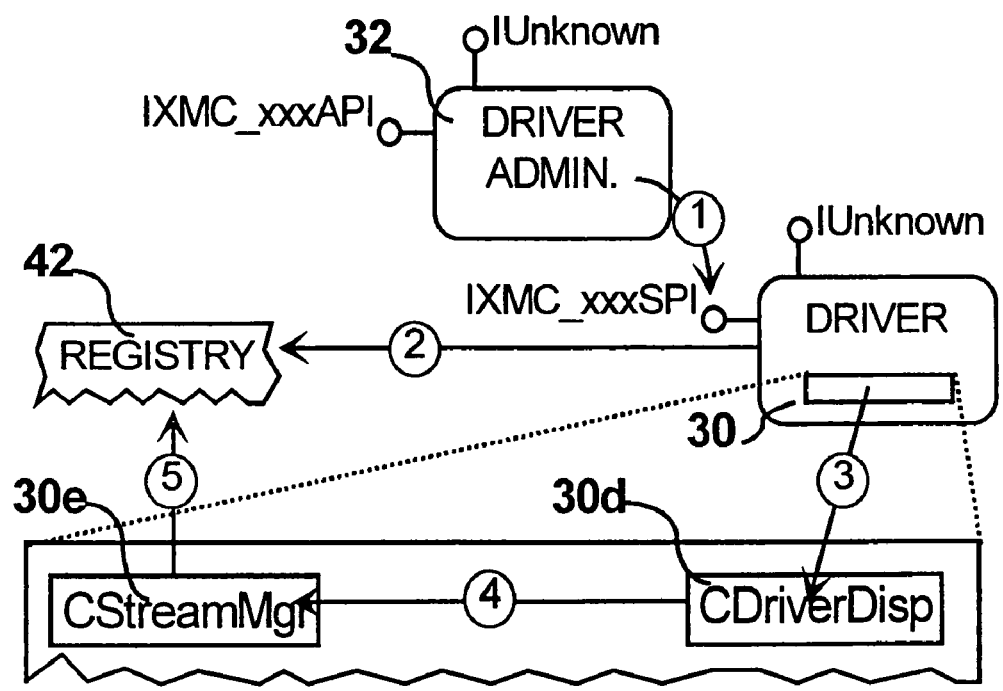

FIG. 15 Scenario-Map - Adding a Stream
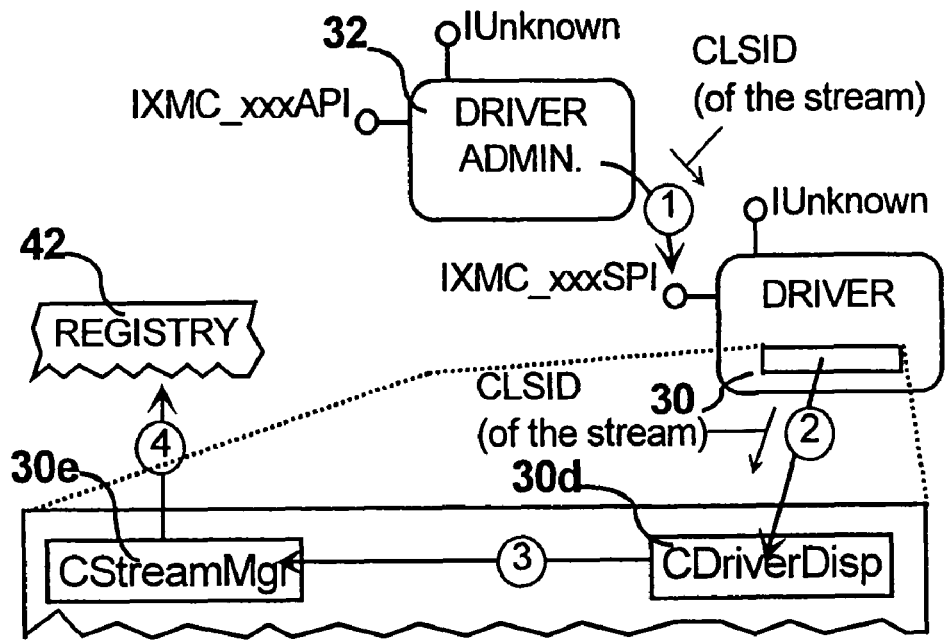
FIG. 16 Scenario-Map - Query Operation
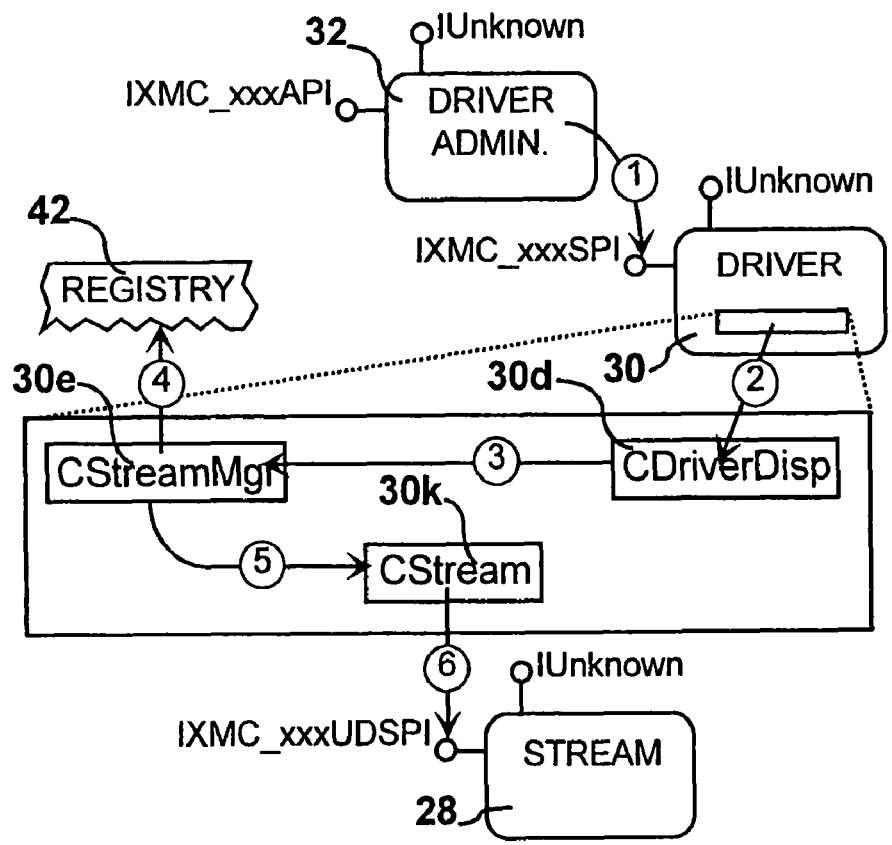

FIG. 17 Scenario-Map - Clean-Up by Drv. Admin.
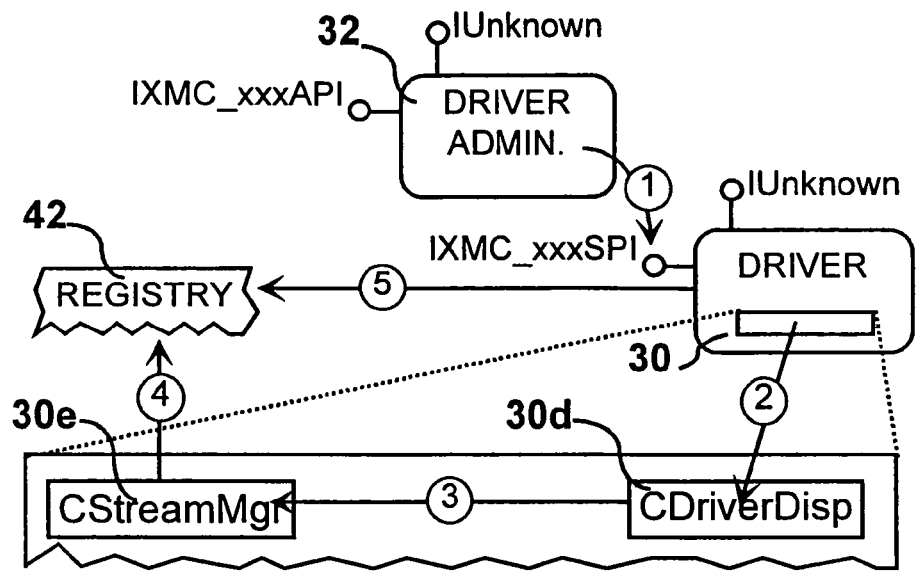
FIG. 18 Scenario-Map - Init. by Component
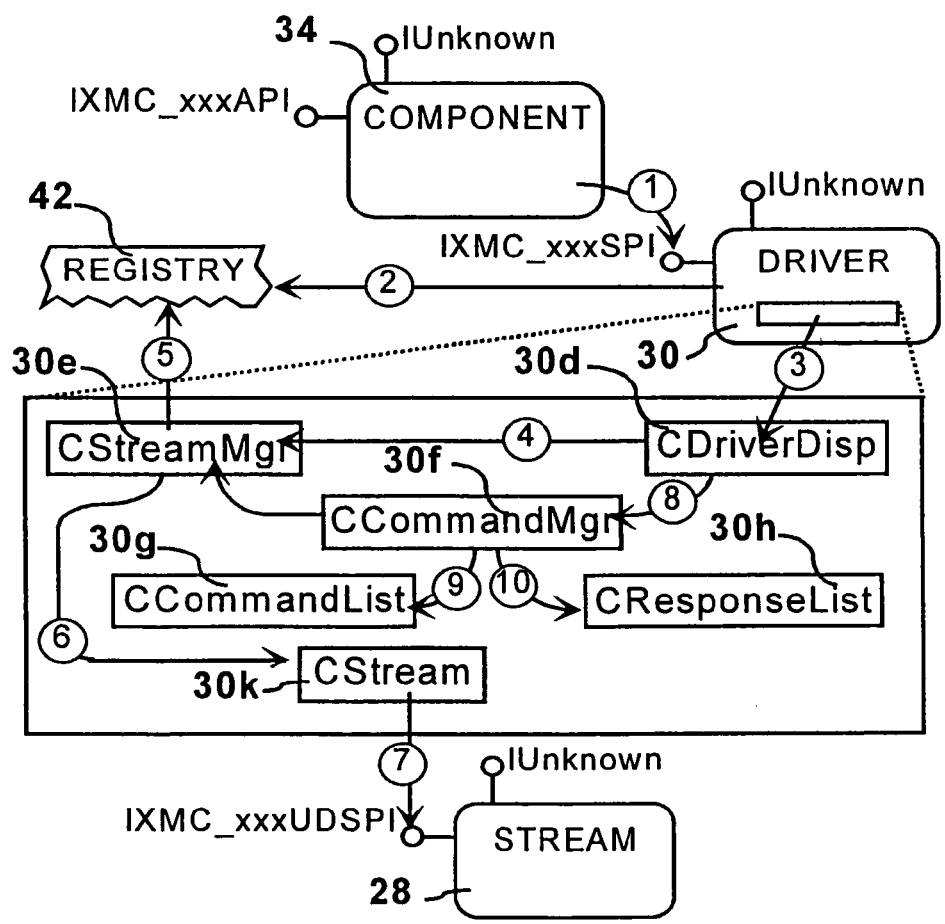

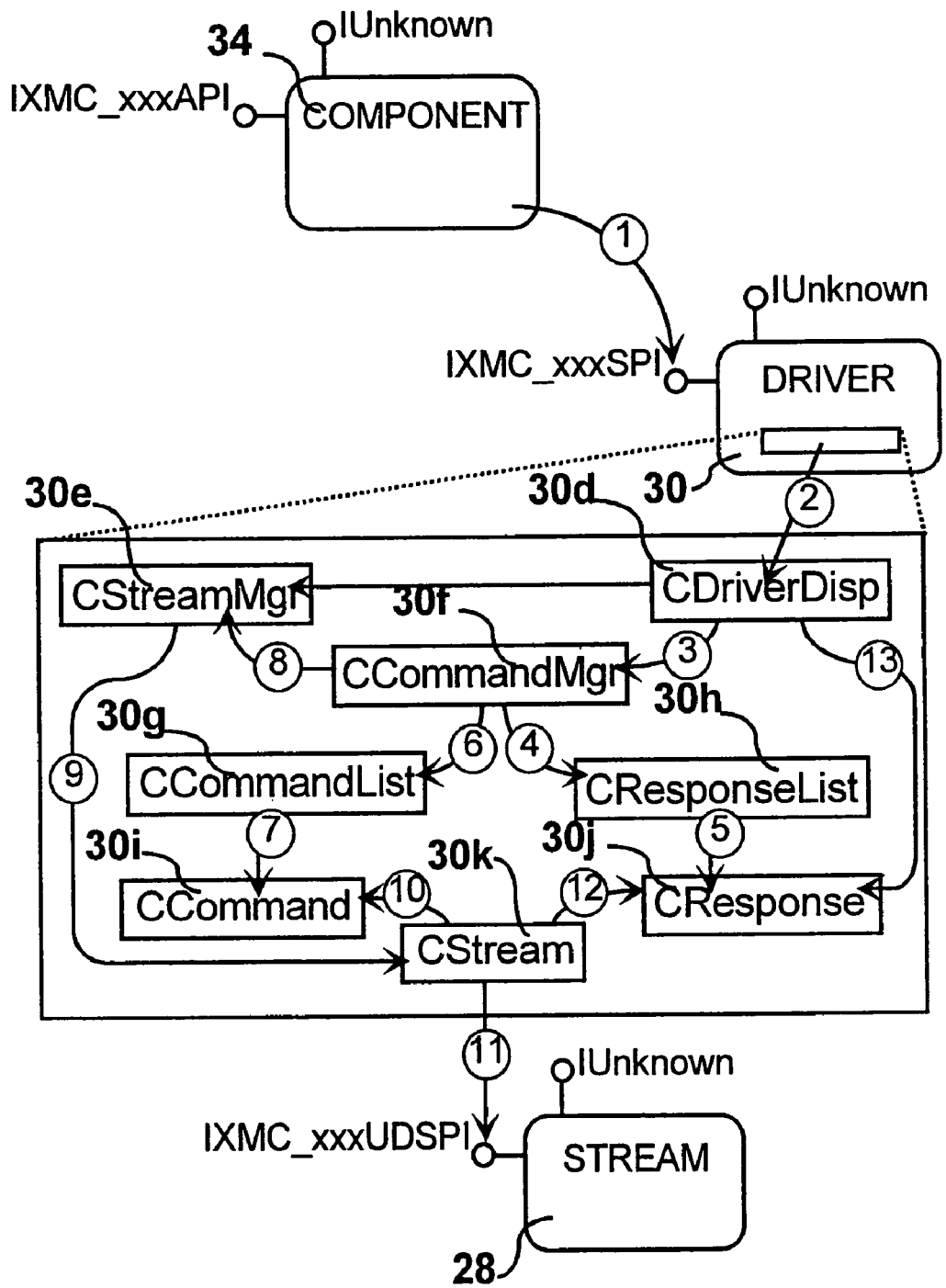
FIG. 19 Scenario-Map - Command Operations

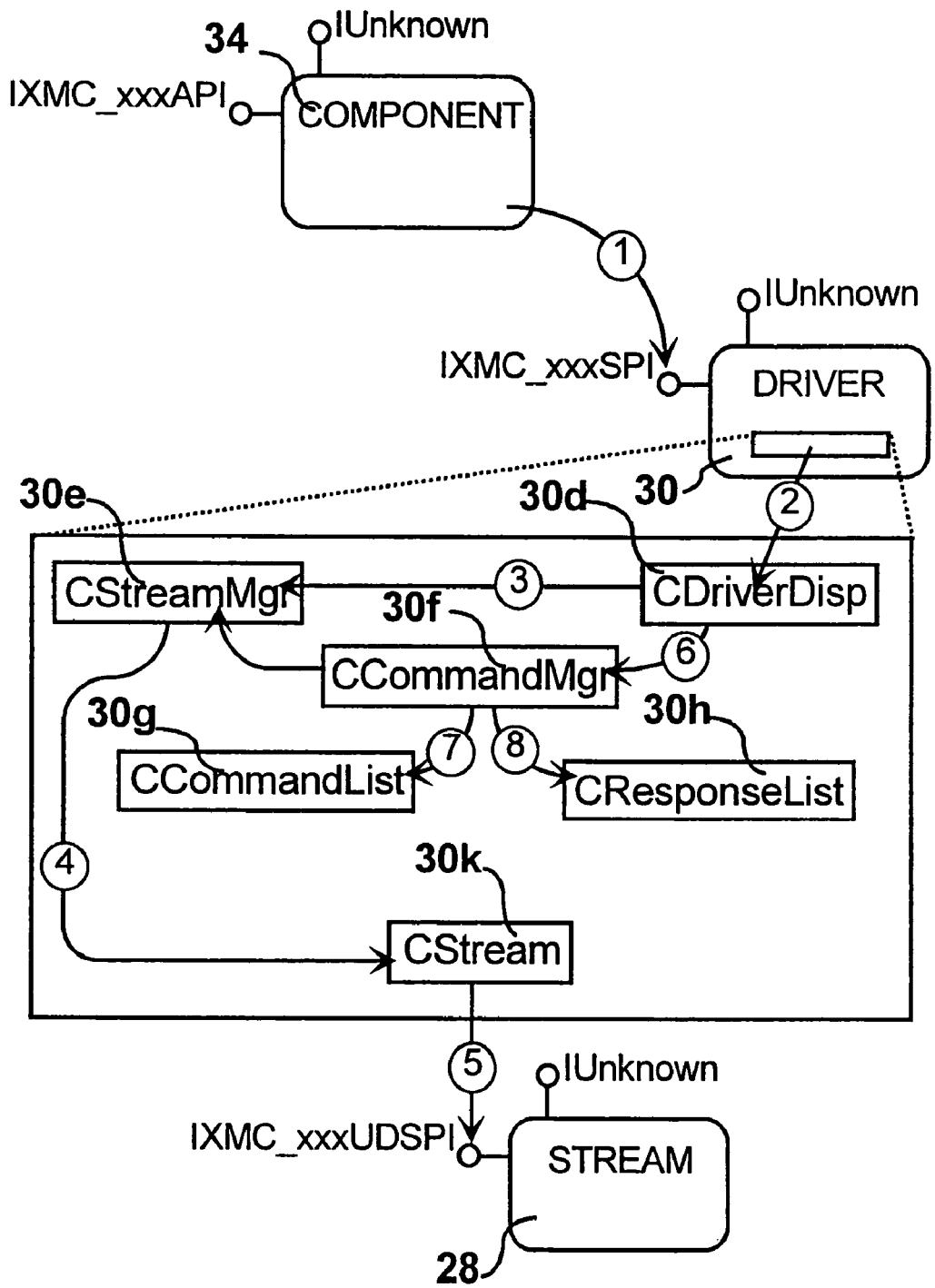
FIG. 20 Scenario-Map - Clean-up by Component

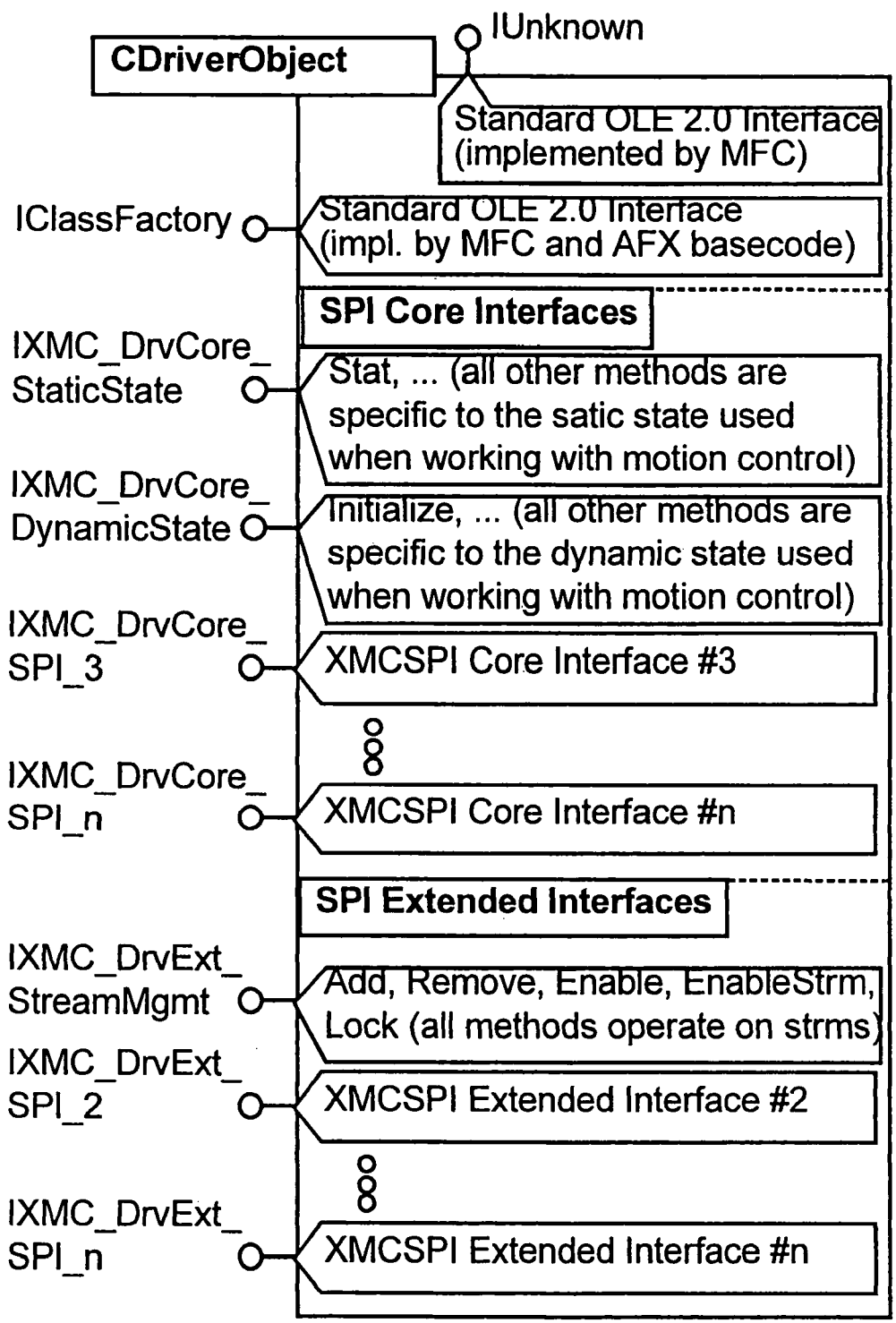
FIG. 21 Interface-Map

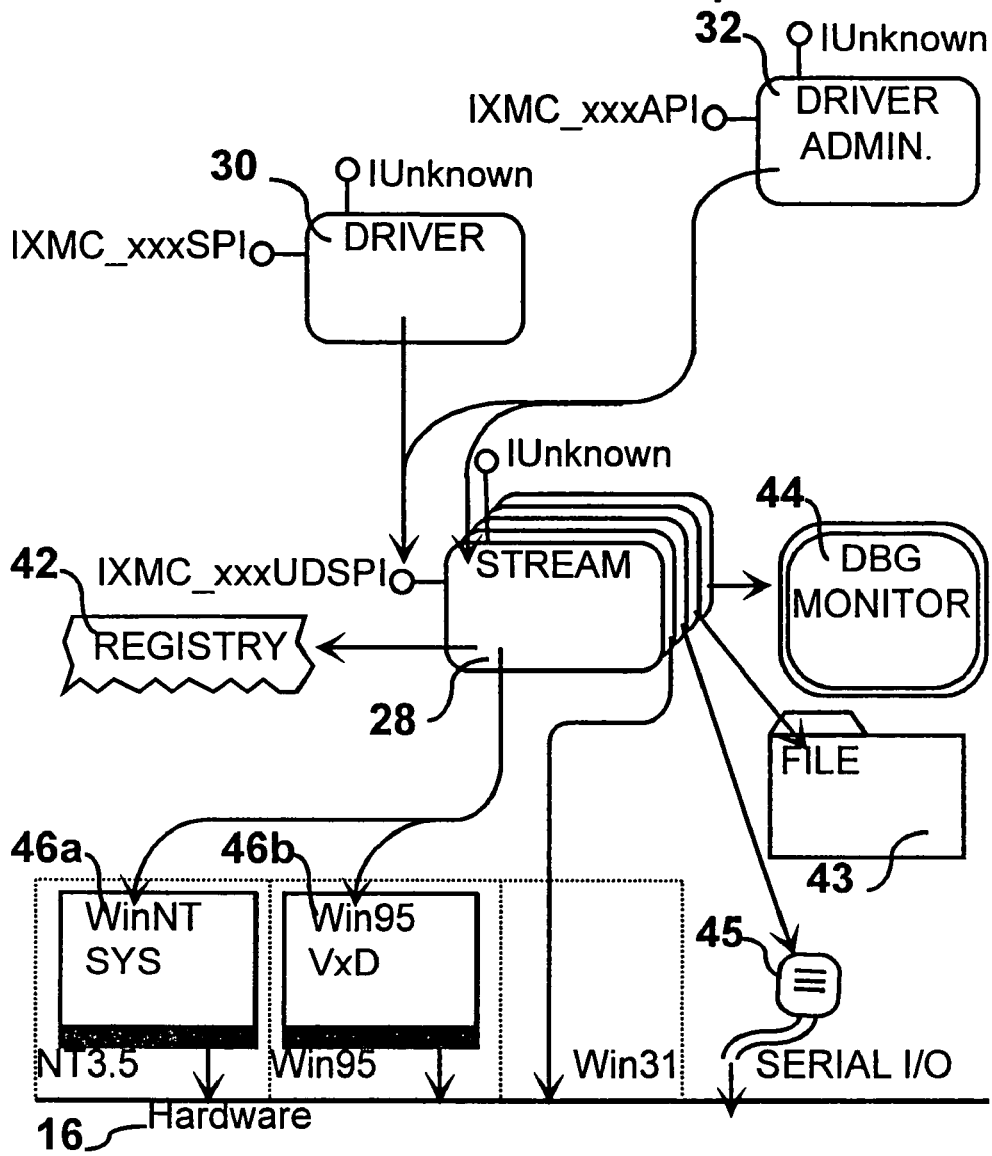
FIG. 22 Module Interaction-Map

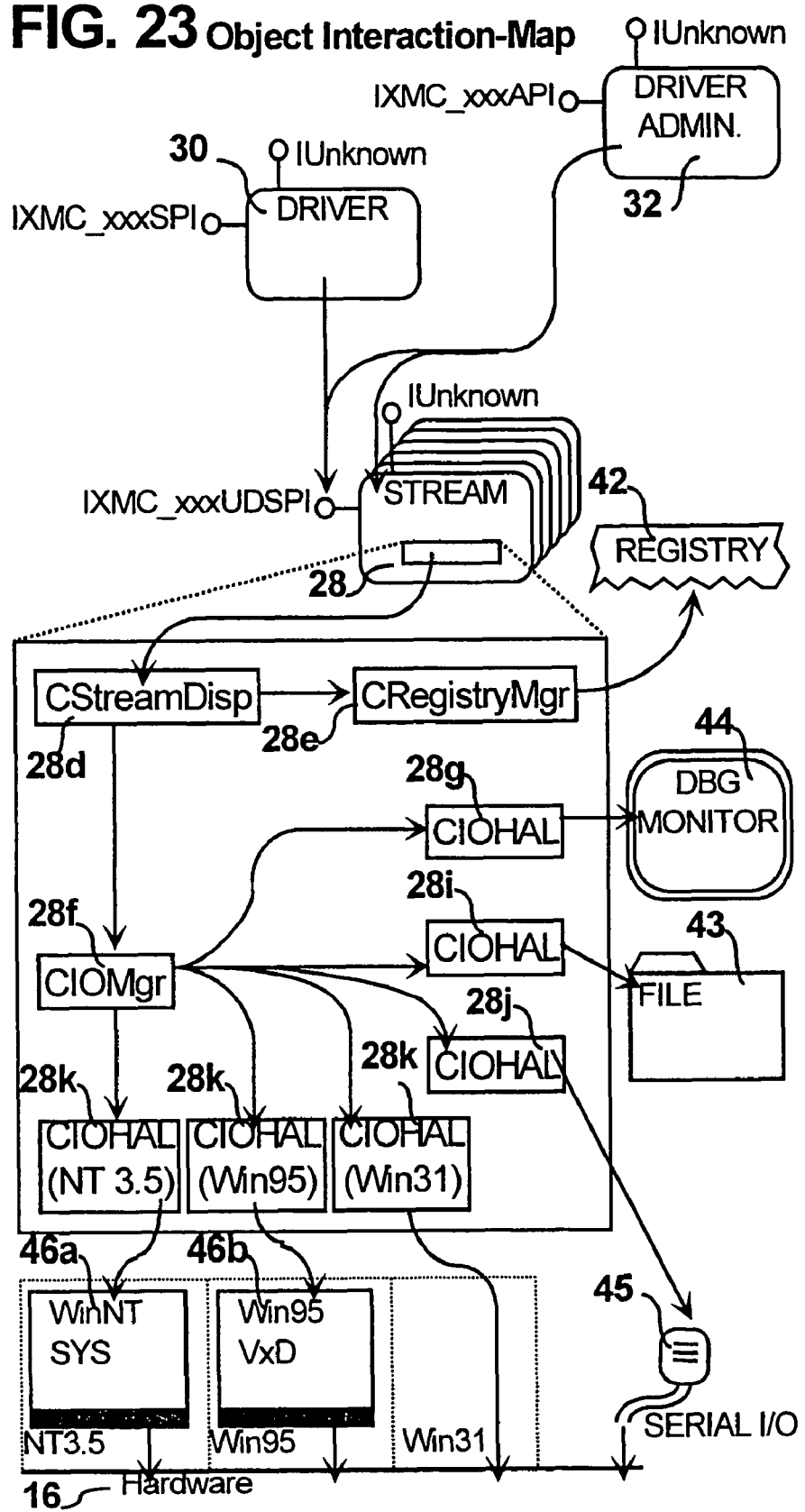
FIG. 23 Object Interaction-Map

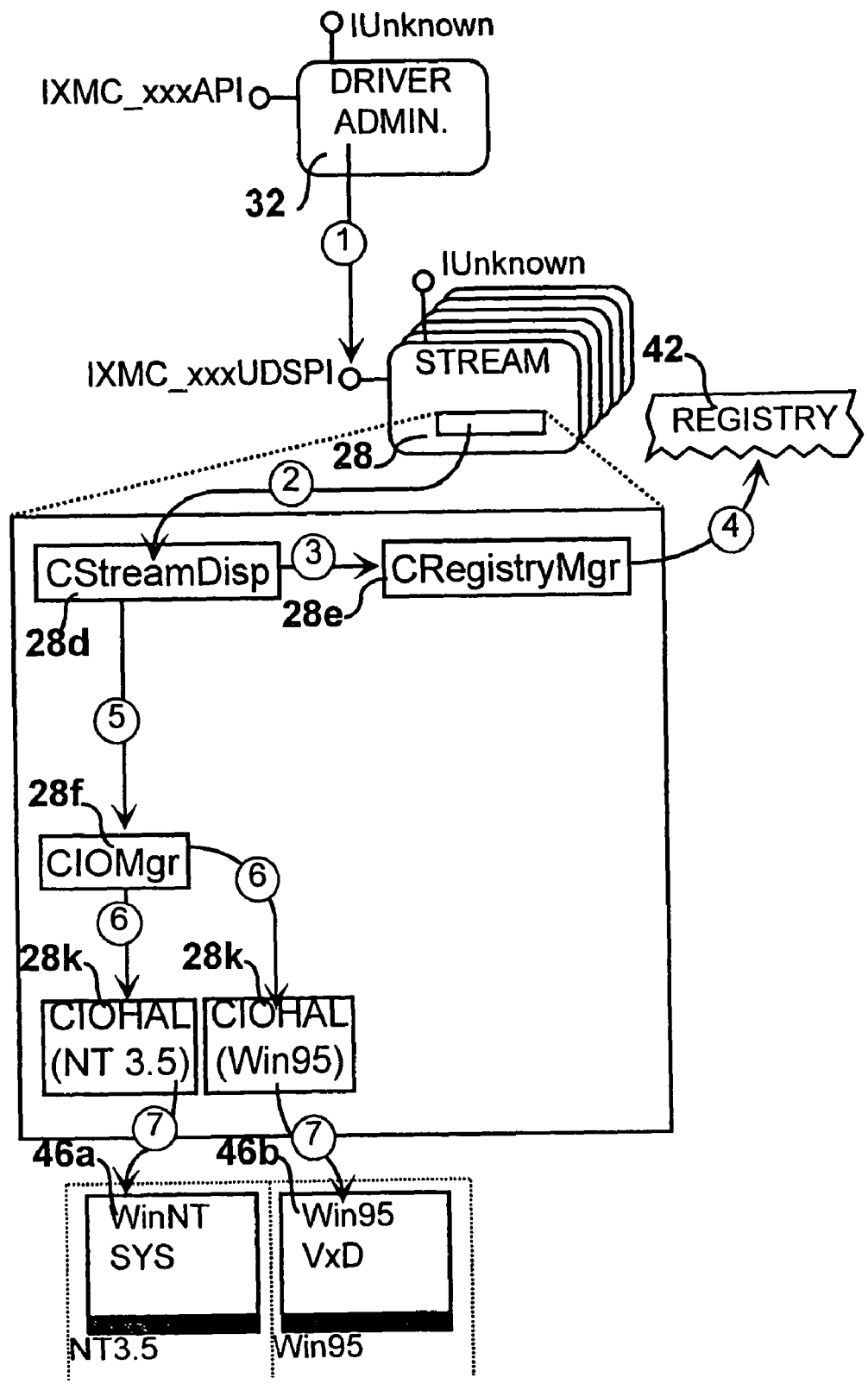
FIG. 24 Scenario-Map - Initialization

FIG. 25 Scenario-Map - Registration
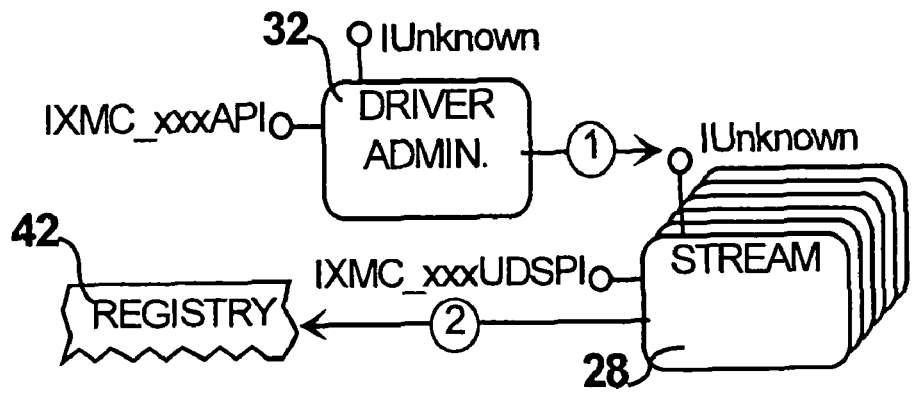
FIG. 26 Scenario-Map - Setup
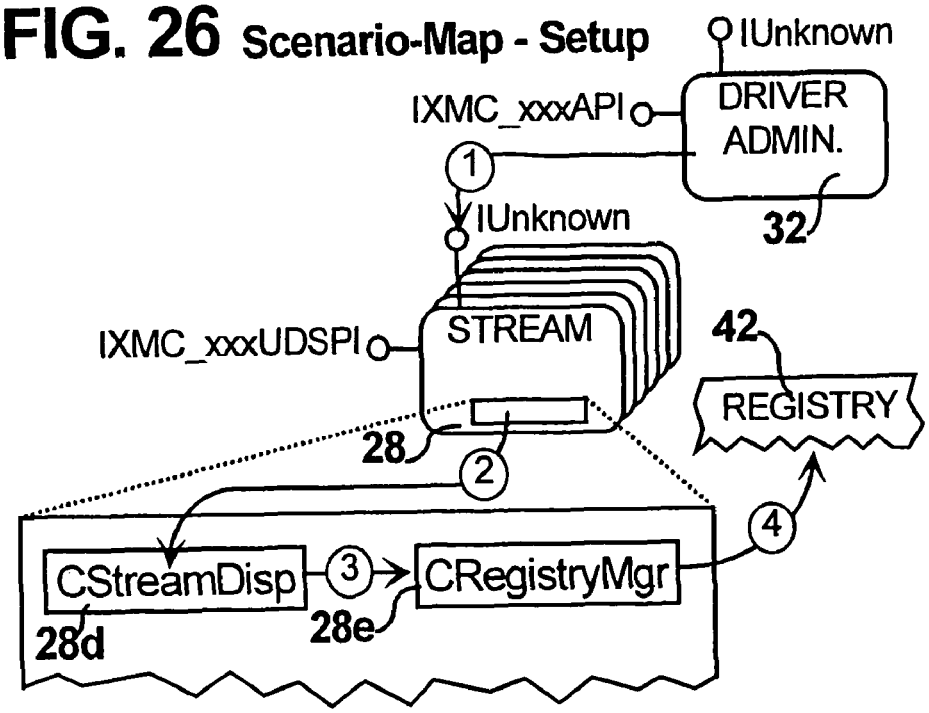

FIG. 27 Scenario-Map - Clean-up
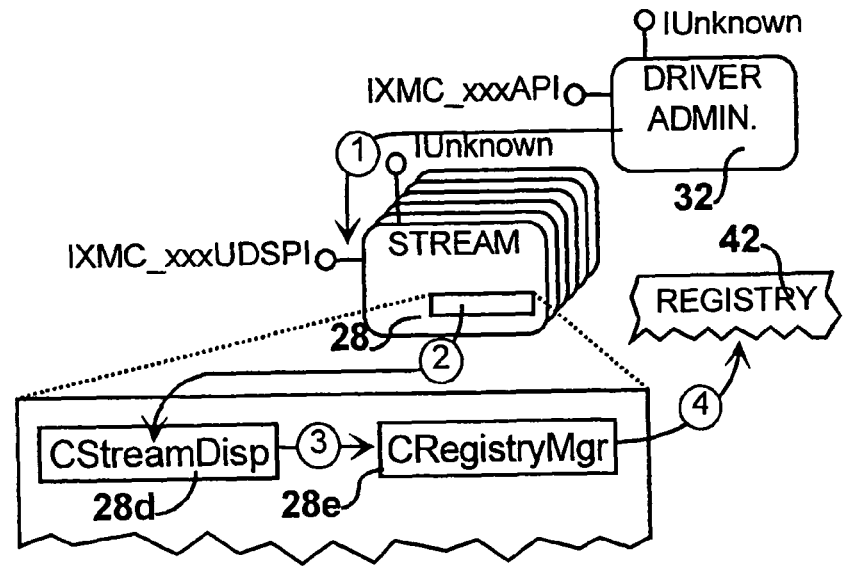
FIG. 28 Scenario-Map - Initialization (Drv)
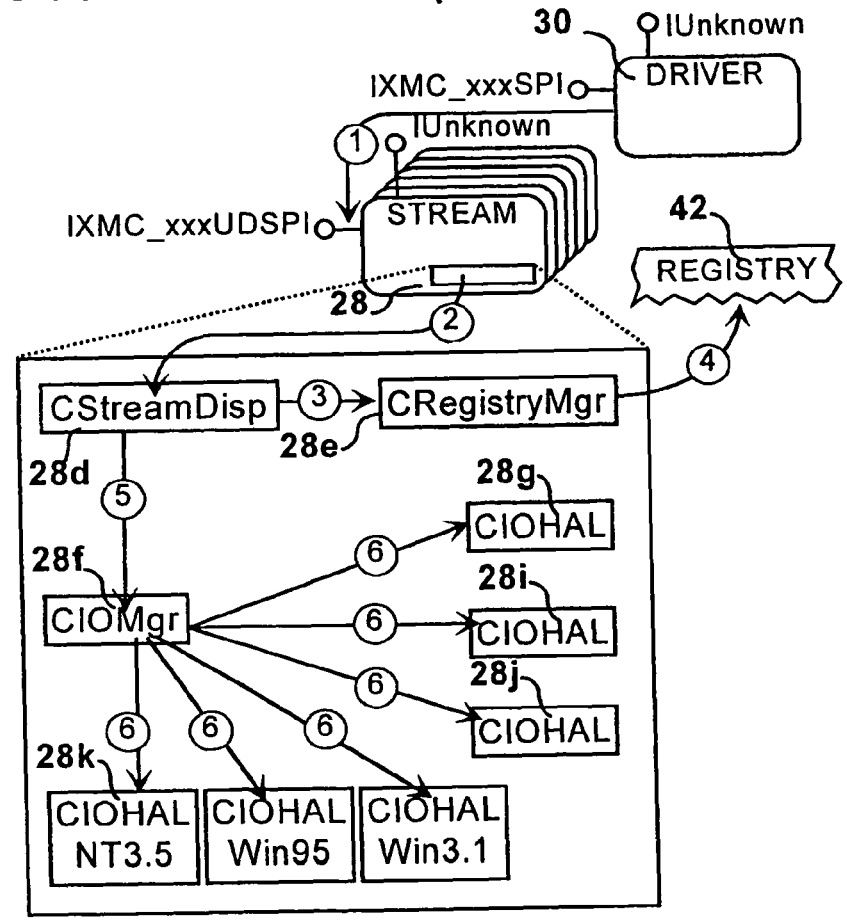

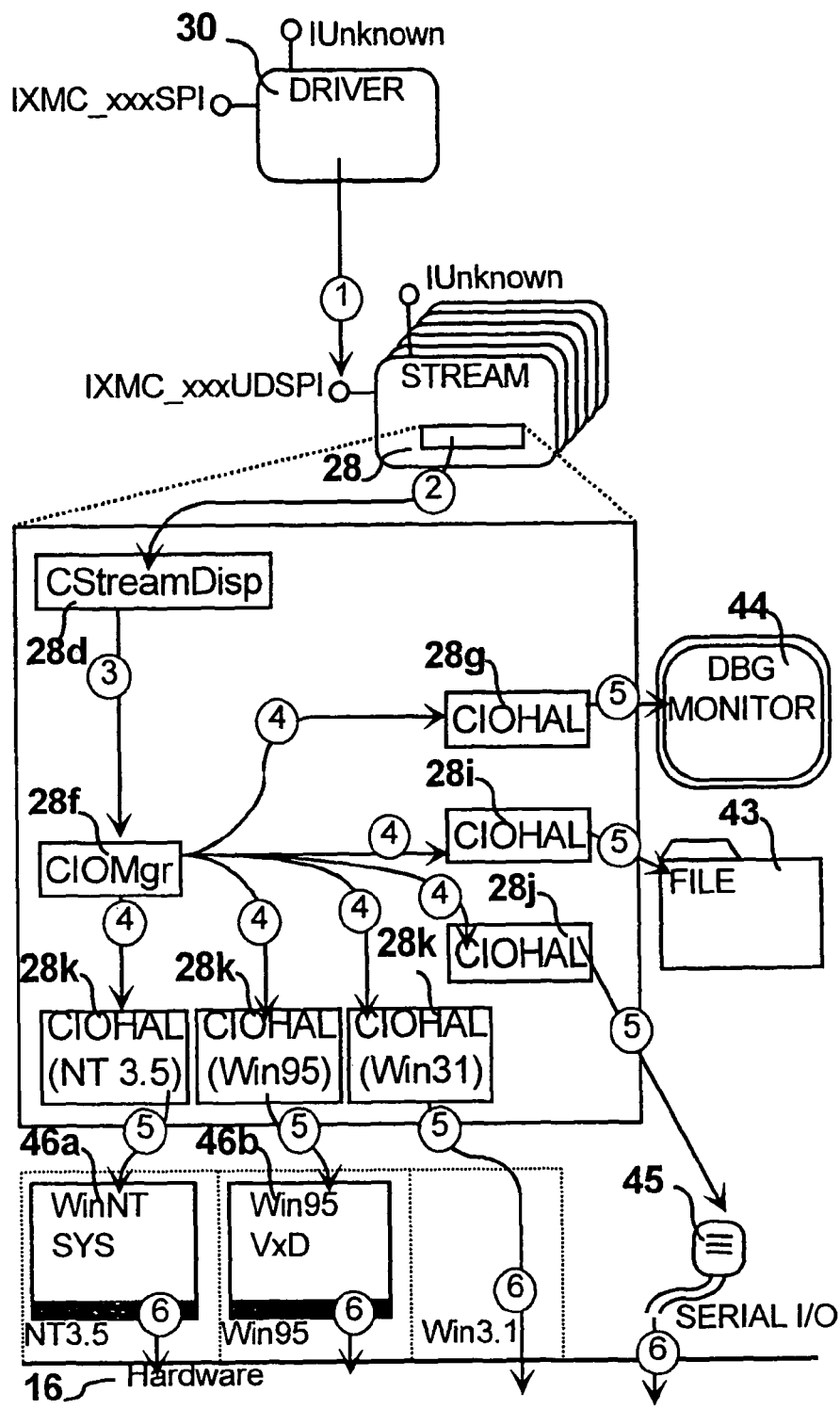
FIG. 29 Scenario-Map - Opening the Stream

FIG. 30 Scenario-Map - Writing Data
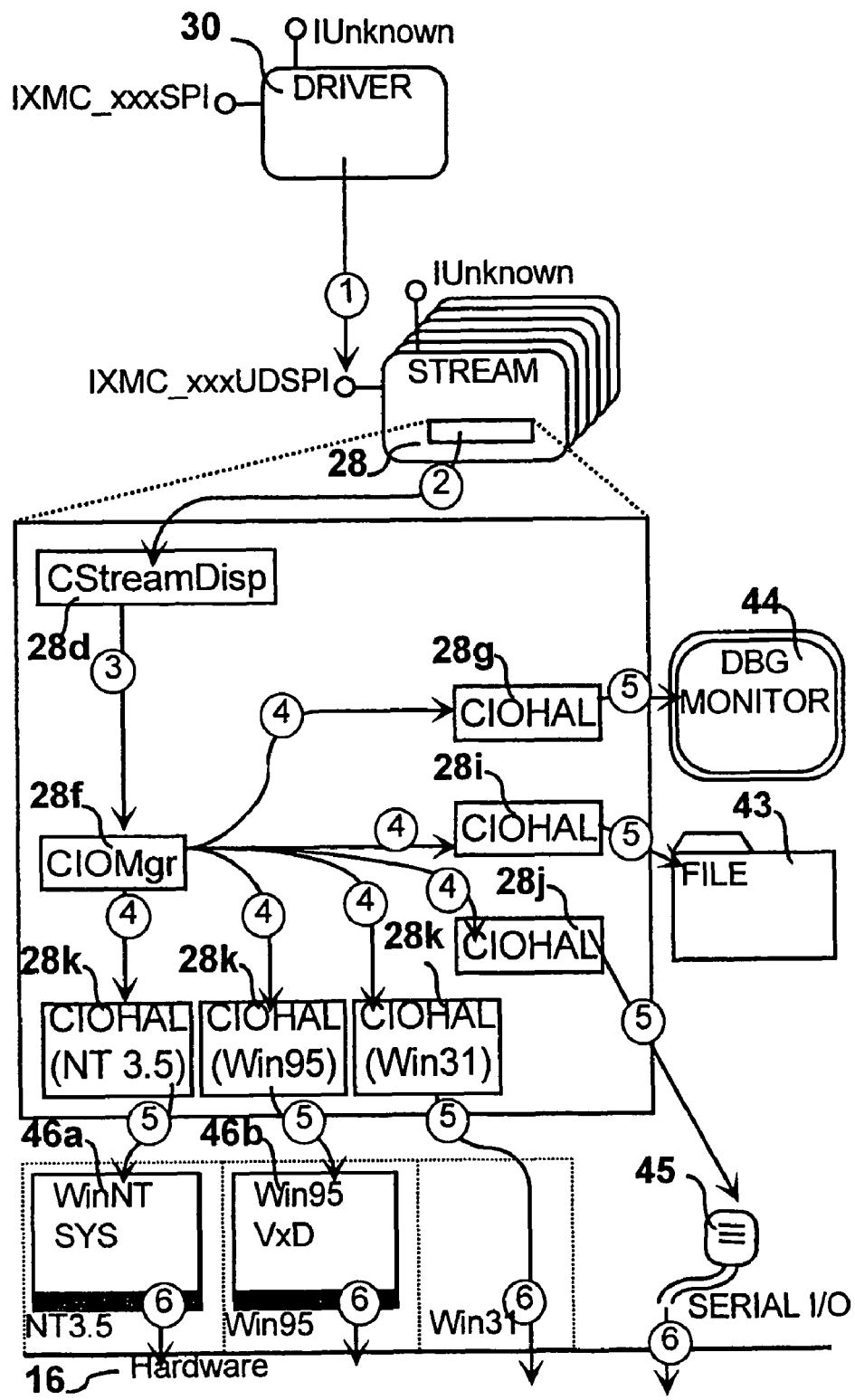

FIG. 31 Scenario-Map - Reading Data
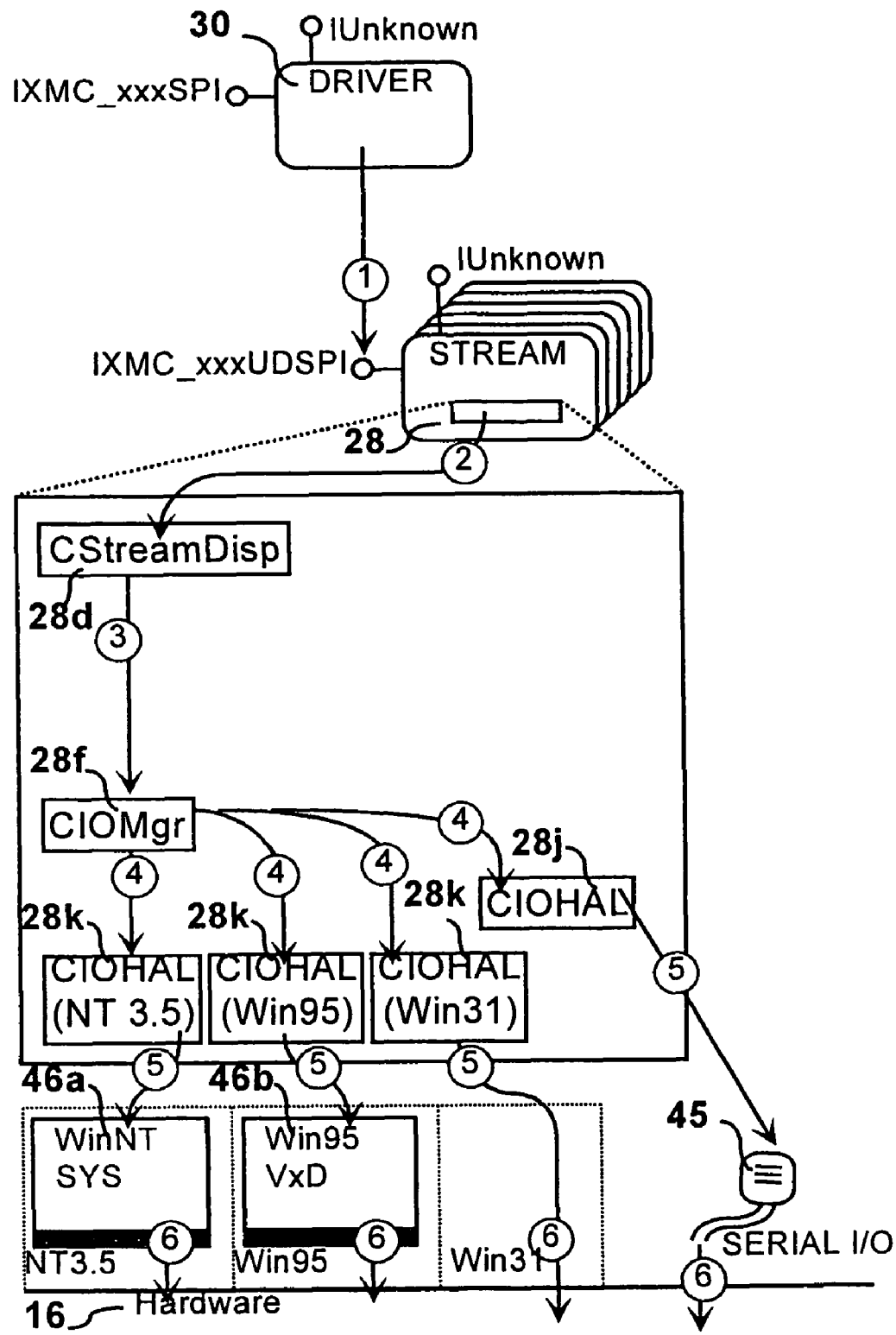

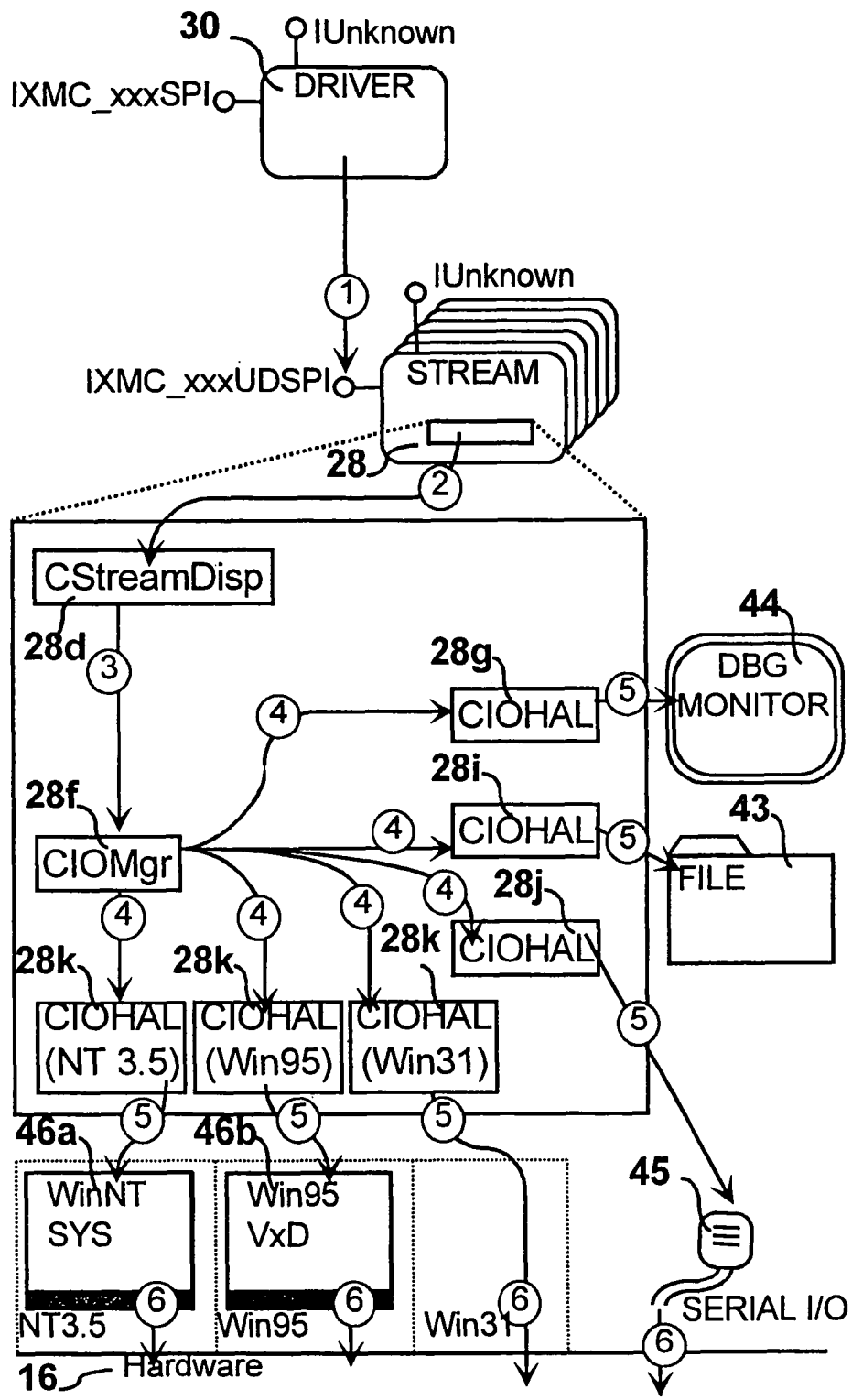
FIG. 32 Scenario-Map - Clean-up (Drv)

FIG. 33 Interface-Map
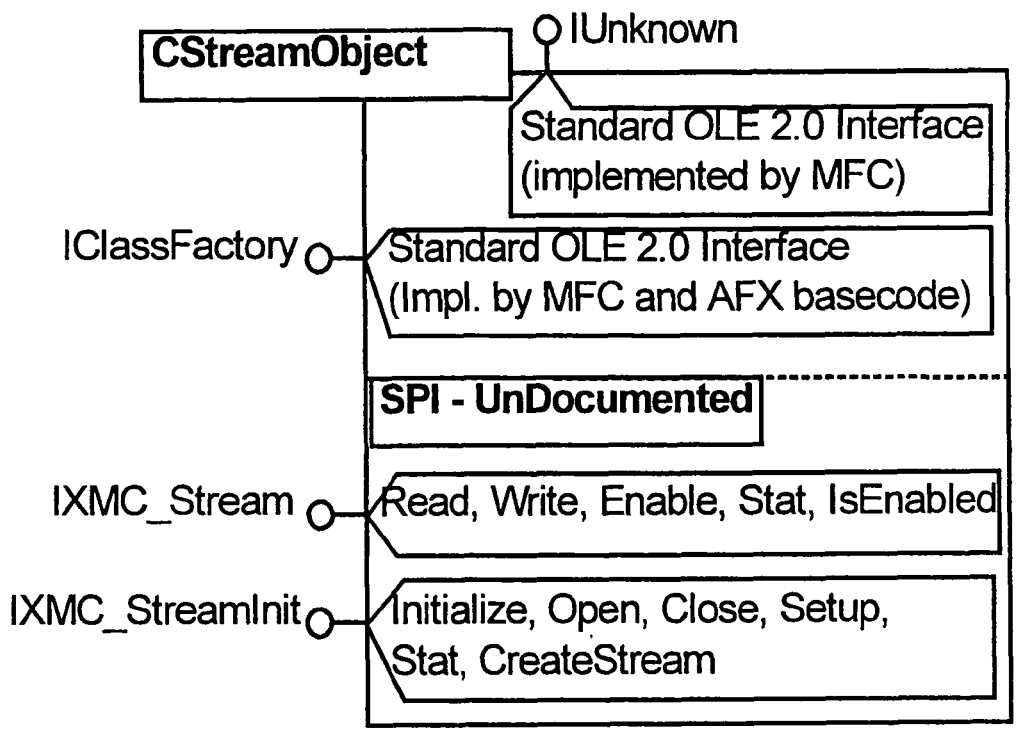
FIG. 34 Module Interaction-Map.
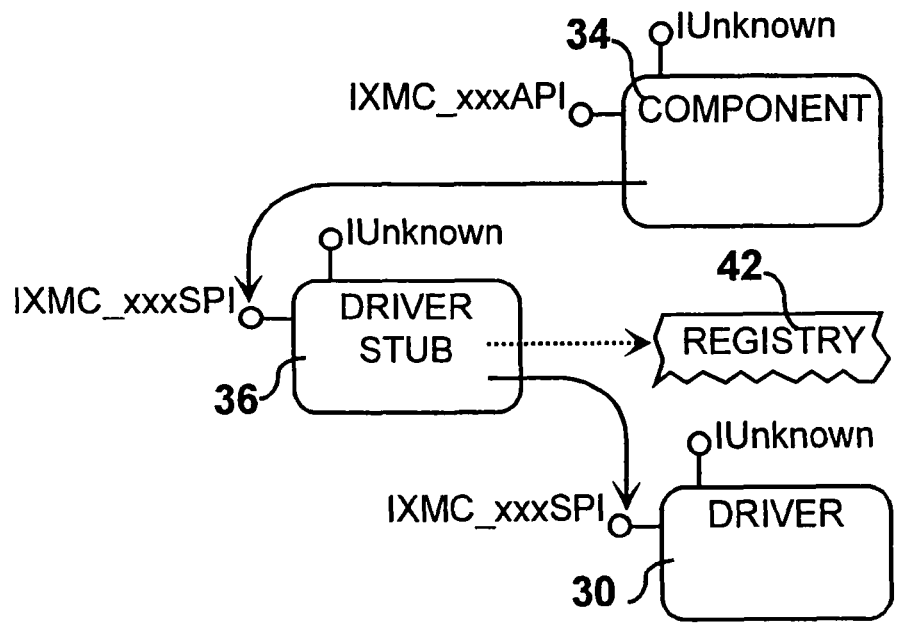

FIG. 35 Object Interaction-Map
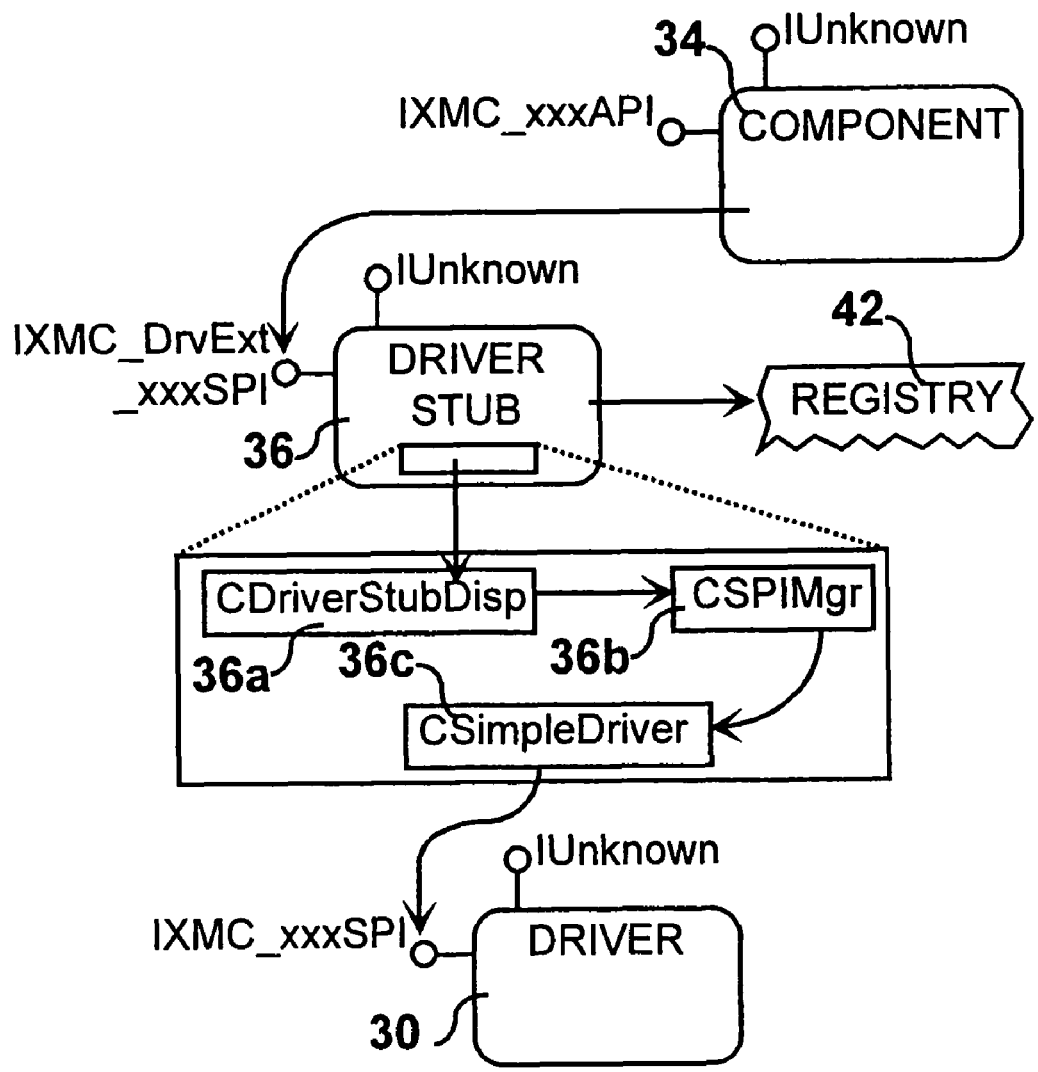

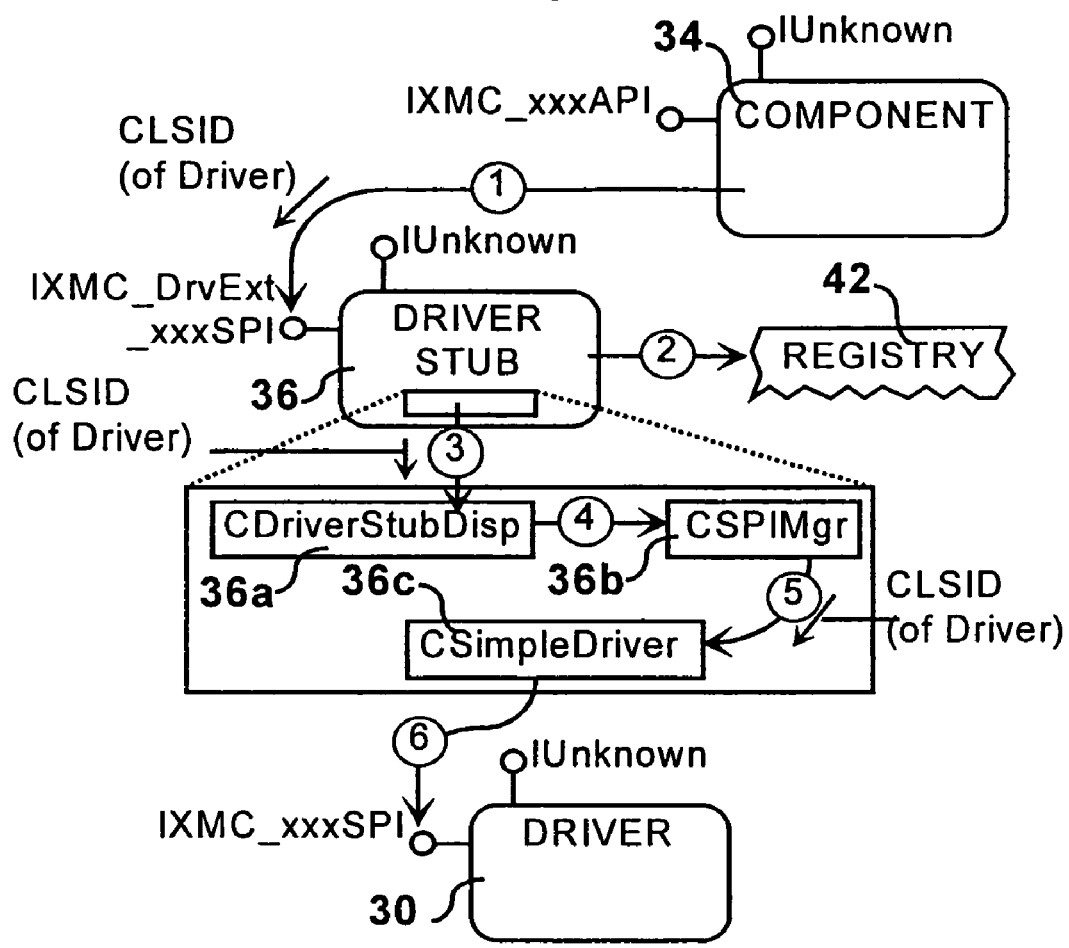
FIG. 36 Scenario-Map - Initialization

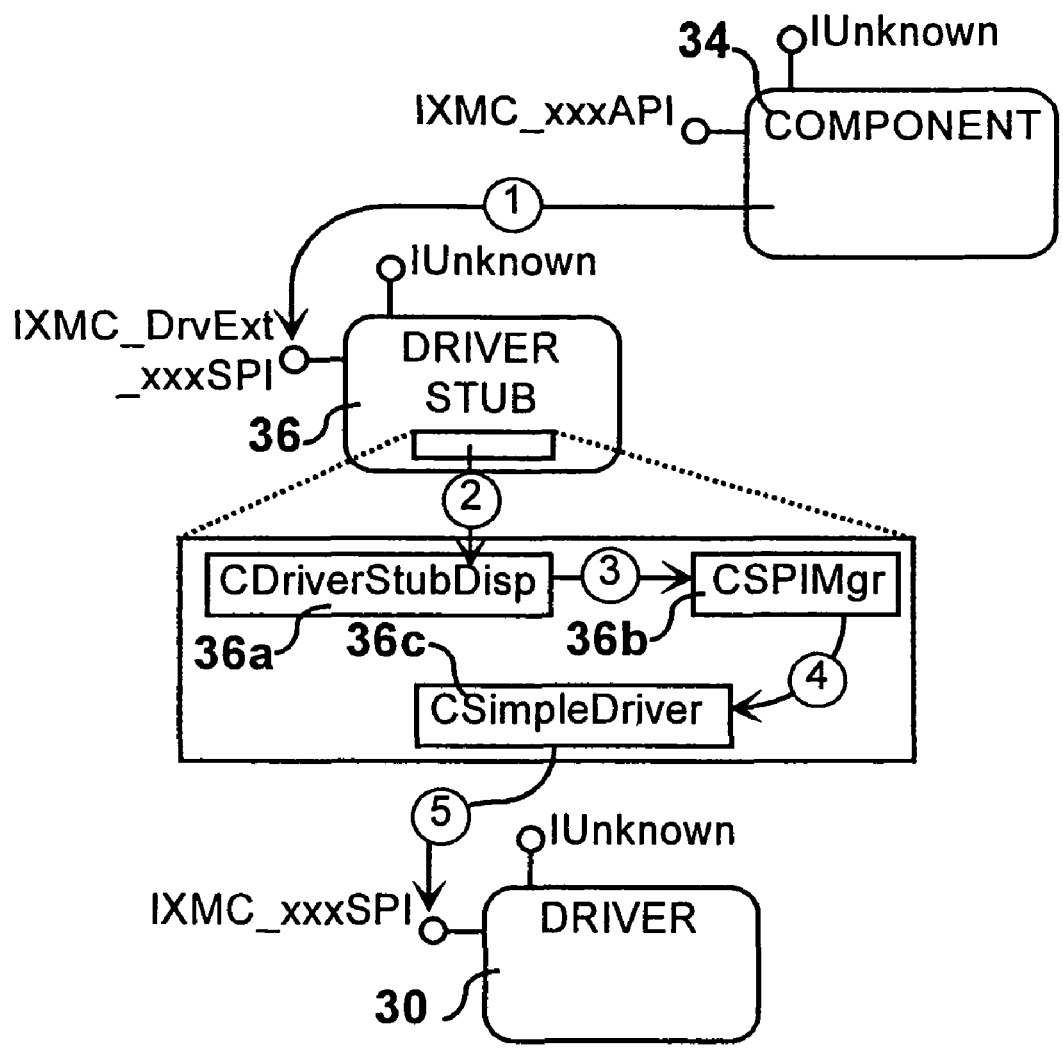
FIG. 37 Scenario-Map - Operations

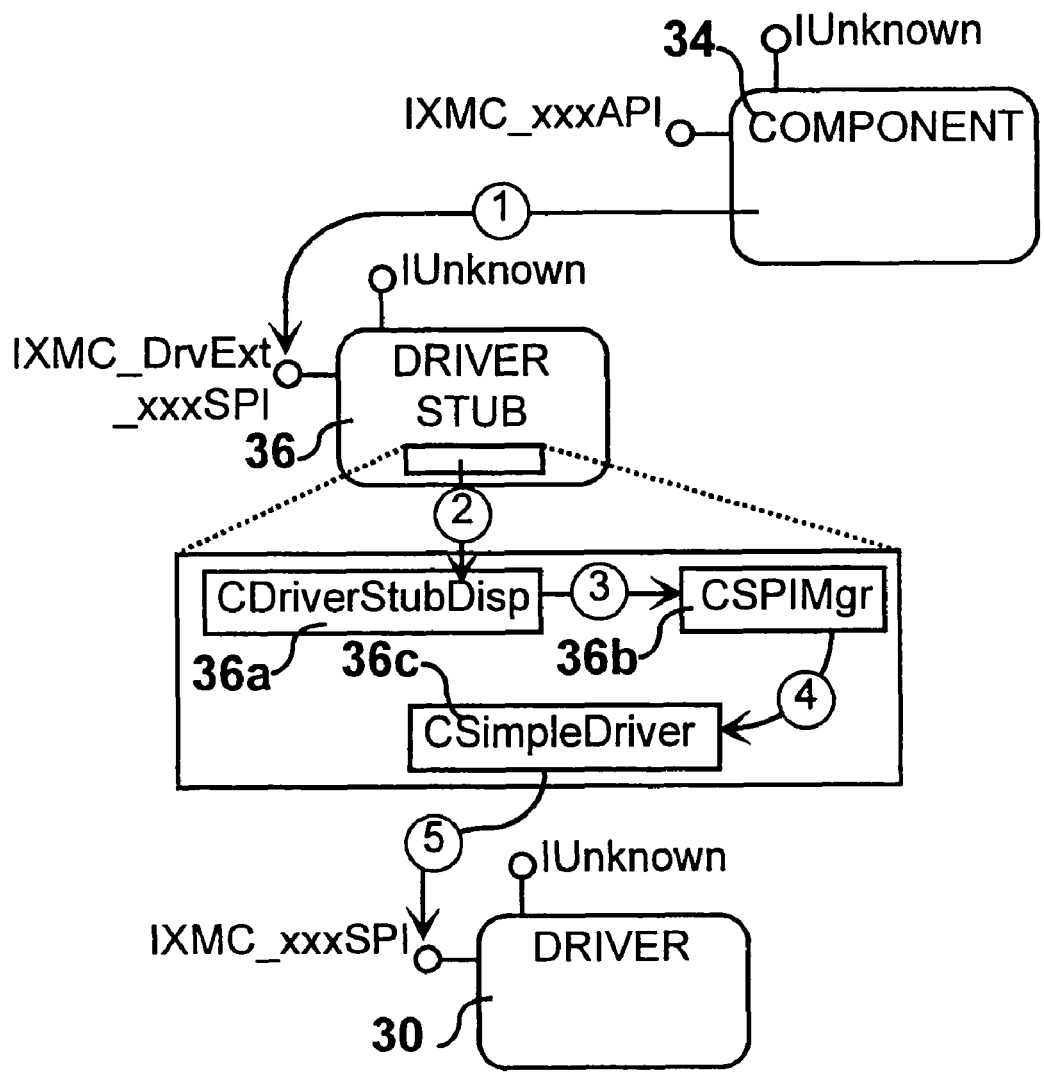
FIG. 38 Scenario-Map - Clean-up

FIG. 39 Interface-Map
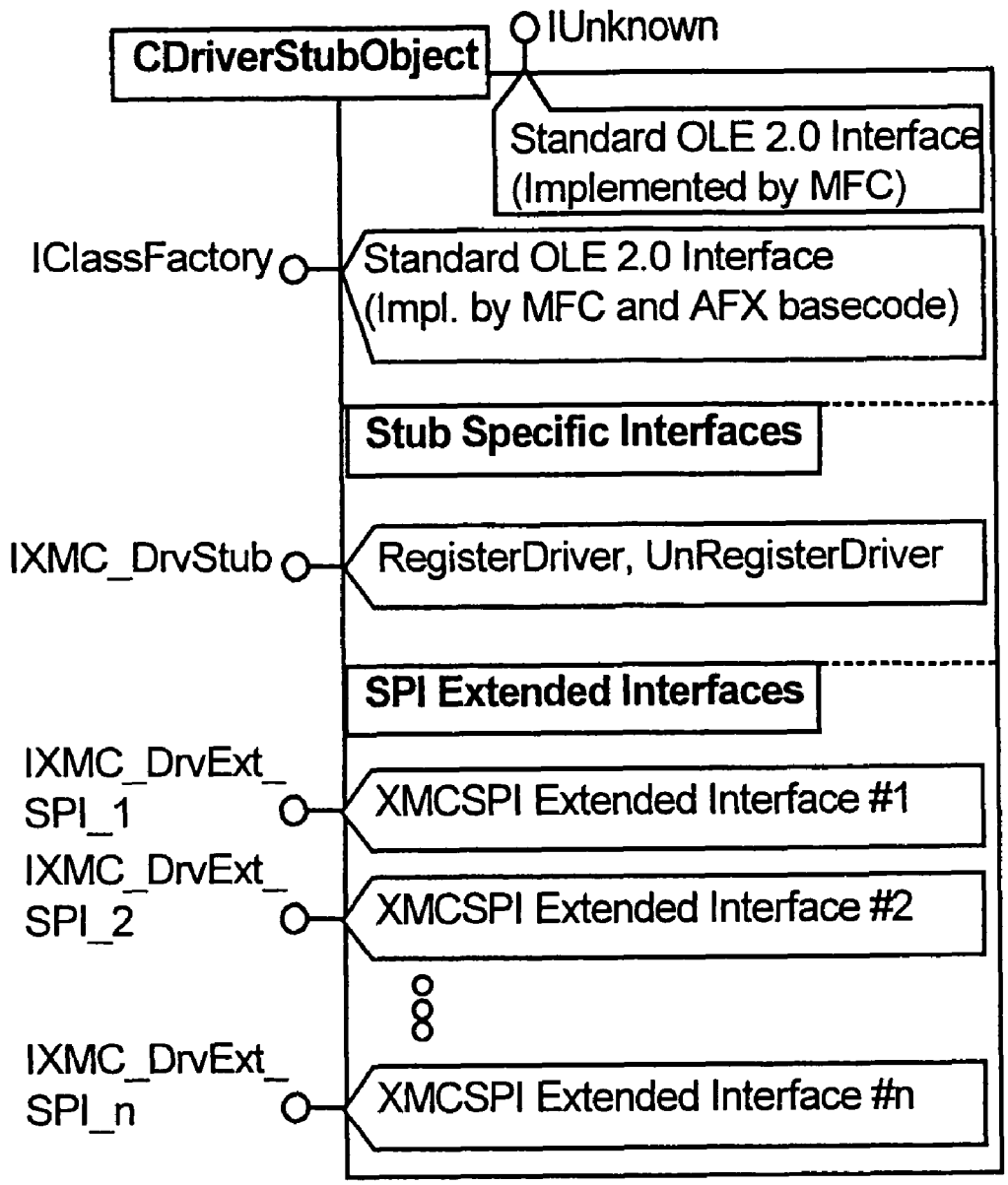

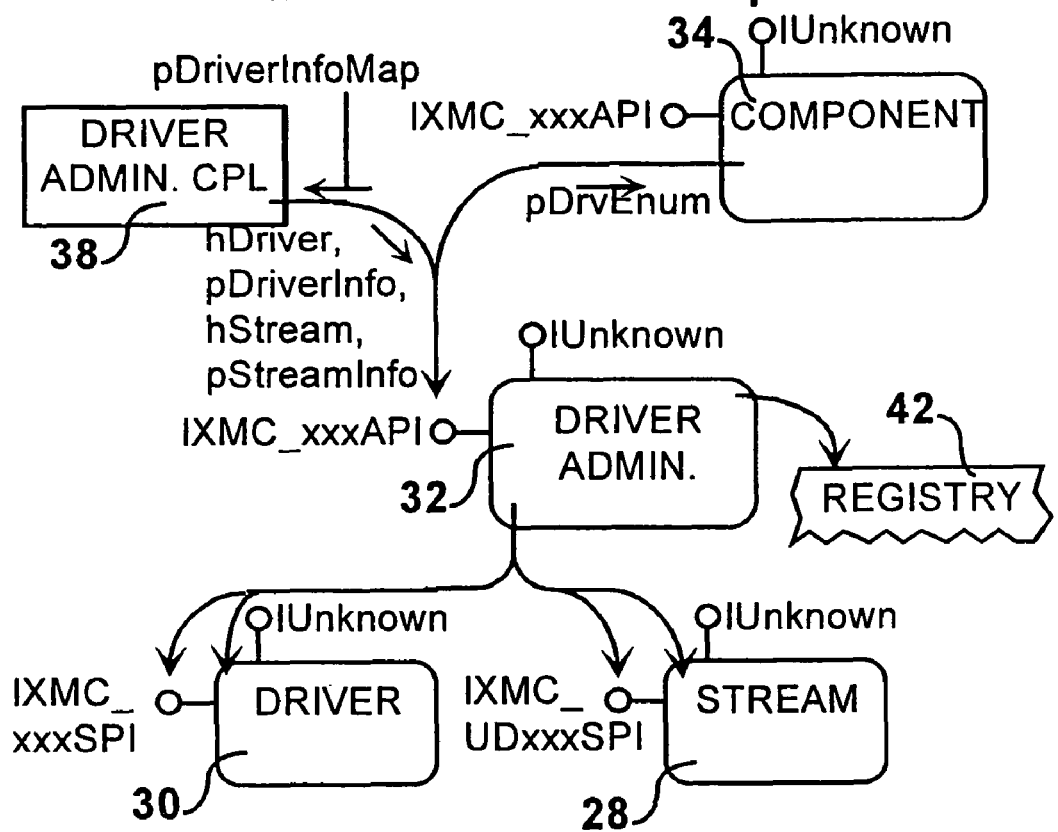
FIG. 40 Module Interaction-Map

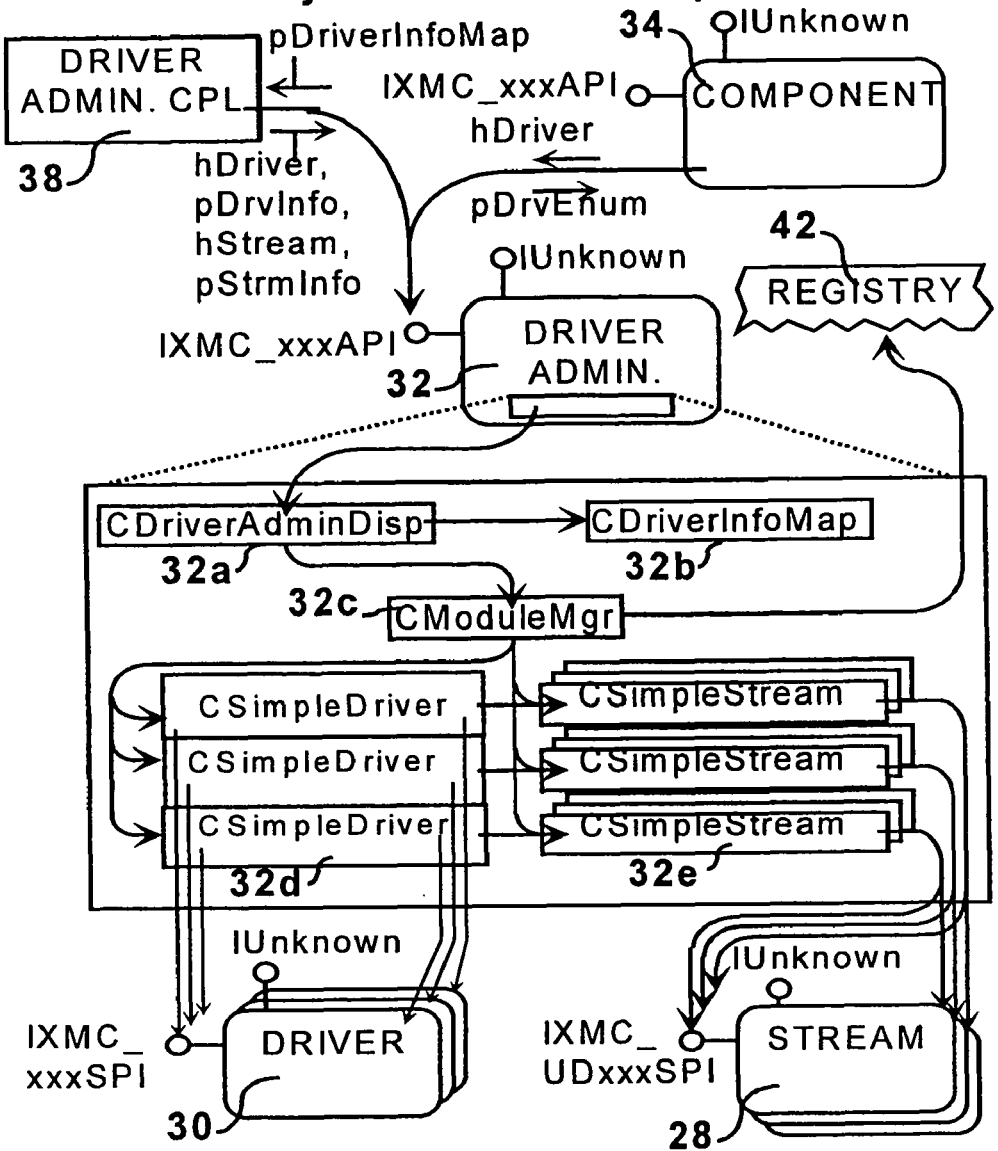
FIG. 41 Object Interaction-Map

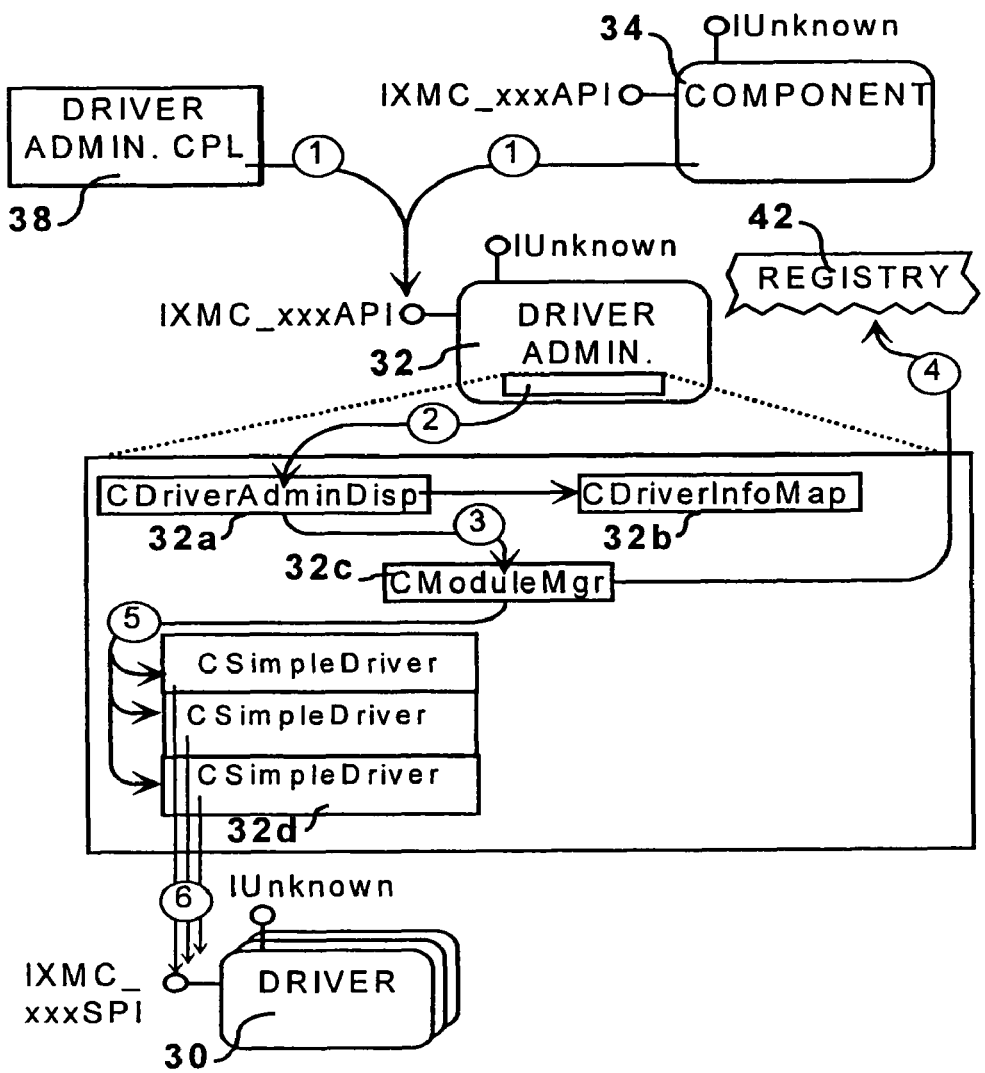
FIG. 42 Scenario-Map - Initialization

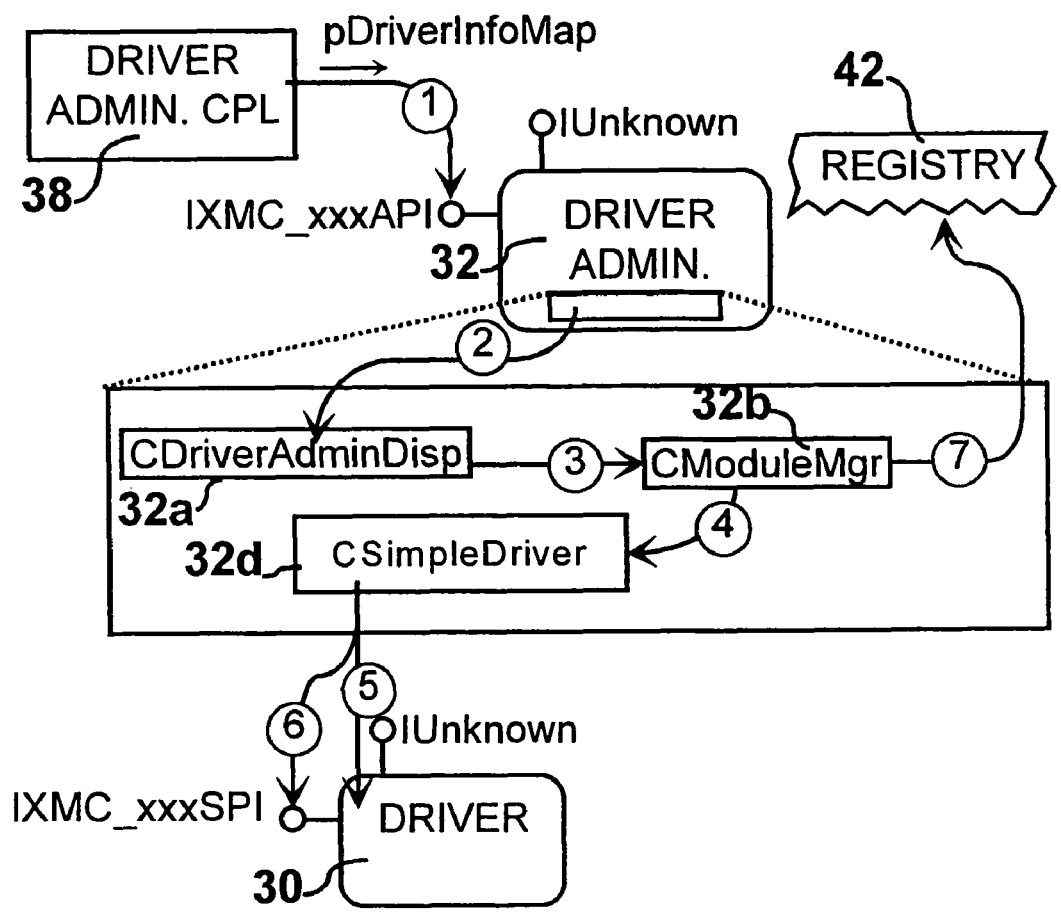
FIG. 43 Scenario-Map - Registering a Driver

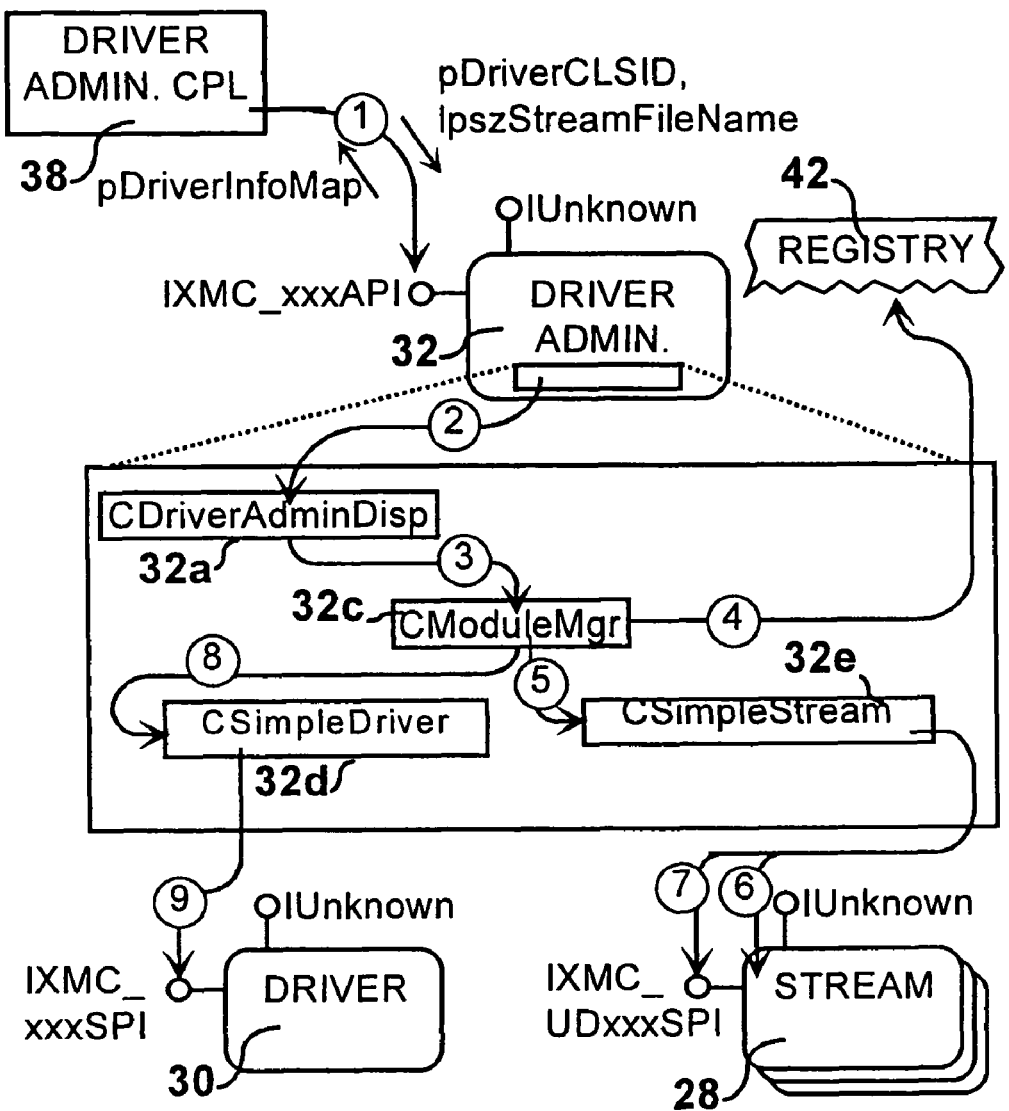
FIG. 44 Scenario-Map - Registering a Stream

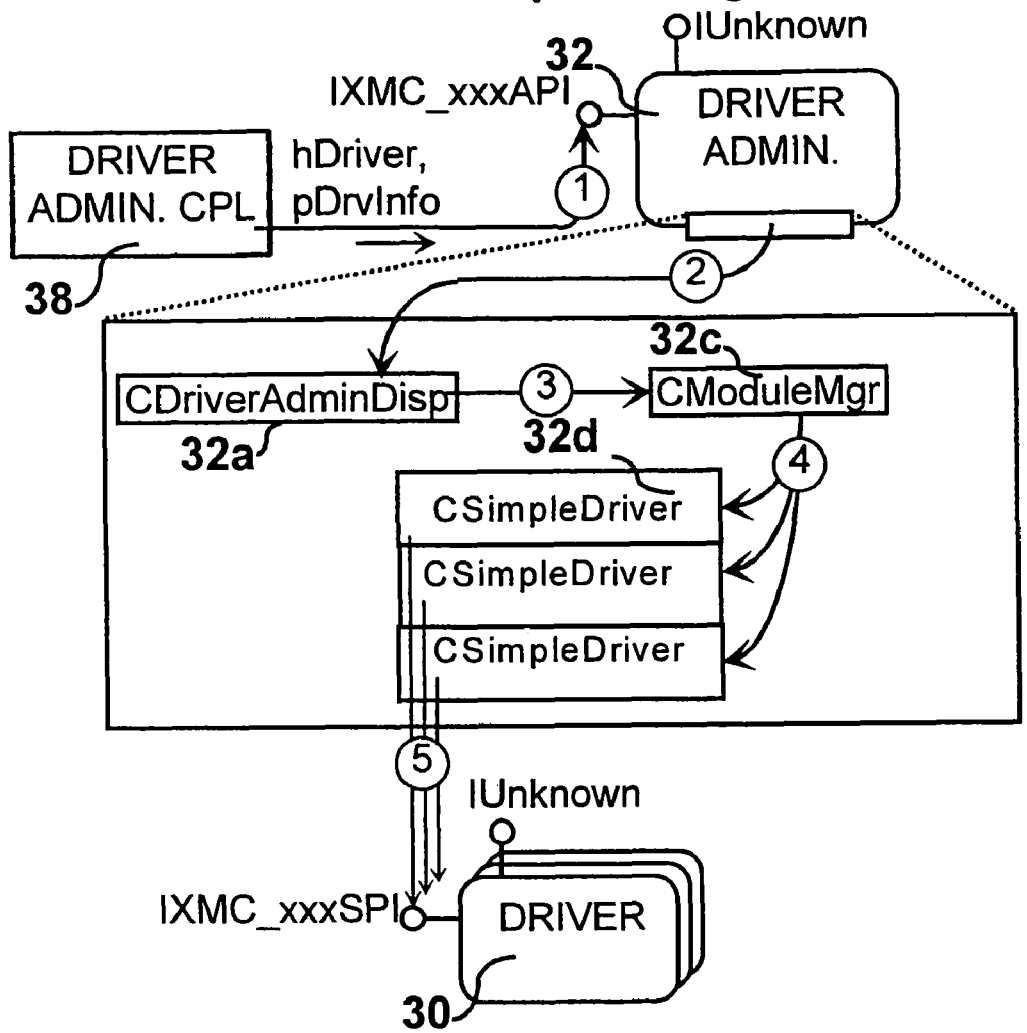
FIG. 45 Scenario-Map - Setting Driver Info.

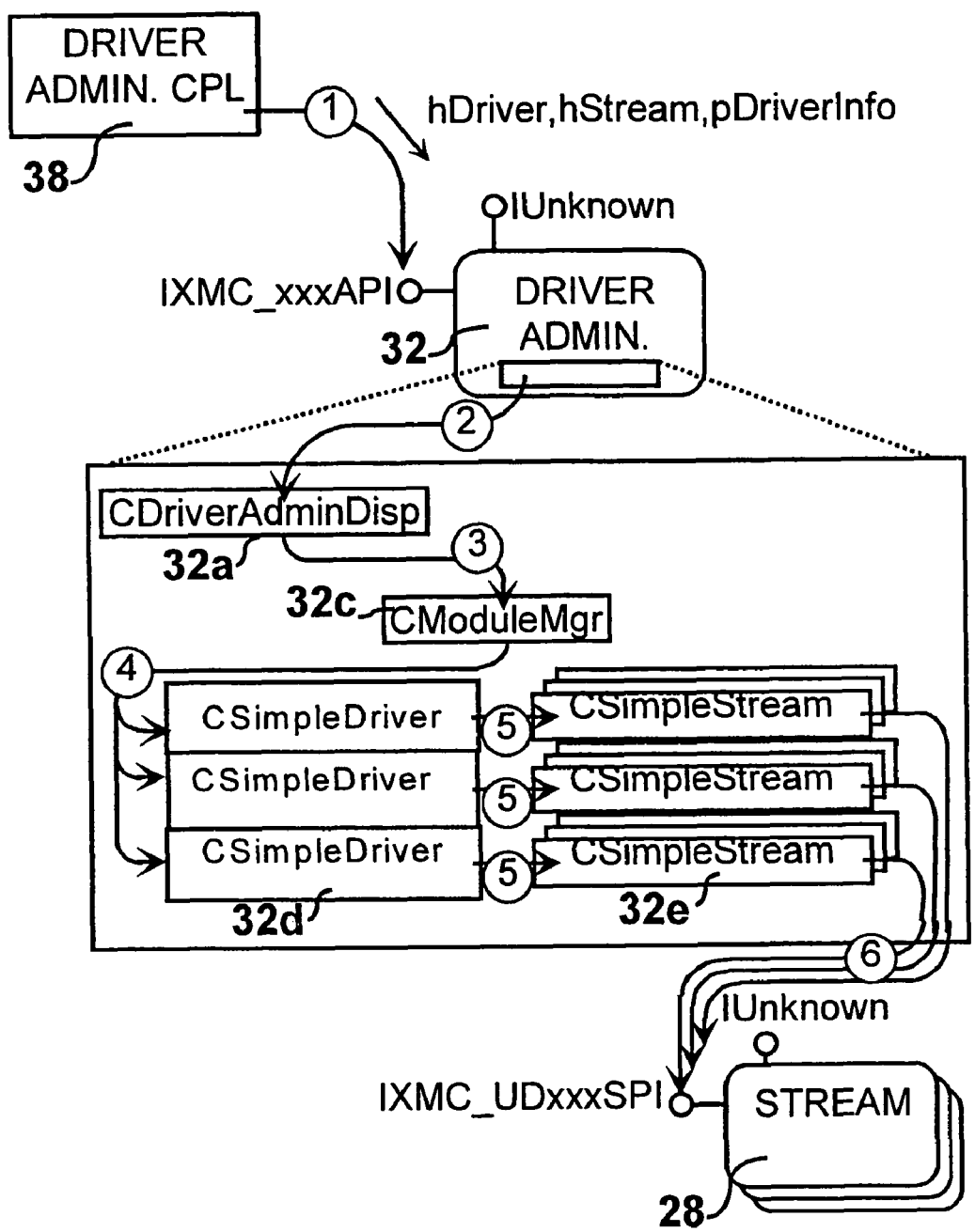
FIG. 46 Scenario-Map - Setting Stream Info.

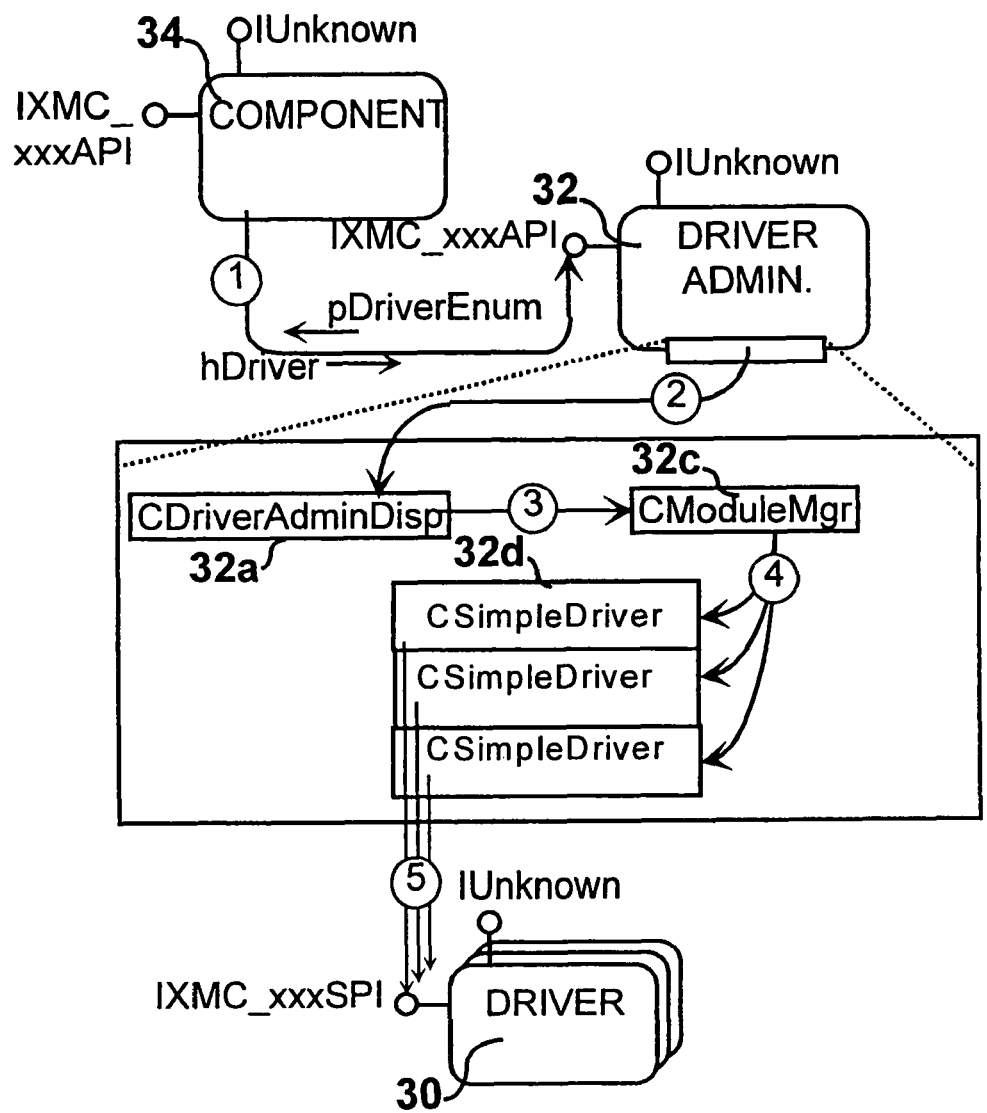
FIG. 47 Scenario-Map - Querying Driver Enum.

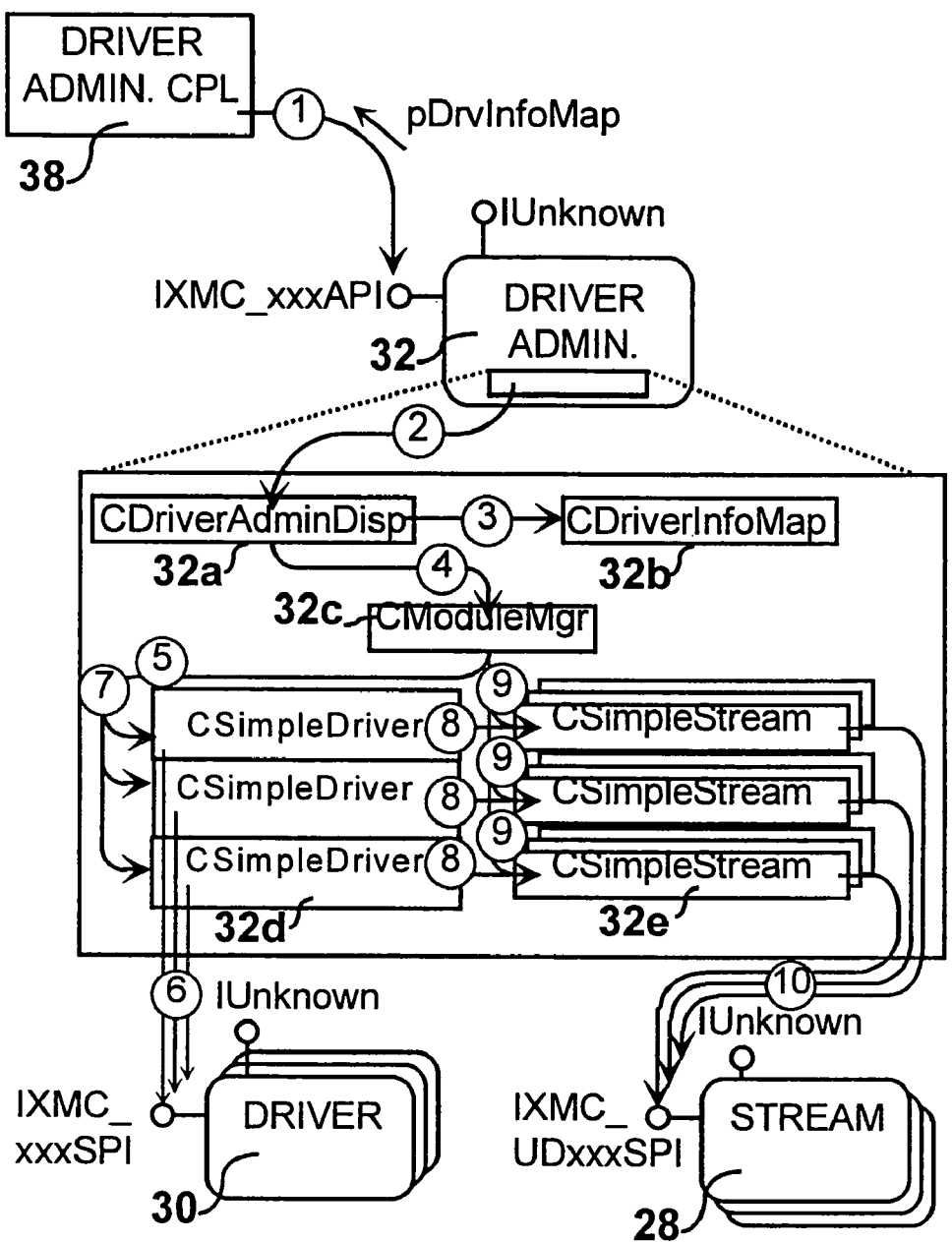
FIG. 48 Scenario-Map - Querying Drv Info. Map

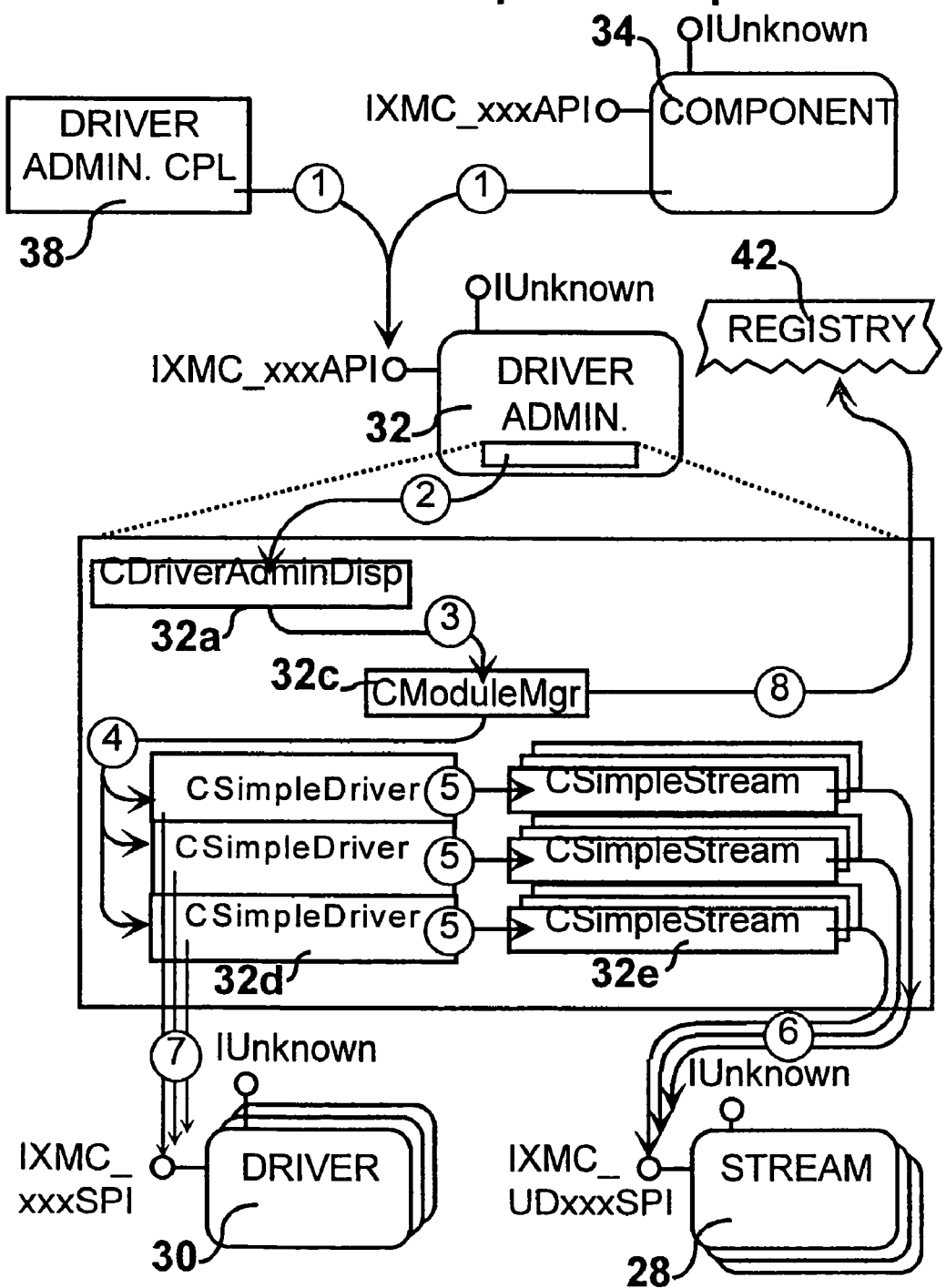
FIG. 49 Scenario-Map - Clean-up

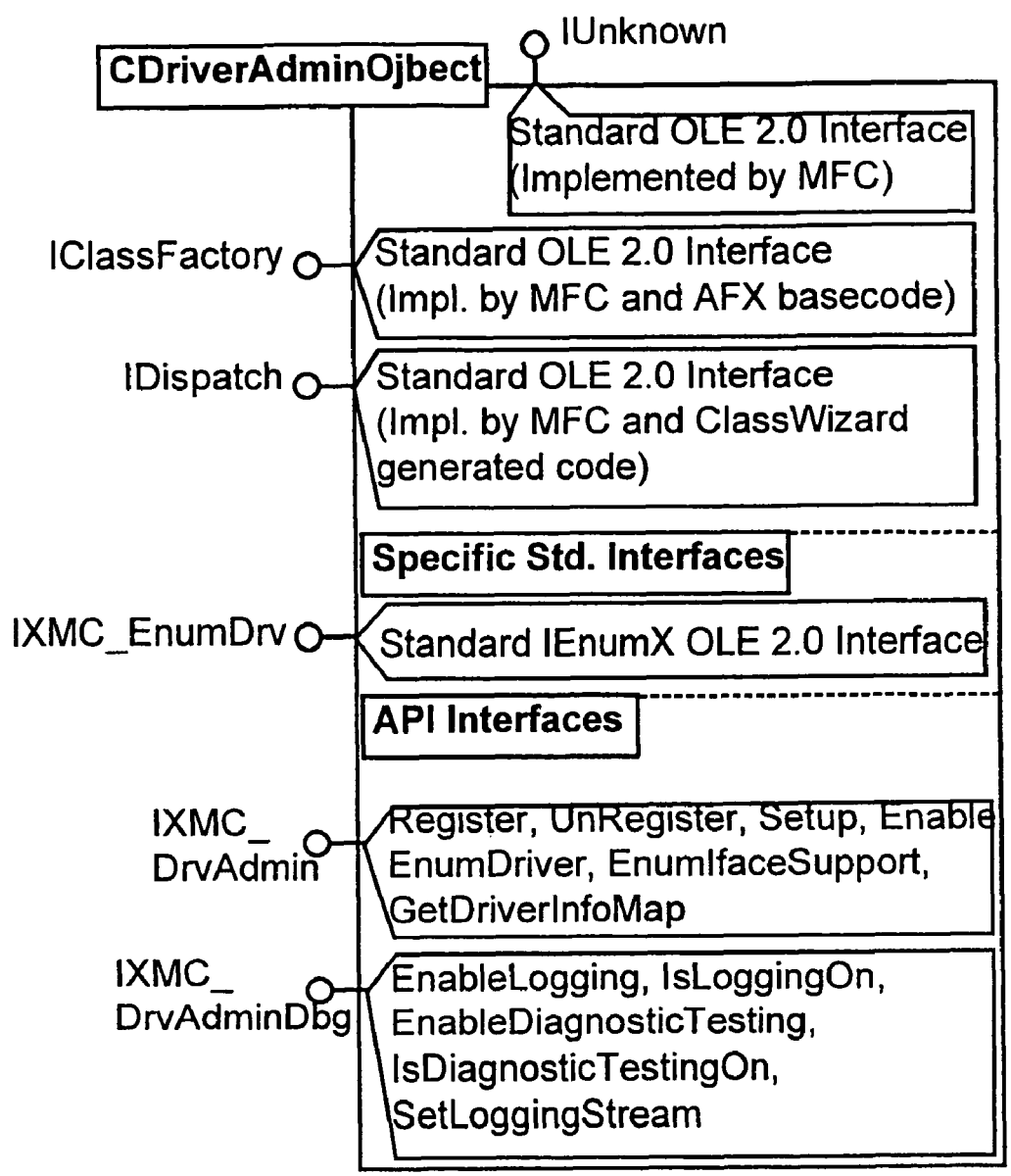
FIG. 50 Interface-Map.

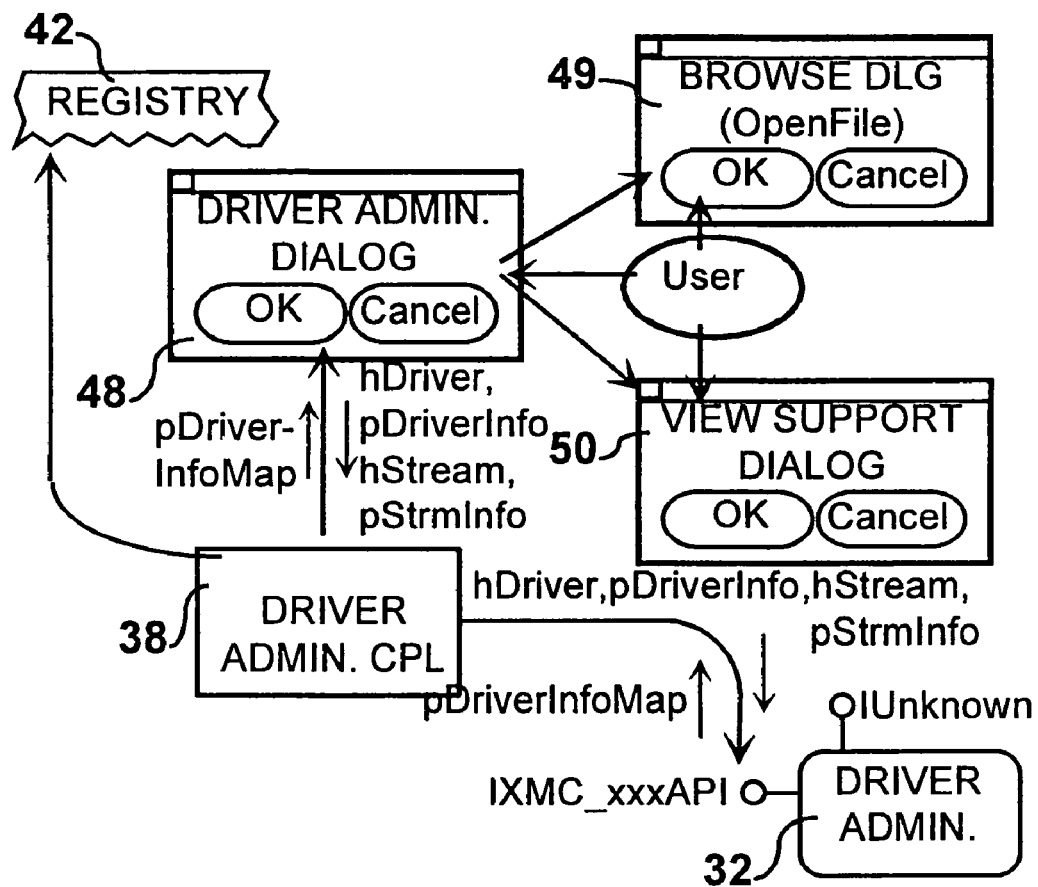
FIG. 51 Module Interaction-Map

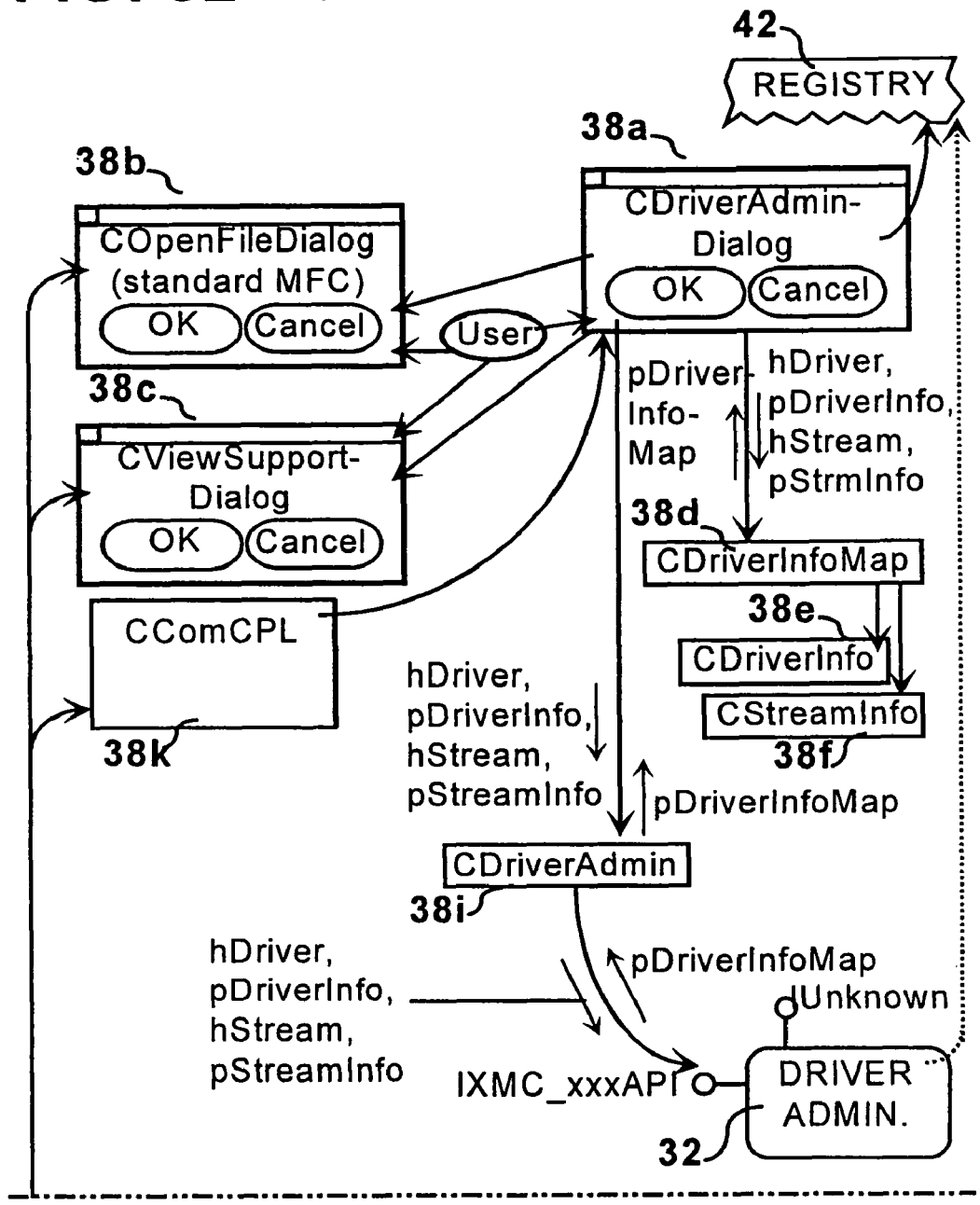
FIG. 52 Object Interaction-Map

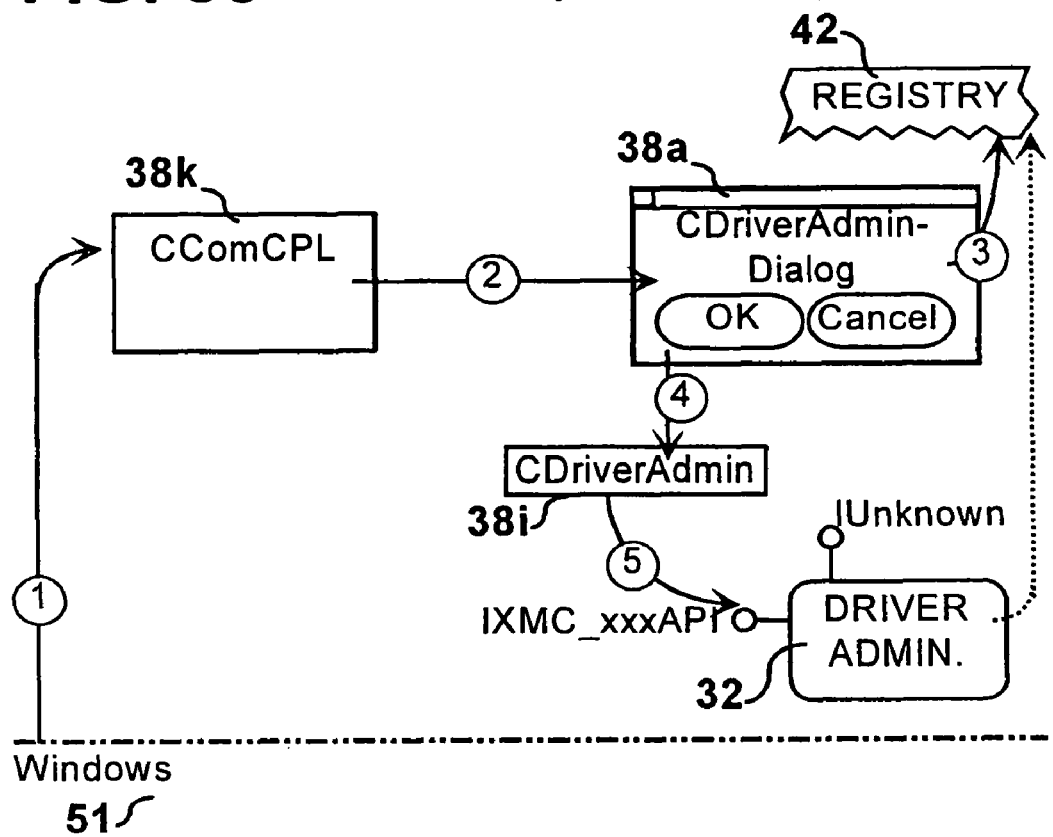
FIG. 53 Scenario-Map - Initializing the App.

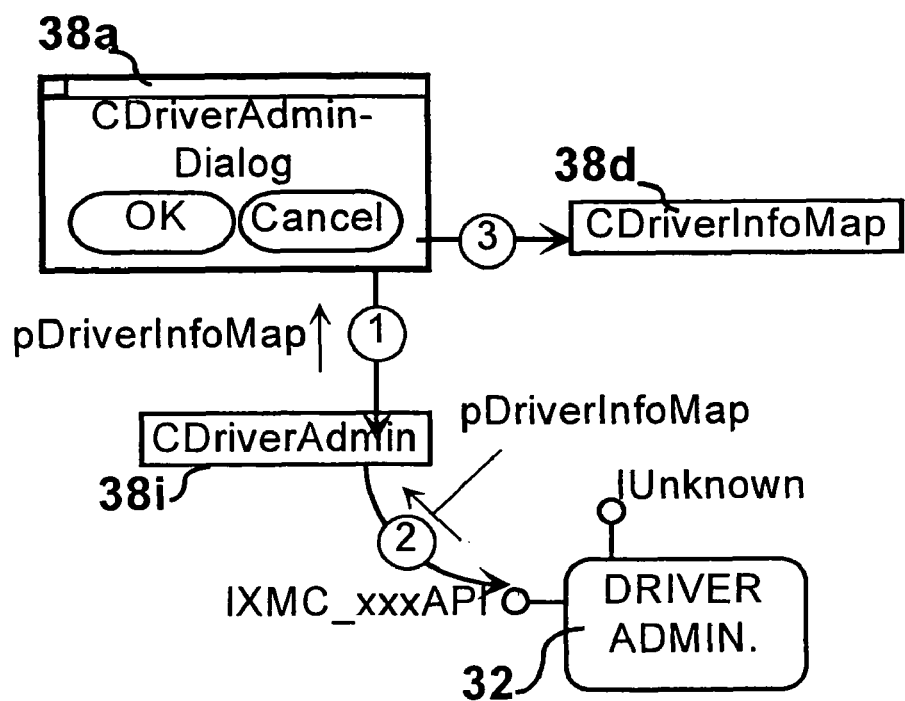
FIG. 54 Scenario-Map - Main Dialog Init.

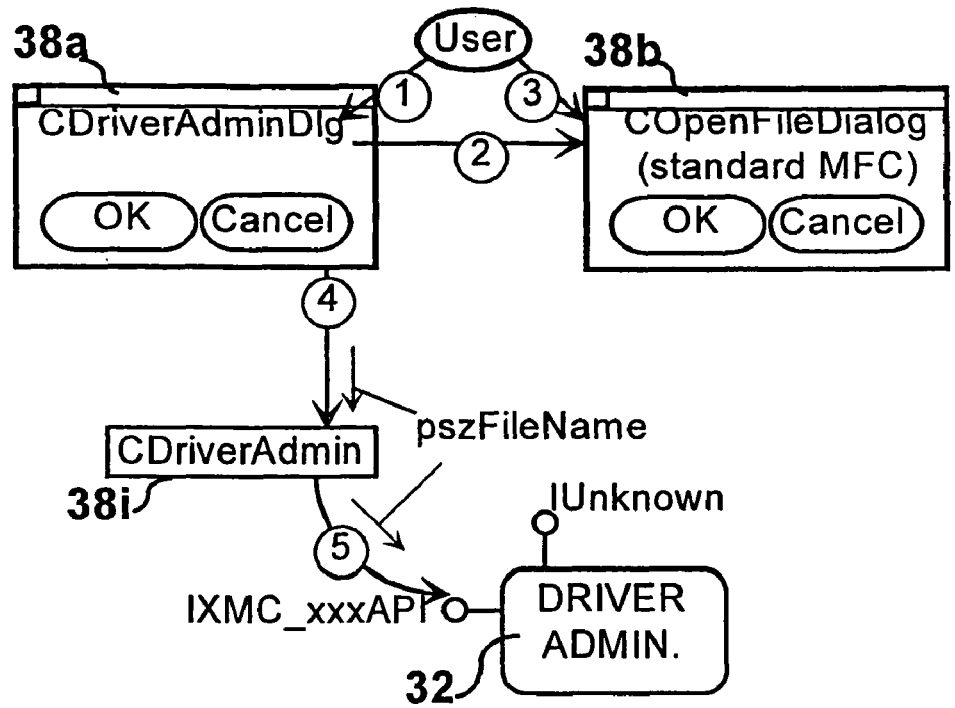
FIG. 55 Scenario-Map - Adding a Driver

FIG. 56 Scenario-Map - Removing a Driver
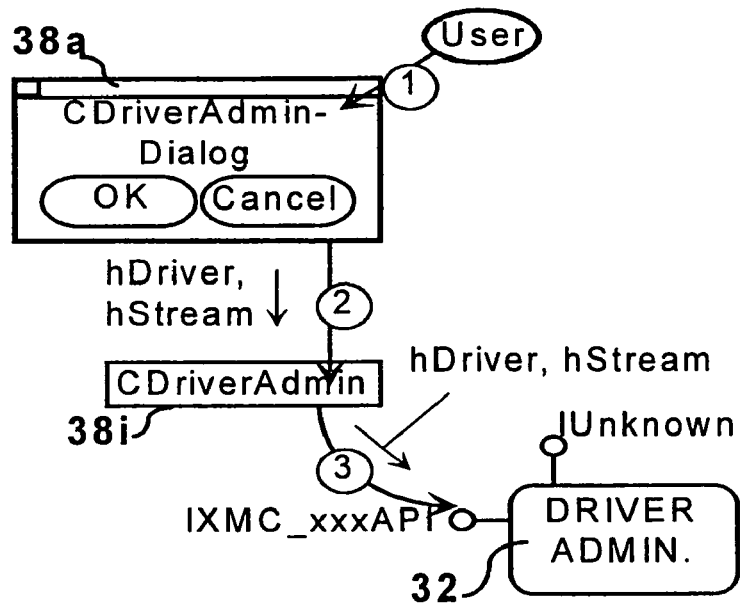
FIG. 57 Scenario-Map - View Support
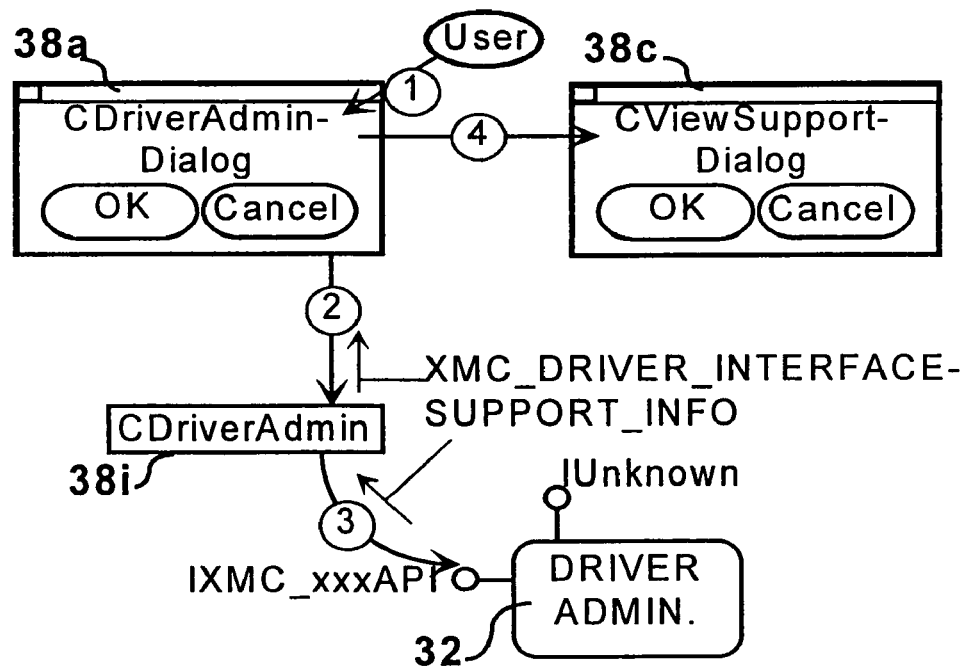

MOTION CONTROL SYSTEMS

RELATED APPLICATIONS

The present application (Ser. No. 11/454,053) is a continuation of U.S. patent application Ser. No. 10/761,537 filed Jan. 21, 2004, now abandoned which is a continuation of U.S. patent application Ser. No. 10/316,451 filed on Dec. 10, 2002, now abandoned which is a continuation of U.S. patent application Ser. No. 10/021,669 filed on Dec. 10, 2001, now U.S. Pat. No. 6,516,236, which is a continuation of U.S. patent application Ser. No. 09/191,981 filed on Nov. 13, 1998, now abandoned, which is a continuation of U.S. patent application Ser. No. 08/656,421 filed on May 30, 1996, now U.S. Pat. No. 5,867,385, which is a continuation-in-part of U.S. patent application Ser. No. 08/454,736 filed on May 30, 1995, now U.S. Pat. No. 5,691,897.

U.S. patent application Ser. No. 10/316,451 filed on Dec. 10, 2002, is also a continuation of U.S. patent application Ser. No. 09/795,777 filed on Feb. 27, 2001, now U.S. Pat. No. 6,513,058, which is incorporated by reference in its entirety and which is a continuation of U.S. patent application Ser. No. 09/205,627 filed on Dec. 3, 1998, now U.S. Pat. No. 6,209,037, which claims benefit of U.S. Provisional Patent Application Ser. No. 60/067,466 filed on Dec. 4, 1997. U.S. patent application Ser. No. 09/205,627 filed on Dec. 3, 1998, now U.S. Pat. No. 6,209,037, is also a continuation of U.S. patent application Ser. No. 09/191,981 filed on Nov. 13, 1998, now abandoned, which is a continuation of U.S. patent application Ser. No. 08/656,421 filed on May 30, 1996, now U.S. Pat. No. 5,867,385, which is a continuation-in-part of U.S. patent application Ser. No. 08/454,736 filed on May 30, 1995, now U.S. patent No. 5,691,897.

U.S. patent application Ser. No. 10/316,451 filed on Dec. 10, 2002, is also a continuation of U.S. patent application Ser. No. 09/633,633 filed on Aug. 7, 2000, now U.S. Pat. No. 6,941,543, which is incorporated by reference in its entirety and which is a continuation of U.S. patent application Ser. No. 09/191,981 filed on Nov. 13, 1998, now abandoned, which is a continuation of U.S. patent application Ser. No. 08/656,421 filed on May 30, 1996, now U.S. Pat. No. 5,867,385, which is a continuation-in-part of U.S. patent application Ser. No. 08/454,736 filed on May 30, 1995, now U.S. Pat. No. 5,691,897.

The contents of all related applications listed above are incorporated herein by reference.

TECHNICAL FIELD

The present invention relates to motion control systems and, more particularly, to interface software that facilitates the creation of hardware independent motion control software.

BACKGROUND OF THE INVENTION

The purpose of a motion control device is to move an object in a desired manner. The basic components of a motion control device are a controller and a mechanical system. The mechanical system translates signals generated by the controller into movement of an object.

While the mechanical system commonly comprises a drive and an electrical motor, a number of other systems, such as hydraulic or vibrational systems, can be used to cause movement of an object based on a control signal. Additionally, it is possible for a motion control device to comprise a plurality of drives and motors to allow multi-axis control of the movement of the object.

The present invention is of particular importance in the context of a mechanical system including at least one drive and electrical motor having a rotating shaft connected in some way to the object to be moved, and that application will be described in detail herein. But the principles of the present invention are generally applicable to any mechanical system that generates movement based on a control signal. The scope of the present invention should thus be determined based on the claims appended hereto and not the following detailed description.

In a mechanical system comprising a controller, a drive, and an electrical motor, the motor is physically connected to the object to be moved such that rotation of the motor shaft is translated into movement of the object. The drive is an electronic power amplifier adapted to provide power to a motor to rotate the motor shaft in a controlled manner. Based on control commands, the controller controls the drive in a predictable manner such that the object is moved in the desired manner.

These basic components are normally placed into a larger system to accomplish a specific task. For example, one controller may operate in conjunction with several drives and motors in a multi-axis system for moving a tool along a predetermined path relative to a workpiece.

Additionally, the basic components described above are often used in conjunction with a host computer or programmable logic controller (PLC). The host computer or PLC allows the use of a high-level programming language to generate control commands that are passed to the controller. Software running on the host computer is thus designed to simplify the task of programming the controller.

Companies that manufacture motion control devices are, traditionally, hardware oriented companies that manufacture software dedicated to the hardware that they manufacture. These software products may be referred to as low level programs. Low level programs usually work directly with the motion control command language specific to a given motion control device. While such low level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

PRIOR ART

In the following discussions, a number of documents are cited that are publicly available as of the filing date of the present invention. With many of these documents, the Applicant is not aware of exact publishing dates. The citation of these documents should thus not be considered an admission that they are prior art; the Applicant will take the steps necessary to establish whether these documents are prior art if necessary.

As mentioned above, a number of software programs currently exist for programming individual motion control devices or for aiding in the development of systems containing a number of motion control devices.

The following is a list of documents disclosing presently commercially available high-level software programs: (a) Software Products For Industrial Automation, iconics 1993; (b) The complete, computer-based automation tool (IGSS), Seven Technologies A/S; (c) OpenBatch Product Brief, PID, Inc.; (d) FIX Product Brochure, Intellution (1994); (e) Paragon TNT Product Brochure, Intec Controls Corp.; (f) WEB 3.0 Product Brochure, Trihedral Engineering Ltd. (1994); and (g) AIMAX-WIN Product Brochure, TA Engineering Co., Inc. The following documents disclose simulation software: (a) ExperTune PID Tuning Software, Gerry Engineering Software; and (b) XANALOG Model NL-SIM Product Brochure, XANALOG.

The following list identifies documents related to low-level programs: (a) Compumotor Digiplan 1993-94 catalog, pages 10-11; (b) Aerotech Motion Control Product Guide, pages 233-34; (c) PMAC Product Catalog, page 43; (d) PC/DSP-Series Motion Controller C Programming Guide, pages 1-3; (e) Oregon Micro Systems Product Guide, page 17; (f) Precision Microcontrol Product Guide.

The Applicants are also aware of a software model referred to as WOSA that has been defined by Microsoft for use in the Windows programming environment. The WOSA model is discussed in the book Inside Windows 95, on pages 348-351. WOSA is also discussed in the paper entitled WOSA Backgrounder: Delivering Enterprise Services to the Windows-based Desktop. The WOSA model isolates application programmers from the complexities of programming to different service providers by providing an API layer that is independent of an underlying hardware or service and an SPI layer that is hardware independent but service dependent. The WOSA model has no relation to motion control devices.

The Applicants are also aware of the common programming practice in which drivers are provided for hardware such as printers or the like; an application program such as a word processor allows a user to select a driver associated with a given printer to allow the application program to print on that given printer.

While this approach does isolates the application programmer from the complexities of programming to each hardware configuration in existence, this approach does not provide the application programmer with the ability to control the hardware in base incremental steps. In the printer example, an application programmer will not be able to control each stepper motor in the printer using the provided printer driver; instead, the printer driver will control a number of stepper motors in the printer in a predetermined sequence as necessary to implement a group of high level commands.

The software driver model currently used for printers and the like is thus not applicable to the development of a sequence of control commands for motion control devices.

From the foregoing, it should be clear that one primary object of the invention is to provide improved methods and devices for moving objects.

SUMMARY OF THE INVENTION

The present invention is, in one form, a method of debugging software used to communicate with a motion control system comprising the following steps. Debug information containing diagnostic information associated with a hardware motion control attribute is generated. At least one selected software driver is capable of sending the debug information to a debug target. A software application is caused to call a motion component function to exchange a common motion control attribute with a selected software driver. The called motion component function is used to cause a motion component to exchange a common motion control attribute with the selected driver by calling a driver function. A called driver function is used to cause the selected software driver to convert a common motion control attribute to a hardware motion control attribute, exchange a hardware motion control attribute with the motion control device, and send debug information to the debug target.

BRIEF DESCRIPTION OF THE DRAWINGS

FIG. 2 is a module interaction map of a motion control component of the system shown in FIG. 1;

FIG. 3 is an object interaction map of the component shown in FIG. 2;

FIGS. 4 through 8 are scenario maps of the component shown in FIG. 2;

FIG. 9 is an interface map of the component shown in FIG. 2;

FIG. 10 is a data map showing one exemplary method of accessing the data necessary to emulate extended driver functions using core driver functions;

FIG. 11 is a module interaction map of the driver portion of the system shown in FIG. 1;

FIG. 12 is an object interaction map of the driver portion shown in FIG. 11;

FIGS. 13 through 20 are scenario maps related to the driver shown in FIG. 11;

FIG. 21 is an interface map for the driver shown in FIG. 11;

FIG. 22 is a module interaction map of the streams used by the system shown in FIG. 1;

FIG. 23 is an object interaction map of the streams shown in FIG. 22;

FIGS. 24 through 32 are scenario maps of the streams shown in FIG. 22;

FIG. 33 is an interface map of the objects comprising the stream shown in FIG. 22;

FIG. 34 is a module interaction map of the driver stub portion of the system shown in FIG. 1;

FIG. 35 is an object interaction map of the driver stub shown in FIG. 34;

FIGS. 36 through 38 are scenario maps of the driver stub shown in FIG. 34;

FIG. 39 is an interface map of the driver stub portion shown in FIG. 34;

FIG. 40 is a module interaction map of the driver administrator portion of the system shown in FIG. 1;

FIG. 41 is an object interaction map of the driver administrator shown in FIG. 40;

FIGS. 42 through 49 are scenario maps relating to the driver administrator shown in FIG. 40;

FIG. 50 is an interface map of the objects that comprise the driver administrator shown in FIG. 40;

FIG. 51 is a module interaction map of the driver administrator CPL applet portion of the system shown in FIG. 1;

FIG. 52 is an object interaction map of the driver administrator CPL applet shown in FIG. 51;

FIGS. 53 through 57 are scenario maps related to the driver administrator CPL applet shown in FIG. 51.

DETAILED DESCRIPTION OF THE INVENTION

Figure 1B:
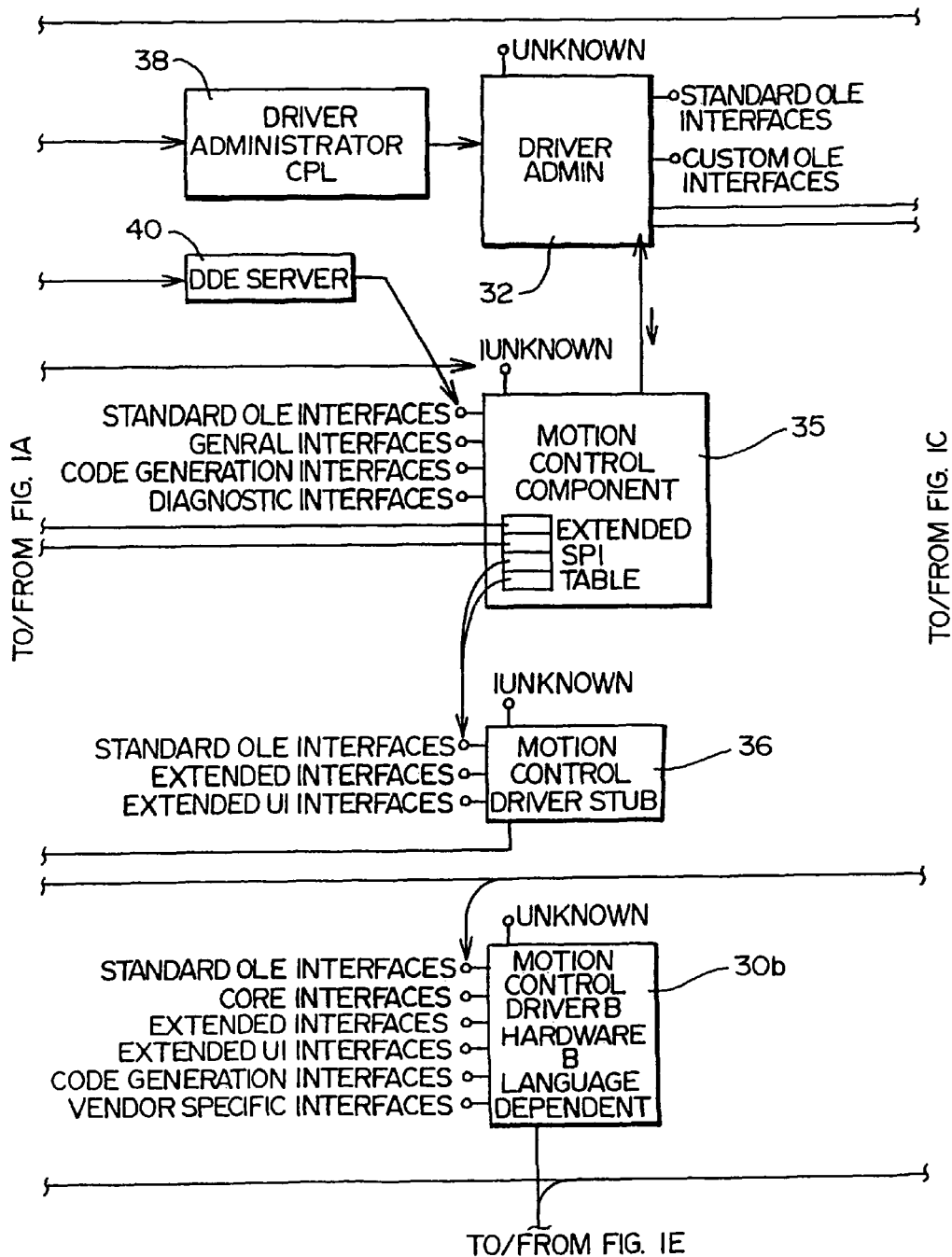
FIG. 1 is a system interaction map of a motion control system constructed in accordance with, and embodying, the principles of the present invention.
Figure 1D:
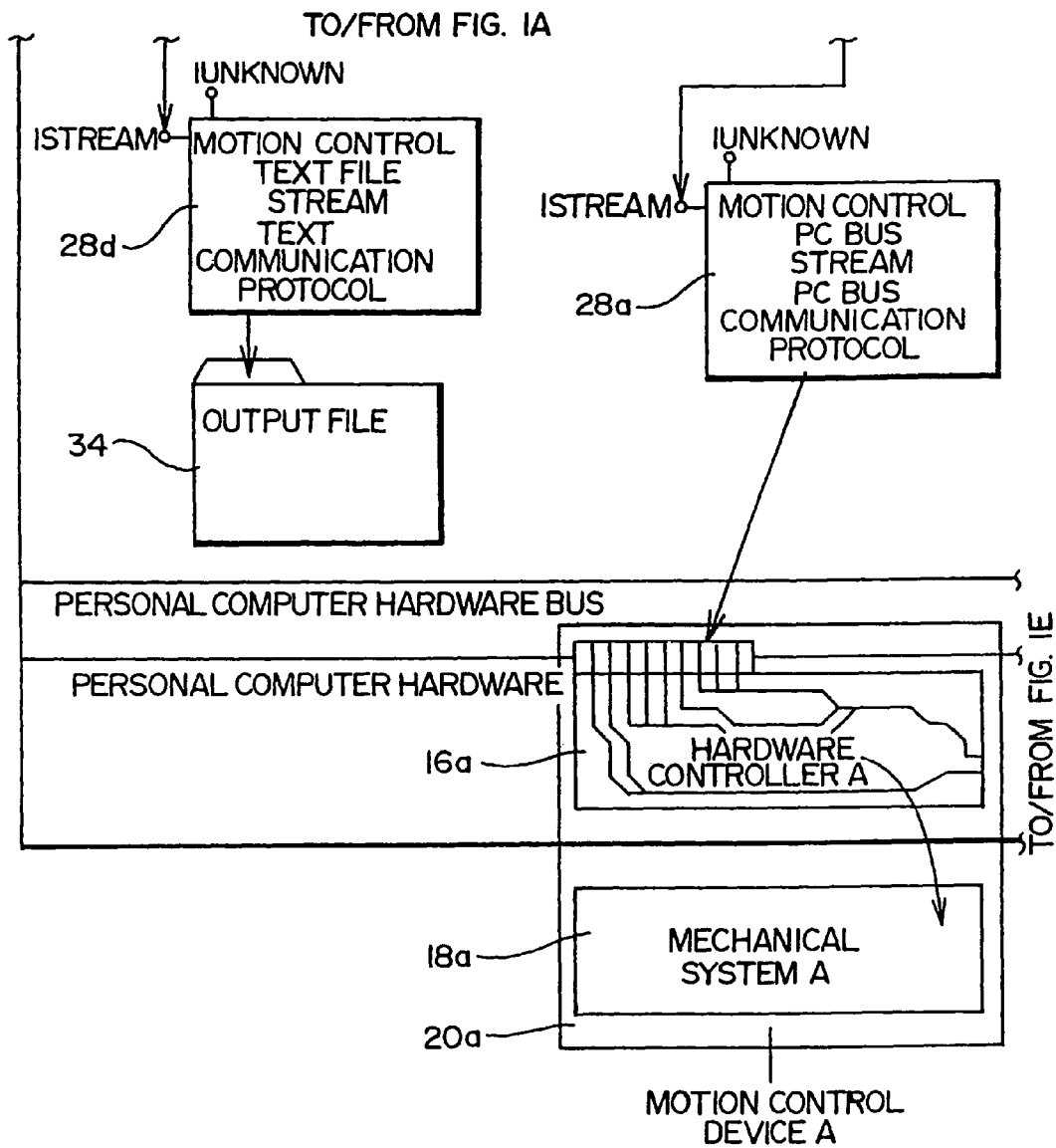
Figure 1F:
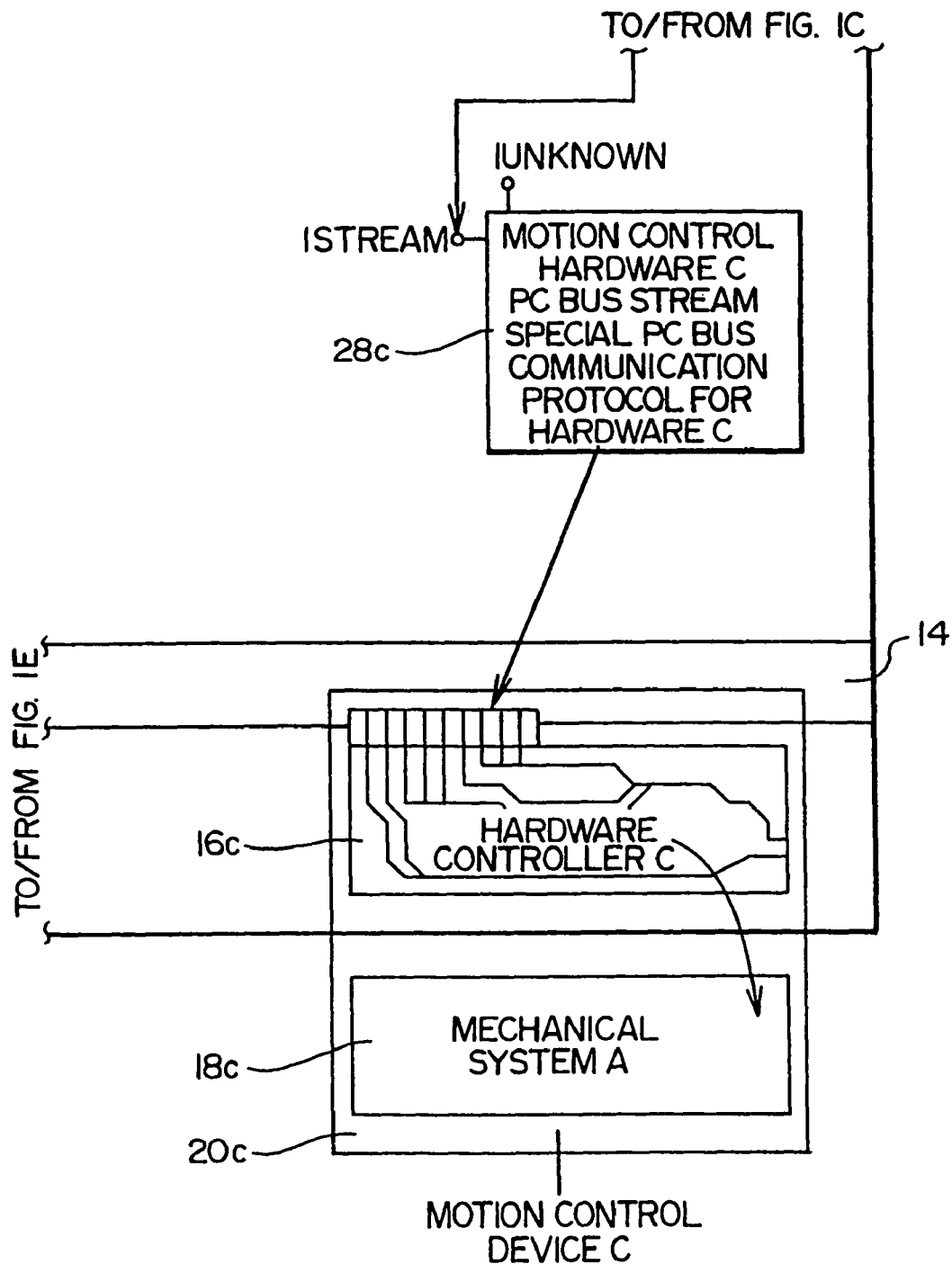

Referring now to the drawing, depicted therein at 10 in FIG. 1 is a motion control system constructed in accordance with, and embodying, the principles of the present invention. This system 10 comprises a personal computer portion 12 having a hardware bus 14, a plurality of motion control hardware controllers 16a, 16b, and 16c, and mechanical systems 18a, 18b, and 18c that interact with one or more objects (not shown) to be moved.

The personal computer portion 12 of the system 10 can be any system capable of being programmed as described herein, but, in the preferred embodiment, is a system capable of running the Microsoft Windows environment. Such a system will normally comprise a serial port in addition to the hardware bus 14 shown in FIG. 1.

The hardware bus 14 provides the physical connections necessary for the computer 12 to communicate with the hardware controllers 16. The hardware controllers 16 control the mechanical system 18 to move in a predictable manner. The mechanical system 18 comprises a motor or the like the output shaft of which is coupled to the object to be moved. The combination of the hardware controllers 16a, 16b, and 16c and the mechanical systems 18a, 18b, and 18c forms motion control devices 20a, 20b, and 20c, respectively.

The hardware bus 14, hardware controllers 16, and mechanical systems 18 are all well-known in the art and are discussed herein only to the extent necessary to provide a complete understanding of the present invention.

The personal computer portion 12 contains a software system 22 that allows an application user 24 to create software applications 26 that control the motion control devices 20.

More particularly, based on data input by the user 24 and the contents of the application program 26, the software system 22 generates control commands that are transmitted by one or more streams such as those indicated at 28a, 28b, 28c, and 28d. The streams 28 transmit control commands incorporating the hardware specific command language necessary to control a given motion control device to perform in a desired manner. As will be discussed in more detail below, the streams 28 implement the communication protocol that allows the control commands to reach the appropriate motion control device 28 via an appropriate channel (i.e., PC bus, serial port).

Using the system 22, the application program 26 is developed such that it contains no code that is specific to any one of the exemplary hardware controllers 16. In the normal case, the application program 26, and thus the user 24 that created the program 26, is completely isolated from the motion control devices 20. The user 24 thus need know nothing about the hardware specific command language or communication protocol associated with each of these devices 20; it may even be possible that the command language of one or more of the hardware controllers 16 was not defined at the time the application program 26 was created.

The software system 22 comprises a combination of elements that allow the application program 26 to be completely isolated from the hardware controllers 16. In the following discussion, the framework of the software system 22 will be described in terms of a method of moving an object and/or a method of generating control commands. After this general discussion, each component of the system 22 will be described in detail in a specific operating environment.

I. Method of Generating Control Commands for Controlling a Motion Control Device to Move an Object Initially, it should be noted that, in most situations, the method described in this section will normally but not necessarily involve the labors of at least two and perhaps three separate software programmers: a software system designer; a hardware designer familiar with the intricacies of the motion control device; and a motion control system designer. The application user 24 discussed above will normally be the motion control system designer, and the roles of the software system designer and hardware designer will become apparent from the following discussion.

The software system designer develops the software system 22. The software system designer initially defines a set of motion control operations that are used to perform motion control. The motion control operations are not specifically related to any particular motion control device hardware configuration, but are instead abstract operations that all motion control device hardware configurations must perform in order to function.

Motion control operations may either be primitive operations or non-primitive operations. Primitive operations are operations that are necessary for motion control and cannot be simulated using a combination of other motion control operations. Examples of primitive operations include GET POSITION and MOVE RELATIVE, which are necessary for motion control and cannot be emulated using other motion control operations. Non-primitive operations are motion control operations that do not meet the definition of primitive operations. Examples of non-primitive operations include CONTOUR MOVE, which may be emulated using a combination of primitive motion control operations.

Given the set of motion control operations as defined above, the software system designer next defines a service provider interface (SPI) comprising a number of driver functions. Driver functions may be either core driver functions or extended driver functions. Core driver functions are associated with primitive operations, while extended driver functions are associated with non-primitive operations. As with motion control operations, driver functions are not related to a specific hardware configuration; basically, the driver functions define parameters necessary to implement motion control operations in a generic sense, but do not attach specific values or the like to these parameters. The SPI for the exemplary software system 22 is attached hereto as Appendix A.

The software system designer next defines an application programming interface (API) comprising a set of component functions. For these component functions, the software system designer writes component code that associates at least some of the component functions with at least some of the driver functions. The relationship between component functions and driver functions need not be one to one: for example, certain component functions are provided for administrative purposes and do not have a corresponding driver function. However, most component functions will have an associated driver function. The API for the exemplary software system 22 is attached hereto as Appendix B.

The overall software model implemented by the software program 22 thus contains an API comprising component functions and an SPI comprising driver functions, with the API being related to the SPI by component code associated with the component functions.

In order for the system 22 to generate the control commands, at least two more components are needed: the application program 26 and at least one software driver such as the drivers indicated at 30a, 30b, and 30c in FIG. 1.

The software drivers 30 are normally developed by a hardware designer and are each associated with a single motion control device. The hardware designer writes driver code that dictates how to generate control commands for controlling the motion control device associated therewith to perform the motion control operations associated with at least some of the driver functions.

In the exemplary software system 22, the software drivers 30a, 30b, and 30c are associated with the motion control devices 20a, 20b, and 20c, respectively. As a software driver exists for each of the motion control devices 20a, 20b, and 20c, these devices 20a, 20b, and 20c form a group of supported motion control devices.

A careful review of the framework of the software system 22 as described above will illustrate that, of all the components of this system 22, only the software drivers 30 are hardware dependent.

The motion control system designer, normally also the user 24, develops the application program 26. The application program 26 comprises a sequence of component functions arranged to define the motion control operations necessary to control a motion control device to move an object in a desired manner. The application program 26 is any application that uses the system 22 by programming the motion control component 35. Applications may program the system 22 either through OLE Automation or by using any of the custom OLE interfaces making up the API.

As mentioned above, the component code associates many of the component functions with the driver functions, and the driver functions define the parameters necessary to carry out the motion control operations. Thus, with appropriately ordered component functions, the application program 26 contains the logic necessary to move the object in the desired manner.

Once the application program 26 has been written and the software drivers 30 have been provided, the user 24 selects at least one motion control device from the group of supported motion control devices 20a, 20b, and 20c. Using a driver administrator module 32, the user 24 then selects the software driver associated with the selected motion control device. This driver administrator module 32 is used to install, uninstall, register, and setup each stream.

As currently implemented, the driver administrator 34 allows only one software driver to be selected. In future versions of the software system 22, the driver administrator will allow the user to select one or more software drivers.

The software system 22 thus generates control commands based on the component functions contained in the application program 26, the component code associated with the component functions, and the driver code associated with the selected software driver 28.

As the control commands are being generated as described above, they may be directly transmitted to a motion control device to control this device in real time or stored in an output file for later use. The software system 22 employs the streams 28 to handle the transmission of the control commands to a desired destination thereof.

In the exemplary system 22, the destinations of the control commands may be one or more of an output file 34 and/or the controllers 16. Other possible destinations include a debug monitor or window or other custom output mechanism defined for a specific situation. The software system designer, or in some cases the hardware system designer, will write transmit stream code for each stream 28 that determines how the control commands are to be transferred to a given one of the control command destinations 16 and 34. Using the driver administrator 32, the user 24 selects one or more of the control command destinations 16 and 34, and, later when run, the system 22 transfers the control commands to the selected control command destination 16 and/or 34 based on the transmit stream code in the stream 28 associated with the selected control command destination 16 and/or 34.

Many control command destinations such as 16 and 34 are capable of transmitting data back to the system 22. Data transmitted from a control command destination back to the system 22 will be referred to as response data. The software system designer thus further writes data response stream code for each of the streams 28a, 28b, and 28c that determines how response data is transmitted from the controllers 16 to the system 22. The system 22 thus processes the response data sent by the controllers 16 based on the data response stream code contained in the streams 28.

Referring again to FIG. 1, this Figure shows that the system 22 further comprises a motion control component 35 and a driver stub module 36. The motion control component module 34 is the portion of the software system 22 that relates the component functions to the driver functions. The motion control component module 34 thus contains the component code that makes the association between the component functions contained in the application program 26 and the driver functions.

The driver stub module 36 is not required to implement the basic software model implemented by the system 22, but provides the system 22 with significantly greater flexibility to accommodate diverse motion control hardware configurations with minimal effort.

More particularly, when the driver stub module 36 is employed, the hardware designer need not develop driver code to implement all of the driver functions; to the contrary, the hardware designer must write driver code for implementing the core driver functions but need not write driver code to implement the extended driver functions. The software system designer provides the motion control driver stub 36 with stub code that identifies the combinations of core driver functions that are employed to emulate the functionality of extended driver functions.

The motion control component 24 will determine for the selected software driver 30 which extended functions, if any, the selected driver 30 supports. For extend functions that are not supported, referred to herein as non-supported extended driver functions, the motion control component 24 refers to the driver stub module 36 to determine the appropriate combination of core driver functions to emulate the functionality of the non-supported extended driver functions. The system 22 thus generates the control commands necessary to implement the non-supported extended driver functions using the appropriate combination of core driver functions.

The process of determining when extended driver functions need to be emulated can be optimized by providing the motion control component 24 with a function pointer table that contains a pointer to each of extended functions. When building the function pointer table, the motion control component 35 checks the selected driver module 30 to see if it supports each extended function. If the selected driver module 30 supports the extended function, the motion control component module 24 stores a pointer to the function, implemented by the selected driver module 30, in the table location corresponding to the extended function. In the event that the selected driver module 30 does not support the extended function, the motion control component module 34 stores a pointer to the extended function implementation located in the driver stub module 36. The driver stub module 36 implementation of the extended function contains calls to a plurality of core functions implemented by the selected driver module 30.

Therefore, the driver stub module 36 allows the hardware designer to use, with minimal time and effort, a working software driver 28 that contains driver code to implement only the core functions. The software driver 28 developed to implement the core driver functions can then be improved by developing driver code to implement extended driver functions as desired.

The use of driver code specifically designed to implement extended driver functions is, in general, preferable to relying on the driver stub module 36 to emulate the extended driver functions; driver code specifically written to implement an extended driver function will almost always obtain a more optimized implementation of the driver function than the emulation of that driver function with a combination of core driver functions.

Referring again for a moment to FIG. 1, this Figure illustrates that the system 22 additionally comprises a driver administrator CPL applet 38 and a DDE server 40. The driver administration CPL applet 38 generates the user interface through which the user 24 communicates with the driver administrator module 32. The DDE server 40 provides the software interface through which the application program 26 communicates with the motion control component module 34.

II. Motion Control Component

The motion control component 35 will now be described in further detail with reference to FIGS. 2-10. The motion control component 35 is used by every application programming the system 22 to perform motion control operations. The major set of the API is implemented by this component. When operating, the motion control component 35 interacts with the driver administrator 32, to get the current driver, and the driver 30 and driver stub 36, to carry out motion control operations. Applications, using system 22, only interact with the motion control component 35.

This section describes the design of the motion control component 35 in three main parts. First, all binary modules that affect the component 35 are described along with their interactions with the component 35. Next, the module interaction-map is drawn in more detail to show the interactions between all C++ objects used to implement the motion control component 35. Next, the object interaction-map is tested by displaying the specific interactions that take place during certain, key process that the component 35 is requested to perform.

The module interaction-map shown in FIG. 2 displays all binary modules and their interactions with the motion control component 35. As can be seen from the module interaction-map, applications only communicate with the motion control component 35 (Component). From this point, the component 35 coordinates all interactions between the driver administrator 32, driver 30, and driver stub 36 components.

Breaking the module interaction-map and adding the interactions taking place between all C++ objects used to implement the motion control component 35, produces the object interaction-map shown in FIG. 3.

Each object in the diagram is described as follows. The CCmpntDisp object is the dispatch object used to dispatch exposed interface methods. During the dispatch process, all raw data is converted into the appropriate C++ form. For example, collections of data passed between OLE components is usually packaged in a raw block of memory. The CCmpntDisp object takes care of packing outgoing data and unpacking incoming data. Data packing involves converting the data between a raw and native C++ format.

The CDriverAdmin object is used to communicate directly with the driver administrator component. All OLE related details are encapsulated within this class.

The CDriverMgr object is used to control all unit mapping taking place before calling the appropriate SPI function. The CUnitMapper object is used to do the actual mapping between units.

The CUnitMapper object is used to map units between the Part Coordinate System (PCS) and the Machine Coordinate System (MCS). Both directions of unit mapping are done by this object.

The CDriver object is used to build the SPI table containing both core and extended SPI functions. Depending on the level of driver support, the extended functions in the SPI table may point to functions implemented in either the driver stub 36 or the driver 30.

The following discussion of FIGS. 4-8 describes all main scenarios, or operations, that occur on the motion control component 35. Each scenario-map displays all objects involved, and the interactions that take place between them in the sequence that they occur.

As shown in FIG. 4, before an application can use the motion control component 35, it must create an instance of the object, using the CoCreateInstance OLE function, and then initialize the instance calling the exposed Initialize custom interface method implemented by the component 35. FIG. 4 displays the sequence of events that take place when the Initialize method is called.

During initialization, the following steps occur. First the application must create an instance of the motion control component 35 by calling the standard OLE function CoCreateInstance. Once loaded, the application must call the component 35's exposed Initialize method. When first loaded, the component 35 loads any registration data previously stored. Next, the component 35 directs the CCmpntDisp to initialize the system. The CCmpntDisp directs the CDriverAdmin to get the current driver(s) to use. The CDriverAdmin, first, loads the driver administrator 32 using the standard OLE CoCreateInstance function. Next, it initializes the driver administrator. Then, it queries the driver administrator for the driver(s) to use and their SPI support information. Finally, the driver administrator returns the driver(s) and the support information to the component 35, and releases all interfaces used from the driver administrator component 32.

Once receiving the active driver(s) 30 and their support information, the motion control component 35 passes the driver(s) 30 to the CDriverMgr and directs it to initialize the system. During its initialization, the CDriverMgr initializes the CUnitMapper. Also while initializing, the CDriverMgr initializes a CDriver for each driver used. After initializing each CDriver, the support information is used to build each SPI table inside each CDriver object. When building the SPI table, all core and supported extended SPI interfaces are queried from the driver. Also, when building the SPI table, the CDriver queries all interfaces, not supported by the driver 30, from the driver stub 36.

Referring now to FIG. 5, once the motion control component 35 is initialized, the application 26 may perform operations on it. There are two types of operations that may take place on the component 35: Operations that use core SPI functions, and operations that use extended SPI functions. Even though the difference between the two is completely invisible to the application using the component 35, the internal interactions are different between the two. The following discussion outlines these differences.

The following interactions take place when the component 35 performs an operation that uses core SPI functions only. First the application must request the operation and pass all pertinent parameters to the component 35. Next, the component 35 directs the CCmpntDisp to carry out the operation. The CCmpntDisp then directs the CDriverMgr to perform the operation and passes all pertinent parameters to it. Before carrying out the operation, the CDriverMgr uses the CUnitMapper to convert all units to the Machine Coordinate System (MCS). Next, the CDriverMgr directs the CDriver object to carry out the operation and passes the newly mapped parameters to it. The CDriver object uses its internal SPI table to communicate directly with the core SPI function implemented by the driver component.

FIG. 6 shows the sequence of events that occurs when the component 35 is directed to carry out an operation that happens to use extended SPI not supported by the driver 30. The following steps occur when the operation is requested.

First the application must request the operation and pass all pertinent parameters to the component 35. Next, the component 35 directs the CCmpntDisp to carry out the operation. The CCmpntDisp then directs the CDriverMgr to perform the operation and passes all pertinent parameters to it. Before carrying out the operation, the CDriverMgr uses the CUnitMapper to convert all units to the Machine Coordinate System (MCS). Next, the CDriverMgr directs the CDriver object to carry out the operation and passes the newly mapped parameters to it. The CDriver object uses its internal SPI table to communicate directly with the core SPI function implemented by the driver component.

As briefly discussed above, when using the system 22, there are several types of units and two different coordinate systems used. The process of unit mapping involves converting measurements between the Part and Machine coordinate systems. FIG. 7 illustrates this process, and the following steps occur when the operation is requested.

First the application must request the operation and pass all parameters to the component 35. Note, all parameters are in the PCS. Next, the component 35 directs the CCmpntDisp to carry out the operation. The CCmpntDisp directs the CDriverMgr to carry out the operation and passes the PCS parameters to it. The CDriverMgr takes all measurements and uses the CUnitMapper to convert them to the MCS. The newly mapped parameters are then passed to the Cdriver. The CDriver directs either the driver or the driver stub component to carry out the operation.

When the application is finished using the motion control component 35 it directs the component 35 to free all of its resources by calling its exposed Release method. This process is depicted in FIG. 8. During the clean-up process, the following steps occur.

First the application must direct the component 35 to release all of its resources by calling its Release method. When invoked, the component 35 passes the call on to the CCmpntDisp object. The CCmpntDisp object directs the CDriverMgr to release any resources it is using. The CDriverMgr directs each CDriver object to release any of its resources, then deletes the CDriver objects. First, the CDriver object releases any interfaces it is using from the driver component. Then, the CDriver object releases any interfaces it is using from the driver stub component.

FIG. 9 is an interface map related to the motion control component 35. FIG. 10 is a data map showing how data relating to the whether extended driver functions need to be emulated is stored. Attached hereto as Appendix C is a document that describes the actual OLE Interfaces exposed, the definitions of the data structures used when passing data around, and the definitions of each class used internally by the motion control component 35.

III. Software Drivers

The driver 30 is used by both the driver administrator 32 and the component 35. Its main purpose is to implement functionality that generates motion control commands for the specific hardware supported. For example, the AT6400 driver, used to control the Compumotor AT6400 motion control hardware, generates AT6400 command codes. During the initialization phase of the system 22, the driver administrator 32 communicates with each driver 30, allowing the user to add, remove, or change the configuration of the driver. When an application, using the system 22, is run, the component 35 communicates with the driver 30 directing it to carry out the appropriate motion control operations.

This section describes the complete design of a generic driver 30. All drivers are designed from the base design described in this manual. This section is divided into three parts. First, a module interaction-map that describes all binary modules that interact with the driver 30 is discussed. Next, the module interaction-map is drawn as an object interaction-map, where all the internals of the driver are exposed. In this map, all C++ objects, making up the driver, and their interactions are shown. Next, several scenario-maps are drawn. Each scenario-map displays the interactions taking place between the C++ objects involved during a certain process. Finally, this section describes the interfaces exposed by the driver component, all data structures used, and the definitions of each C++ class used.

Referring now to FIG. 11, the module interaction-map displays all binary modules and their interactions with the driver 30. There are two modules that interact directly with the driver: the motion control component 35, and the driver administrator 32. The driver administrator 32 queries and changes the driver settings and the component 35 directs the driver to carry out motion control operations, such as moving to a certain location in the system. Shown at 42 in FIG. 11 is the standard Windows registration database, referred to herein as the registry.

Breaking the module interaction-map down into more detail by including the interactions taking place between all C++ objects used to implement the driver, produces the object interaction-map. The object interaction-map for the driver 30 is shown in FIG. 12.

Each object in the diagram is described as follows.

CDriverDisp is the dispatch object used to dispatch exposed interface methods. During the dispatch process, all raw data is converted into the appropriate C++ form. For example, collections of data passed between OLE components is usually packaged in a raw block of memory. The CDriverDisp object takes care of packing outgoing data and unpacking incoming data. Data packing involves converting the data between a raw and native C++ format.

The CStreamMgr object is responsible for managing the set of streams registered with the driver. Streams, may be added, removed, and enabled. Only enabled streams are sent data. The CLSID and enabled status of each stream registered, is stored in the registration database. When communicating to streams, the CStreamMgr is used to send the command string to all enabled streams.

The CCommandMgr object is used to build commands sent to the stream, and extracting responses received from the stream. The CCommandMgr is the controlling object that manages the CResponse, CCommandList, and CStream objects.

The CCommandList object stores the complete list of commands making up the motion control command language. Such commands may be stored as text resources or in a text file.

The CCommand object builds command strings that are then sent to the CStream. Each command built is a complete motion control command string.

The CResponseList object builds CResponse objects that are initialized with the parsing format for the expected response.

The CResponse object converts raw response strings, returned by the CStream, and converts them into C++ data types. For example, a response string containing position data may be converted into a set of double values.

The CStream object is used to communicate directly with the underlying stream component.

FIGS. 14-20 contain scenario maps that describe all main scenarios, or operations, that occur on the driver 30. Each scenario-map displays all objects involved, and the interactions that take place between them in the sequence that they occur.

There are two types of operations that occur on the driver 30. First, the driver administrator 32 may initiate operations, such as adding streams or configuring the driver. Next, the motion control component 35 may initiate operations on the driver when an application is actually running. The following discussion describes each perspective, starting with the operations directed by the Driver Administrator; all operations made on the driver by the driver administrator are discussed in the order that they may occur when using the driver.

Before a driver may be used, it must be registered in the OLE system. In order to register a driver the driver administrator first verifies that the module being registered is actually an driver 30, then it calls the DLLRegisterServer exported function to register the driver. Each module of the system 22 exports a function called DLLGetModuleType. This function is used to verify that the module is a driver 30 component. FIG. 13 displays the interactions that take place when registering a driver.

During the registration process shown in FIG. 13, the following steps occur. First, the driver administrator must load the DLL, containing the stream component, verify that the module is an driver 30. To do so, the driver administrator calls the DLLGetModuleType function, exported by the driver. If the function returns a value that contains the value XMC_DRIVER_MT in the high byte, then the driver administrator proceeds and registers the driver by calling its exported function, DLLRegisterServer. When called, the implementation of the DLLRegisterServer writes all OLE 2.0 registration information to the Windows registration database.

Referring now to FIG. 14, after the driver is registered, the driver administrator can load the component 35 using the OLE CoCreateInstance function. During the initialization process, the driver loads all registration data and initializes both the CDriverDisp and CStreamMgr C++ objects.

During initialization, the following steps occur.

Before loading the driver component, the driver administrator must query the driver module for its CLSID. Calling the driver's exported function, DLLGetCLSID, returns the CLSID. Once it has the CLSID, the driver administrator may create an instance of the driver by calling the standard OLE function CoCreateInstance. When first loaded, the driver loads any registration data previously stored. Next, the driver directs the CDriverDisp object to initialize the system. When notified, the CDriverDisp object initializes itself and then directs the CStreamMgr to initialize itself. During its initialization, the CStreamMgr loads all stream settings from the registration database. For example, the CLSID and enabled state of all streams previously registered with the driver, are loaded.

After initializing the driver, the driver administrator may perform operations on it. For example, the driver administrator may request the driver to add or remove a stream. FIG. 15 displays the sequence of events occurring when the driver is requested to add a new stream. When adding a stream, the following steps occur.

First the driver administrator directs the stream to add a new stream and passes CLSID of the stream, to be added, to the driver. The driver then passes the CLSID to the CDriverDisp object and directs it to add the stream. The CDriverDisp object passes the information on to the CStreamMgr and directs it to add the stream. In the final step, the CStreamMgr assumes that the module is a valid stream component 28 and adds the CLSID to the drivers set of information in the registration database.

Another operation requested of the driver, after initialization, is that of querying it for its current settings. Before displaying information about the driver, like the name of the hardware it supports, the driver administrator must query the driver for the information. For example, FIG. 16 displays the process of querying the driver for an enumeration of the streams registered with it. When querying the driver for information, the following steps occur.

First the driver administrator calls the interface method used to query the driver's stream enumeration. Next, the driver directs the CDriverDisp to create the stream enumeration. The CDriverDisp object then directs the CStreamMgr to prepare the stream enumeration. The CStreamMgr checks the registration database and makes sure its internal state is in sync with the data stored in the registry. Next, it sets a lock that will cause all stream management operations, such as adding or removing streams, to fail. The CStreamMgr prepares the list of streams and loads them into memory using the CStream object. The CStream object loads the stream component using the OLE CoCreateInstance API.

After the driver administrator is done using the driver, it must release the driver by calling its exposed Release method. Calling this method, directs the driver to release all resources used. FIG. 17 displays the process of releasing the driver component. During the clean-up process, the following steps occur.

First the driver administrator must direct the driver component to clean itself up by calling its Release method. When invoked, the driver component passes the call on to the CDriverDisp object. The CDriverDisp object then directs the CStreamMgr to save all data. The CStreamMgr saves all data, including the state of each stream, in the registration database. Finally, the driver saves all internal data in the registration database.

After a driver is successfully installed into the system 22 and configured using the driver administrator, it is ready for use by the motion control component 35. The component 35 uses the driver 30 when performing motion control operations requested from the application using the component 35. The following discussion describes the component 35 directed operations that can take place on the driver.

Before using the driver, it must be initialized by the component 35. This operation is different from the driver initialization taking place on the driver when used by the driver administrator because the system must be prepared for sending and receiving commands. In order to prepare for the data communication, the stream must be initialized and then opened. FIG. 18 describes the initialization process. The following steps occur during the initialization process.

First the component 35 must direct the driver to initialize itself. This is usually a two step process. In the first step, the component 35 creates and instance of the driver using the standard OLE CoCreateInstance function. Next, the Initialize method, exposed by the driver, is called to prepare the driver for data transmissions. When the Initialize method is called, the driver first loads any internal data stored in the registration database 42. Next, the driver directs the CDriverDisp to initialize the internal system. The CDriverDisp then directs the CStreamMgr to initialize the streams. Next, the CStreamMgr loads all data from the registration database, including the set of all CLSID's and enabled status' for all streams registered with the driver. Then the CStreamMgr loads each enabled stream by creating a new CStream object for each enabled stream. When creating each CStream object, the CLSID for the underlying stream is passed to the CStream object. When each CStream object is created and attached to a stream component it loads the component 35 by calling the standard OLE CoCreateInstance function. Once the CStreamMgr is done, the CDriverDisp directs the CCommandMgr to initialize itself. During its initialization process, the CCommandMgr initializes and loads the CCommandList. Also, when the CCommandMgr is initializing, it loads the CResponseList corresponding to the CCommandList.

Once the system is initialized, the motion control component 35 can direct the driver to carry out certain command operations. Command operations are standard motion control operations such as moving to a specific location in the system, or querying the system for the current position. FIG. 19 describes the process of commanding the driver to carry out a certain operation. When commanding the driver to perform a certain operation the following steps occur.

First, the component 35 directs the driver to perform the operation, such as moving to a position or querying the system for the current position. Next, the driver directs the CDriverDisp object to perform the operation. The CDriverDisp object then directs the CCommandMgr to build the appropriate command. Any parameters related to the command are passed to the CCommandMgr. For example, when directing the driver to move to a certain position, the position information is passed to the CCommandMgr. Next, the CCommandMgr requests the CResponseList to create a CResponse object. The CResponseList looks up the response format and uses it to create a new CResponse object that is returned to the CCommandMgr. Then, the CCommandMgr directs the CCommandList to create the command. Any parameters related to the command are passed to the CCommandList. The CCommandList creates a new CCommand object, looks up the raw command string, and passes it and the command parameters to the CCommand object who then builds the command string.

The CCommandMgr, then passes the CCommand object, returned by the CCommandList, and the previously created CResponse object to the CStreamMgr object. The CStreamMgr object is directed to process the objects. The CStreamMgr passes the CCommand and CResponse objects to all enabled CStream objects. The CStream object queries the CCommand object for the full command string in raw text form. The raw text command is passed to the stream component. Next, the CStream object waits for the response, then reads the raw text response into a buffer. The raw text response is then passed to the CResponse object. Next the CRETONNE object is returned to the CStreamMgr, who returns it to the CCommandMgr, who returns it to the CDriverDisp object. Eventually the CResponse returns to the CDriverDisp object, who then directs the CResponse to convert the response into a generic C++ type. The generic type is returned to the motion control component 35.

Once the component 35 is finished using the driver, the driver must be released by calling its Release method. Releasing the driver frees all resources used by the driver. FIG. 20 describes the process of releasing the driver. The following steps occur when cleaning up and freeing all resources used by the driver.

First, the component 35 must call the driver's Release method. When called, the driver directs the CDriverDisp object to release any resources used. The CDriverDisp then directs the CStreamMgr to free any resources used. The CStreamMgr then frees all active CStream objects. Each CStream object releases all stream component interfaces used. Next the CDriverDisp directs the CCommandMgr to free all of its resources. During its clean-up, the CCommandMgr frees the CCommandList object. To complete its clean-up, the CCommandMgr frees the CResponseList object.

Attached hereto as Appendix D is a document that describes the actual OLE Interfaces exposed, the definitions of the data structures used when passing data around, and the definitions of each class used internally by the driver.

IV. Streams

This section describes the stream component 28 used as the data transport layer between the driver 30 component and the destination output location such as the motion control device 20 and/or the output file 34. For example, when using motion control hardware that is connected to the PC Bus, the driver 30 Component will communicate with the PC Bus stream component 28.

The design of a stream component 28 will be discussed in three parts. First, a Module Interaction-Map describes the modules that are involved, with respect to the stream, and how they interact with one another. Next, the Object Interaction-Map breaks the Module Interaction-Map down into a more detailed view that not only displays the interactions occurring between modules, but also the interactions taking place between the C++ objects within the stream component 28. Then, the Object Interaction-Map is "tested" by running it through several Scenario-Maps. Each Scenario-Map displays the object interactions taking place during a certain operation.

The Module Interaction-Map shown in FIG. 22 displays all modules that interact with the stream component 28. Interactions begin from two different perspectives. First, the driver administrator 32 interacts with the stream component 28 when installing, removing, and configuring the stream. Next, when used, each driver 30 interacts with the stream while sending and retrieving data to and from the destination. For example, when a driver writes data to a text file stream, the stream takes care of writing the data out to the file. Or, if the driver reads data from a PC Bus stream, the stream does the actual read from the hardware and passes the data back to the driver.

Drivers only communicate with streams that have been specifically connected to the driver. Once connected, the stream is used to communicate with the destination object, like the PC Bus, serial I/O connection, text file, or debug monitor.

The stream component 28 shown in FIG. 22 is the object that operates as the data transport layer for each driver. Each stream has a different target that defines the type of the stream. The following are the current stream targets.

PC Bus/WinNT—This Windows NT stream uses a Windows NT .SYS device driver to communicate directly with the motion control hardware connected to the PC Bus.
  PC Bus/Win95—This Windows 95 stream uses a Windows 95 VxD to communicate directly with the motion control hardware connected to the PC Bus.
  PC Bus/Win 3.1—This Windows 3.1 stream communicates directly with the motion control hardware connected to the PC Bus.
  Serial—This stream uses the COMM API to communicate with the motion control hardware connected to the serial port.
  Text File—This stream is write-only and sends all data to a text file.
  Debug Monitor—This stream is write only and sends all data to the debug monitor.
  Custom—This is a custom stream that sends data to an unknown location.

Similar to the Module Interaction-Map, the Object Interaction-Map displays interactions between modules. In addition, this map, shows all interactions taking place between each C++ object within the stream component 28. FIG. 23 is the Object Interaction-Map for the stream component 28.

Each object in the diagram is described as follows. The CStreamDisp object is the dispatch object used to dispatch exposed interface methods. During the dispatch process, all raw data is converted into the appropriate C++ form. For example, collections of data passed between OLE components is usually packaged in a raw block of memory. The CStreamDisp object takes care of packing outgoing data and unpacking incoming data. Data packing involves converting the data between a raw and native C++ format.

The CRegistryMgr object takes care of managing all data stored in the registration database. Since many streams of the same type may exist at the same time, each stream is assigned a handle. The handle assigned, is used by the stream to look up the location it uses to load and store data in the registration database, much as an library index is used to locate a library book.

All input and output is funnelled through the CIOMgr manager. Management of input and output operations consists of buffering data and controlling primitives used to transport data to and from the target location.

The CIOHAL object is the input/output hardware abstraction layer. With in this object lay all hardware dependent code such as calls to inp and outp. Each different type of stream contains a different implementation of this object.

Scenario-Maps are specialized Object Interaction-Maps that display how each module and the objects inside the stream component interact with one another during the operation described by the map. The Scenario-Maps in FIGS. 24-32 are broken into two different categories; those that are initiated by the driver administrator 32, and those that are initiated by the driver 30.

Operations directed by the driver administrator are usually related to initializing, uninitializing, and configuring the stream. The following sections describe all operations, directed by the driver administrator, that take place on the stream.

Before a stream component can be used by anyone, it must be registered in the Windows registration database. Registration is a standard OLE 2.0 operation required in order to use any OLE 2.0 component, such as the stream component. FIG. 24 describes this process. During the registration process, the following steps occur.

First, the driver administrator must load the DLL, containing the stream component, verify that the module is an stream component 28. To do so, the driver administrator calls the DLLGetModuleType function, exported by the stream. If the high byte in the return value contains the value XMC_STREAM_MT, then the driver administrator proceeds and registers the stream by calling its exported function, DLLRegisterServer. When called, the implementation of the DLLRegisterServer writes all OLE 2.0 registration information to the Windows registration database.

After the stream component is successfully registered, it is ready for initialization. During initialization, the stream component not only initializes itself, but also initializes any device drivers used by registering the driver with the operating system. For example, the Windows NT stream component registers the Windows NT .SYS driver with Windows NT and starts the service. FIG. 25 describes this process. During initialization, the following steps occur.

First the driver administrator must direct the stream to initialize itself. When making this call, the name and location of the driver used, and the handle of the stream are passed into the method as arguments. Once directed to initialize itself, the stream component calls the CStreamDisp and directs it to initialize the system. The CStreamDisp object then directs the CRegistryMgr to load all pertinent data for the stream using the handle passed to it. The CRegistryMgr loads all data from the registration database. After all information is loaded from the registry, the CStreamDisp directs the CIOMgr to register the appropriate driver with the operating system. The CIOMgr directs the CIOHAL to register the driver, if appropriate. If running in Windows NT, the CIOHAL registers the .SYS driver with the Windows NT operating system and starts the driver. If running in Windows 95, the VxD integrity is verified with a quick, dynamic, load and unload.

After initializing the stream component, it may be queried for its current settings or directed to set new settings. Since both operations are very similar, only changing settings will be described. Stream settings include data such as: port addresses, IRQ levels, file names, etc. Any data needed to communicate with the output/input target are included in the stream settings. FIG. 26 describes the process of changing the streams settings. During the setup process, the following steps occur.

First the driver administrator directs the stream to use the data passed to change its internal data. Once directed, the stream component passes the interface method invocation to the CStreamDisp object. The CStreamDisp object then directs the CRegistryMgr to store the new settings. The CRegistryMgr stores the new values in the registration database.

When the driver administrator is done using a stream component, it must clean up the resources used. FIG. 27 describes this process. During the clean-up process, the following steps occur. First the driver administrator must direct the stream component to clean itself up by calling its Release method. When invoked, the stream component passes the call on to the CStreamDisp object. The CStreamDisp object then directs the CRegistryMgr to save all data. All persistent data is saved to the registration database by the CRegistryMgr.

Driver directed operations occur when each driver 30 uses the stream component 28 connected to it. Remember, each stream component is used as the data transport layer. Each driver uses the stream to transfer the motion control command data, it generates, to the output target. Streams are also used to transfer data back to the driver when read operations occur. Only certain streams are readable.

Before the driver can perform operations on the stream, the stream must be initialized. Initialization occurs in two steps. First the OLE stream component must be loaded, and then once it is, the stream must be explicitly initialized. FIG. 28 describes the second portion of the initialization process. The following steps occur during the initialization process.

First the driver must invoke the Initialize methods exported by one of the stream interfaces. When calling Initialize, the driver passes to the stream, the stream handle. Next, the stream passes the directive on to the CStreamDisp object for dispatching. The CStreamDisp object first directs the CRegistryMgr to load all settings stored in the location defined by the stream handle. The CRegistryMgr reads in the data stored in the registry at the handle. After the data is loaded, the CStreamDisp, directs the CIOMgr to initialize itself. As part of its initialization, the CIOMgr initializes the CIOHAL object that it is using.

Once a stream has been initialized, it must be opened. Opening a stream places the stream in a state where it can pass data between the driver and the target. FIG. 29 describes the process of opening a stream. When opening a stream, the following steps occur.

First the driver directs the stream to open itself, by calling the Open exposed interface method. Once directed, the stream passes the call on to the CStreamDisp object. Next, the CStreamDisp object directs the CIOMgr to open the stream. At this time, the CIOMgr prepares any buffers that will later be used when transferring data through the stream. After the buffers are ready, the CIOMgr directs the CIOHAL object to interact with the target and open it. CIOHAL directly communicates with the target or with a device driver and opens the stream. When operating with hardware streams, the device driver, or Serial IO directly communicates with the hardware and prepares it for operation.

After opening a stream, it is ready to perform data transport operations. There are two main data transport operations available: Reading data, and writing data. FIG. 30 describes the process of writing data to the stream. When writing to the stream, the following steps occur. First the driver directs the stream to write data to the target and passes the data to the stream. Next, the stream passes the data to the CStreamDisp object. The CStreamDisp object passes the block of data to the CIOMgr and directs it to write it to the target. The CIOMgr object either passes the complete block of data to the CIOHAL object, or stores the block in an internal buffer and then passes pieces of the buffer to the CIOHAL object until the complete buffer is sent. The CIOHAL object takes the data passed to it and either sends it directly to the target, passes it to a device driver, or calls COMM API to send the data to the Serial IO port. The device driver or COMM API sends the data directly to the hardware controlled.

Certain streams, like the PC Bus and Serial IO streams, return data after write operations occur on them. The data returned may be specific to a previous request for data, or status describing the success or failure of the previous write operation. FIG. 31 describes the process of reading data from the stream. It should be noted that not all streams are readable. Currently, the only readable streams are the PC Bus and Serial streams. During the operation of reading data from the target, the following steps occur.

First the driver directs the stream to read data from the target. The stream passes the call on to the CStreamDisp object. The CStreamDisp object directs the CIOMgr to perform the read. Depending on how the stream is implemented, the CIOMgr may either make one call or multiple calls to the CIOHAL object. If multiple calls are made, all data read is stored in CIOMgr internal buffers. The CIOHAL object either directly communicates to the hardware, uses the COMM API, or a device driver to read the data. If a device driver or the COMM API are used, they directly communicate with the hardware to read the data.

Once the driver is done using the stream, it must direct the stream to clean-up all resources used. To do so, the driver calls the standard Release method. FIG. 32 displays the sequence of events taking place after the Release method is called. The following steps occur when cleaning up and freeing all resources used by the stream.

First the driver must call the stream's Release method. Next, the stream directs the CStreamDisp object to release all resources used. The CStreamDisp object then directs the CIOMgr to free any resources used in buffers, etc. Next, the CIOMgr directs the CIOHAL to free any resources used. During its clean-up and depending on the type of stream, the CIOHAL will delete text files used, close the debug monitor, shut-down the hardware, or direct any device drivers to shut-down the hardware. If device drivers or the COMM API are used, they direct the hardware to shut-down.

FIG. 33 depicts an interface map for the stream 28. Attached hereto in Appendix E is a document that describes the actual OLE Interfaces exposed, the definitions of the data structures used when passing data around, and the definitions of each class used internally by the stream.

V. Driver Stub Module

The driver stub module 36 is used to fill in the extended SPI functions that the driver 30 is unable to support or implement. By simulating the extended SPI, applications are able to use a larger set of motion control functionality than would be available if the application directly programmed the motion control hardware. In order to implement the extended SPI, the driver stub uses software algorithms that call core SPI interface methods implemented by the driver 30. During the initialization of the driver stub, the driver 30 to use is registered with the driver stub.

This section describes all aspects of the driver stub 36 in three basic parts. The first part of this section describes all binary modules affecting the driver stub. Next, a more detailed view, that includes all C++ objects used inside the driver stub, is described. Then several processes that take place on the driver stub are described.

The module interaction-map displays all binary modules and their interactions with the driver stub 36. As can be seen from FIG. 34, the driver stub is used by the component 35. More or less, the driver stub acts as a helper to the component 35 by filling in all extended SPI functionality possible.

By taking the module interaction-map in FIG. 34 and displaying all interactions taking place with all C++ objects implementing the driver stub, we produce what is called the object interaction-map. FIG. 35 is the object interaction-map for the driver stub 36 component.

Each object in the diagram is described as follows.

The CDriverStubDisp object is the dispatch object used to dispatch exposed interface methods. During the dispatch process, all raw data is converted into the appropriate C++ form. For example, collections of data passed between OLE components is usually packaged in a raw block of memory. The CDriverStubDisp object takes care of packing outgoing data and unpacking incoming data. Data packing involves converting the data between a raw and native C++ format.

The CSPIMgr object is responsible for managing all SPI issues such as managing the CSimpleDriver by directing it to connect to the appropriate SPI core interfaces exposed by the driver.

The CSimpleDriver object is used to directly communicate with the driver implementing the SPI core interfaces. The CSimpleDriver only communicates with the core SPI interfaces implemented by the driver.

The following discussion describes all main scenarios, or operations, that occur on the driver stub 36. Each scenario-map displays all objects involved, and the interactions that take place between them in the sequence that they occur. All operations on the driver stub originate from the motion control component 35. In addition to the motion control component 35, the XMC Setup Component interacts with the driver stub when installing the system 22. It should be noted that all scenarios below assume that the driver stub 36 has already been registered in the OLE system. Registering this component is the responsibility of the setup application and setup component.

This discussion describes all operations made on the driver stub by the motion control component 35. Each section is discussed in the order that they may occur when using the driver.

As shown in FIG. 36, before using the driver stub 36, the motion control component 35 must initialize it by creating an instance of the driver stub, and then initializing the instance created. Calling the standard OLE function CoCreateInstance completes the first step. After an instance is created, the component 35 must call the driver stub exposed Initialize interface method. During initialization, the following steps occur.

The component creates an instance of the driver stub by calling the standard OLE function CoCreateInstance. Once loaded, the CLSID of the driver to use is passed to the driver stub when calling its Initialize exposed interface method. When first loaded, the driver loads any registration data previously stored. Next, the component 35 passes the CLSID, of the driver to use, to the CDriverStubDisp object and directs it to initialize the system. The CDriverStubDisp object then directs the CSPIMgr to initialize itself and passes the driver CLSID to it. The CSPIMgr passes the CLSID to the CSimpleDriver and directs it to only query the core SPI interfaces exposed by the driver. The CSimpleDriver loads an instance of the driver then queries all core interfaces exposed by the driver.

Once the driver stub is initialized, it is ready to perform operations such as performing extended SPI functions. FIG. 37 describes the steps that occur when the component 35 directs the driver stub to perform an extended SPI operation. The following steps occur when the operation is requested.

First the component 35 must request the operation and pass all pertinent parameters to the driver stub. Next, the driver stub directs the CDriverStubDisp to handle the operation. The CDriverStubDisp then directs the CSPIMgr to perform the SPI extended function and passes the appropriate XMC_EXT_SPI identifier as a parameter. The CSPIMgr calls the appropriate function corresponding to the XMC_EXT_SPI identifier. The function simulates the extended SPI function and calls the CSimpleDriver for core operations. When directed, the CSimpleDriver performs SPI core functions by directly calling the exposed interfaces implemented by the driver.

When the motion control component 35 is finished using the driver stub 36, it must release it by calling the exposed Release method. Calling the Release method causes the driver stub to free all the resources it uses. FIG. 38 displays this sequence of events. During the clean-up process, the following steps occur.

First the component 35 must direct the driver stub to release all of its resources by calling its Release method. When invoked, the driver component passes the call on to the CDriverStubDisp object. The CDriverStubDisp object then directs the CSPIMgr to release any resources that it was using. The CSPIMgr releases all resources including the CSimpleDriver object used. When freed, the CSimpleDriver releases any interfaces used from the driver.

FIG. 39 is an interface map of the driver stub module 36. Attached hereto as Appendix F is a document that describes the actual OLE Interfaces exposed, the definitions of the data structures used when passing data around, and the definitions of each class used internally by the driver.

VI. Driver Administrator Module

The driver administrator 32 is used from two different perspectives. When the driver administrator Control Panel Applet 38 is used to configure the system, the applet directs the driver administrator 32 to carry out the operations. The applet 38 simply provides the user-interface, and the component 35 does the real work of managing drivers and streams used with the system 22. Using the driver administrator component with the control panel applet is the first perspective on using the component 35.

In the second perspective, the motion control component 35 uses the driver administrator component to query for the current set of enabled the driver 30. It should be noted that, currently, only single driver operation is allowed. Clearly, the system 22 may support multiple drivers that are virtualized. For example, if two, four axis, drivers are installed, applications using the system could act as though they were using an eight axis system.

This section describes the driver administrator 32 in three main parts. First, all modules interacting with the driver administrator component are described along with their interactions. Next, the module interaction-map is expanded to display all interactions taking place between the C++ objects used to implement the driver administrator 32 Component. This description is called the object interaction-map. Then, the object interaction-map is tested by running it through several scenarios, or scenario-maps. Each scenario-map displays the events and the order in which they occur in a certain process taking place on the driver administrator component.

The module interaction-map shown in FIG. 40 displays all binary modules and their interactions with the driver administrator 32 Component. Both the driver administrator CPL 38 and the motion control component 35 are the main modules that interact with the driver administrator 32 Component.

The driver administrator CPL module 38 provides the user-interface that allows the user to add, configure, and remove drivers and streams in the system 22. The driver administrator 32 handles all driver and stream management. Even though the control panel applet provides the user-interface, this module 32 does the actual management work.

In addition, the driver administrator is used by the component 35 to access the current driver(s) to use when carrying out motion control operations. For example, if the AT6400 driver is selected as the current driver when the component 35 queries the driver administrator, the driver administrator returns the CLSID of the AT6400 driver.

Taking the driver administrator 32, displayed in the module interaction-map, and displaying all interactions occurring between the C++ objects used to implement the administrator 34, produces the object interaction-map therefor. The object interaction-map for the driver administrator 32 is shown in FIG. 41.

Each object in the diagram is described as follows.

The CDriverAdminDisp object is the dispatch object used to dispatch exposed interface methods. During the dispatch process, all raw data is converted into the appropriate C++ form. For example, collections of data passed between OLE components is usually packaged in a raw block of memory. The CDriverAdminDisp object takes care of packing outgoing data and unpacking incoming data. Data packing involves converting the data between a raw and native C++ format.

The CDriverInfoMap object is used to build the information used by the driver administrator CPL 38 when displaying information about each driver or stream.

The CModuleMgr object is responsible for managing all stream and driver modules in the system. A list of all drivers registered are stored persistently in the registration database by the CModuleMgr. Each time a driver or stream is accessed the CModuleMgr is used to get the module.

The CSimpleDriver object is used to directly communicate with the driver component. All OLE specific details are encapsulated within this object.

The CSimpleStream object is used to directly communicate with the stream component. All OLE specific details are encapsulated within this object.

FIGS. 42-49 describe all main scenarios, or operations, that occur on the driver administrator 32. Each scenario-map displays all objects involved, and the interactions that take place between them in the sequence that they occur.

Referring now to FIG. 42, before using the driver administrator component, it must be initialized. FIG. 42 describes the process of initializing the driver administrator component from either the driver administrator control panel applet or the motion control component. During initialization, the following steps occur.

First, either the control panel applet or the motion control component must create an instance of the driver administrator component by calling the standard OLE function CoCreateInstance. Next, the exposed Initialize interface method must be called. When the Initialize method is called, the driver administrator component directs the CDriverAdminDisp to initialize the system. Next, the CDriverAdminDisp directs the CModuleMgr to initialize itself and any modules that it is managing. The CModuleMgr, first, loads all information from the registration database. Then for each driver registered, the CModuleMgr creates an instance of the driver by calling the standard OLE function CoCreateInstance. Next, the CModuleMgr calls each drivers Initialize method, passing to the method the CLSID of the driver component to attach. The CSimpleDriver attaches to the driver component by calling the standard OLE function CoCreateInstance.

The driver administrator 32 can register both drivers and streams. Registering drivers is very direct, since the driver administrator manages the drivers registered in the system. Registering streams, on the other hand, is more complex, since each stream must be registered with a driver and the driver manages the streams registered with it, not the driver administrator. The following discussion describes the process of registering both drivers and streams.

Registering a driver entails verifying that the module is actually a driver, verifying that the driver can be loaded, and storing the driver information in a persistent location. FIG. 43 describes this process. When registering a driver, the following steps occur.

First, the driver administrator CPL passes the name of the driver and directs the driver administrator component to register it. Next, the driver administrator component passes the driver name to the CDriverAdminDisp and directs it to register the module. The CDriverAdminDisp directs the CModuleMgr to register the new driver. The CModuleMgr creates a new CSimpleDriver and requests it to register the driver. First the CSimpleDriver verifies that the driver is valid by calling its DLLGetModuleType exported function. If the function returns XMC_DRIVER_MT the CSimpleDriver then calls the driver's exported function DLLRegisterServer to register the module in the OLE system. Next the CLSID is queried from the module by calling its exported DLLGetCLSID function. The CLSID returned is then used to load the driver by calling the standard OLE function CoCreateInstance. If the CSimpleDriver is successful, the CModuleMgr stores the driver CLSID in the registration database.

Registering a stream is similar to registering a driver, but a little more complex, since each stream must be registered with a specific driver. FIG. 44 displays the process of registering a stream. When registering a stream, the following steps occur.

First, the driver administrator CPL passes the CLSID of the driver and the filename of the stream to register with the driver, to the driver administrator component. The driver administrator component directs the CDriverAdminDisp to register the stream. The CDriverAdminDisp object directs the CModuleMgr to register the stream and passes the CLSID of the driver and the name of the stream along to it. First, the CModuleMgr verifies that the CLSID of the driver one of the registered drivers. If it is not, the driver is registered as discussed above.

Next, the CModuleMgr creates a new CSimpleStream object and directs it to verify and load the stream component. The CSimpleStream first verifies that the module is actually an stream component 28 by calling its exported DLLGetModuleType function. If the function returns XMC_STREAM_MT, the CSimpleStream continues and registers the stream component by calling its DLLRegisterServer exported function. Finally, the CSimpleStream object queries the new module for its CLSID by calling the module's exported DLLGetCLSID function. The new CLSID is used, by the CSimpleStream, to load the stream component using the standard OLE function CoCreateInstance. If the CSimpleStream succeeds, the CLSID of the stream is passed along to the CSimpleDriver who is directed to register the stream. The CSimpleDriver passes the CLSID to the driver component and directs it to register the stream.

The following discussion describes setting information in either a driver or stream. When the user edits information in the driver administrator control panel applet 38, the applet 38 directs the driver administrator 32 to edit the settings for the stream or driver being edited. The following discussion describes how this configuration process works.

Editing the settings of a driver takes place when the user changes the driver settings displayed in the driver administrator CPL. Changing these settings causes the process described in FIG. 45 to occur within the driver administrator component. The following steps occur when setting the driver configuration.

When driver settings are changed in the CPL 38, the driver administrator CPL directs the driver administrator component to make the appropriate changes to the driver corresponding to the driver handle. A XMC_DRIVER_INFO structure is passed to the component 35, describing the new values for the driver. The driver administrator component takes the XMC_DRIVER_INFO structure and the handle to the driver and passes the information to the CDriverAdminDisp object, directing it to change the settings in the driver.

The CDriverAdminDisp object directs the CModuleMgr to edit the driver corresponding to the driver handle. The CModuleMgr locates the CSimpleDriver with the handle and directs it to change its settings to those stored in the XMC_DRIVER_INFO structure. The CSimpleDriver passes the XMC_DRIVER_INFO structure to the driver component and directs it to change its settings.

As shown in FIG. 46, when the user edits stream settings in the driver administrator CPL 38, the following steps occur.

After the user changes settings for the stream in the CPL, the driver administrator CPL directs the driver administrator component to change the stream's settings and passes a handle to the driver containing the stream, a handle to the stream, and a XMC_STREAM_INFO structure describing the new values. The driver administrator component directs the CDriverAdminDisp object to change the streams settings. The CDriverAdminDisp object directs the CModuleMgr to change the settings of the stream corresponding to the handle.

First, the CModuleMgr locates the driver corresponding to the driver handle. Next, it requests the CSimpleDriver to change the settings for the stream corresponding to the stream handle. The CSimpleDriver searches for the stream corresponding to the stream handle and directs it to change its settings to those stored in the XMC_STREAM_INFO structure. The CSimpleStream directly communicates with the stream component and directs it to change its settings to those in the XMC_STREAM_INFO structure.

There are two different types of information that may be queried from the driver administrator 32: the enumeration of all drivers registered, and the driver information map. The motion control component 35 uses the driver enumeration when selecting the set of drivers to use and control during motion control operations. The driver information map, on the other hand, is used by the driver administrator CPL 38 to update the user-interface display describing all drivers and streams registered in the system. The following discussion describes the process of querying for both the driver enumeration and the driver information map.

Querying for the driver enumeration occurs during the initialization of the motion control component 35. When initializing, the component 35 must know what drivers to use when performing motion control operations. The driver administrator 32 Component is used for that very purpose. Querying the driver enumeration just returns a pointer to the IXMC_EnumDriver interface exposed by the driver administrator 32 Component. FIG. 47 displays the events that occur when using the interface to get each driver in the enumeration. Using the interface causes, the following steps occur.

First, the motion control component 35 queries the driver administrator 32 Component for the next driver. Next, the driver administrator 32 Component directs the CDriverAdminDisp to get the next driver supported. The CDriverAdminDisp directs the CModuleMgr to get the next driver. The CModuleMgr then directs the CSimpleDriver to either return the CLSID or a pointer to the IUnknown interface for the driver, depending on the parameters of the enumeration. If the CSimpleDriver is requested to return a pointer to the IUnknown interface, the interface is queried from the driver component.

Another set of information that may be queried from the driver administrator 32 consists of the driver information map. This data is used by the driver administrator CPL 38 when displaying information describing the drivers and streams registered in the system. As shown in FIG. 48, when querying the system for the driver interface map, the following steps occur.

First, the driver administrator CPL 38 queries the driver administrator 32 Component for the current driver information map. When queried, the driver administrator component directs the CDriverAdminDisp to create and load a CDriverInfoMap class. The CDriverAdminDisp creates the CDriverInfoMap. Next, the CDriverAdminDisp passes the CDriverInfoMap to the CModuleMgr and directs it to load the information map. The CModuleMgr queries each driver registered for its internal information. Each CSimpleDriver communicates directly with the driver component and queries it for all pertinent driver information. Next, the CModuleMgr queries each driver for a list of all streams registered with the driver. Using the stream enumeration, each CSimpleDriver creates an array of CSimpleStream objects and returns the array to the CModuleMgr. For each CSimpleStream object in each array, the CModuleMgr queries for all pertinent stream information. Each CSimpleStream communicates directly with the stream component and queries it for all information describing the stream.

After the driver administrator CPL 38 or the motion control component 35 are finished using the driver administrator 32, they must release the component 35 to free any resources it was using. FIG. 49 describes this process. When cleaning up after a call to the Release method, the following steps occur.

First, either the driver administrator CPL 38 or the motion control component 35 must direct the driver administrator 32 Component to release itself by calling its Release method. Next, the driver administrator component directs the CDriverAdminDisp object to free all resources used in the system. The CDriverAdminDisp then directs the CModuleMgr to free any resources that it is using. First, the CModuleMgr traces through all CSimpleDriver objects, querying each for their CLSID and enabled state. Next, each CSimpleDriver is freed. Each CSimpleDriver object freed, frees all arrays of CSimpleStream objects registered with it. When freed, each CSimpleStream object releases all interfaces that it was using from the stream component. In its final clean-up, each CSimpleDriver releases all interfaces that it was using from the driver component. All CLSID and enabled state information is stored persistently in the registration database.

FIG. 50 depicts an interface map for the driver administrator 32. Also, attached hereto as Appendix G is a document that describes the actual OLE Interfaces exposed, the definitions of the data structures used when passing data around, and the definitions of each class used internally by the driver administrator 32 component.

VII. Driver Administrator CPL Applet

This document describes the design of the driver administrator control panel applet 38 (CPL) that is used by the user to add, configure, and remove both drivers 30 and stream components 28 later used by the component 35 when directed to carry out motion control operations. With regard to design, there are three main types of "views" used to look at how the control panel applet works.

First, a module interaction map shown in FIG. displays all main executable and user-interactable items, or modules, that the CPL uses and interacts with. For example, when a dialog is displayed by the CPL executable, both the dialog and the CPL modules are considered to interact with one another. Technically, the dialog is not a module since it is a figment displayed on the screen, but none the less, module interaction maps classify them as such since they are key destination points for user-input.

Second, an object interaction map shown in FIG. 52 displays all main objects making up the modules described in the module interaction map. Objects consist of the actual instances of C++ classes defining each object. All interactions between the objects are drawn out in this interaction map.

Finally, FIGS. 53-57 display a set of scenario maps are drawn out using the object interaction map as a basis. Scenario interaction-maps describe the interactions taking place during a specific operation. Initialization, Adding a driver to the system, and Viewing the support offered by a driver, are all examples of a scenario interaction-map.

The design goals for the driver administrator 32 are the following:

1. User-Interface separation—Implement all user-interface elements used to control the driver administrator 32 Component.
2. Upgradable to OCX Client—Eventually each driver and stream may implement all UI elements with an OCX that then passes all input to the corresponding driver or stream. The driver administrator CPL 38 must be designed in a way that is easy to upgrade to become an OCX client.
3. Provide Stream Independence—drivers 30 should not be required to use streams 28 in order to operate. The design of the driver administrator 32 must make amends to ensure that it is not dependent on stream component 28 operations to operate.
4. Use Windows 95 UI—When ever possible, Windows 95 UI elements should be used. For example, TreeViews, ImageLists, Button Bars, Tab Dialogs and any other UI elements should be put to use to ensure a Windows 95 look-and-feel.

The following discussion describes the module interaction map for the control panel applet 38. A module is defined as either an executable binary, an external data file, or a main user-interface element used when interacting with the user. FIG. 51 is a drawing of all modules that interact with each other when running the driver administrator control panel applet.

The driver administrator CPL 38 is a control panel applet. And, a control panel applet is a special DLL that exports several functions allowing the Windows Control Panel to communicate with the applet.

The Driver Administrator Dialog is the main dialog that appears when selecting the control panel applet icon from the Windows Control Panel.

The Browse Dialog is used to query the user for a filename. For example when adding a new stream or driver, the driver administrator uses this dialog to ask the user for the location of the new driver or stream to add.

The View Support Dialog displays the support provided by the selected driver 30. Each driver may support a different set of extended functionality. This dialog shows the user exactly how much support is provided by each driver allowing them to determine which functions within their application may not operate when using the driver.

Unlike the Module Interaction-Map described above, the Object Interaction-Map shown in FIG. 52 describes how the actual instances of C++ objects interact with one another within each module.

Other than showing that each dialog is managed by the object, whose name is displayed in the dialog, the main difference from the module IA-map are both the CComCPL and CDriverAdmin C++ objects. Both objects are described below.

As the description of each dialog class is fairly straight forward and very similar to the dialog description above they will not be described in this section. This section will describe all other C++ objects.

The CComCPL is a C++ object that is generated by the COMBuilder application from a template. It is used to handle all Windows messages sent from the Control Panel Application.

The CDriverAdmin object is used to drive, control, and manage the use of the driver administrator 32 Component. For example, all OLE 2.0 interface management and data translation is handled by this object. Data translation involves translating data from a standard C++ format to a raw format that is handled easily with the OLE 2.0 data transfer mechanisms.

Scenario Interaction-Maps are almost identical to object interaction-maps but they only display the objects and interactions taking part in a specific operation. Also, each interaction is numbered by the sequence in which they occur while the operation is running. The following discussion describes several key operations that occur while running the driver administrator CPL 38 Applet.

Initialization occurs when the user first runs the CPL Applet. During this process all other objects are initialized and several modules are loaded. There are two steps that take place during the initialization process: First the application is initialized, and second the dialog is initialized with values queried from the driver administrator 32 Component. The following sections describe each.

Initializing the application, which is shown in FIG. 53, occurs when the application is first run and the main dialog has not yet been displayed. When initializing the application, the following steps occur.

Through a Windows message, Windows notifies the CComCPL object that the Control Panel Applet has just been loaded. CComCPL then loads the CDriverAdminDialog and tells it to do any dialog prepping before going modal. Next, CDriverAdminDialog loads any settings stored in the Registration Database. For example, the current window position and active tab may be stored in the database. CDriverAdminDialog then Loads the CDriverAdmin class and directs it to initialize itself. During initialization, CDriverAdminDialog creates an instance of the driver administrator 32 and queries all interfaces that will be used.

Once the application is initialized, the default settings to be displayed in the dialog must be set. These values are set when the dialog is initialized, just before displaying it. FIG. 54 describes this process. During the process of initializing the dialog, the following steps occur.

During the dialog preparation that occurs before the DoModal call, CDriverAdminDialog queries the CDriverAdmin object for the driver enumeration to be used when setting initial values to be displayed in the dialog box. CDriverAdmin uses the driver administrator 32 Component to query for the driver information map, which is then passed back to the CDriverAdminDialog. Once receiving the driver information map, the CDriverAdminDialog uses the information to update all user-interface items related to either drivers or streams.

Adding a driver to the system 22 can be broken down into two steps. First, the module name must be added to the system. Next, the driver administrator 32 main dialog must update itself to reflect the new driver just added.

Adding a driver occurs when the user presses the "Add . . ." button on the driver administrator 32's main dialog. FIG. 55 describes this process. When adding a new driver, the following steps occur.

When adding a driver, first the user must press the "Add . . ." button. After pressing the button, CDriverAdminDialog opens up the common open file dialog. The user must enter in the filename of the driver to add and close the dialog. CDriverAdminDialog then passes the filename to the CDriverAdmin object and calls the RegisterDriver method passing in the name of the module to register as a driver. CDriverAdmin then passes the driver filename to the driver administrator 32 Component and directs it to register the driver in the system 22.

The process of updating the main dialog is identical to the process of initializing the dialog discussed above.

Similar to the process of adding a new driver, removing a driver involves both removing the driver from the system and then updating the main dialog. Pressing the "Remove" button removes a driver from the XMC software system. FIG. 56 describes this process. The following steps occur when removing a driver.

To remove a driver, the user must first select the "Remove" button. After pressing the button, the selected driver or parent driver to the selected stream will be removed. CDriverAdminDialog passes the XMC_HDRIVER of the driver to the CDriverAdmin and directs it to remove the driver by calling its UnRegister method. CDriverAdmin passes the XMC_HDRIVER to the driver administrator 32 Component and directs it to UnRegister the driver.

The process of updating the main dialog is identical to the process of initializing the dialog discussed above.

Viewing Support involves viewing the level of support implemented by the selected driver. FIG. 57 describes the process of providing this information to the user via the View Support Dialog. The following steps occur when viewing the support provided by the driver.

First the user must select the "View Support" button on the driver administrator main dialog. When selected, CDriverAdminDialog queries CDriverAdmin for the driver support information. CDriverAdmin passes the query on to the driver administrator 32 component who actually fills out the information. Once the queried information is returned, the CDriverAdminDialog passes it on to CViewSupportDialog. CViewSupportDialog initializes itself using the driver support information.

Attached hereto as Appendix H is a document that describes the actual OLE Interfaces exposed, the definitions of the data structures used when passing data around, and the definitions of each class used internally by the driver administrator 32.

VIII. Driver Administrator CPL Applet

This section contains a description of the driver administrator control panel applet 38. When using the driver administrator 32 to configure the motion control system, there are two main items that the user will work with: drivers and streams. Each driver 30 generates the hardware specific, control codes that are then sent to the selected stream component 28. Streams facilitate the data transport layer between the driver and the control-code destination.

Depending on the current hardware setup, different streams may be used. For example, if the hardware is connected to the PC Bus, a PC Bus stream will be used to communicate to it. On the other hand, if the hardware is connected through a serial cable to a serial I/O Port, the serial stream will be used. Finally, all hardware configurations may use the file stream. When using the file stream, all control-codes are sent to the specified file that can be downloaded to the hardware at a later time.

This section describes both drivers and streams, and how each is configured. This section initially describes the driver items and all property pages used to edit them. This section also contains a description of the streams and their property pages. Finally, this section describes the about box containing details on the Software.

The main purpose of each driver is to generate the hardware-specific control-codes directing the hardware to carry out specific motion control actions. For example, such actions may include querying the hardware for the current position or directing the hardware to move to a predetermined location in the system. The following discussion describes the property pages used to configure each driver.

There are two types of properties affecting each driver. First, a set of defaults may be set that are used by the motion control component 35 as recommended values. The scaling and units used are several example default values. In addition to setting default values, if the driver supports more advanced configuration, pressing the Advanced . . . button will display a dialog box used to set the driver configuration. For example, if a driver does not support streams, the advanced configuration dialog, provided by the driver, will allow the user to set the I/O Port and IRQ settings.

The properties affecting drivers 30 are as follows.
Scaling—Setting the scaling property affects the default scaling used on all axes within the motion control system. The range for scaling values is (0.0, 1.0]. Default setting may be overridden when programming XMC by using the IXMC_StaticState interface.
Units—Setting the units property affects all coordinates used when programming the system 22.
The unit descriptions are as follows:
MM_ENGLISH—Inches are used as the base unit for all coordinates
MM_METRIC—Millimeters are used as the base unit for all coordinates.
MM_NATIVE—The native coordinates defined by the hardware system are used. Coordinates used to program XMC are mapped 1:1 to the hardware coordinates.
Advanced . . . —Pressing this button will display a dialog used to edit any advanced properties for the driver that may be edited by the user.

In addition to allowing the user to set properties, each driver property page displays the full names of both the hardware supported and the hardware vendor who makes the hardware.

The buttons along the bottom of the windows work with the selected driver or stream. The following discussion describes each button and what it does.

Pressing the Make Default button selects the current driver to be the default. If a stream is selected, its parent driver becomes the default driver. The default driver is later used by the motion control component 35

Selecting the Add . . . button, displays the Add Module dialog. This dialog is used to add new drivers and streams to the system 22. Once selected, the new driver or stream will be displayed in the Driver tree view. When adding a stream, the stream is added under the currently selected driver. To enable the stream, you must select the enable check box located in the streams property page.

Selecting the Remove button, removes the current driver or stream selected. If a driver is removed all of its streams are also removed.

Selecting the View Support . . . button displays a dialog used to view the level of XMC support implemented by the driver. For example, all API interfaces and subsequent methods are displayed. If a lack of implementation within the driver prohibits an API interface from operating, the driver stub 36 is used. If the lack of implementation within the driver 30 cannot be replaced by operations within the driver stub 36, the interface or method is disabled.

The following are descriptions of each graphic found in the XMC Support View Dialog.

D—This graphic means that the interface or method is implemented by the driver 30.

S—This graphic means that the interface or method is implemented within the driver stub 36.

X—This graphic means that the interface or method is disabled because of a lack of implementation within the driver 30.

Like the properties page, a debug page is also provided to set all debugging settings for the driver. Each driver may specify that all API calls used to control the driver are logged. The logging settings only affect the current driver selected. The Output field allows you to select the output stream where all debug information is sent. When Streams is enabled, debug information is sent to the specified text file. When Debug Monitor is enabled, debug information is sent to the debug monitor if it is running. Using Enable to enable a stream turns it on causing all debug information generated to be sent to the stream. More than one stream may be enabled at one time.

Stream Settings are available for each debug stream supported. Text File allows the name of the text file may be set. The Debug Monitor can only be enabled and disabled.

A stream is the transport layer used by the driver to pass data to the destination location. The destination location may be the actual motion control hardware or even a text file. Usually the control language used by a hardware vendor is supported by several different flavors of their motion control hardware. For example, some vendors have both PC Bus based and Serial I/O based motion control hardware that understand the same control language. In such a case, the same driver would be used for each hardware setup but it would communicate with different streams depending on the specific hardware setup. Graphically, each stream is listed below each driver that uses the stream.

This section describes the streams supported by the system 22 and how they are configured.

The PC Bus stream sends all data directly to a PC Bus based motion control hardware system by writing to the specified I/O Ports and IRQ's defined by the hardware. This section describes both the properties and debug settings available for the PC Bus Stream.

Stream properties only affect the currently selected stream. The user is required to select certain settings, such as the I/O Port and IRQ. Without setting these values, the PC Bus Stream will not be able to communicate with the hardware. The properties affecting PC Bus Streams are described below.

The I/O Port is the base port used to communicate with the motion control hardware that the stream is to send data to.

The IRQ is the interrupt request level used by the hardware.

Pressing the Advanced . . . button will display a dialog allowing the user to edit more advanced stream options. For example, if the stream supports a Port I/O map that the user can edit, the port map would be displayed in this dialog. This button is only enabled for streams supporting advanced features that the user may edit.

When debugging an application program it may be useful to see what codes are actually sent to the hardware. The Debug Settings page for streams allows the user to enable and disable both the Cmd and Bit Streams. The Cmd Stream is used to log all command-codes sent to the hardware. If this level of detail does not provide you with enough information, the Bit Stream may be used. When enabled, the Bit Stream logs all values sent through each hardware port. All values read from and written to each port used by the hardware are logged. Note, when enabled, both streams may significantly slow down the application programming the motion control system.

Serial RS-232 Streams are used to send data from the driver to motion control hardware connected to the computer through the serial I/O port. Both property and debug settings only affect the selected Serial RS-232 Stream. The following discussion describes the available settings in each in detail.

All Serial RS-232 property settings must be set by the user for they let the stream know what I/O port and communication protocol to use when communicating with the hardware. The properties affecting Serial RS-232 Streams are as described below.

The Port is the serial port that the hardware is connected to COM1-COM4 are valid ports that can be used.

The Baud Rate is the speed of data transmission supported by the hardware.

When Hardware is selected a more efficient, but less compatible, communication protocol is used to communicate to the hardware. If errors occur when this protocol is selected, use the XON/XOFF communication protocol.

When the XON/XOFF communication protocol is selected a simple and more compatible communication protocol is used.

Debug settings for the Serial RS-232 Stream are very similar to those supported by the PC Bus Stream. Serial RS-232 Streams only support command logging through the Cmd Stream and do not support bit logging.

The Text File Stream is used to build control-code programs for later use. Using this stream facilitates running the XMC software in code-generation-mode. No motion control actions take place when running in this mode. Instead, control-code programs may be built and stored to file. Later, after programs are built and saved, they may be downloaded to the motion control hardware and run. The following discussion describes the property and debug settings for the Text File Stream.

The main property set, when configuring a Text File Stream, is the actual name and location of the file to use. Once set, the stream is ready for use.

The following properties may be configured for the Text File Stream:

Filename is the filename and location of the file used to store all control-codes generated by the driver 30 selected. Pressing the Browse . . . button displays a dialog allowing you to graphically select the location and filename to use.

No debug settings are available for the Text File Stream.

It should be clear from the foregoing that the present invention may be embodied in other specific forms without departing from the essential characteristics thereof. The present embodiments are therefore to be considered in all respects as illustrative and not restrictive, the scope of the invention being indicated by the appended claims rather than by the foregoing description; all changes which come within the meaning and range of equivalency of the claims are therefore intended to be embraced therein.

We claim:

1. A method of debugging software used to communicate with a motion control system, comprising the steps of:
   providing a set of hardware motion control attributes used for motion control,
      where
      at least one hardware motion control attribute is a primitive hardware motion control attribute used for motion control that cannot be emulated using at least one other hardware motion control attribute, and at least one hardware motion control attribute is a non-primitive hardware motion control attribute that does not meet the definition of a primitive hardware motion control attribute;

providing a set of common motion control attributes;

providing a motion control device capable of storing at least one primitive hardware motion control attribute;

generating debug information containing diagnostic information associated with at least one hardware motion control attribute;

providing a set of software drivers, where at least one software driver is capable of sending the debug information to a debug target;

selecting at least one selected software driver, capable of sending the debug information to a debug target, from the set of software drivers;

providing a software application;

causing the software application to call at least one motion component function to exchange at least one common motion control attribute with the at least one selected software driver;

using at least one called motion component function to cause at least one motion component to exchange at least one common motion control attribute with the at least one selected software driver by calling at least one driver function; and using at least one called driver function to cause the selected software driver to convert at least one common motion control attribute to at least one hardware motion control attribute, exchange at least one hardware motion control attribute with the motion control device, and send debug information to the debug target.

2. A method as recited in claim 1, wherein at least one primitive hardware motion control attribute sent to the debug target contains data read from the motion control device.

3. A method as recited in claim 1, further comprising the step of providing a set of command codes, wherein:

at least one command code is capable of causing the motion control device to perform at least one primitive motion operation, and at least one software driver is capable of causing at least one command code to be sent to the debug target.

4. A method as recited in claim 1, further comprising the steps of:

reading at least one primitive hardware motion control attribute; and causing the debug information to be sent to the debug target.

5. A method as recited in claim 1, wherein the step of exchanging at least one common motion control attribute causes the debug information to be sent to the debug target.

6. A method as recited in claim 1, wherein the step of exchanging at least one common motion control attribute causes:

the motion control device to move an object; and the debug information to be sent to the debug target.

7. A method as recited in claim 1, wherein the debug target is a file.

8. A method as recited in claim 1, wherein further comprising the steps of:

providing a user interface; and causing the debug target to display at least some of the debug information in the user interface.

9. A method as recited in claim 1, further comprising the step of providing a debug stream, wherein the debug stream is capable of writing at least some of the debug information to a file.

10. A method as recited in claim 1, further comprising the step of providing a debug stream, wherein the debug stream is capable of sending at least some of the debug information to a user interface.

11. A method as recited in claim 1, in which the selected software driver exposes a driver software interface, where the driver software interface comprises at least one driver function used to access at least one primitive hardware motion control attribute received from the motion control device.

12. A method as recited in claim 11, wherein the motion component is capable of querying and using the driver software interface.

13. A method as recited in claim 11, further comprising the step of exposing a motion software interface, where the motion software interface contains at least one motion component function.

14. A method as recited in claim 13, wherein the software application is capable of querying and using the motion software interface.

15. A method of debugging motion control software, comprising the steps of:

providing a set of hardware motion control attributes comprising primitive hardware motion control attributes, where the primitive hardware motion control attributes cannot be emulated using at least one other primitive hardware motion control attribute, and non-primitive hardware motion control attributes that do not meet the definition of primitive hardware motion control attribute;

providing a set of common motion control attributes;

providing a motion controller capable of storing at least one primitive hardware motion control attribute;

providing a motion control device capable of being controlled using the motion controller;

generating debug information containing diagnostic information associated with at least one hardware motion control attribute;

sending the debug information to a debug target;

providing a set of software drivers, where at least one software driver is capable of being configured to send the debug information to the debug target, and at least one software driver exposes at least one driver function that converts at least one common motion control attribute to at least one hardware motion control attribute;

selecting a selected software driver from the set of software drivers;

providing a software application;

causing the software application to exchange at least one common motion control attribute with the selected software driver by calling the at least one software driver function; and in response to the at least one called software driver function, causing the selected software driver to exchange at least one hardware motion control attribute with the motion control device, and send the hardware motion control attribute to the debug target.

16. A method as recited in claim 15, further comprising the steps of:
- reading at least one primitive hardware motion control attribute from the motion control device; and
- sending to the debug target the at least one primitive motion control attribute read from the motion control device.

17. A method as recited in claim 15, further comprising the steps of:
- writing at least one primitive hardware motion control attribute to the motion control device; and
- sending to the debug target the at least one primitive hardware motion control attribute written to the motion control device.

18. A method as recited in claim 15 further comprising the steps of:
- writing at least one primitive hardware motion control attribute to the motion control device, where the at least one primitive hardware motion control attribute written to the motion control device is capable of causing the motion control device to move an object; and
- sending to the debug target the at least one primitive hardware motion control attribute written to the motion control device.

19. A method as recited in claim 15, wherein at least one primitive hardware motion control attribute written to the motion control device is:
- capable of causing the motion control device to move; and
- is sent to the debug target.

20. A method as recited in claim 15, wherein the selected software driver exposes a driver interface that contains at least one driver function capable of being used to access at least one primitive hardware motion control attribute received from at least one motion control device.

21. A method as recited in claim 20, wherein the software application is capable of querying and using the driver interface.

22. A method as recited in claim 15, wherein the debug target is a file.

23. A method as recited in claim 15, wherein the debug target is a user interface that displays at least some of the debug information.

24. A method as recited in claim 15, further comprising the step of providing a debug stream, where the debug stream is capable of writing at least some debug information to a file.

25. A method as recited in claim 15, further comprising the step of providing a debug stream, where the debug stream is capable of sending at least some of the debug information to a user interface.

* * * * *